United States Patent [19]

Trouteaud et al.

[11] Patent Number: 5,025,950

[45] Date of Patent: Jun. 25, 1991

[54] APPARATUS FOR STORING AND DISPENSING FROZEN COMESTIBLES

[75] Inventors: Lee E. Trouteaud, Huber Heights; Robert J. Hadick, Kettering, both of Ohio

[73] Assignee: Hobart Corporation, Troy, Ohio

[21] Appl. No.: 405,635

[22] Filed: Jan. 16, 1990

[51] Int. Cl.5 .................... G07F 11/16; B65G 59/00

[52] U.S. Cl. .................... 221/5; 221/6; 221/129; 221/150 R; 364/479

[58] Field of Search .................... 221/5, 6, 14, 123-125, 221/129-131, 133, 150 R, 226, 236, 258; 364/479

[56] References Cited

U.S. PATENT DOCUMENTS

| | | | |
|---|---|---|---|
| 2,720,337 | 10/1915 | Chater | 221/111 |
| 2,971,675 | 2/1961 | Allegri | 221/150 R |
| 3,139,994 | 7/1964 | Chasar | 214/16.4 |
| 3,325,049 | 6/1967 | Craven et al. | 221/6 |
| 3,893,589 | 7/1975 | Mandell | 221/123 |
| 3,901,366 | 8/1975 | Schuller et al. | 194/4 C |
| 4,008,827 | 2/1977 | Appelbaum et al. | 221/197 |
| 4,039,785 | 8/1977 | Ziemann | 235/151 |
| 4,051,978 | 10/1977 | Kiefer | 221/197 |
| 4,225,056 | 9/1980 | Flubacker | 364/479 |
| 4,231,105 | 10/1980 | Schuller et al. | 364/479 |
| 4,267,942 | 5/1981 | Wick, Jr. et al. | 221/2 |
| 4,372,464 | 2/1983 | Otten | 221/14 |
| 4,412,292 | 10/1983 | Sedam et al. | 364/479 |
| 4,483,459 | 11/1984 | Taylor et al. | 221/14 |
| 4,639,875 | 1/1987 | Abraham et al. | 364/479 |
| 4,687,119 | 8/1987 | Juillet | 221/133 |
| 4,766,548 | 8/1988 | Cedrone et al. | 364/479 |
| 4,789,054 | 12/1988 | Shore et al. | 194/212 |
| 4,812,629 | 3/1989 | O'Neil et al. . | |
| 4,839,505 | 6/1989 | Bradt et al. | 235/381 |

*Primary Examiner*—David H. Bollinger
*Assistant Examiner*—Steven Kennemore
*Attorney, Agent, or Firm*—Robert J. Fox; Russell L. McIlwain

[57] ABSTRACT

An apparatus and method for storing and dispensing comestibles, such as ice cream, has a cabinet defining an interior for holding a plurality of stacked ice cream containing magazines. A refrigeration system for cooling the interior of the cabinet below the freezing point of the ice cream is connected thereto. An X-Y picker assembly is positioned in the cabinet interior to transport ice cream from the selected magazine without heating the selected ice cream container or any other ice cream containers stored therein. The ice cream is carried by the X-Y picker assembly to a dispensing opening in the cabinet from which it can be accessed by the consumer. A nonvolatile information storage device is associated with the plurality of magazines and contains product characteristic information therein related to the flavors of ice cream in the magazines. A mapping system maps switch closures from product selection switches with the product characteristic information.

9 Claims, 34 Drawing Sheets

FACTORY LOADING OF MAGAZINES

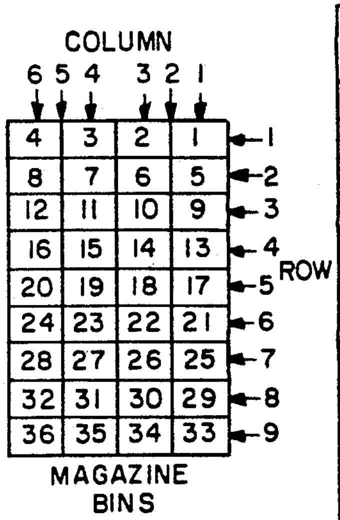
FIG. 16
| MAGAZINE POSITION | PICKER TRAVEL TO: | | MAGAZINE POSITION | PICKER TRAVEL TO: | |
|---|---|---|---|---|---|
| | ROW | COLUMN | | ROW | COLUMN |
| 1 | 1 | 1 | 20 | 5 | 6 |
| 2 | 1 | 3 | 21 | 6 | 1 |
| 3 | 1 | 4 | 22 | 6 | 3 |
| 4 | 1 | 6 | 23 | 6 | 4 |
| 5 | 2 | 1 | 24 | 6 | 6 |
| 6 | 2 | 3 | 25 | 7 | 1 |
| 7 | 2 | 4 | 26 | 7 | 3 |
| 8 | 2 | 6 | 27 | 7 | 4 |
| 9 | 3 | 1 | 28 | 7 | 6 |
| 10 | 3 | 3 | 29 | 8 | 1 |
| 11 | 3 | 4 | 30 | 8 | 3 |
| 12 | 3 | 6 | 31 | 8 | 4 |
| 13 | 4 | 1 | 32 | 8 | 6 |
| 14 | 4 | 3 | 33 | 9 | 1 |
| 15 | 4 | 4 | 34 | 9 | 3 |
| 16 | 4 | 6 | 35 | 9 | 4 |
| 17 | 5 | 1 | 36 | 9 | 6 |
| 18 | 5 | 3 | DELIVERY LEFT | 7 | 2 |
| 19 | 5 | 4 | DELIVERY RIGHT | 7 | 5 |
FIG. 17
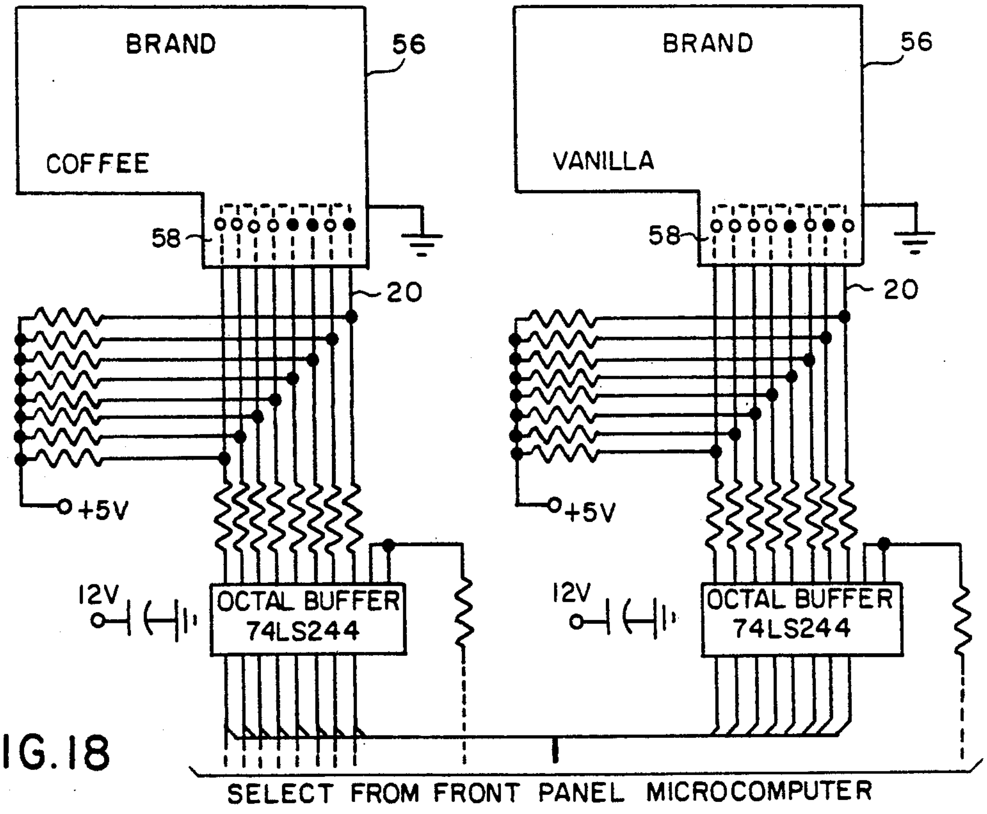
FIG. 18

APPARATUS FOR STORING AND DISPENSING FROZEN COMESTIBLES

BACKGROUND OF THE INVENTION

The instant invention generally relates to an apparatus for storing and dispensing frozen comestibles in a freezer unit. In particular, the invention relates to an apparatus for storing and dispensing frozen comestibles which substantially isolates the comestibles in a controlled thermal environment to prevent them from thawing. The apparatus also dispenses the comestibles automatically by using handling equipment maintained at the same temperature as the comestibles in order to prevent thawing of comestibles remaining in frozen storage immediately adjacent those being dispensed during a selected dispensing cycle.

It is well known that many people today often wish to reward themselves by the small indulgence of having a high quality ice cream. The market for high quality ice creams has grown greatly in the last 15 to 20 years as a result of this increased demand. The high quality ice creams sold in this market are often made from substantially natural ingredients and often have a high butterfat content in order to provide a pleasing taste to the discriminating purchaser. These high quality ice creams are often distributed by ice cream stores in hand-packed containers, but, more recently, are being sold through mass market stores such as supermarkets and the like.

It is well known that such ice cream is typically sold in freezer units having open tops which are exposed to handling by the public. While the freezer units typically maintain their temperature at −15° F. to −20° F., it is apparent that, since the top is open, anyone wishing to inspect the ice cream can reach in, touch the ice cream and move it about. The person looking for a particular flavor of ice cream thus may handle a number of cartons or containers of ice cream while searching for the flavor that he or she wants. As the customers handle the ice cream, they tend to heat small portions of it which may melt and then quickly refreeze leading to deterioration in the quality of the ice cream. The relatively high temperature of the person's hand touching the ice cream is almost 100° F. or higher than the temperature of the ice cream, leading to rapid heat transfer into the ice cream and sometimes localized melting. In addition, it may be appreciated that, since the prior art freezer units are not substantially enclosed, there may be temperature gradients and, if the ice cream is over-packed, there may be partial melting of the ice cream near the top of the unit. As a result of the partial melting of the ice cream, the ice cream will often later refreeze but with portions of the ice cream having stratified out of the liquid solution and with the water, upon refreezing, forming ice crystals. While this is not desirable, it may be tolerated by persons purchasing low cost ice cream on the theory that they have not spent a great deal of money. However, this is clearly unacceptable for persons spending a great deal of money for a high quality ice cream in which taste and texture are all important.

Other freezer units have been developed which dispense ice cream through front opening doors. It is clear that with these units, when the doors are open, a great deal of cold air drops out of the bottom of the door opening while warm air rushes into the upper portions of the freezer unit allowing the ice cream at the top and, in particular, the top and front of the freezer to be heated. Additionally, the ice cream is subjected to handling which may cause the ice cream to thaw. This is due to the fact that the ice cream, while having been stacked neatly to begin with, may have been moved around by the customers and become stacked haphazardly.

The same product deterioration problems may be encountered with conventional freezer units because of the manner in which they are stocked with ice cream. Typically, ice cream is packed on a refrigerated truck on skids, pallets or the like. When the ice cream is delivered to the retailer, it is unloaded from the truck and loaded by hand into conventional display type freezers. As a result of the fluctuating to which the ice cream is exposed, as well as the manual handling, the ice cream may be melted and refrozen leading to a deterioration in quality as set forth above.

A number of handling schemes have been devised for other types of products where, in particular, it is desirable to maintain the physical security of an item but allow one to receive the item through a dispenser after the product has been selected. In particular, see U.S. Pat. No. 4,789,054 to Shore, et al. for Vending Machine For Returnable Cartridges which discloses a vending machine for vending reusable articles, in this case, video cassettes and containers.

See also U.S. Pat. No. 4,812,629 to O'Neil, et al. for Method and Apparatus for Vending which also discloses a video cassette vending machine having a video cassette handling system including a storage rack 12 in which are placed video cassettes and from which they may be selected by a carrier means for carrying the video cassettes between one of the storage positions and the vend position 17. Note, in particular, that the carrier means 35 includes a vertical rod 42 and a horizontal rod 46 comprising geared racks. The carrier means 35 is operated under the control of the microprocessor system 104.

U.S. Pat. No. 4,839,505 to Bradt, et al. for Apparatus and Method for Storing and Retrieving Articles discloses a machine for dispensing rental videocassettes. The system includes a picker assembly 148 which is movable in the r, theta and z directions for selecting videocassettes from a carousel type storage arrangement.

Although the O'Neil, et al., Shore, et al. and Bradt, et al. systems include a carrier means or vending means, it may be appreciated that the environment within which the video cassettes are stored is not temperature controlled. In other words, the video cassettes are selected by the carrier means in order that inadvertent vending of a video cassette does not take place which might allow a thief to make off with the video cassette without having paid for it.

What is needed then is a storage and dispensing system for insuring that frozen comestibles, once they are to be shipped, are maintained in a temperature controlled environment to prevent them from deteriorating due to unwanted fluctuations in the temperatures to which they are exposed. The apparatus and method also should prevent the frozen comestibles from being manually handled until dispensing actually takes place, which dispensing is subsequent to a selection having been made.

SUMMARY OF THE INVENTION

A number of the difficulties encountered with prior art freezer devices are solved by the instant invention.

The apparatus, according to the present invention, includes a cabinet having a refrigerator connected to it for cooling the interior of the cabinet. A plurality of food product selection switches are located on the exterior of the cabinet so that a user may select a particular food product, typically a particular flavor of ice cream. Associated with the food product selection switches are food product code sensors which may read a product code from a removable transparency held adjacent the food product selection switch. Typically, the transparency has an attractive photograph of the ice cream, an identification of its flavor and possibly other information associated therewith, so that the consumer may make an informed selection of the particular ice cream which is desired. Positioned within the cabinet are product characteristic storage means which include a random access memory loaded with information related to the flavors of the ice cream loaded within bins of a magazine. Mapping means are associated with the product characteristic means to cause product selection signals, generated by actuation of the food product selection switches, to be mapped with the product characteristic storage information signals so that an X-Y picker assembly may be controlled to select the appropriate ice cream containers from the magazine assemblies contained within the cabinet of the apparatus. The X-Y picker assembly is completely contained within the cabinet and is maintained at the same temperature as the magazines by the refrigeration equipment. In this manner, the portion of the picker assembly that actually touches the ice cream does not cause it to melt when it is being handled. In addition, since the system is completely sealed, it is unnecessary for a person looking for a particular flavor of ice cream to handle any of the ice cream. They may merely make their selection from the appropriate product selection switch on the outside of the cabinet. Since the location of each flavor is mapped into the apparatus, it is unnecessary to handle any ice cream other than ice cream which actually was selected by the consumer. This avoids thawing of the ice cream due to moving it about by hand while searching for a particular flavor. In the event that the ice cream having the selected flavor has been exhausted from the apparatus, a product out signal will be generated causing a visual indication to be produced so that the consumer is informed that his or her selection is then unavailable.

One particular advantage of the instant apparatus is that the ice cream loaded within the magazines need not be viewed by the person making the selection. In order to make sure that the ice cream remains completely sealed in its cooled state, the magazine assemblies made up of the stacked bins are loaded at a factory at which the ice cream is made. The loading takes place at temperatures below the freezing point of the ice cream in order to preserve its flavor, texture and other desirable characteristics. Each bin is loaded with six half-gallons of a particular flavor ice cream. Each of the magazines has associated with it a random access memory storage device of the nonvolatile type such as a CMOS RAM memory with a battery back-up power supply or an electrically erasable random access memory or the like, having product information coded therein related to the type of product or flavor of ice cream in each of the bins. For instance, the bin in the upper left-hand corner of the magazine bins may contain chocolate ice cream while the bins in the entire second tier of the magazine may contain vanilla ice cream. The product information is securely associated with the magazines by securely fastening the nonvolatile memory storage device to the magazine for shipment. The magazines are shipped in refrigerated trucks and, upon delivery at the retailer, immediately moved into the refrigerated cabinets of the inventive apparatus in order to prevent thawing or other temperature related deterioration of the ice cream. The nonvolatile memory device is, at the same time, electrically connected to other portions of the electrical system of the apparatus. Information from the nonvolatile memory device is automatically loaded into a system memory whenever access doors to the cabinet for the apparatus are open, thus insuring that whenever access is had to the magazines, which might possibly change the contents of the magazines, the information related to the magazine assemblies is remapped into the product selection mapping memory so that an accurate characterization of the product inventory is available for the system.

Since the apparatus maintains the ice cream in the cooled state until it exits the machine, it is clear that it prevents deterioration of the ice cream due to thawing and refreezing, as has so often occurred with the prior art systems. The use of the picker mechanism maintained at the refrigerated temperature allows the apparatus to make selections of the ice cream and handle ice cream containers without causing the ice cream to thaw or to be damaged.

The picker assembly, in particular, is adapted to operate in a low temperature, high humidity environment in which frost may be formed. Although other picker assemblies have been shown in the prior art, none of them are particularly adapted for use in refrigerated environments. One of the inventive features of the instant picker assembly is the use of magnetic sensors and, in particular, Hall effect position sensors positioned along various portions of the picker assembly so that position information regarding the picker may be supplied to the electronic portions of the system for measurement and control purposes. Other position indicators have used optical position sensors in the past, however, we have found that such optical position sensors cannot be used in a high humidity, low temperature environment due to the fact that frost and ice are formed on the sensors under typical operating conditions and block the optical paths between the light emitting diodes and the photo diodes or photo-transistors of a typical sensor pair.

In order to allow the system to be remotely operable and autonomous, a modem is provided within the electronic control system so that the system including the mapping means can be interrogated from remote locations from time to time to determine the condition of the system, including such things as the amount of product left in the system as well as the temperature conditions or whether there have been any equipment failures. This remote interrogation facility allows the ice cream wholesaler, who may have installed the system within a selected retail store, to interrogate the system without the necessity of sending skilled personnel out to examine the system. It is clear that the system may be interrogated more often and that potential faults may be found through the use of the modem communication facility before a failure occurs in the system or before its inventory is completely exhausted.

It is a principal aspect of the present invention to provide an apparatus for storing frozen comestibles, such as ice cream, in a low temperature isothermal environment to prevent deterioration of the ice cream due to thawing.

It is another aspect of the present invention to provide an apparatus for storing frozen comestibles having internal X-Y handling apparatus maintained at the same temperature as is the stored ice cream to prevent the stored ice cream from deteriorating during handling and dispensing operations.

It is a still further aspect of the present invention to provide an apparatus for storing and dispensing frozen comestibles which allows the user to make a product selection from an external panel without touching the chilled comestible stored therein.

It is a still further aspect of the present invention to provide an apparatus for storing frozen comestibles within magazine storage units wherein locations of particular types of comestibles within the magazine storage units may be easily varied and their location electronically identified via a mapping system.

It is another aspect of the present invention to provide a method of storing and dispensing frozen comestibles wherein frozen comestibles are located within closed magazines at a remote location and a resulting magazine assembly is loaded directly into a refrigerated cabinet of a refrigeration apparatus at a retail site.

Other aspects of the present invention will become apparent to those having ordinary skill in the art from the specification and the claims in light of the accompanying drawings.

BRIEF DESCRIPTION OF THE DRAWINGS

FIG. 16 is a schematic rendering of the addressing of the bins by column and row number;

FIG. 17 is a schematic or tabular showing of the bin positions and the picker addressing to move one or the other of the pickers of the picker assembly into registration with the selected bin;

FIG. 18 is a schematic showing of the relationship between the transparencies and the information transfer circuitry associated therewith;

DESCRIPTION OF THE PREFERRED EMBODIMENT

Figure 1:
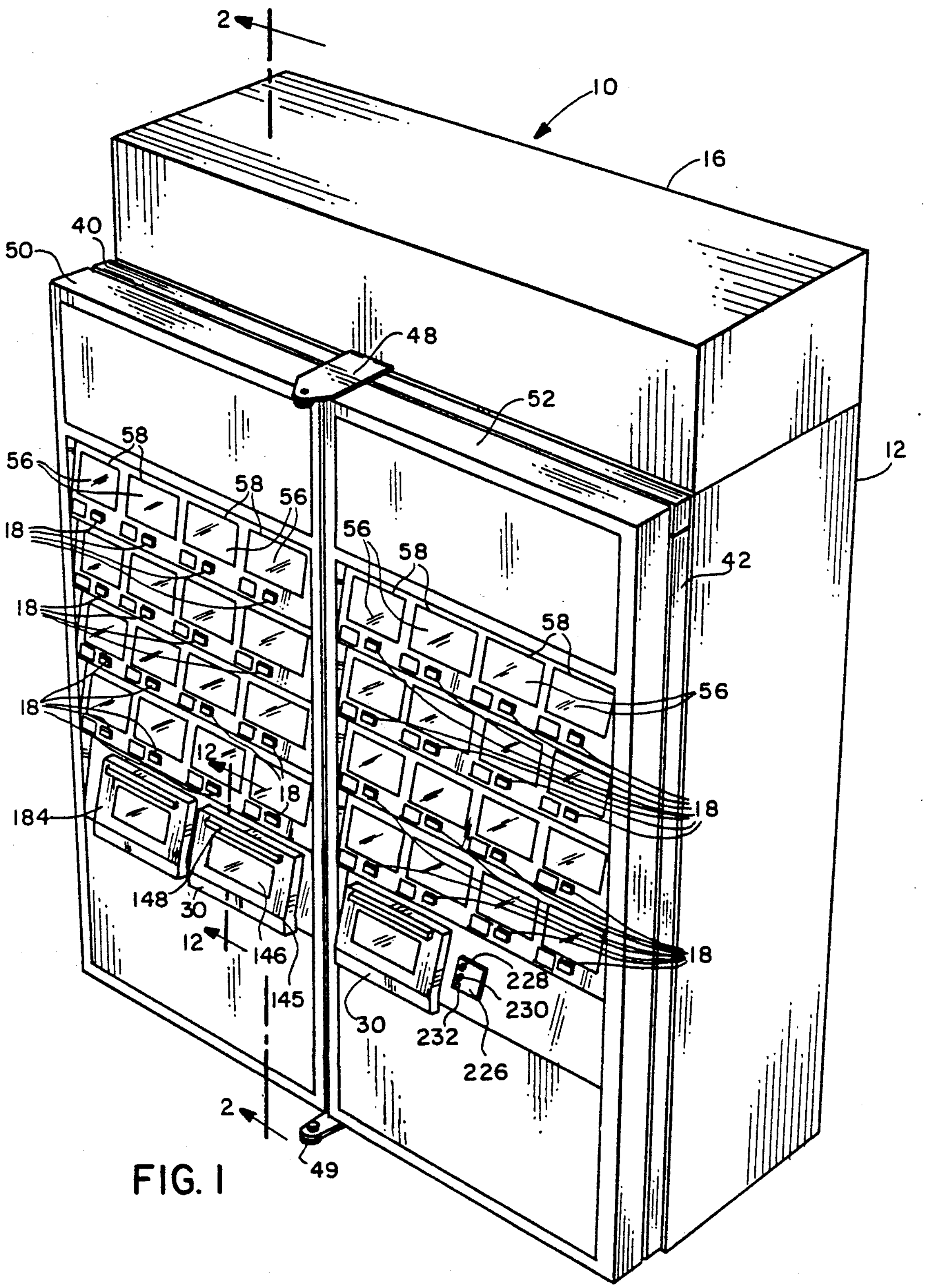
FIG. 1 is an isometric view of an apparatus for storing and dispensing frozen comestibles embodying the present invention.
Figure 2:
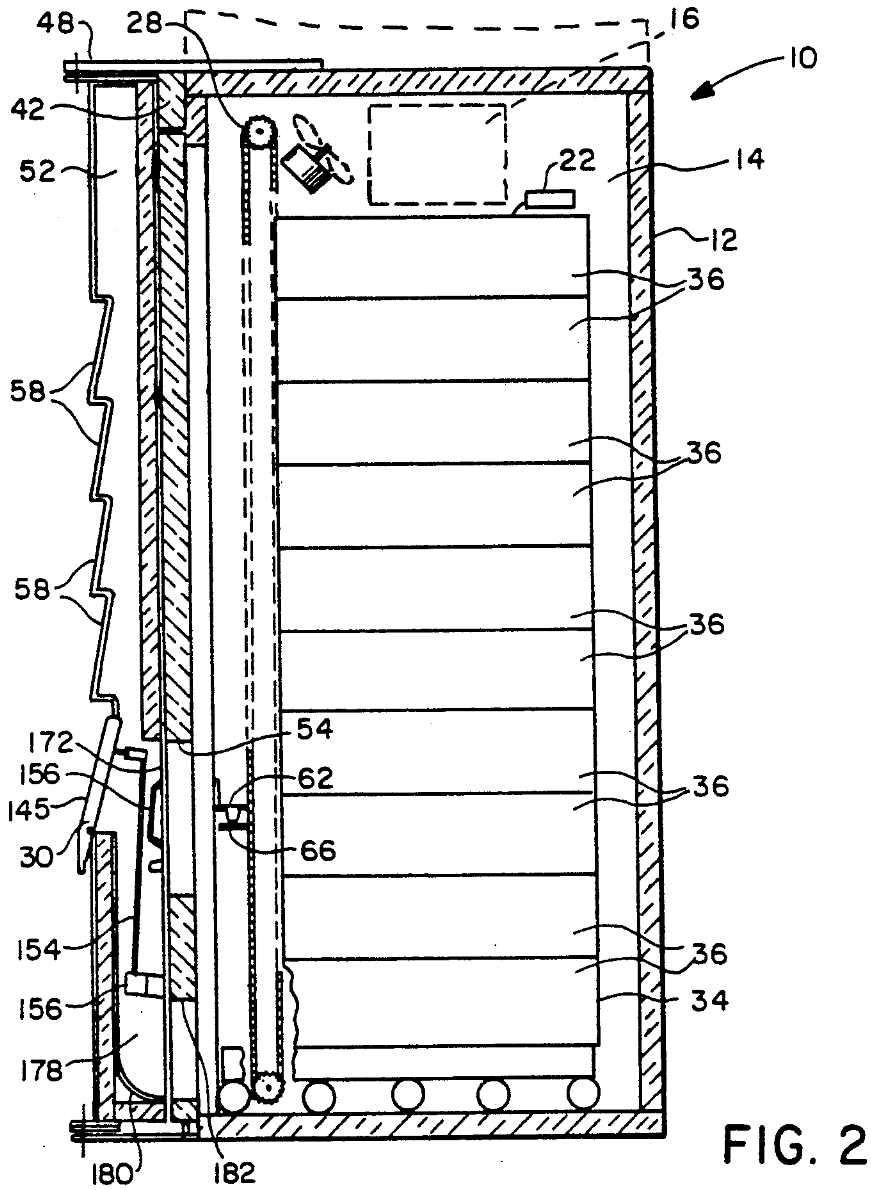
FIG. 2 is a sectional view of the apparatus of FIG. 1, taken along line 2—2, having a portion of a refrigeration unit broken away.

An apparatus 10 for storing and dispensing frozen comestibles is generally shown in FIGS. 1, 2, 3 and 4. The apparatus 10 includes a cabinet 12 having a refrigerated interior 14. Cooling means 16 for cooling the cabinet interior 14 is mounted in an upper portion of the cabinet for keeping the temperature within the cabinet at about −15° F. to −20°60 F. The cabinet 12 includes a plurality of food product selection switches 18 which may be actuated by a customer to cause delivery of a selected flavor ice cream from the interior 14 of the cabinet 12. Associated with each of the food product selection switches 18 is a food product code sensor 20 adapted to read a digital code stored in a transparency and showing a food product thereon, as may best be seen in FIG. 18. Product characteristic storage means 22, in this embodiment a pair of Dallas Semiconductor model no. DS1217A CMOS random access memories having battery back-up power supplies to make them nonvolatile and to maintain product information therein, are positioned within the interior 14 of the cabinet 12. Mapping means 24 and interrogating means 26 communicate with the product characteristic storage means 22 to move information from the product characteristic storage means 22 into the mapping means 24 where it can be accessed by interrogating means 26 when one of the product selection switches 18 is activated by a customer. Handling means 28, comprising a picker assembly, is positioned within the interior 14 of the cabinet 12 and maintained at −15° F. to −20° F., as are the portions of the interior 14. A pair of frozen comestible delivery stations 30, as may best be seen in FIG. 1, are positioned so that a customer may remove a product from them which has been transferred from the interior 14 of the cabinet 12 to one of the frozen comestible delivery stations 30 by the picker assembly 28. A pair of magazines 32 and 34, each made up of a plurality of bins 36 capable of holding six half-gallons of ice cream in each bin, may be removably positioned within the interior 14 of the storage cabinet 12. The bins 36 are loaded at a remote site, typically a factory where ice cream is produced, and are loaded under substantially isothermal conditions, that is at −5° F. to −20°60 F. to prevent deterioration of the ice cream by heating. Associated with the magazines 32 and 34 are the product characteristic storage means 22, in this case a storage medium comprised of the CMOS RAM data cartridges 22. The cartridges 22 are connected via anchor cables 38 to their respective magazines 32 and 34. This prevents the data in the CMOS RAMs 22 from being separated from the magazines 32 and 34 during shipment so that, although the magazine bins 36 remain sealed, information is available in the data cartridges 22 as to the contents of the magazine bins 36.

Figure 3:
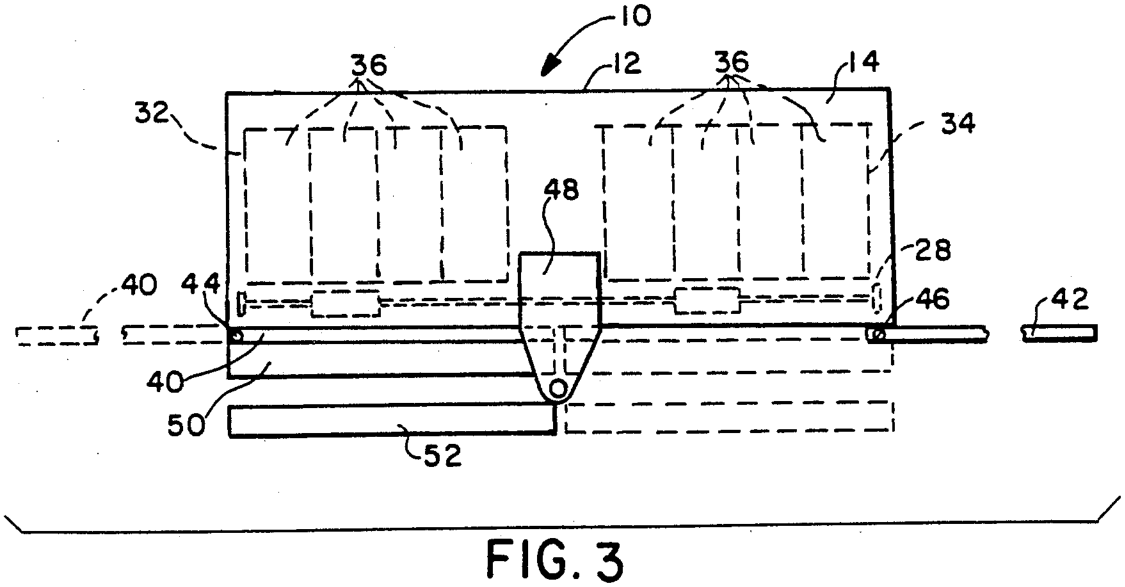
FIG. 3 is a top elevational view of the apparatus of FIG. 1 showing, in phantom, the position of a pair or interior doors and a pair of exterior doors when opened.
Figure 4:
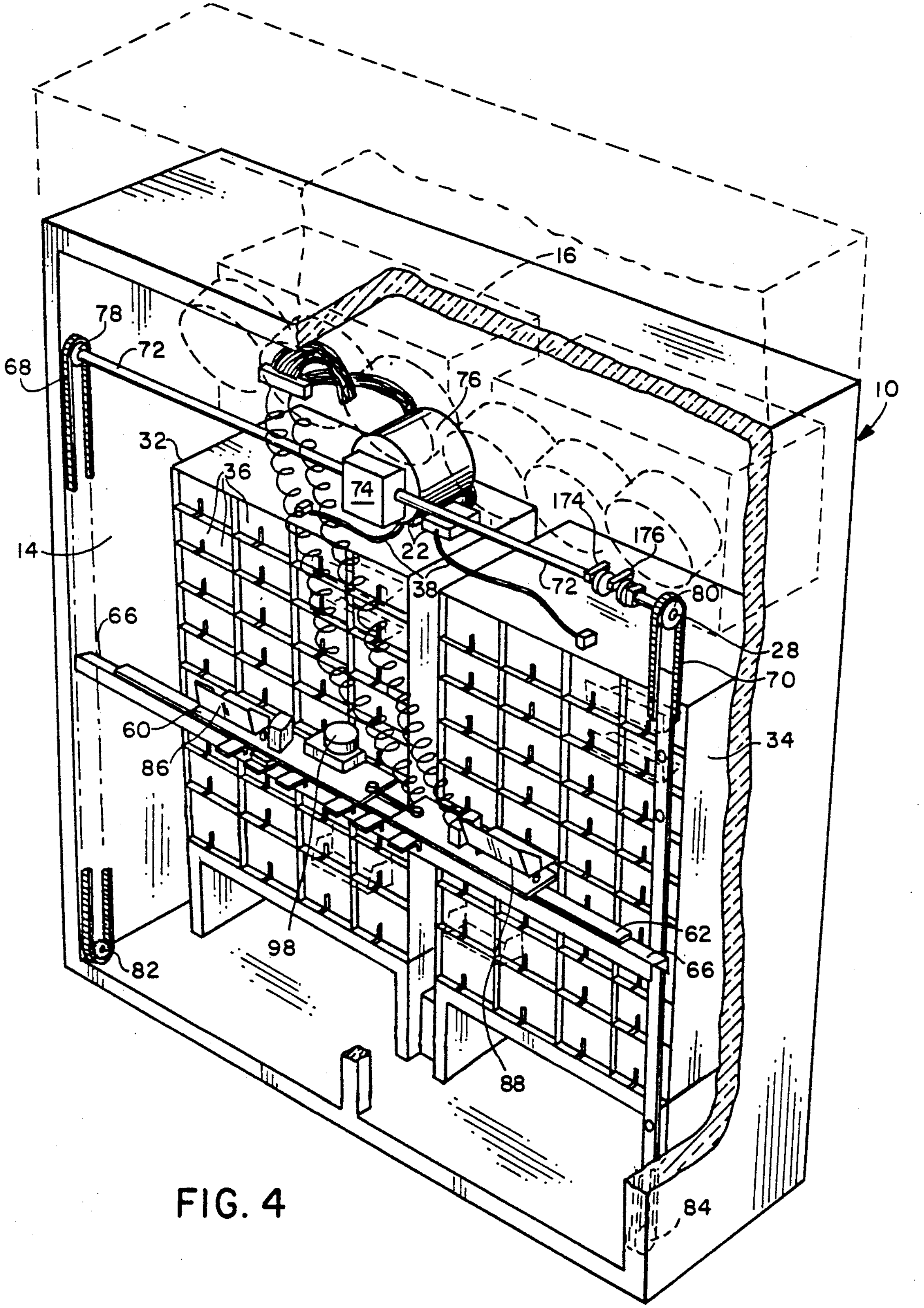
FIG. 4 is an isometric view of the apparatus of FIG. 1 having portions broken away to show interior details thereof including a picker mechanism and a pair of frozen food storage magazines.

As may best be seen in FIGS. 1 and 3, the cabinet 12 includes a pair of inner thermal doors 40 and 42 which are pivotable, respectively, about hinges 44 and 46 located at wall portions of the cabinet 12. A center hinge structure 48 suspends a pair of outer doors 50 and 52, which are pivotable thereabout. The inner doors 40 and 42 provide substantial thermal insulation over nearly their entire extent. Although, as may best be seen in FIG. 2, inner door 40 has a delivery aperture 54 formed therein so that frozen comestibles stored in the bins 36 may be transferred by the handling means 28 to the delivery station 30 for access by a consumer, the outer doors 50 and 52 also have the food product selection switches 18 and the food product code sensors 20 positioned thereon. Associated with each of the food product code sensors 20 is a removable transparency 56 which typically shows a dish of ice cream of a selected flavor as well as the ice cream brand name and possibly even the price. The transparency 56 also has a code section 58 associated therewith having a plurality of circular perforations therein to define a digital code which is sensed by the food product code sensor 20 when the transparency 56 is inserted into a transparency window 58 of the outer door 50 and 52. The transparency windows 58 may be illuminated from behind by appropriate lighting to provide an attractive and pleasing display for a customer.

The magazines 32 and 34 which have their bins 36 loaded with frozen comestibles, in this instance half-gallon containers of ice cream, are positioned within the interior 14 of the cabinet 12 where they are kept refrigerated. It may be appreciated that no contact is made with the ice cream in the bins 36 other than by the picker assembly 28 which is maintained at −15° F. to −20° F. by the refrigeration system 16. It may be noted that the use of a pair of magazines within the interior 14 of the cabinet 12 may allow one magazine to be replaced or removed from the system 10 while the other continues to dispense product, thereby assuring a continuous flow of product to the customers even while magazine exchange operations remote from the cabinet 12 are taking place.

Figure 8A:
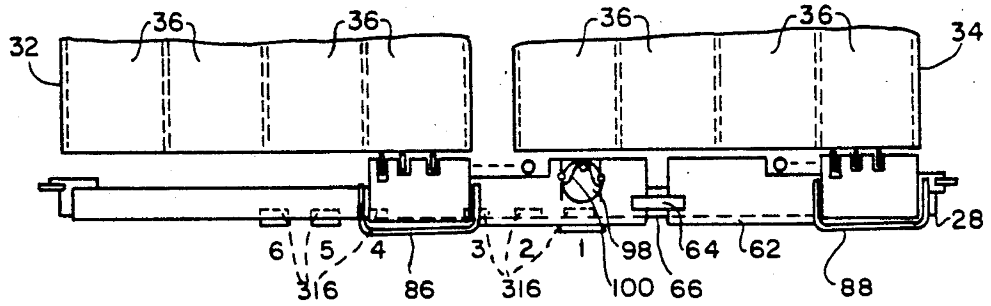
FIG. 8A is an elevational view of a portion of a picker assembly of the apparatus of FIG. 1 showing the orientation of the picker assembly with respect to one of the magazines.
Figure 8B:
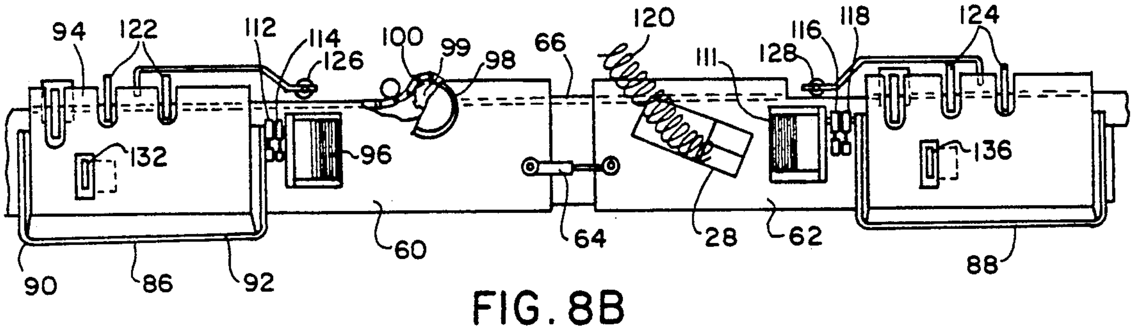
FIG. 8B is a detailed elevational view of the portion of the picker assembly in FIG. 8A.

Referring now, in particular, to FIGS. 8A and 8B, portions of the picker assembly 28 are shown therein. The picker assembly 28 includes a left-hand picker 60 and a right-hand picker 62. The two pickers are substantially identical and are joined by an adjustable link 64 so that the relative displacement between the picker 60 and the picker 62 may be easily controlled. The pickers 60 and 62 are horizontally movable along a horizontal track bar 66 to be brought into selective registration with the bins 36 and the delivery station 30. The horizontal track bar 66 is suspended from a first loop chain 68 and a second loop chain 70 disposed at opposite sides of the interior 14 of the cabinet 12. The loop chains 68 and 70 are driven by a drive shaft 72 connected to a transmission 74 having a vertical electrical motor 76 supplying driving energy thereto. The drive shaft 72 has a first end gear 78 and a second end gear 80, respectively engaging the loop chains 68 and 70, and an idler gear 82 and an idler gear 84 engaging the loop chains at lower portions of the cabinet 12. It may be appreciated that impetus from the vertical motor 76 causes the chains 68 and 70 to move, raising and lowering the horizontal track bar 66 of the picker assembly 28. The twin pickers 60 and 62 are movable horizontally along the bar 66 so that a rotatable ice cream transporter 86 may be brought into registration with one of the bins 36 of the magazine 32, or a rotatable ice cream transporter 88 may be brought into registration with one of the bins 36 of the magazine 34. The transporter 86 includes a bin or tray portion 90 having an upright section 92 and a normally horizontal or floor section 94. The tray 90 is connected to a transporter electric motor 96 so that the tray can be rotated with respect to the horizontal arm 66 of the picker assembly.

The picker 60 also has a horizontal electric motor 98 positioned thereon having a drive gear 99 engaging a fixed chain 100 so that when the horizontal motor 98 rotates, the fixed chain 100 causes the pickers 60 and 62 to move horizontally along the horizontal arm 66.

The transporter 88 includes an upright wall 102 formed integral with a normally horizontal wall 104. A pivot 106, having a pivot aperture 108 formed therein, allows the tray 88 to be rotated about a pin 110 by a transporter electric motor 111.

Figure 9:
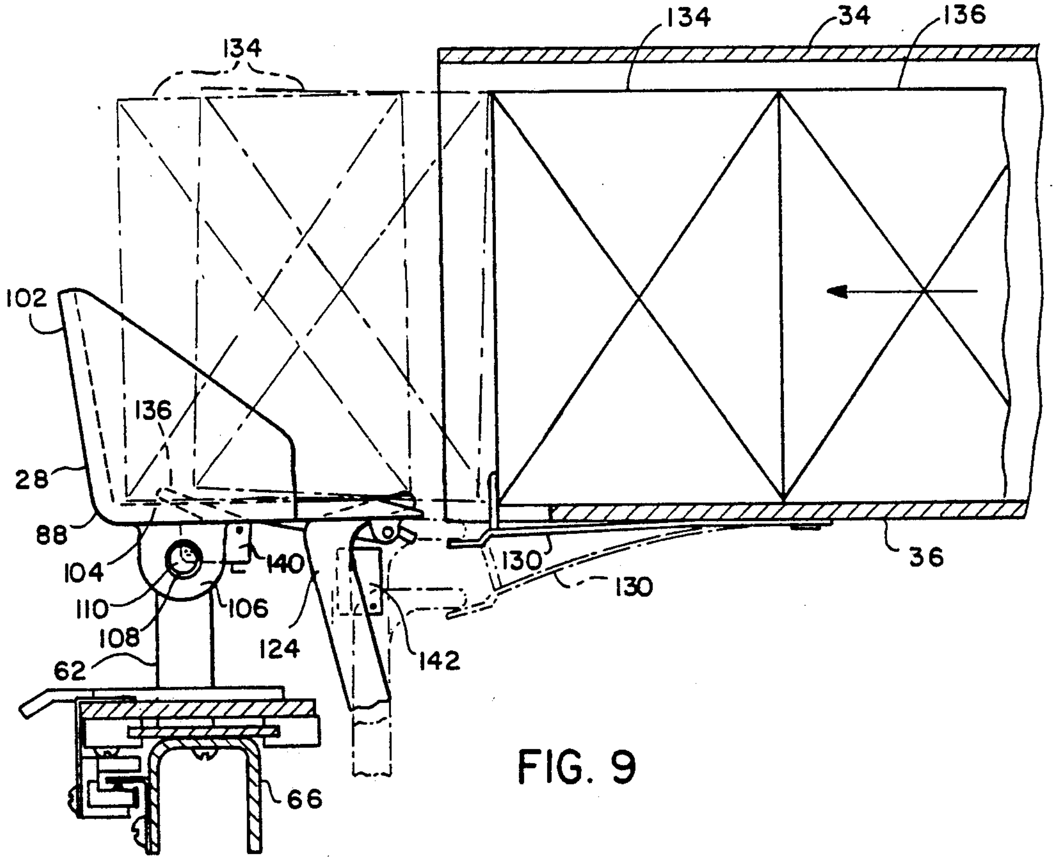
FIG. 9 is a sectional view of one of the magazines and a portion of the picker assembly showing details of the transfer of a half-gallon container of ice cream from the magazine to the picker.
Figure 10:
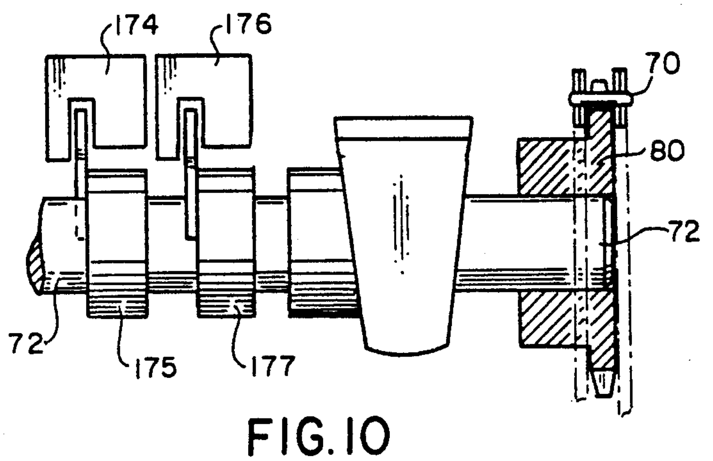
FIG. 10 is an elevational view of a vertical motion drive shaft of the picker assembly showing details of a pair of vanes and Hall effect switches which are actuated by the vanes.
Figure 11:
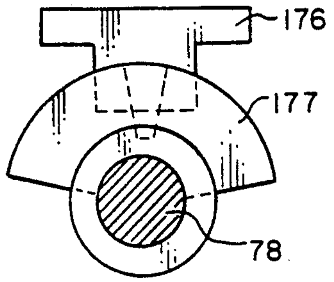
FIG. 11 is a sectional view of a portion of a vanes of the vertical motion drive shaft of the picker assembly.

It may be appreciated that a pair of rotary limit switches 112 and 114 are coupled between the transporter motor 96 and the transporter 86. Similarly, a pair of limit switches 116 and 118 are connected between the motor 111 and the transporter 88 to sense the position of the transporter 88 while it is being driven by the motor 111. Information from the switches 112 and 114 and control of the motors 96 and 111 is carried out by electrical signals carried by a cable 120 connected to the picker 62. The picker 60 includes a hook assembly 122 driven by a solenoid 126. The picker 62 includes a hook assembly 124 driven by a solenoid 128. As may best be seen in FIG. 9, when the transporter 88 is brought into registration with the end of one of the bins 36, which contains, as shown in FIG. 9, two half-gallon packages of ice cream 132 and 134, the hook 124 engages a leaf spring latch 130 to allow the ice cream 134 to be forced forward by a compression spring positioned at the back of the bin 36. As the package 134 is forced onto the normally horizontal wall 104 of the transporter 88, a switch arm 136, connected to a switch 140, is forced downward indicating to the system 10 that the package 134 is properly seated in the transporter 88. A sensing switch 142 also indicates to the system 10 whether or not the bin 36 has been unlatched, allowing the ice cream to be taken. Thus, actuation of switch 142 indicates ice cream taken and switch 140 actuation indicates ice cream properly loaded into the transporter 88. A switch 138, similar to the switch 136, is associated with the transporter 86.

Figure 12:
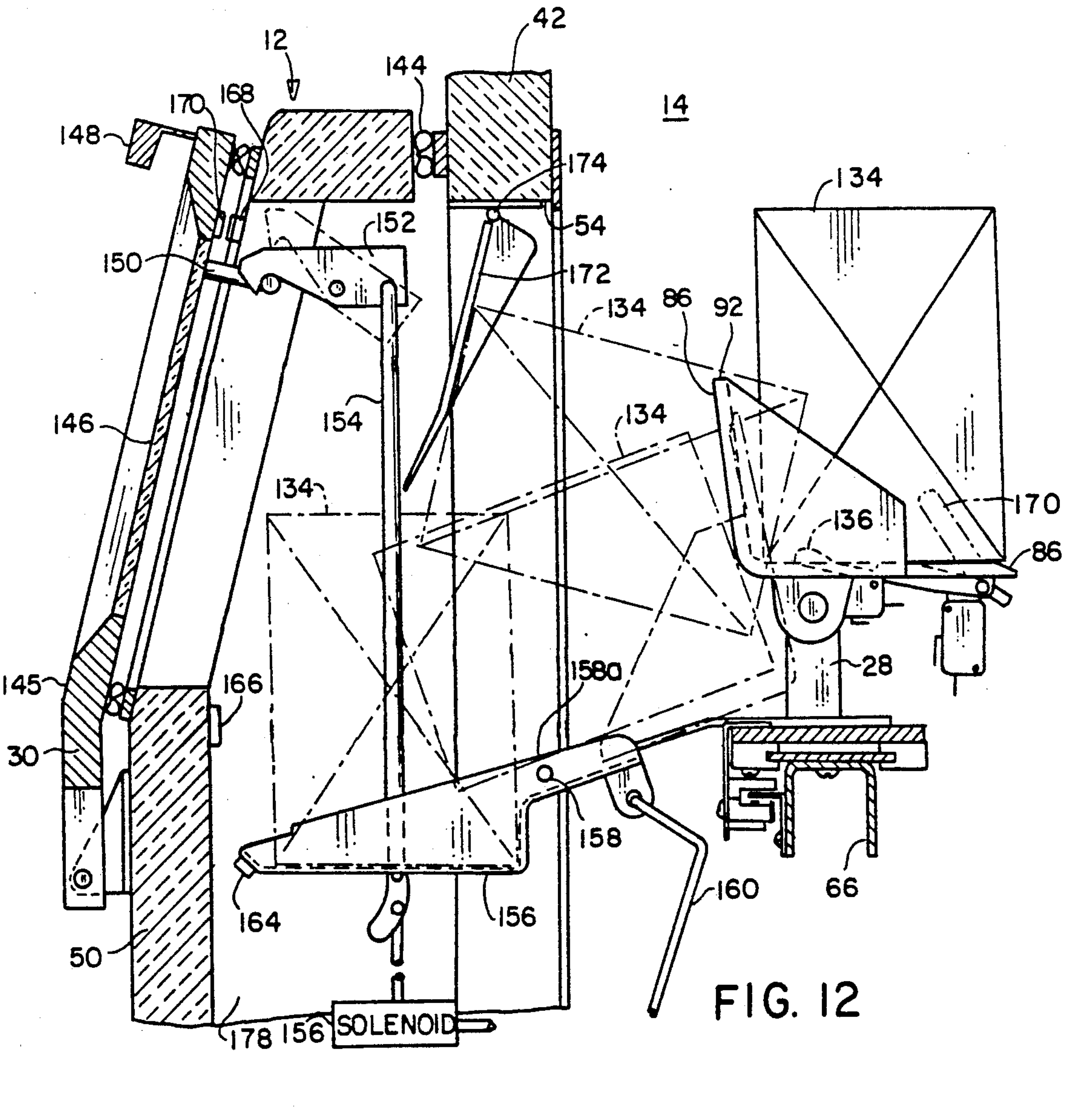
FIG. 12 is a sectional schematic view of the door assembly of the apparatus and the picker assembly showing the details of the transfer of a half-gallon of ice cream from one of the pickers of the picker assembly to the door for delivery to a consumer.
Figure 13:
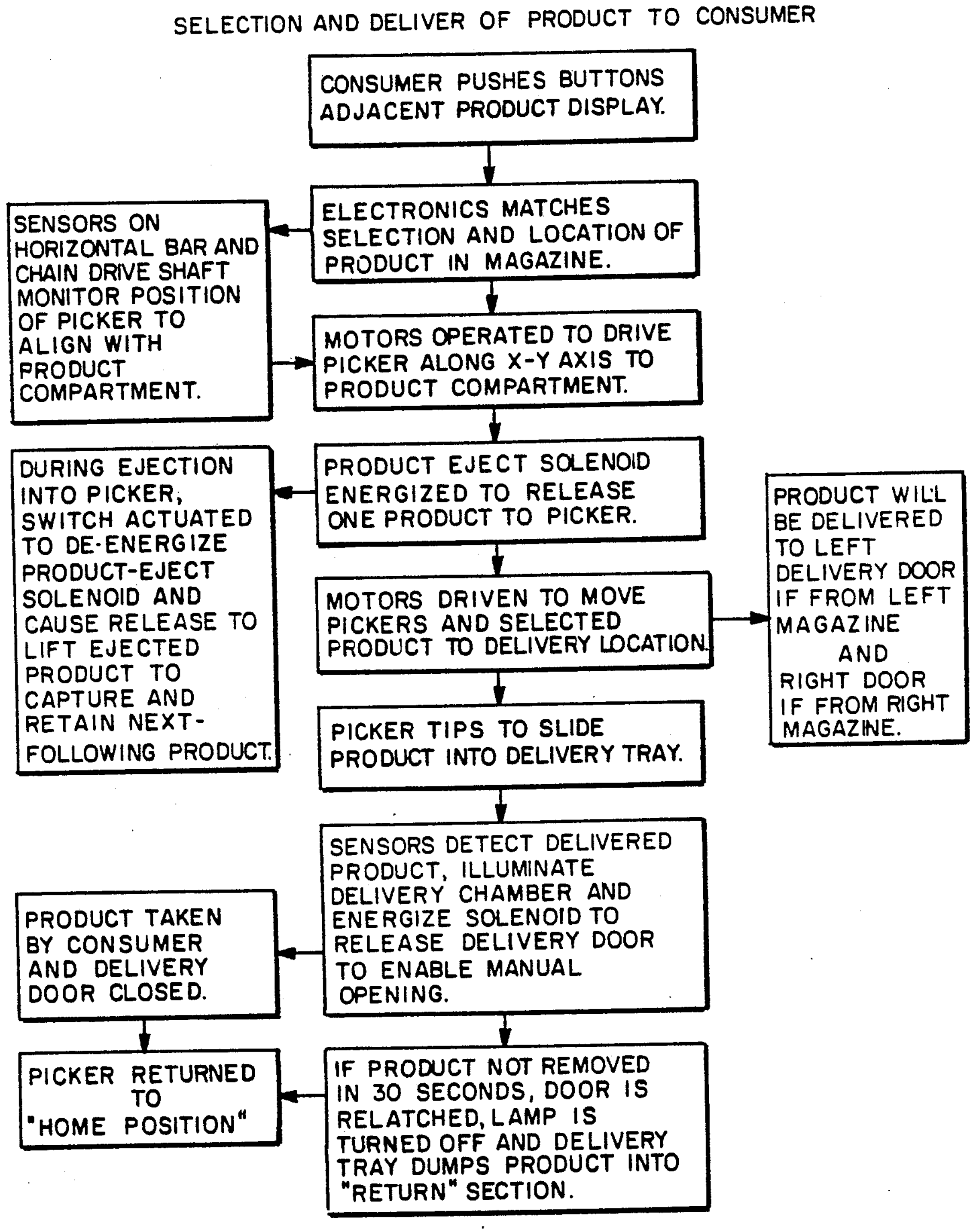
FIG. 13 is a flow diagram of the process of operation of the apparatus whereby a customer selects and receives a particular frozen food product.

Referring now to FIG. 12, it may be seen that when the picker assembly 28 moves into registration with one of the delivery stations 30, it is also in registration with the delivery aperture 54 of the thermal barrier door 42. It should be noted that the area around the aperture 50 is enclosed by a seal 144 attached to the door 40 in order to prevent leakage of heat into the interior 14 of the cabinet 12. The delivery station 30 includes a door 145 having a window section 146 and has a handle 148 connected thereto. It should be noted that the delivery door 145 has a latching pin 150 connected thereto which is engaged by a rotatable latch 152 connected to a link 154. Inadvertent opening of the delivery door 145 is prevented by the rotatable latch 152, which remains engaged with the pin 150 until a solenoid 156 is actuated by the system 10, drawing the link 154 downward and releasing the latch 152. This is not done until product 134 is in position to be delivered. It may be seen in FIG. 12 that the ice cream carton 134 carried on the transporter 86 is brought into registration with a dispenser tray 156 mounted on a pivot pin 158. As the product 134 slides into the dispenser tray 156, the dispenser tray 156 is held in a substantially level position by the weight of the product 134 acting against a stop 158a adjacent the dispenser tray 156. At the point that the product 134 is indicated as having left the transporter 86 by the switch arm 136 and a front transporter switch arm 170 having been raised, the system actuates the solenoid 156 to release the door 145. The door 145 remains released for 30 seconds allowing a consumer to open the door 145 and remove the ice cream package 134 from the interior of the freezer. In the event that the package is removed, the dispenser tray 156 pivots so that a magnet 164 on the end of the dispenser tray 156 is brought into juxtaposition with a Hall effect sensor 166 on the door 145, thereby signalling to the system 10 that the ice cream 134 has been taken. A signal is also sent to the system 10 that the door 145 has been opened by a delivery door sensor 168 positioned on the outer door 50 adjacent a magnet 170 positioned on the delivery door 145. It should also be appreciated that a flap 172 is attached via a hinge 174 to the portion of the door 40 defining the aperture 54 so that the flap 172 remains oriented substantially downward by partially sealing the aperture 54 to prevent the entry of warm air into the interior 14. When the dispenser tray 156 does not have an ice cream container 134 thereon, the dispenser tray 156 pivots so that the magnet 164 swings up into proximity with the flap 17 thereby allowing the flap 172 and the dispenser tray 156 to substantially close the dispensing aperture 54 in the inner door 40. If the ice cream package 134 is not taken from the dispenser tray 156, the dispenser tray 156 is released by moving the picker bar 66 downward to allow the dispenser tray 156 to swing downward and allowing the package 134 to slide down a chute 178 having a ramp 180 therein so that the ice cream 134 is returned through a return aperture 182 to the interior 14 of the cabinet 12 where it may be stored without any deterioration. Similarly, persons wishing to return ice cream may open a return door 184, next to the delivery door 145, and deposit the ice cream in a similar chute where it is returned to a holding area at the bottom of the interior 14 of the cabinet 12.

Figure 19:
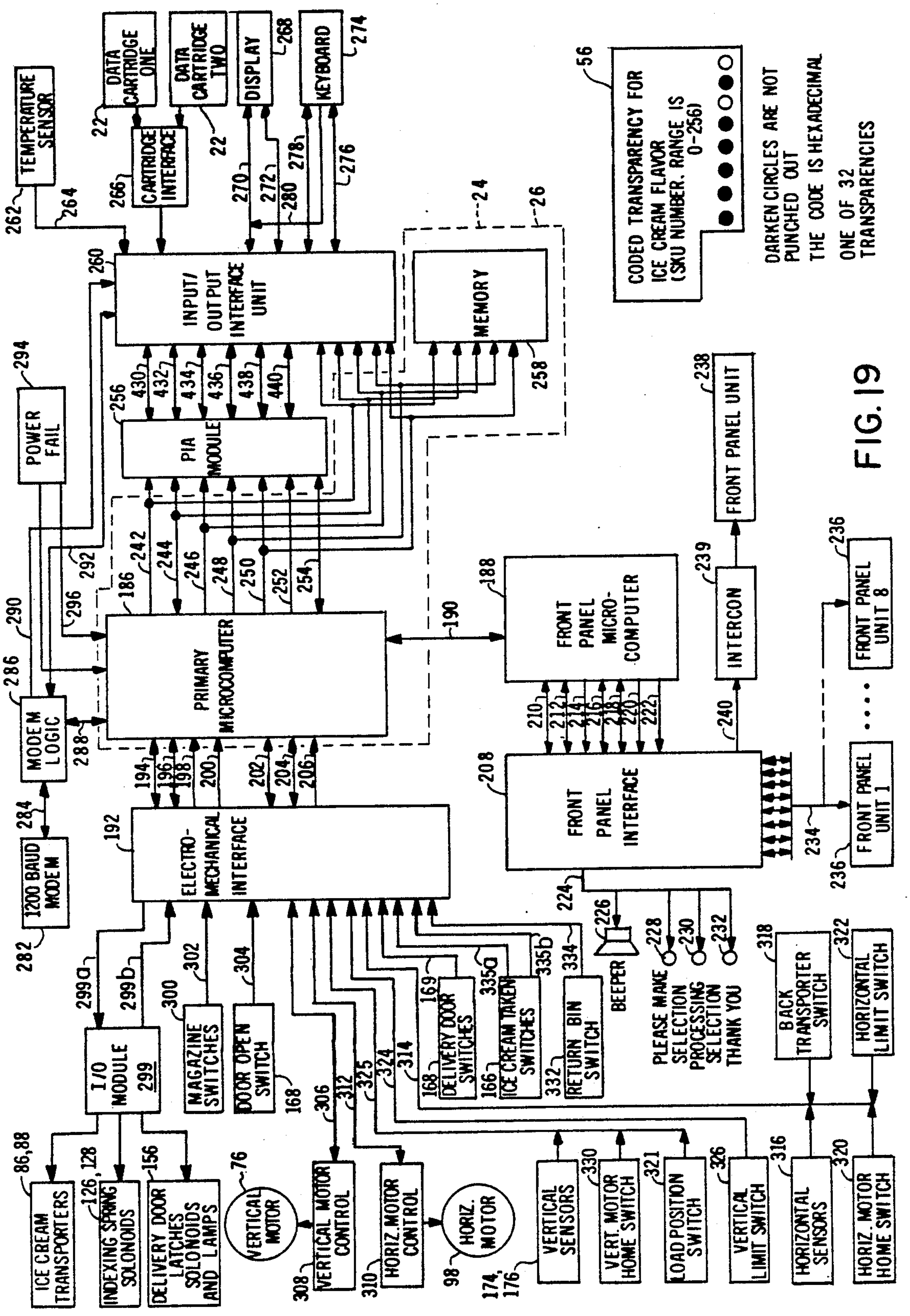
FIG. 19 is a block diagram of the electronic circuitry of the apparatus of FIG. 1.

As may best be seen in FIG. 19, a controller comprising a primary microcomputer control 186 and a front panel microcomputer 188, connected together via a bus 190, are shown therein. The primary microcomputer 186 is a Wintek 6809 multiboard microcomputer. The front panel microcomputer is a Wintek 6809 central processing unit assembly connected via bus 190 to the primary microcomputer 186. The microcomputer 186 is connected to an electromechanical interface unit 192 via a port 2 PA(0:6) bus 194, a port 2 PB(0:7) bus, a port 2 CA1 bus 200, a port 2 CA2 bus 202, a port 1 PA(0:7) bus 204, a port 1 PB(0:7) bus 204 and a port 1 CA1 bus 206. A front panel interface unit 208 is connected to front panel microcomputer 188 by a port 1 PA(0:7) bus 210, a port 1 PB(0:7) bus 212, a port 1 CA2 bus 24, a port 2 PA(0:7) bus 216, a port 2 PB(0:7) bus 218, a port 2 CB bus 220 and a RESET/E bus 222. The interface unit 208 is connected via a signalling bus 224 to a beeper 226, a please-make-selection lamp 228, a processing-selection lamp 230, and a thank-you lamp 232, all of which are located on outer door 52. A front panel selection bus 234 is connected to 8 front panel boards 236, each of which has two product selection switches 18 connected to it as well as two food product code sensors 20 connected to it. Each of the boards 236 is mounted inside of outer door 50. Similarly, a plurality of boards 238 are connected via a bus 240 to the interface unit 208. The boards 238 are connected to the product selection switches 18 in the outer door 52. The microcomputer 186 is connected via an address 242, an 8-bits data bus 244, an R/W bus 246, an E bus 248, an IOSEL bus 250, a reset bus 252 and a FIRQ bus 254 to a Wintek programmable interface module 256. Buses 242 through 254 are likewise connected to a memory board 258 and to an input/output interface board 260 as well. The input/output interface board 260 has a temperature sensor 262 connected to it via a bus 264. A cartridge interface unit 266 is connected by a bus 268 to the general interface unit 260. The data cartridges 22 may be connected to the cartridge interface unit 266 to transfer information thereto. A dot matrix display 268 is connected via a bus 270 and a bus 272 to the interface 260. The display 268 is positioned on the interior of the inner door 42 for displaying diagnostic information and like to an operator of the unit 10. A membrane keyboard 274 is positioned on the inner door 42 adjacent the display 268. The keyboard is coupled via a PA7 bus 276, a CA1 bus 278, and a PB(0:3) bus 280 to the interface unit 260 to supply keyboard information thereto. The microcomputer 186 also may communicate with remote systems via a modem 282 connected via a modem bus 284 to modem interface logic 286. The modem interface logic 286 is connected via a bus 288 to the microcomputer 186 and is also connected via a bus 290 and a bus 292 to the interface unit 260. A power fail indicator unit 294, which signals power fail conditions to allow the system 10 to degrade gracefully, is connected via a bus 296 to the microcomputer 186.

The interface 192 has connected thereto a plurality of magazine switches 300 which indicate the presence or absence of magazines 32 and 34 in the interior 14 of the cabinet 12. The magazine switches 300 are connected via a bus 302 to the interface unit 192. The door open switch 168 is connected via a bus 304 to the interface unit 192 for communication with the microcomputer 186. A bus 306, connected to the interface unit 192, communicates with an Automotion LC4B vertical motor control unit 308 which is connected to the vertical motor 76 of the picker assembly 28.

A horizontal motor controller 310 is connected a horizontal motor control bus 312 to the interface 192 and controls the horizontal motor 98. A horizontal sensor bus 314 is connected to horizontal position sensors 316 on the picker assembly 28, a back transporter switch 318, a horizontal motor home switch 320 and a horizontal limit switch 322 to provide information through the interface unit 192 to the microcomputer 186 as to the current position of the pickers 60 and 62 on the horizontal track bar 66. In a similar fashion, a bus 324 connects a vertical limit switch 326 to the interface 192, while a bus 326 connects a load position switch 328, a vertical motor home switch 330 and the vertical sensors 174 and 176 to the interface board 192. Finally, a return bin switch 332 is connected via a bus 334 to the interface 192 for communication therewith.

It may be appreciated that the front panel microcomputer interface unit 208 is disclosed in FIGS. 20, 21, 22, 23, 24, 25, 26 and 27. The electromechanical interface unit 192 is shown in FIGS. 28, 29, 30, 31, 32, 33 and 34. The input/output interface unit 260 is disclosed in FIGS. 35, 36, 37, 38 and 39. Since each of the front panel boards 236 and 238 is substantially identical, an exemplary front panel unit is disclosed in FIG. 40.

Figure 35:
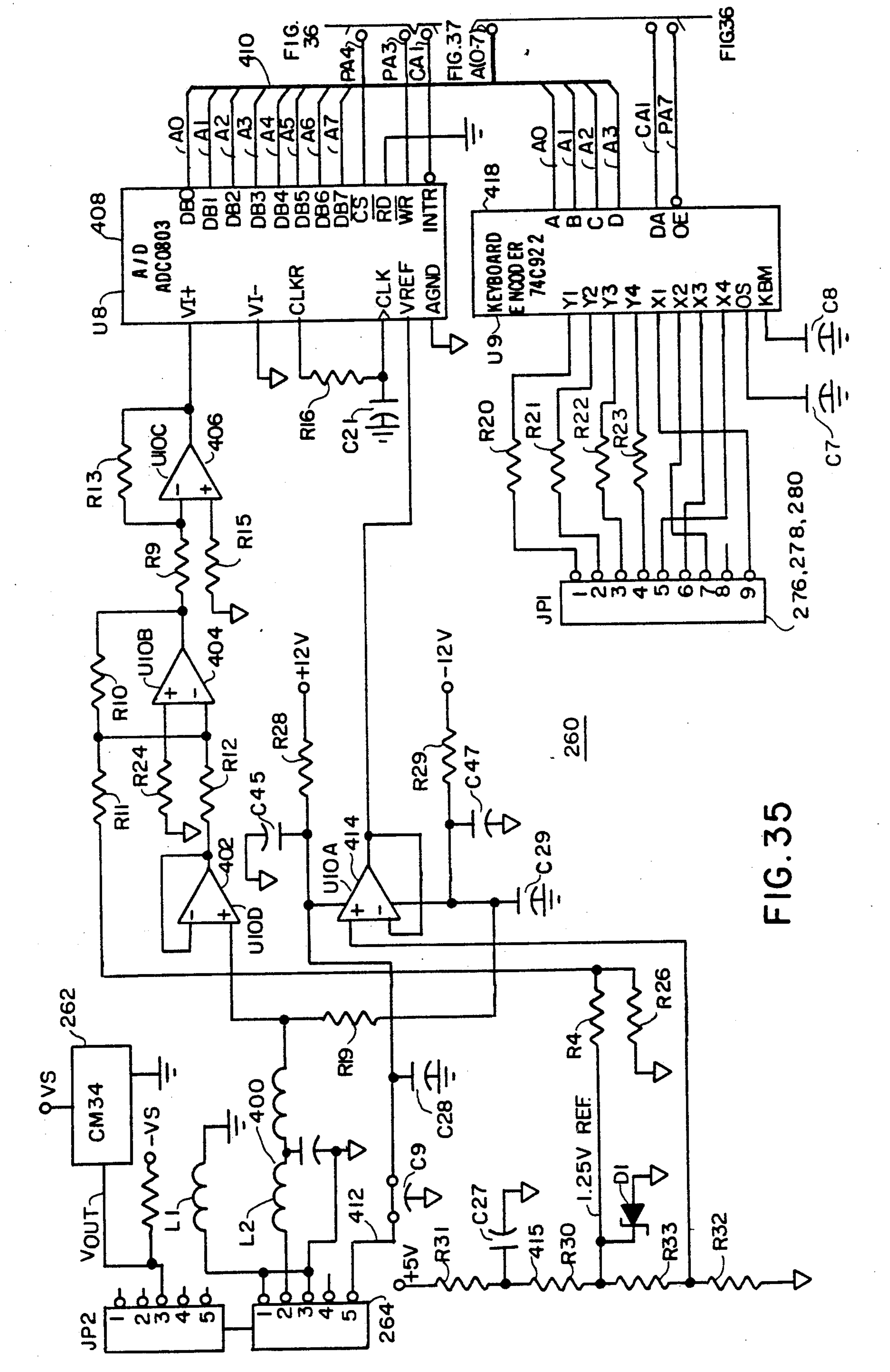
FIGS. 35-39 are schematic diagrams of an input/output interface unit.
Figure 36:
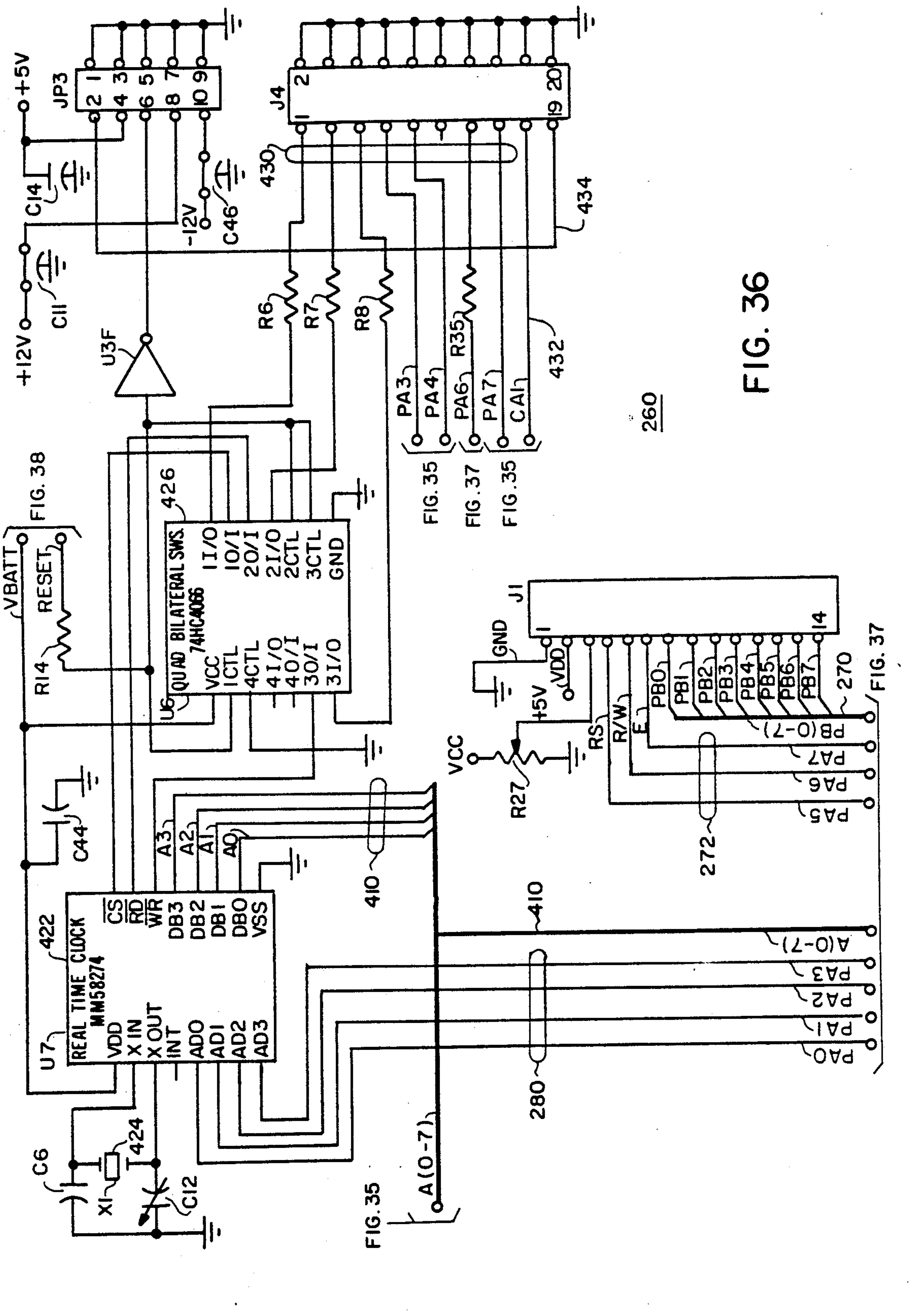

As may best be seen in FIG. 35, a temperature sensor 262, connected through bus 264, feeds a low pass filter 400 to produce a low passed filtered signal. The low pass filtered signal is fed to a voltage follower 402 which buffers the signal and feeds it to an inverting amplifier 404. The amplified signal from the inverting amplifier 404 is sent to a second inverting amplifier 406 which feeds the signal to an ADC0804 analog-to-digital converter 408 from which an 8-bit output, at lines A0 through A7, is generated on a bus 410. Also required to drive the analog-to-digital converter 408 is a voltage reference signal which comprises a 12 volt potential received on a line 412. A regulated voltage divider 415, consisting of a plurality of resistors and a Zener diode supplies reference voltages both to the amplifier 404 and to an amplifier 414 connected to the lead 412. The amplifier 414 drives the voltage reference terminal of the analog-to-digital converter 408. The buses 276, 278 and 280 are connected via a connector block JP1 to the keyboard encoder 418. The keyboard encoder 418 receives signals from the keyboard 274 on the inside of the inner door 42 for control of microcomputer 186 operations in accordance with the software listed hereinafter. The interface board 260 also includes a real time clock 422 comprised of an MM58274 integrated circuit driven from a crystal oscillator 424. Clock signals are supplied to a CD4066 quad bilateral switch integrated circuit 426. The programmable interface adapter 256 is connected to the input/output interface unit 260 by a bus 430, a bus 432, a bus 434, a bus 436, a bus 438 and a bus 440. The quad bilateral switches 426 selectively connect resistor R6 to the chip select terminal on the real time clock 422, resistor R7 to the read terminal on the real time clock 422, and resistor R8 to the write terminal on the real time clock 422 in order to reload the contents of the real time clock 422 under the control of the microprocessor 186. The contents of the real time clock 422 may be accessed via the bus 280 connected to it, and information may be fed to it by the bus 410.

Figure 37:
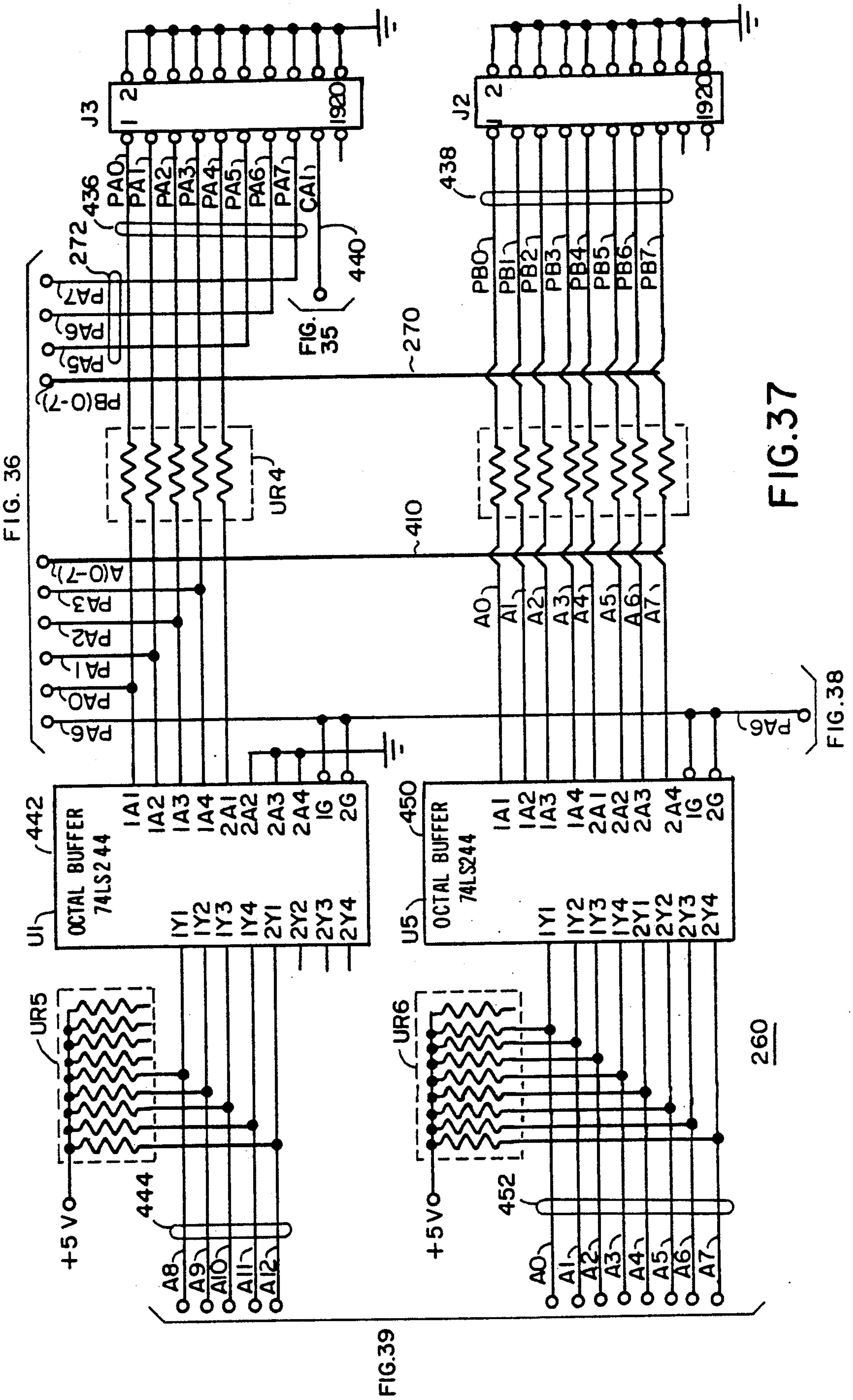

Referring now to FIG. 37, FIG. 37 shows a port A interface bus 436, a port B interface bus 438, and CA1 bus 440. Bits 4 through 0 of the bus 436 are fed to an octal buffer 442 and output on a bus 444. Similarly, a 74LS244 octal buffer 450 receives eight bits from either bus 410, bus 270 or bus 438, whichever one is driven high, and outputs the bits on a bus 452.

Figure 38:
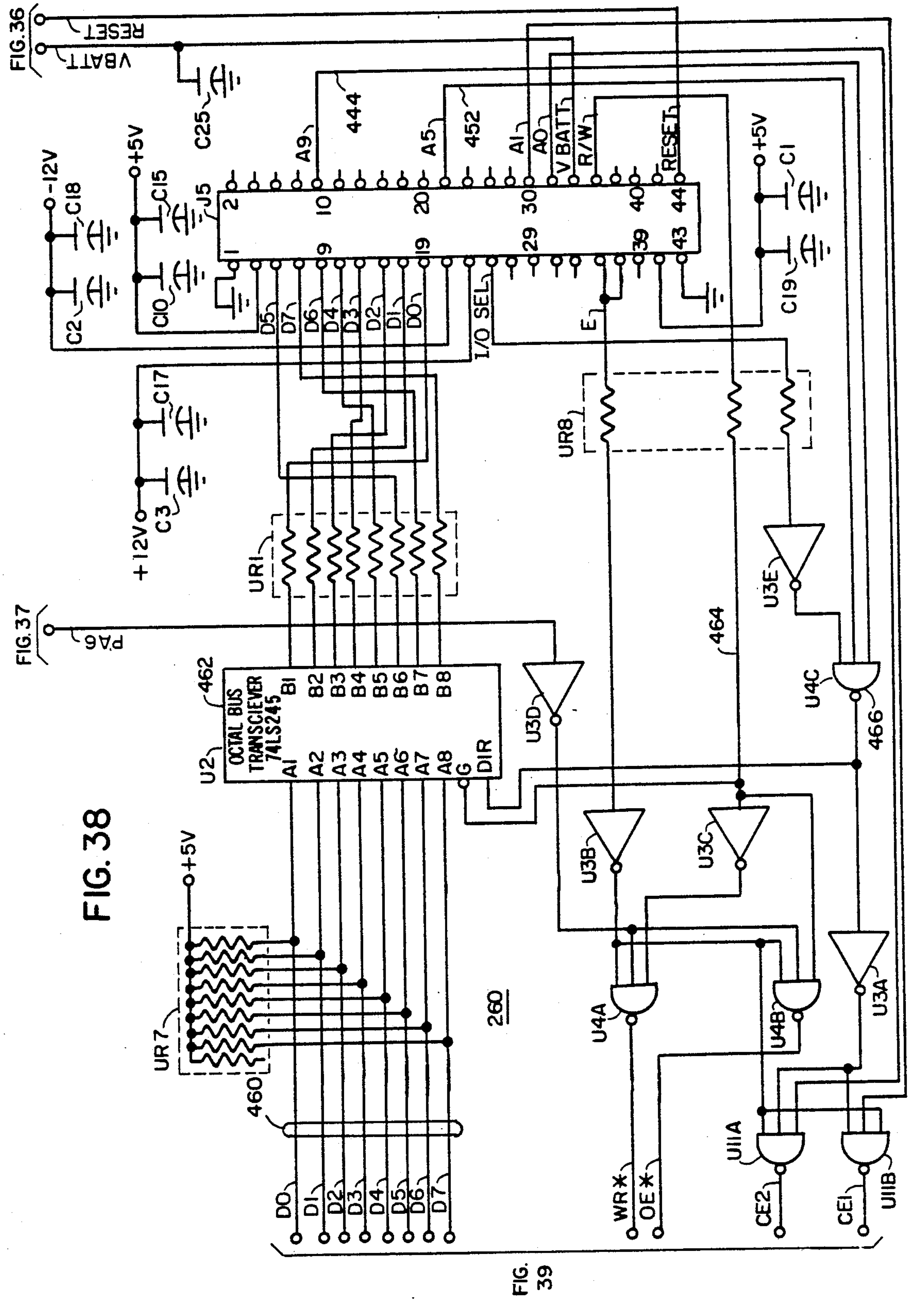
Figure 39:
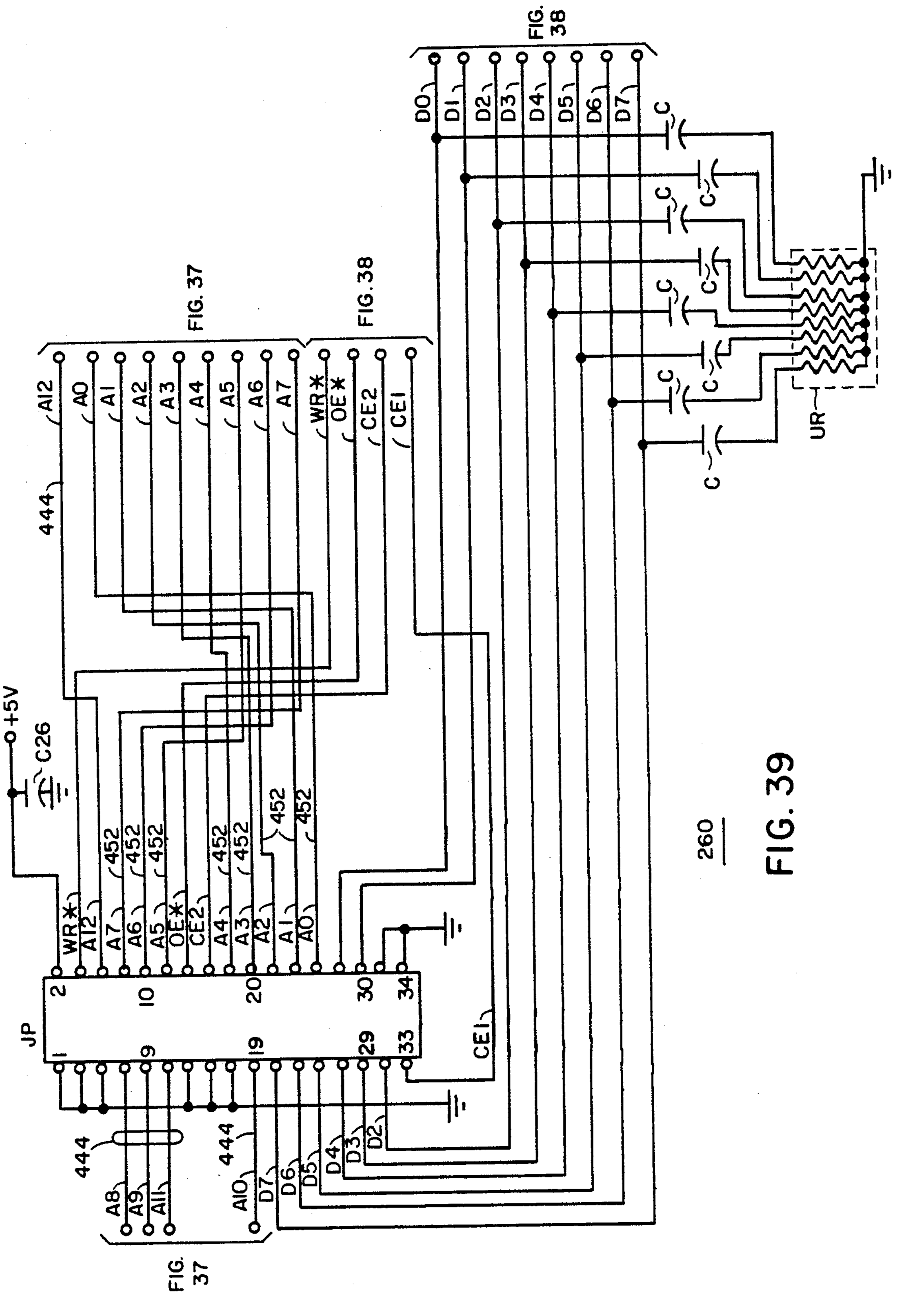

Referring now to FIG. 38, a data bus 460 feeds a 74LS245 octal bus transceiver 462, operating under control from a read/write line 464 or from a NAND gate 466, driven from the address bus 444 and the bus 452. The octal bus transceiver 462 controls the flow of information to and from the data cartridges 22 so that the data cartridges 22 can be interrogated through the octal bus transceiver 462.

Referring now to the electromechanical interface unit 192, which is also coupled to the microcomputer 186, the interface unit 192 mediates signals between the microcomputer 186 and the handling means 28, various door switches and the like. Thus, the electromechanical interface unit 192 controls signal flow related to sensing of the ice cream handling equipment condition, as well as driving of the ice cream handling equipment and the delivery stations.

Figure 28:
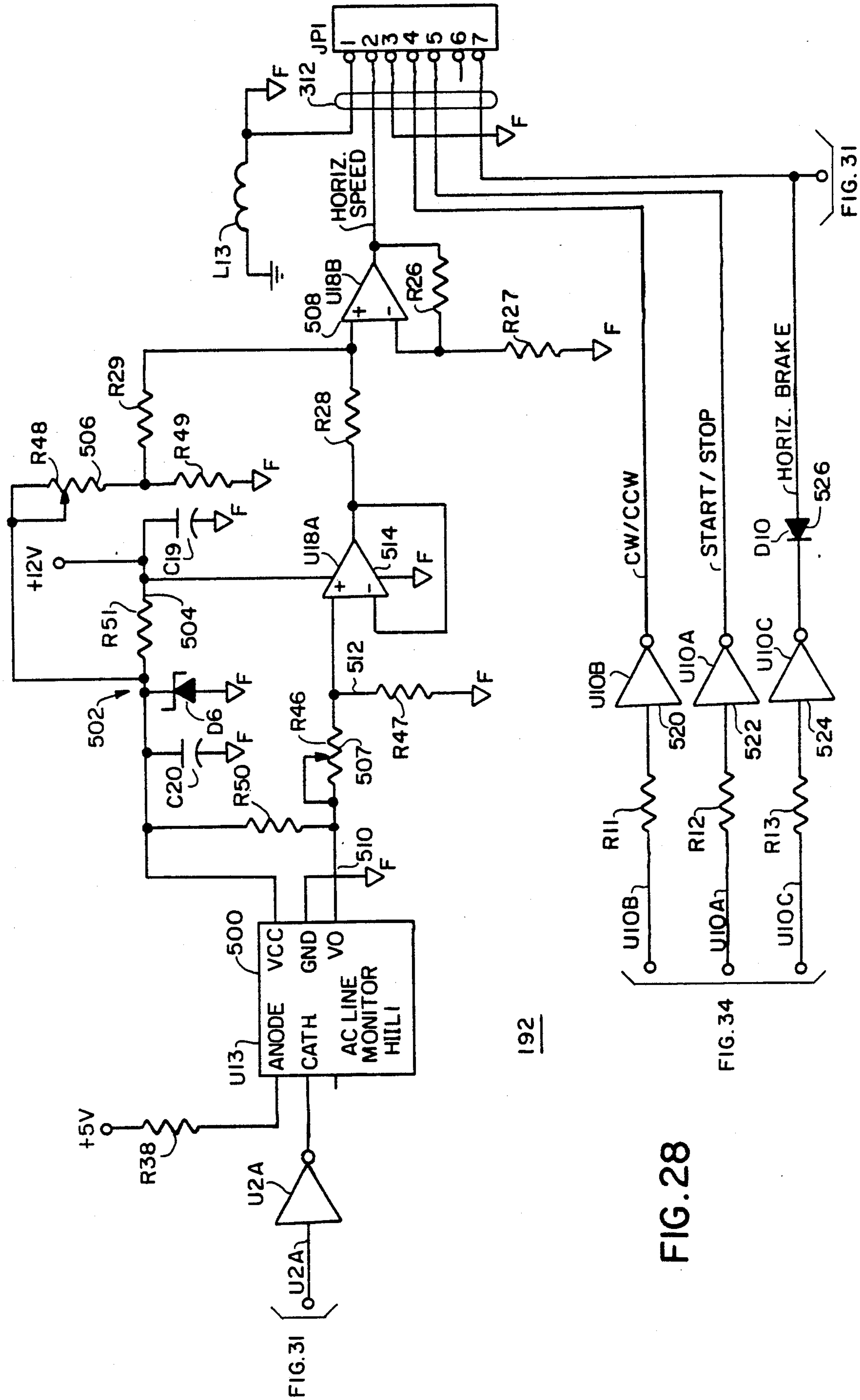
FIGS. 28-34 are schematic diagrams of an electromechanical interface unit.
Figure 29:
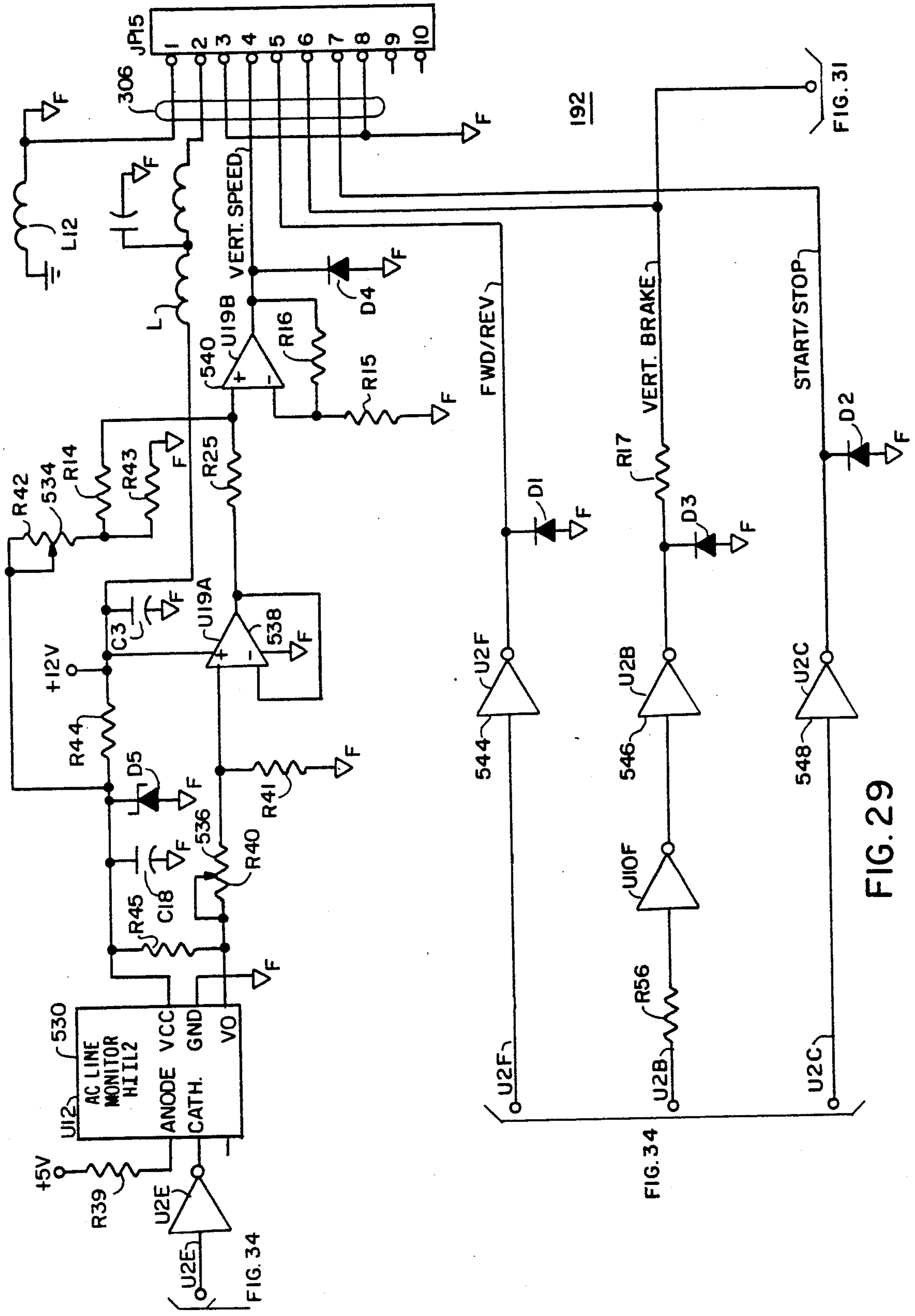

Referring now to FIG. 28, the portion of the interface unit 192 related to the horizontal motor controller 310 is shown therein. An AC line monitor 500, which is actually an opto-isolator, is connected to a voltage generating network 502 including a potentiometer 506 and a potentiometer 507 feeding a buffer amplifier 514. The buffer amplifier 514 and the resistor 506 feed a differential amplifier 508 which generates a horizontal speed signal supplied via the bus 312 to the horizontal motor controller 310. An inverter 520 selects clockwise or counterclockwise motor rotation. An inverter 522 sets the start and stop condition, while an inverter 524 connected to a diode 526 sets the horizontal brake. Referring now to FIG. 29, a similar vertical speed control unit is shown therein with an AC line monitor 530 connected to a voltage generating network 532 including a variable resistor 534 and a potentiometer 536 feeding a buffer amplifier 538. The buffer amplifier 538 and a resistor 534 feed a differential amplifier 540 which generates a vertical speed signal supplied via the bus 306 to the vertical motor controller 308. An inverter 544 selects forward or reverse, that is up or down directions, for the vertical motor 76. An inverter 546 causes the vertical brake to engage or disengage, and an inverter 548 generates start/stop commands. Inverters 544, 546 and 548 all feed signals to the bus 306.

Figure 30:
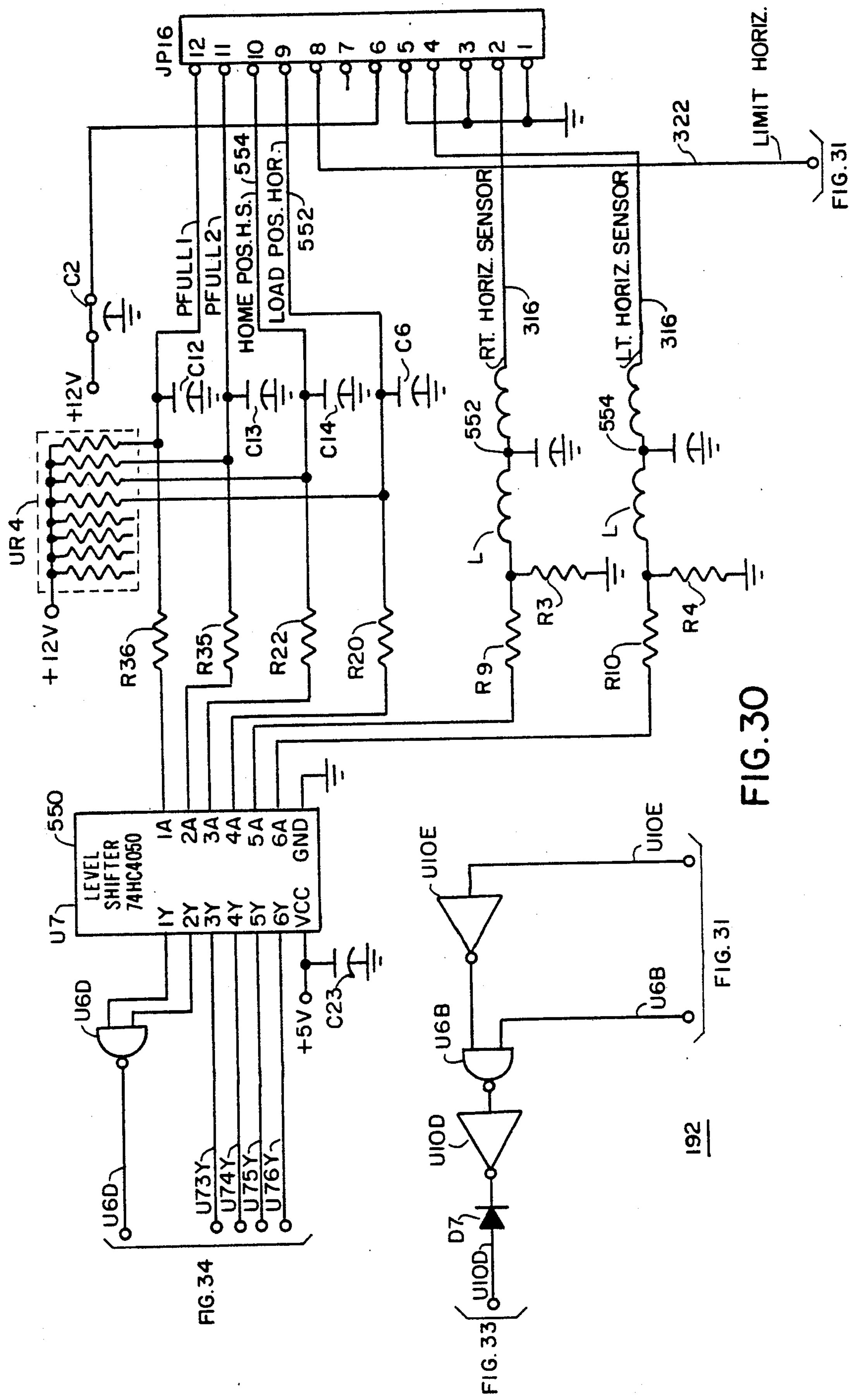

As may best be seen in FIG. 30, a sensing subunit for sensing the horizontal position, among other things, of the pickers 60 and 62 on the picker bar 66 is shown therein. The position sensing bus 316 receives signals related to the left horizontal Hall effect sensor and the right horizontal Hall effect sensor, and feeds those signals to a level shifter 550 from which they are output. Likewise, signals related to the actuation of the load position, horizontal sensor, and the home position horizontal sensor fed on line 554, are fed to the level shifter 550. The right horizontal position signal and the left horizontal position signal are respectively filtered by low pass filters 552 and 554 before being fed to the level shifter.

Figure 31:
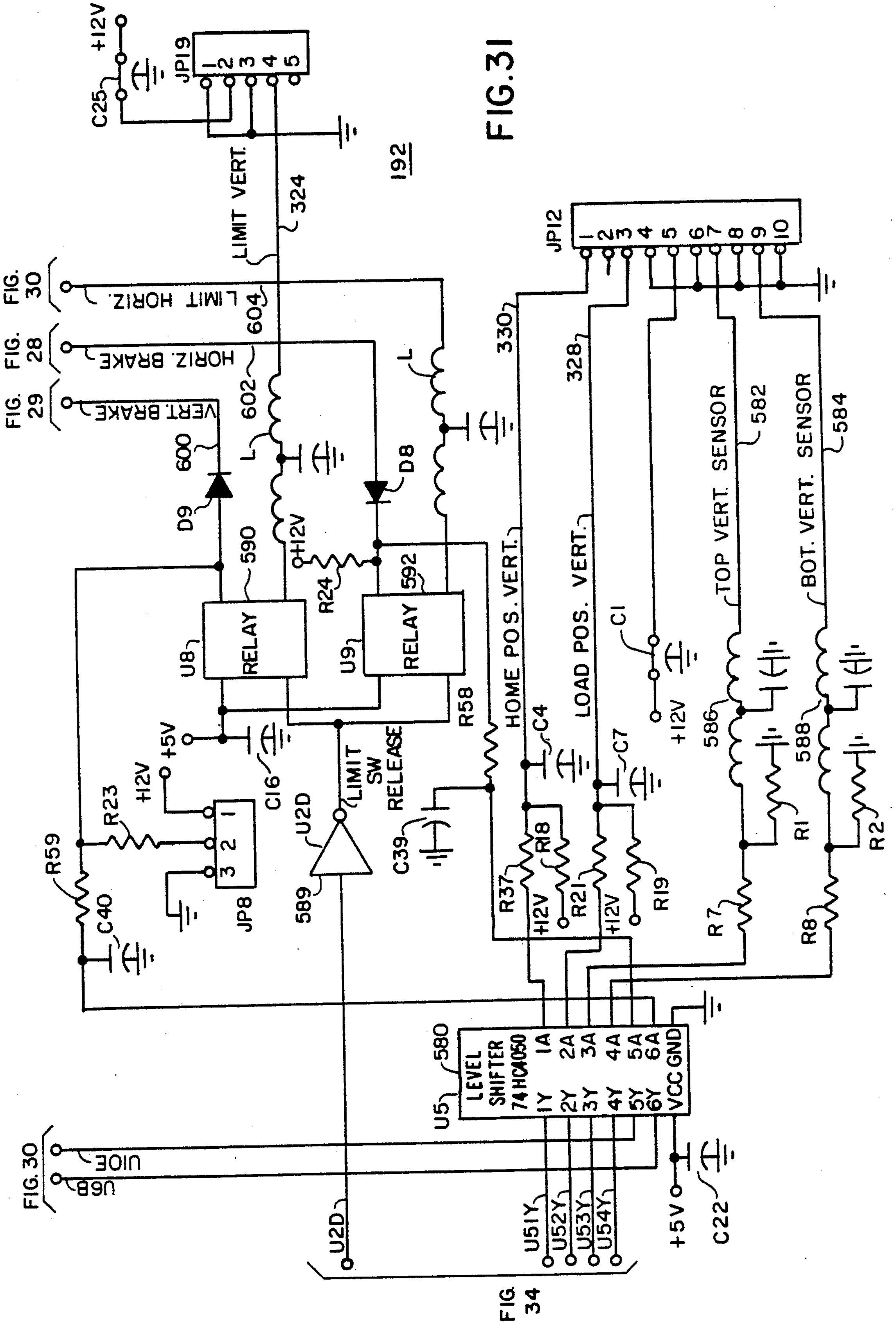

Referring now to FIG. 31, a level shifter 580 is connected to receive filtered signals from the top vertical sensor 174 along a line 582, the bottom vertical sensor 176 along a line 584, home position vertical sensor on the line 330, and the load position vertical sensor on the line 328. The signals on lines 582 and 584 are filtered by low pass filters 586 and 588, respectively, to remove noise. An inverter 589 is connected to a pair of relays 590 and 592 which are connected to a vertical brake line 600, horizontal brake line 602, and a limit horizontal line 604. In the event that a limit switch release signal is given, the relays 590 and 592 are deactivated, causing the vertical brake, horizontal brake signals to be deactivated and allowing the handling means 28 to exceed its normal travel limits. This will allow the picker bar 66 to be moved out of the way if it is necessary to perform maintenance on the interior 14 of the system 10.

Figure 32:
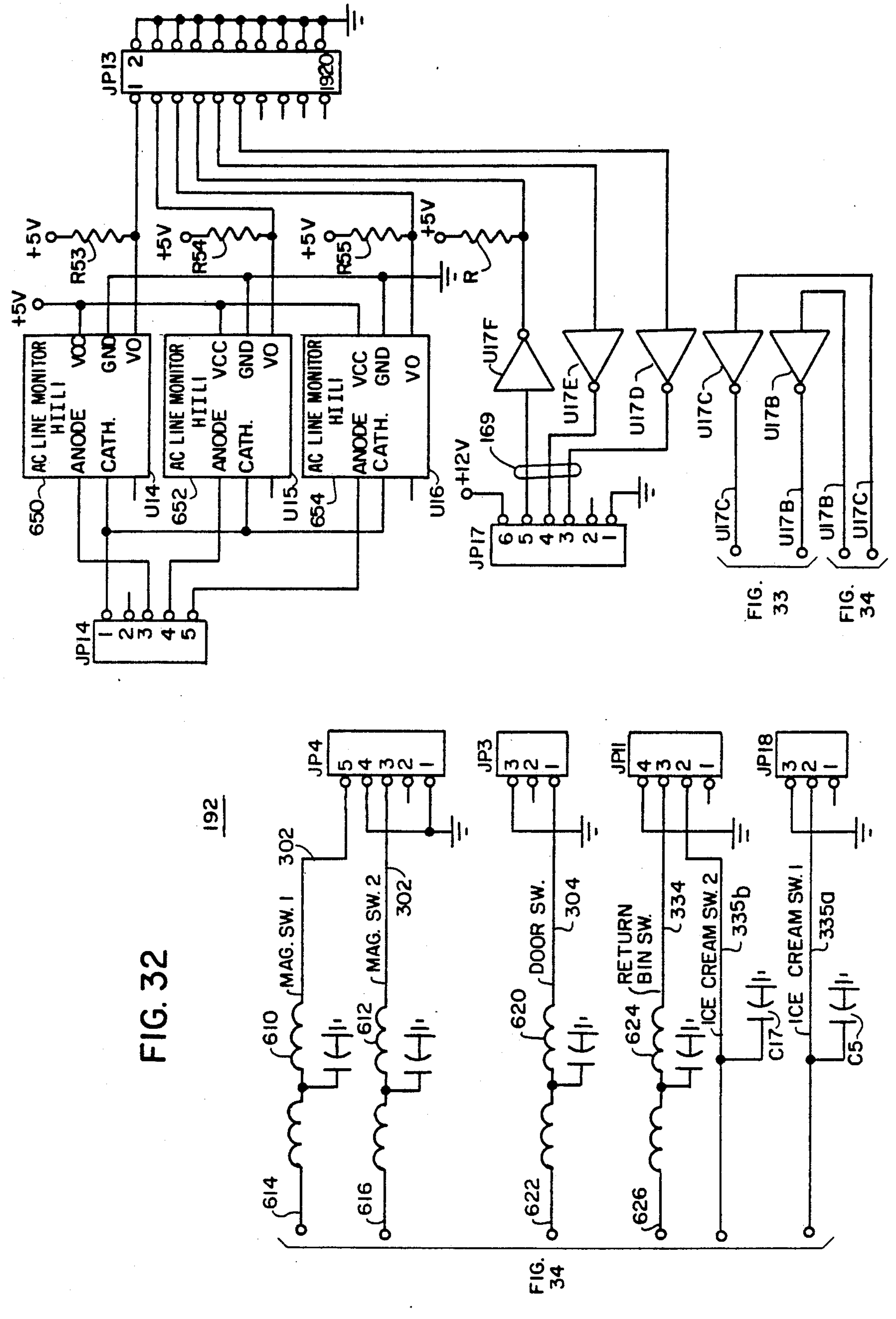

Referring now to FIG. 32, the magazine lines 302 feed magazine switch signals to a pair of low pass filters 610 and 612, which drive lines 614 and 616. The door switch signal line 304 drives a low pass filter 620 which drives the line 622. The return bin switch signal drives a low pass filter 624, which drives a line 626. The ice cream switch line 335A and the ice cream switch line 335B all feed a level shifter 630 on FIG. 34.

Figure 33:
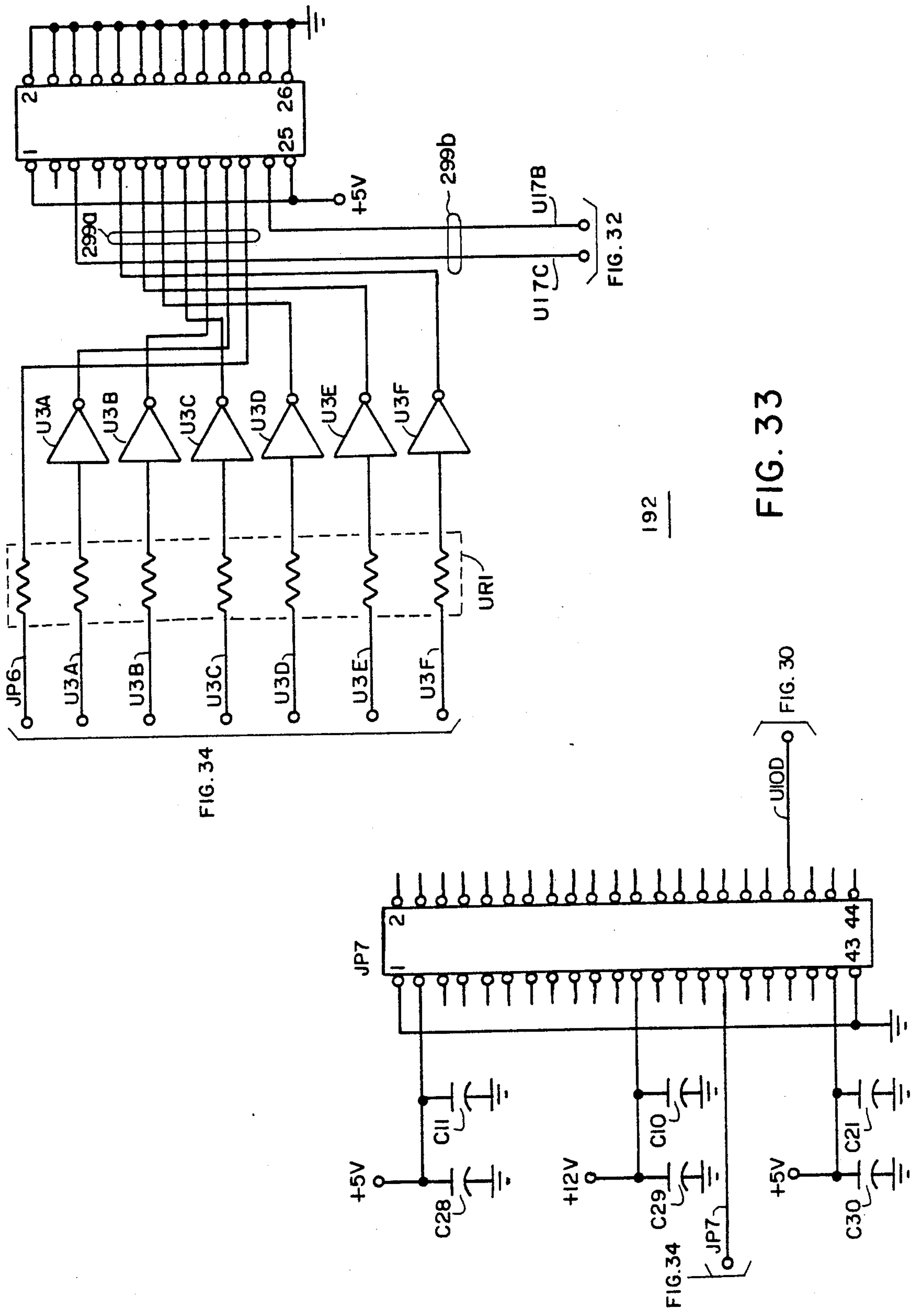
Figure 34:
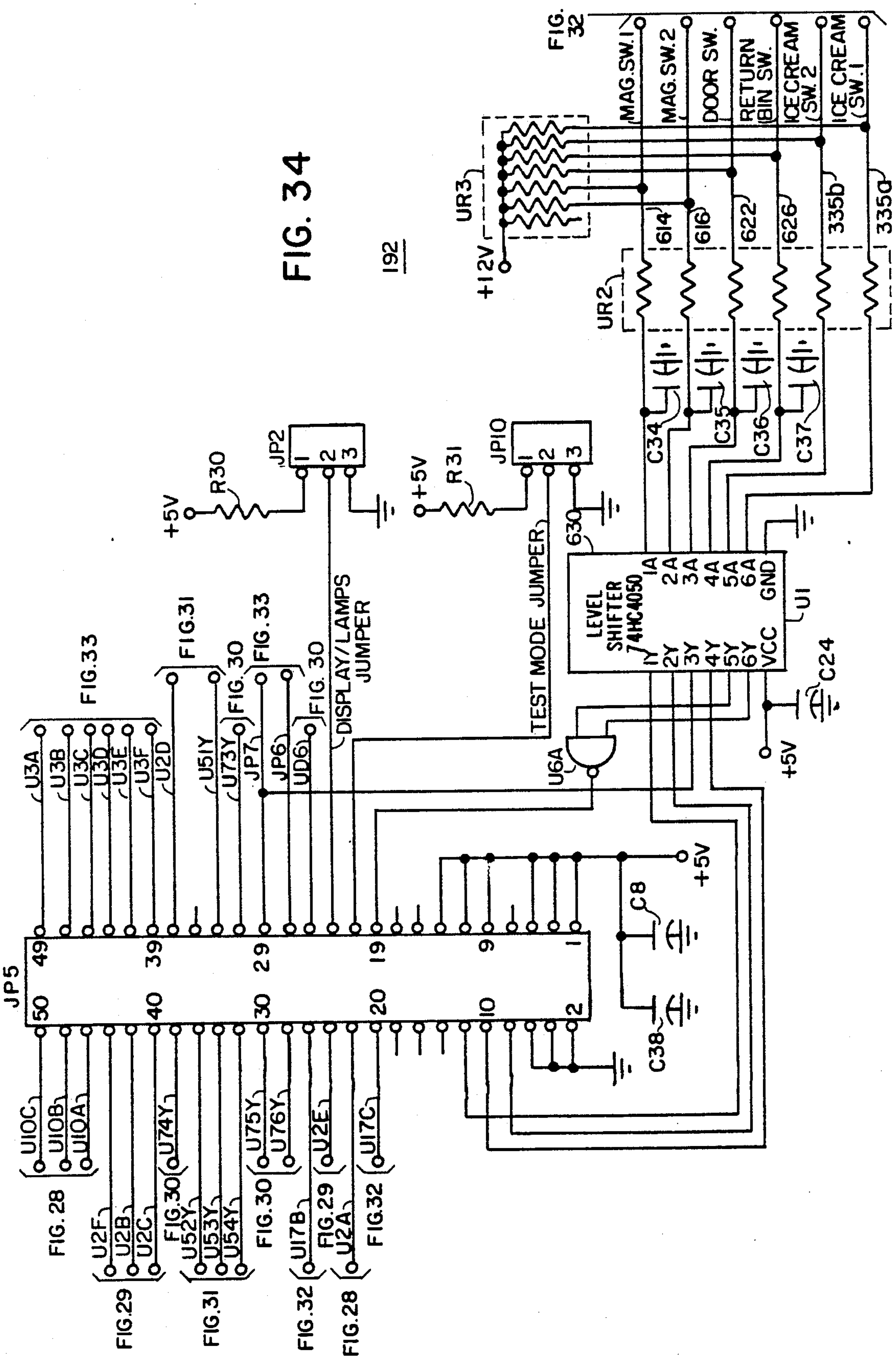

As to FIGS. 33 and 34, a plurality of line drivers extending from a connector shown on FIG. 34 drive a bus 299A connected to the I/O module board for enabling a plurality of relays on the I/O module board for driving the ice cream transporters 86 and 88, the indexing spring solenoids 126 and 128, and the delivery door latches, solenoids and lamps as exemplified by delivery door latch 156. FIG. 34 shows a connector portion of the board which includes buses 194, 196, 198, 200, 202, 204 and 206, coupling the microcomputer 186 and the interface unit 192.

Figure 20:
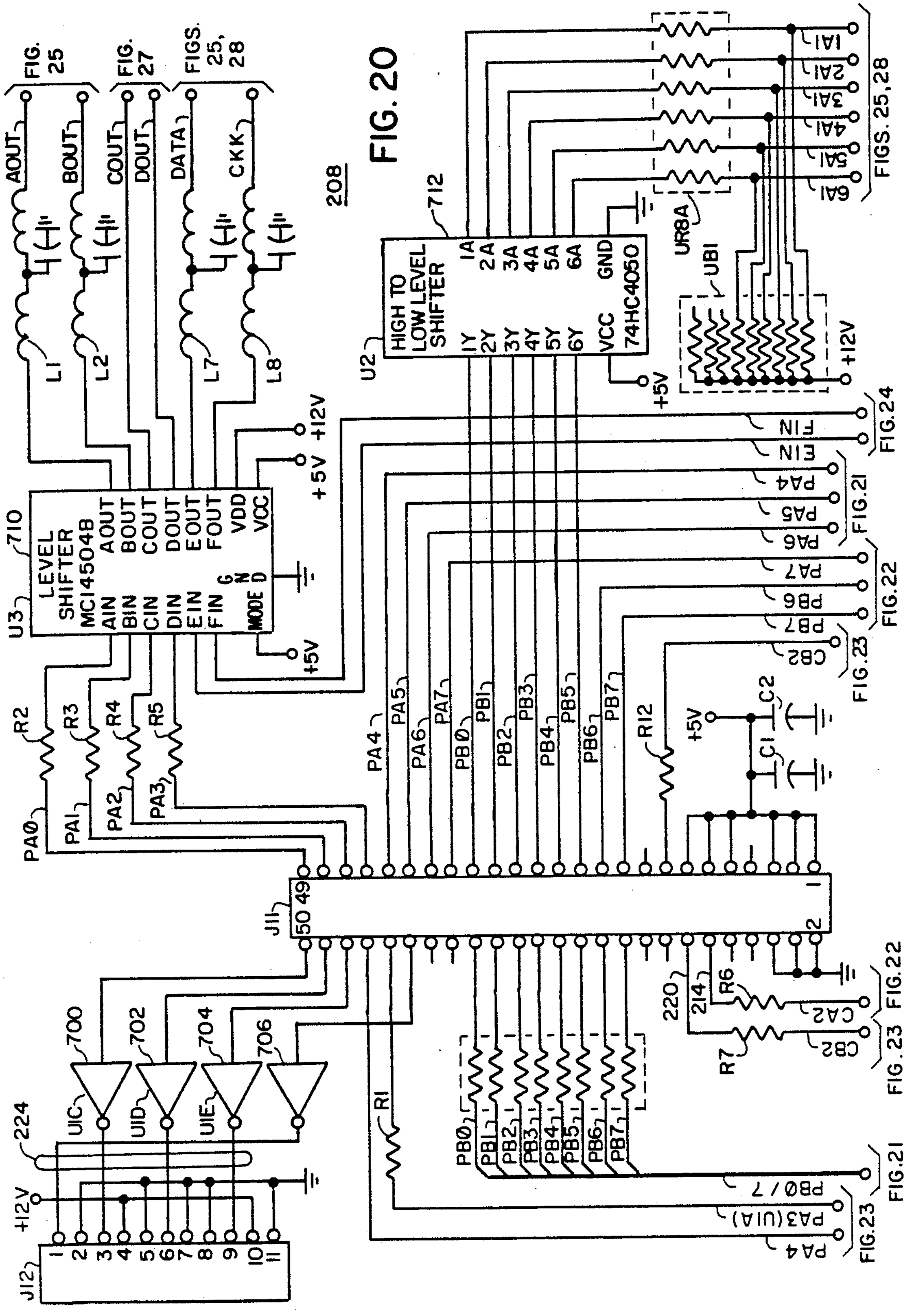
FIGS. 20-27 are schematic diagrams of a front panel interface unit.
Figure 21:
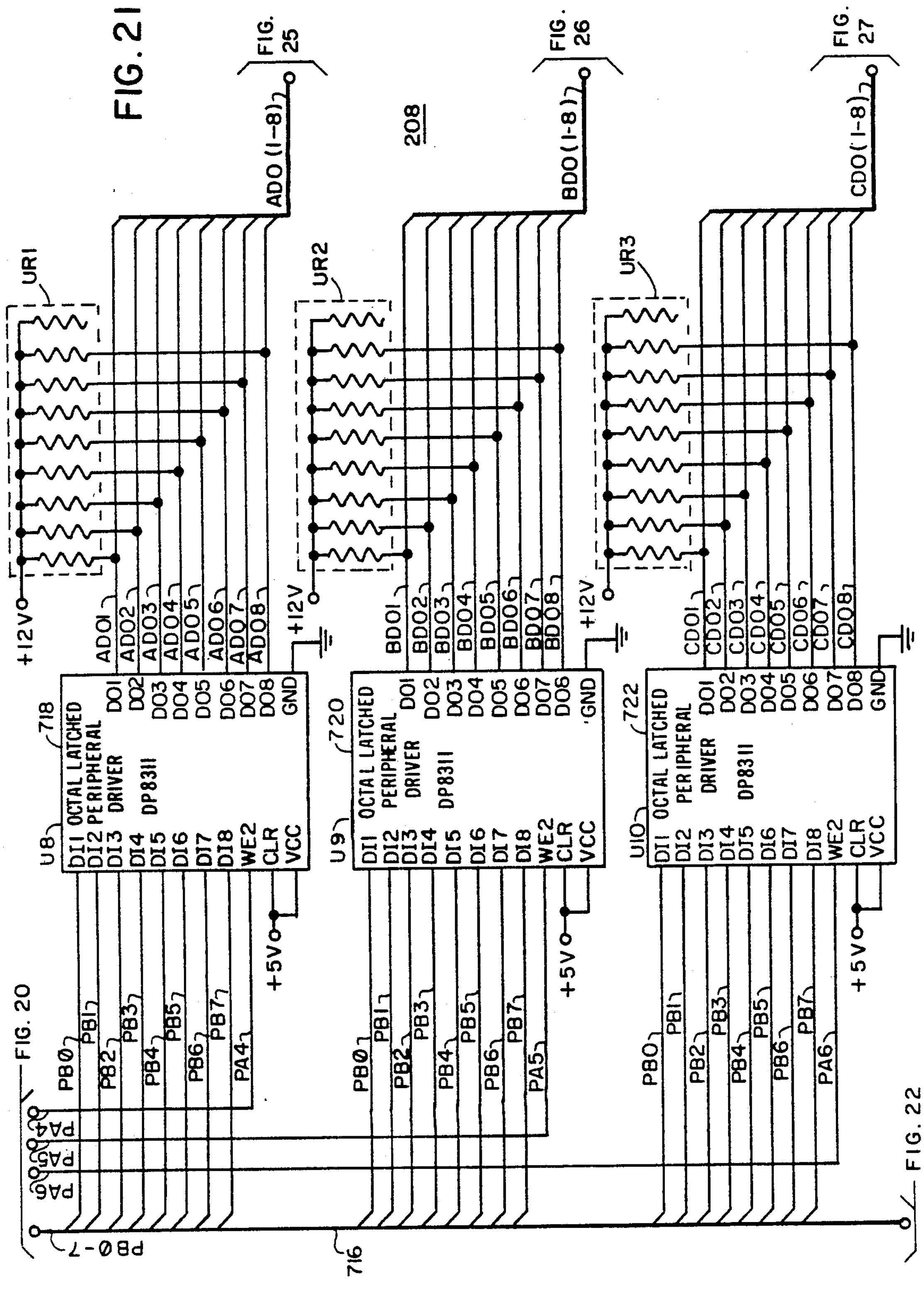
Figure 22:
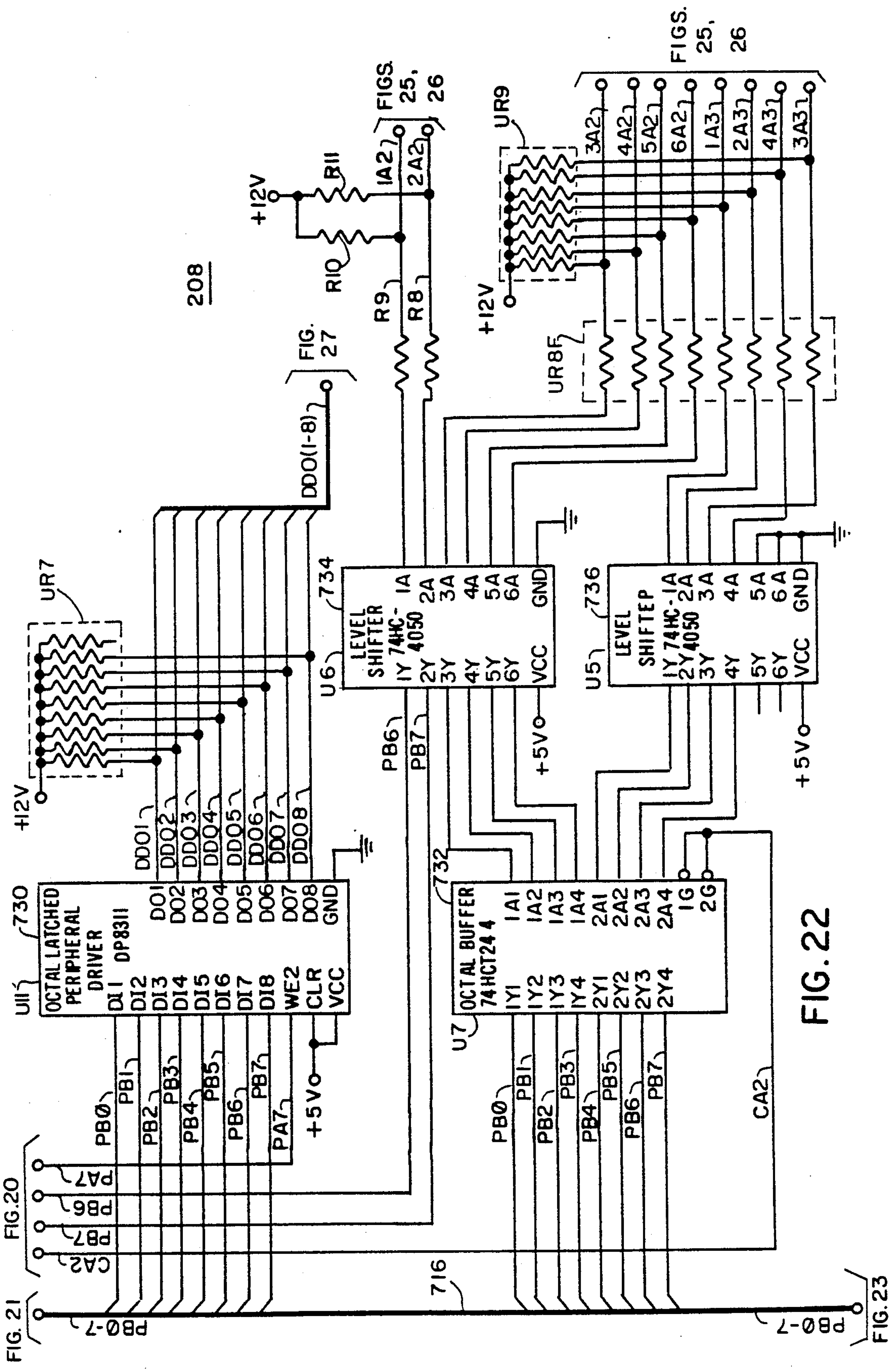
Figure 23:
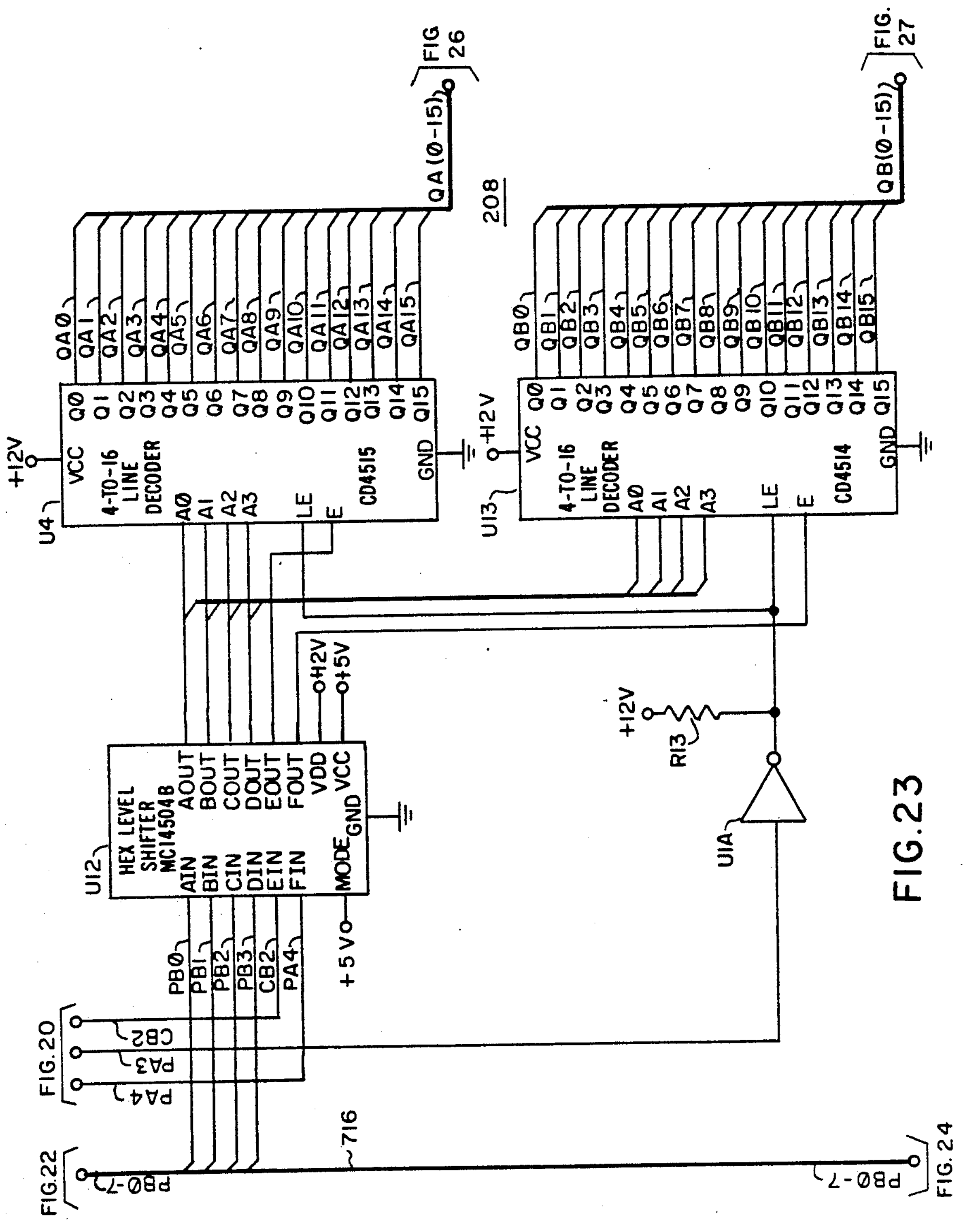
Figure 24:
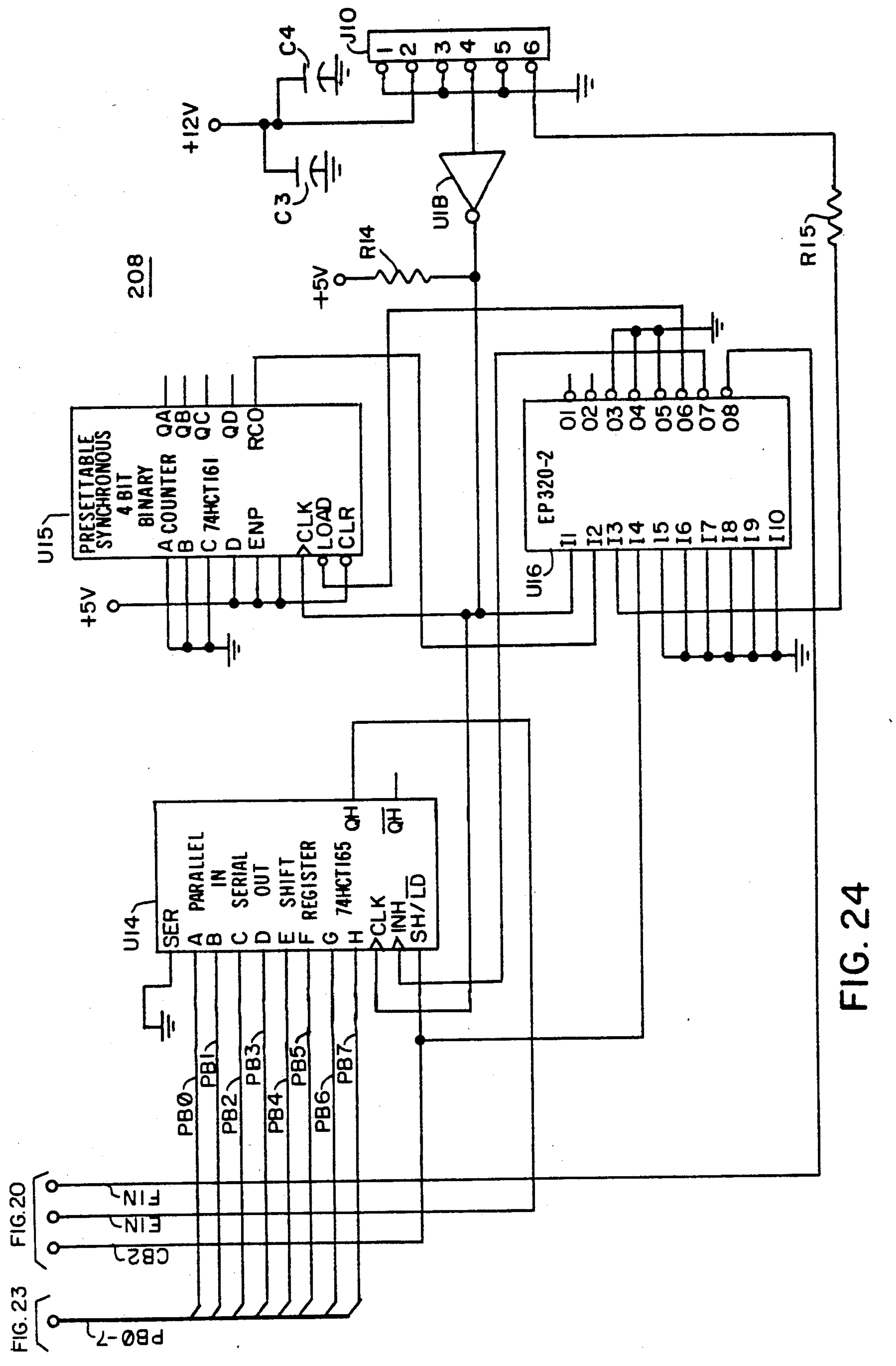

Referring now to the front panel interface board 208, and, in particular, to FIG. 20 which discloses a portion of the circuitry on that board, a portion of the interface unit shown in FIG. 20 includes inverters 700, 702, 704 and 706 which respectively drive the please-make-selection lamp 228, the processing-selection lamp 230, the thank-you lamp 232, and the beeper 226 on the door 52. A level shifter 710 receives signals on a plurality of lines PA0 through PA3 and outputs them on lines AOUT through DOUT data and CKK. Similarly, a level shifter 712 receives data on lines 1A1 through 6A1 and outputs it at lines PB0 through PB5. A bus PB0 through PB7, space 716, drives an octal latch peripheral driver 718, octal latch peripheral driver 720, and an octal latch peripheral driver 722, shown in FIG. 21, which, in turn, feed output connectors shown in FIGS. 25 and 26. Similarly, as may best be seen in FIG. 22, an octal latch peripheral driver 730 is driven from the bus 716, as is an octal buffer 732 feeding a pair of level shifters 734 and 736 which drive the connectors on FIGS. 25 and 26.

Figures 25, 26:
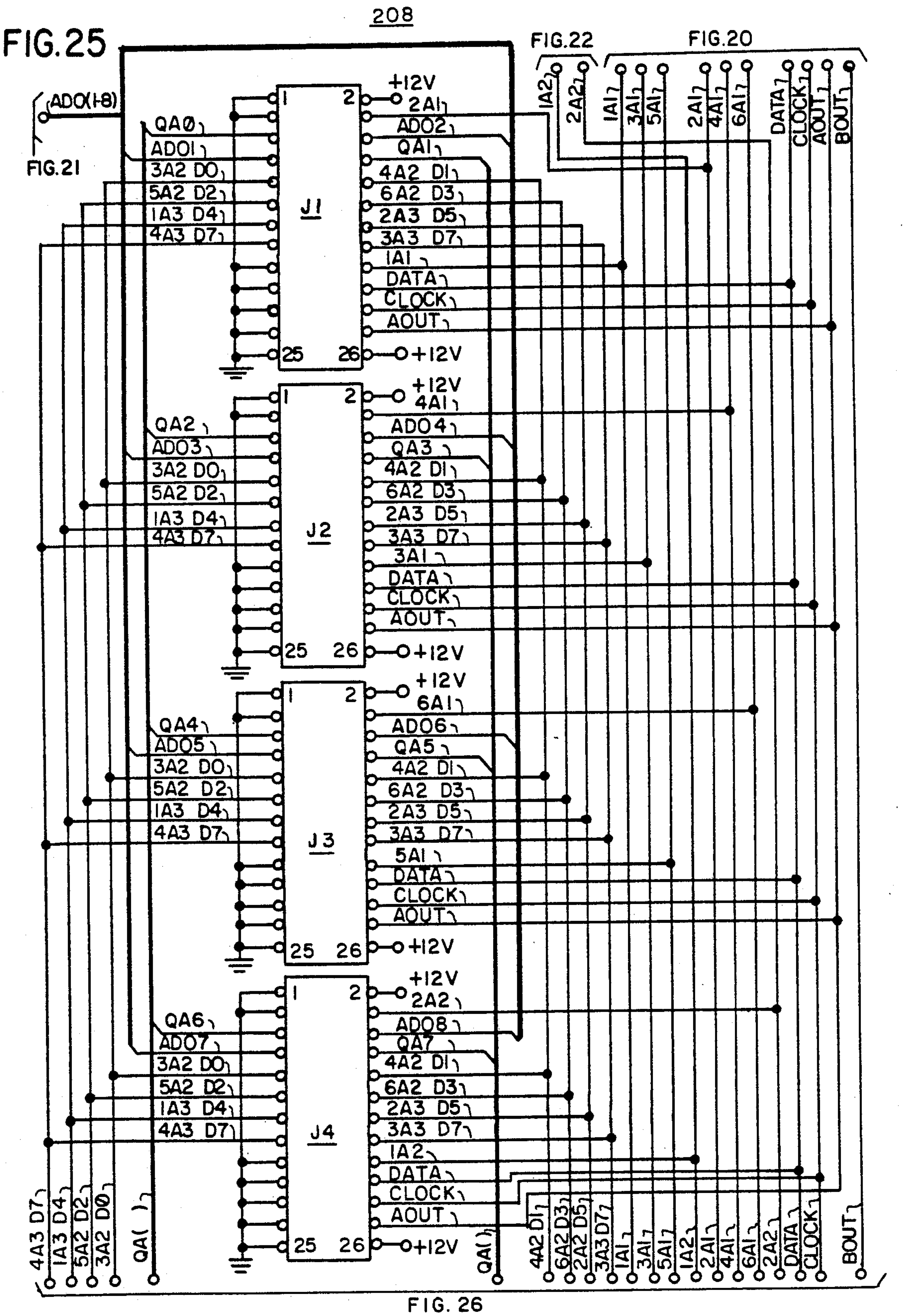
Figures 25, 26:
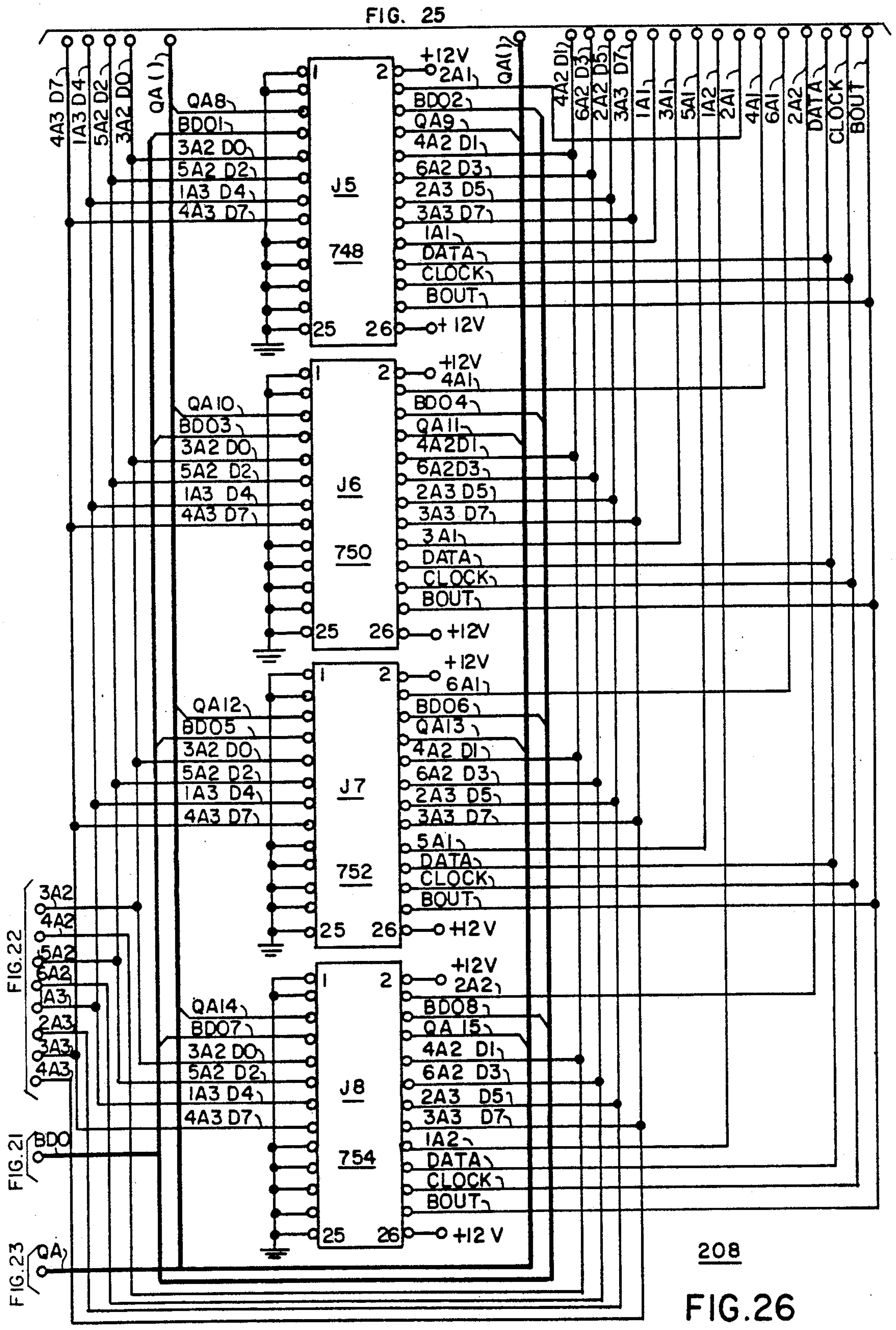
Figure 27:
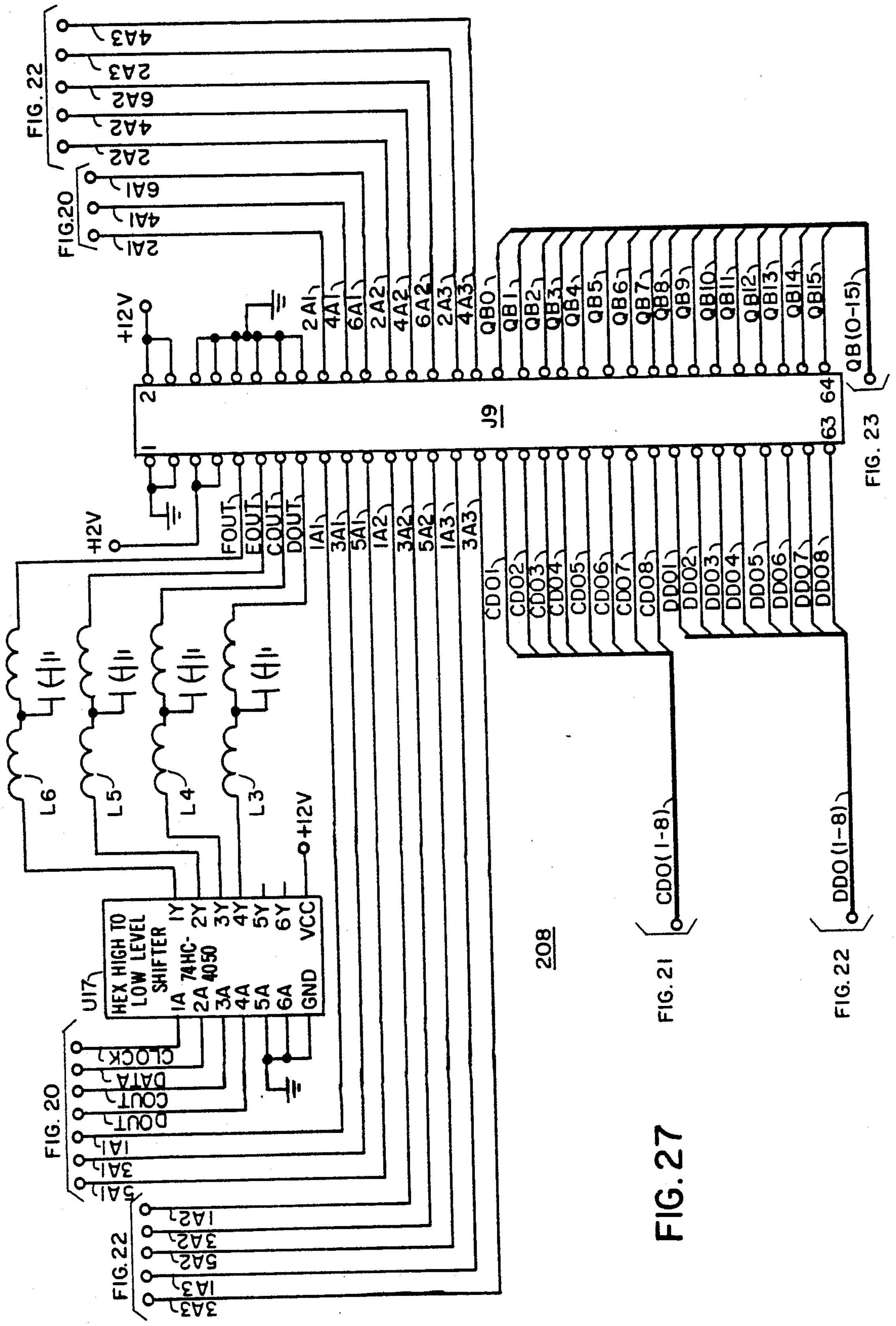
Figure 40:
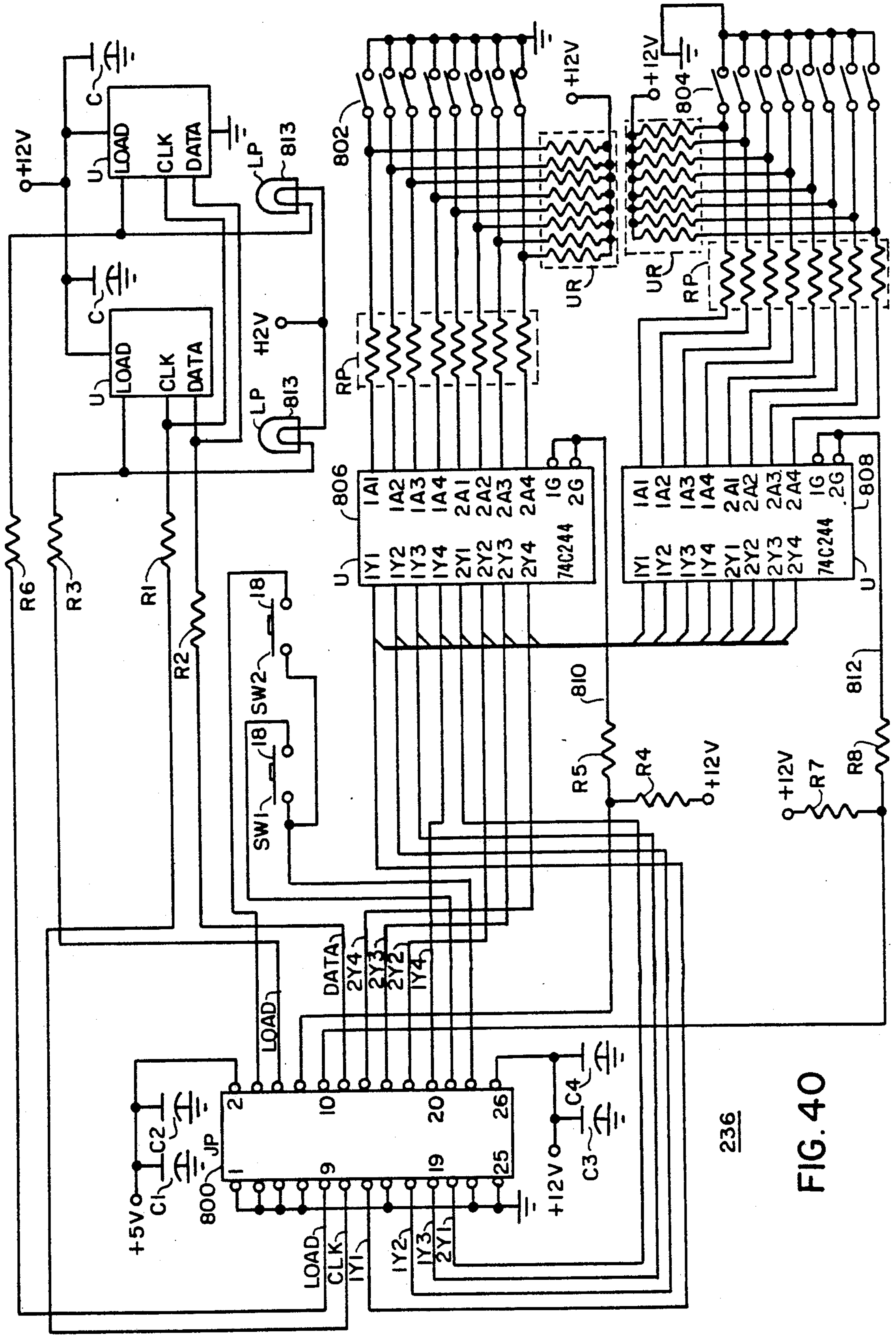
FIG. 40 is a schematic diagram of a front panel unit.
Figure 41:
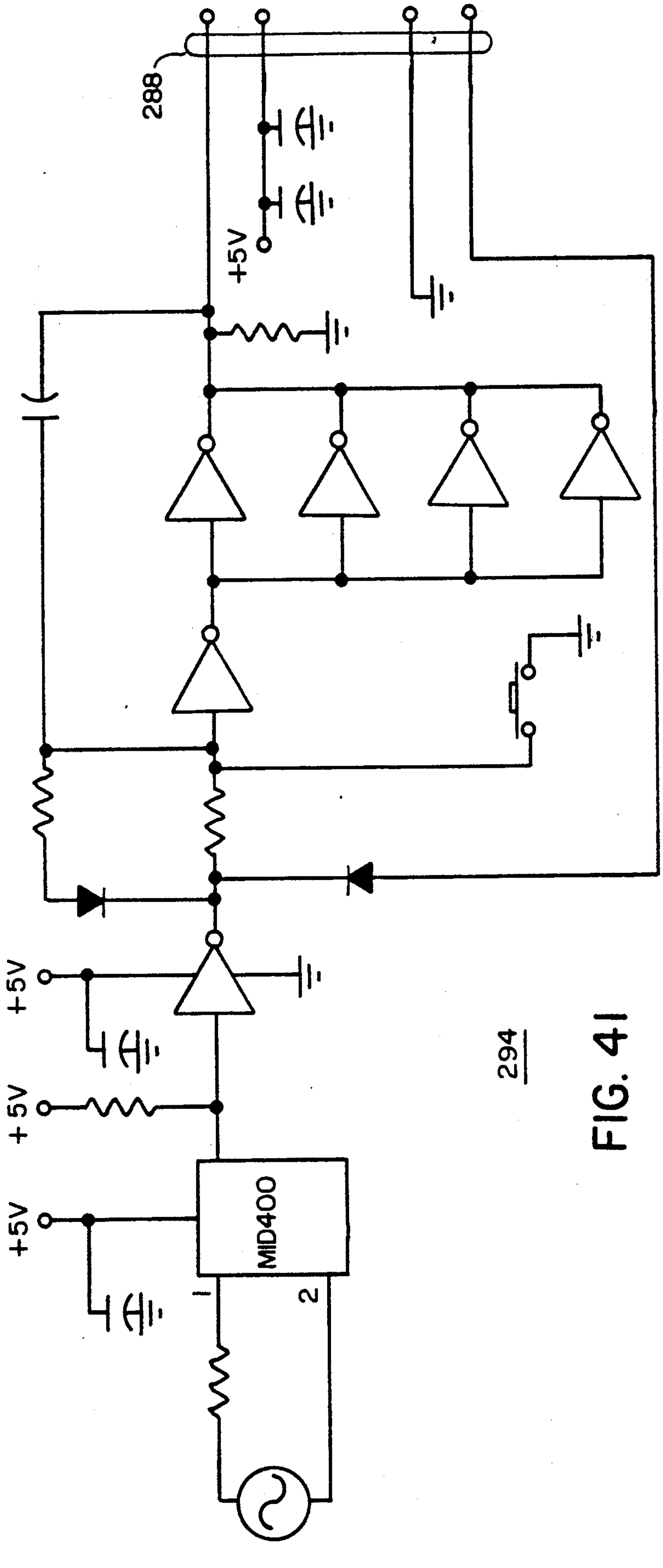
FIG. 41 is a schematic diagram of a power failure detection module.
Figure 42:
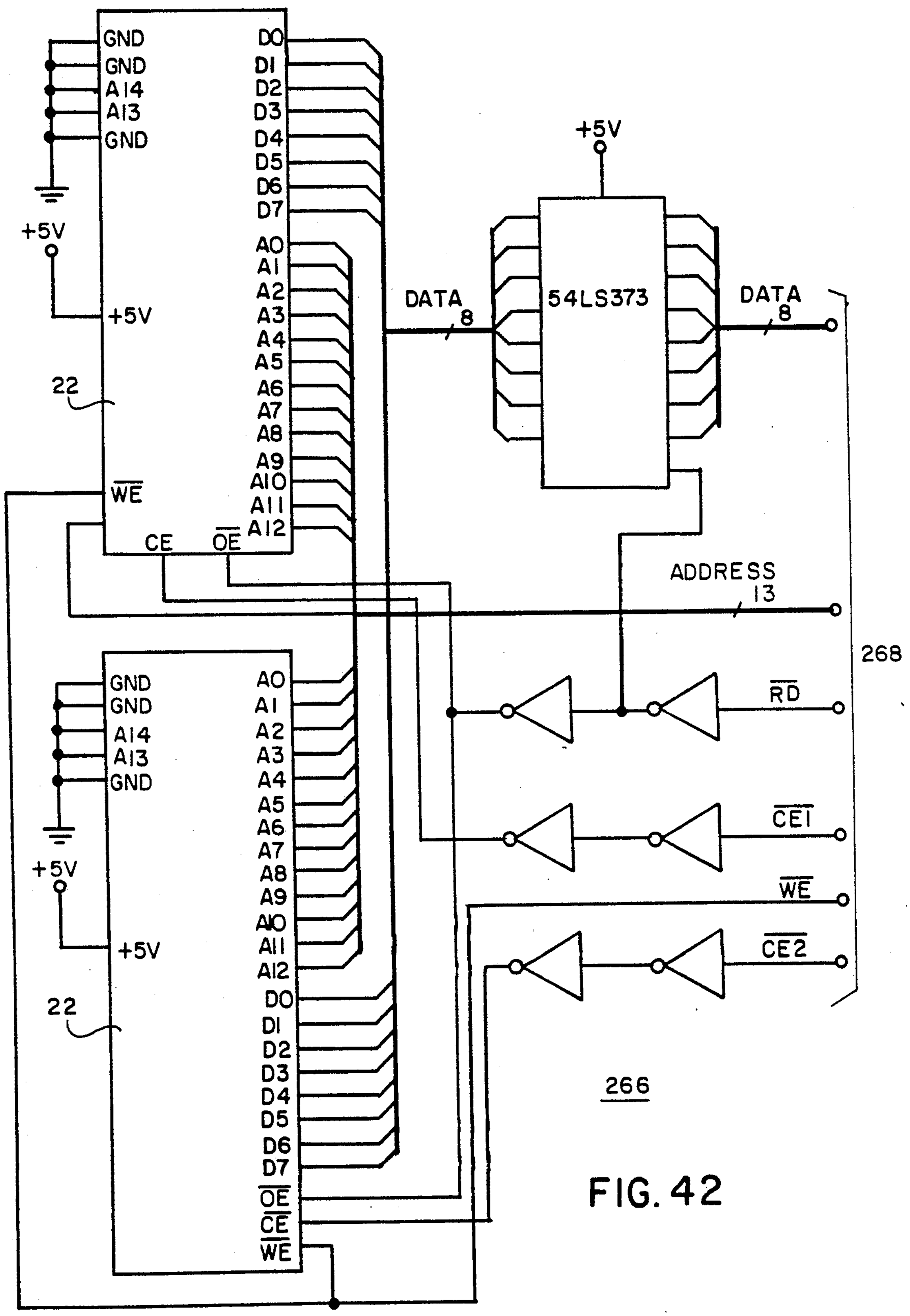
FIG. 42 is a schematic diagram of a data cartridge interface unit shown connected to a pair of CMOS RAMS.

Referring now to FIGS. 25 and 26, a plurality of connectors 740, 742, 744, 746, 748, 750, 752 and 754 are shown thereon, and are substantially connected and parallel with each other to drive output boards, an exemplary one of which is shown in FIG. 40 as front panel board. Each of the boards 236 has a connector 800 thereon which is coupled to a respective one of the connectors 740 through 754. The interconnect unit 239 is substantially similar to the interconnect shown if FIGS. 25 and 26.

As may best be seen in FIG. 40, the board 236 has a first plurality of switches 802 and a second plurality of switches 804. The switches 802 are closed at the perforations in the transparency 56 placed in the appropriate sensor. The switch status is then sensed by a 74C244 octal latch 806 connected to the switches 802 and a 74C244 octal latch 808 connected to the switches 804. The octal latches 806 and 808 are respectively enabled by signals on lines 810 and 812 received from the interface unit 208. The outputs are fed back to the interface units 208 where they are fed to the front panel microcomputer which either scans each of the product sensors 802 and 804 on the boards 236 and 238 sequentially in order to determine what product flavors are available for selection on the board, or causes scanning to take place when the switches 18 are closed, indicating that a product selection has been made. A pair of out-of stock lamps 813 may be illuminated when the inventory for a particular transparency has been exhausted.

The microcomputer 186 operates under the control of the program code contained at pages 1A through 147A. The microcomputer 198, which performs the front panel functions through the interface unit 208, is operating under the control of the code shown at pages 148A through 178A of the Appendix.

It is apparent that the instant apparatus 10 may be filled with magazines which are factory loaded.

Figure 5A:
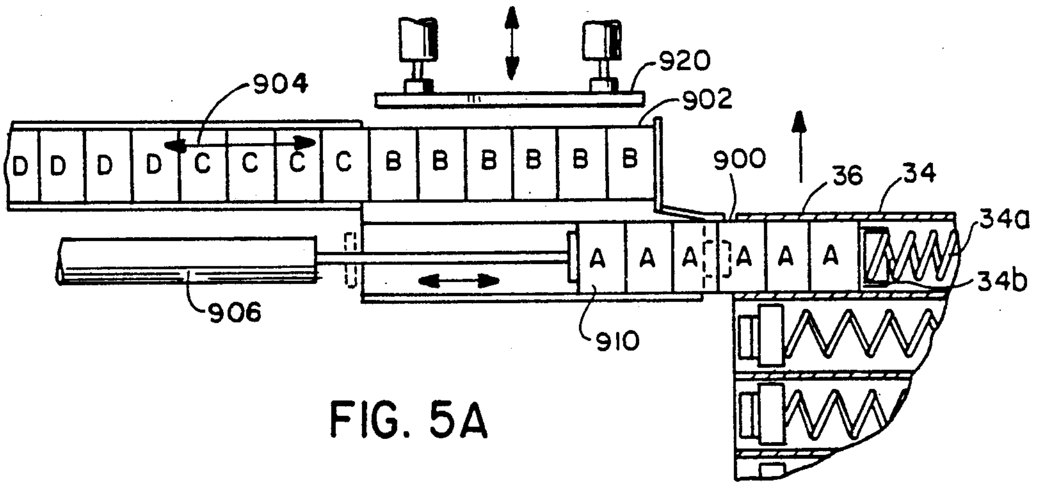
FIG. 5A is a schematic showing of an apparatus for loading frozen ice cream into a bin of a magazine.
Figure 5B:
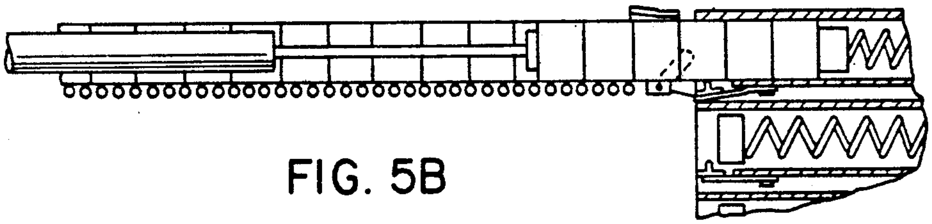
FIG. 5B is a side elevational view of the apparatus of FIG. 5A.
Figure 6:
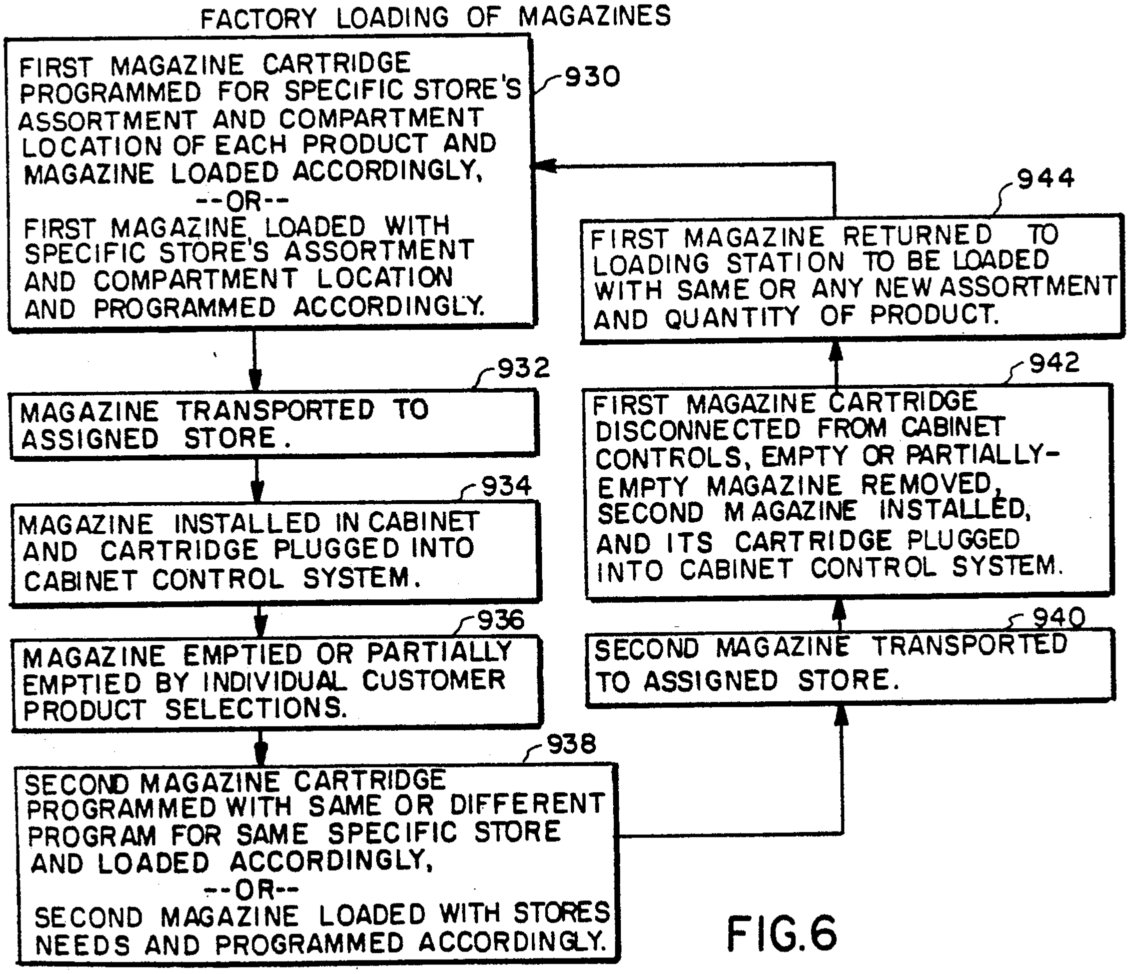
FIG. 6 is a flow chart showing details of the method of loading the magazine with frozen comestibles.

Referring now to FIGS. 5A, 5B and 6, a schematic showing is made in FIGS. 5A and 5B of the method of factory loading magazines. It may be appreciated that six cartons of ice cream at a time may be loaded. The first six cartons 900 are labeled A. The second six cartons 902 are labeled B. Four cartons of ice cream 904 are labeled C. In a first step, the plurality of cartons 900 is inserted into a bin 36 of a magazine 34 against the force supplied by a compression spring 36*a* acting on a ram 36*b*. A hydraulic pusher 906 forces the ice cream packages 900 into the bins 36 where the leaf spring latch 130, which is not shown, will hold the last carton 900 in place. The second plurality 902 will then be in position, the ram 906 will withdraw, and a ram 920 will move all of the cartons 902 into a loading position from which they can be loaded into the next bin 36. It may be appreciated that the cartons 900 may, for instance, contain vanilla ice cream, the cartons 902 may contain chocolate ice cream, and the cartons 904 may contain peppermint ice cream. Each flavor ice cream may be loaded under control of information stored in a data cartridge 22, or a duplicate thereof, so that the information in the data cartridge 22 corresponds to the contents of each of the bins 36. Thus, as shown in FIG. 6 in a first step 930, the first magazine is loaded with the product and the data cartridge 22 is programmed accordingly. The magazine may be transported to the assigned store at which point it is loaded into the apparatus 10 along with the data cartridge 22. The data cartridge 22 is then plugged into the cartridge interface 266 in a step 934. Information is loaded into the system 10 and the magazine may be emptied by operation of the apparatus 10 by consumers in a step 936. As that emptying is taking place, a second magazine may be loaded at the factory in a step 938 and transported to the store in a step 940. The first magazine may be unloaded from the cabinet 12 as and the data cartridge 22 is disconnected in a step 942 and returned to the factory for reloading in a step 944. Thus, a magazine is maintained in the interior 14 of the apparatus 10 at all times so that product is available.

Figure 7A:
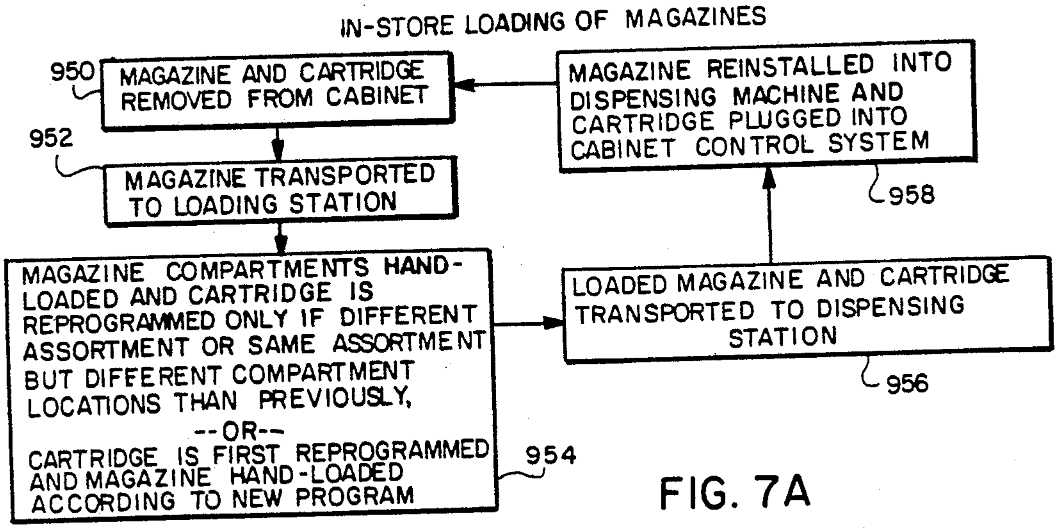
FIG. 7A is a flow chart showing the details of in-store loading of a filled magazine into an empty dispenser unit.

In an alternative embodiment, one of the magazines 32 or 34 may be loaded in the store. The magazine and data cartridge 22 may be removed from the cabinet 12 in a step 950. The magazine may be transported to a loading station in a step 952, at which point, in a step 954, the magazine may be hand-loaded with ice cream packages and the data cartridge 22 may be reprogrammed if there is a differing assortment of ice cream placed therein. The loaded magazine and reprogrammed data cartridge 22 may be retransported to the apparatus 10 in a step 956 and may be loaded into the apparatus 10 in a step 958, as is best seen in the flowchart of FIG. 7A.

Figure 7B:
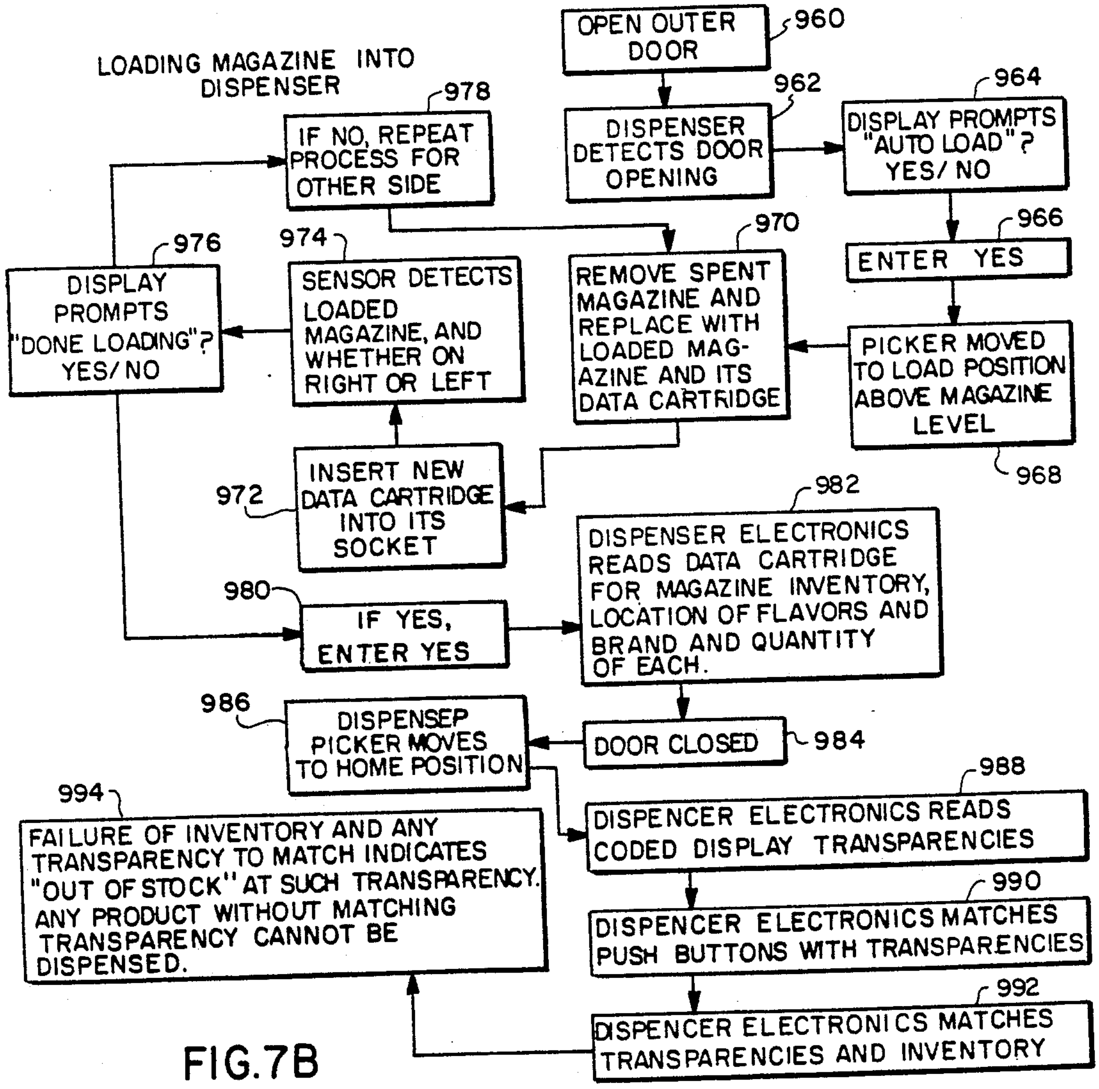
FIG. 7B is a flow diagram showing the details of loading the magazine assemblies into the dispenser including transferring information from data cartridges into a dispenser memory.

The flowchart of FIG. 7B displays the detailed loading of the magazine into the dispenser 10. One of the outer doors 50 or 52 is opened, in a step 960, at which point the microcomputer 186, in a step 962, detects the door opening and the display 268, in a step 964, prompts "AUTOLOAD YES or NO?". The user may then enter the YES command on the keyboard 274, in a step 966, and the picker assembly 28 is moved to the load position, which is above the magazine level, so that it is completely clear of the magazines when they are placed in the interior 14, in a step 968. At that point, in a step 970, the spent magazine 32 or 34 is removed, along with its associated data cartridge 22 and a loaded magazine is replaced with its data cartridge 22. In a step 972, the new data cartridge 22 is connected to the data cartridge interface 266. The magazine switches 300, in a step 974, indicate to the microcomputer 186 that a magazine has been loaded either on the left- or right-hand side of the cabinet interior 14. The display 268 then prompts the loader, in a step 976, as to whether loading has been completed or not. In the event loading has not been completed, the microcomputer 186 proceeds to a step 978 wherein step 970 is repeated and the rest of the loop is repeated. In the event that a YES answer is made to the display prompt from the step 976, control is transferred to a step 980. The microcomputer 186, in a step 982, then causes the data in the data cartridge 22 to be loaded into the memory 258 so that an inventory of the contents of each of the bins 36 is available. The door may then be closed in a step 984. It may be appreciated that, whenever either of the magazines 32 or 34 is moved, the associated data cartridge 22 is then reread when the inner door 40 or 42 is closed in order to make certain that the most current information related to the contents of the magazines 32 and 34 is contained in the memory 258. After the step 984, the picker 28, under the control of the microcomputer 186, is moved in a step 986 to its home position where it is ready for operation.

Following movement of the picker assembly 28 to the home position, the front panel microcomputer 198, via the interface unit 208, scans the food product code sensors 20 in a step 988 and associates the identified product codes from the transparencies 56 with the food product selection switches 18 in a step 990. In a step 992, the inventory information, stored in the memory 258 from the data cartridge 22, is then associated with the indicated selections available from the transparencies 56 in the step 990. In the event that one of the transparencies 56 does not have corresponding inventory information stored in the memory 258, an out-of-stock lamp is lit in a step 994.

Figure 14:
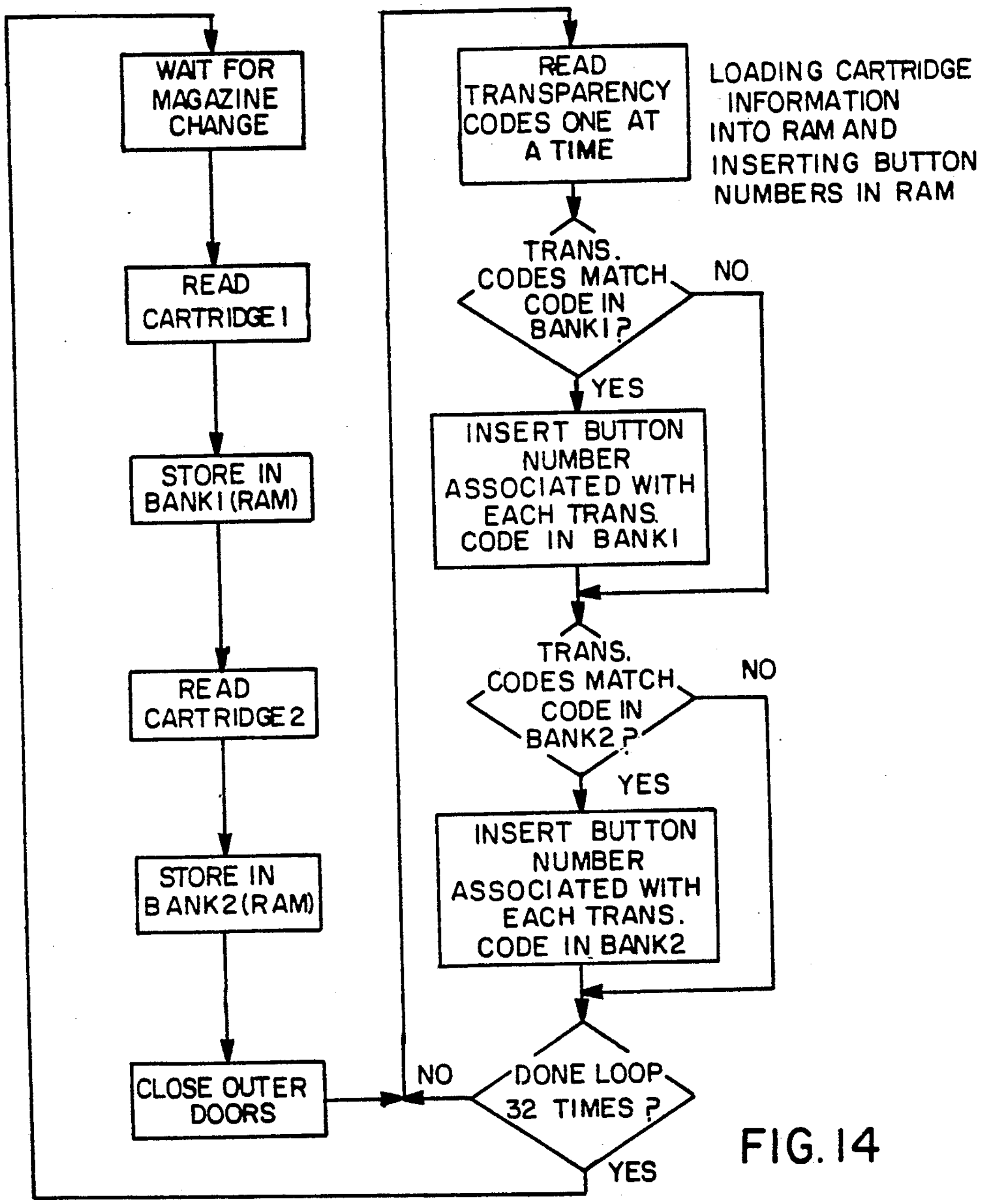
FIG. 14 is a flow diagram of the method by which cartridge information is loaded into a random access memory in the apparatus of FIG. 1.
Figure 15:
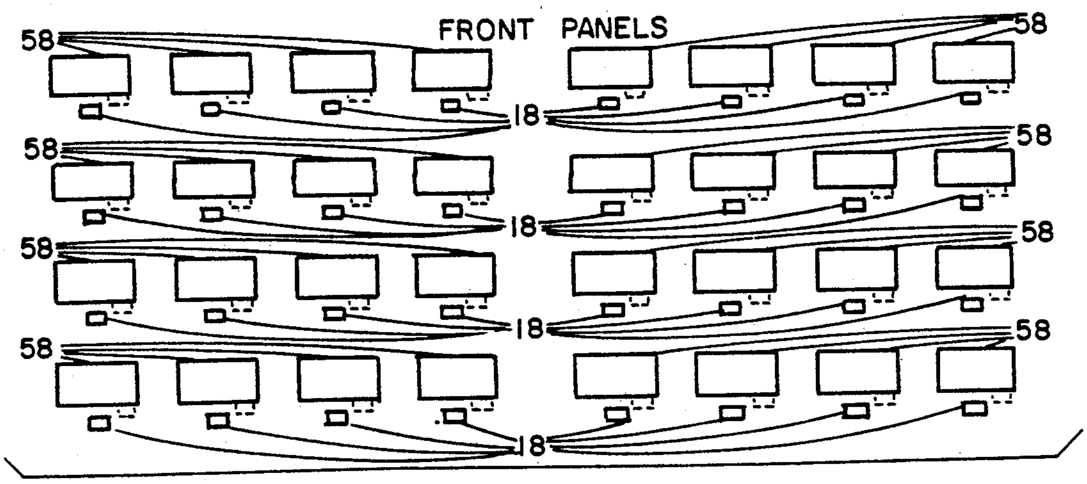
FIG. 15 is a schematic showing of the customer displays and associated information entry switches comprising the keyboard.

As may best be seen in FIG. 14, more specifically when the data cartridges 22 are read in a step 1003, if the magazine has been moved control is transferred to a step 1004. In step 1004, the first cartridge 22 is read and its contents are stored in the memory 258 in a step 1006. The second cartridge 22 is read in a step 1008 and its contents are stored in the memory 258 in a step 1010. The outer doors 50 and 52 are then closed by the user and the transparency codes from the food product code sensors 20 are read in the step 1014. The transparency codes are compared with the inventory indicated in the step 1006 and a test is made in the step 1018 to see if the codes match. In a step 1020, the identification for the food product selection switches 18, corresponding to each of the transparencies, is then loaded into the memory 258 and the transparency codes, indicative of the products to be selected, are compared with the product characteristics stored in RAM in a step 1024. In a step 1028 a test is made if all buttons have been scanned for set-up, if so control is transferred to step 1003 to await moving the magazines. If not, the loop is repeated until all 32 buttons have been scanned.

The arrangement of the magazine bins is set forth for each magazine in FIG. 16 and the bin positions or relative magazine positions are set forth in FIG. 17 identifying the rows and columns to which the picker assembly 28 must travel in order to remove material from the magazine bins and also to make deliveries at the left delivery door 30 and the right delivery door 30.

It may thus be appreciated that the apparatus 10 provides a storage and dispensing unit 10 for frozen comestibles which receives the comestibles in a frozen condition, maintains them in that condition, and then allows quick and easy product selection to be made by the handling means 28 under the control of the microcomputer 186. Since the handling means 28 is maintained at the same temperature as is the magazines 32 and 34, no melting of the frozen comestible or ice cream takes place when the comestible is selected. The system 10 also obviates the handling of frozen comestibles by one searching for a particular flavor, causing the searching to be done completely electronically and an indication to be made to the customer if a particular product selection has been exhausted.

While there have been illustrated and described particular embodiments of the present invention, it will be appreciated that numerous changes and modifications will occur to those skilled in the art which fall within the true spirit and scope of the present invention.

```
.*****************************************************************************
*  FUNCTION NAME                    MODULE NAME                   PROGRAM NAME
*  CLRRAM                           UTILITY.C                     COMET CONTROL
*=============================================================================
*  DESCRIPTION
*    THIS FUNCTION WILL CLEAR ALL RAM ON POWER UP IF THERE IS A COLD START
*  REVISIONS
*  REV      DATE       ENGINEER       DESCRIPTION OF CHANGE
*****************************************************************************/

#include "io.h"

extern char bank1[], bank2[], price[], sale[], phone[], stkout[], id[];
extern char holdsku[];

clrram()
 {
  unsigned counter;    /*COUNTER*/

  for (counter = 0;counter < maxbank;counter++) /*CLEAR BANK1*/
   bank1[counter] = 0;
  for (counter = 0;counter < maxbank;counter++) /*CLEAR BANK2*/
   bank2[counter] = 0;
  for (counter = 0;counter < maxprc;counter++)   /*CLEAR PRICE FIELD*/
   price[counter] = 0;
  for (counter = 0;counter < maxsale;counter++) /*CLEAR SALE FIELD*/
   sale[counter] = 0;
  for (counter = 0;counter < maxnum;counter++)   /*CLEAR PHONE NUMBER*/
   phone[counter] = 0;
  for (counter = 0;counter < maxout;counter++)   /*CLEAR OUT OF STOCK FIELD*/
   stkout[counter] = 0;
  for (counter = 0;counter < maxid;counter++)    /*CLEAR MACHINE ID FIELD*/
   id[counter] = 0;
  for (counter = 0;counter < maxsku;counter++)   /*CLEAR HOLDSKU FIELD*/
   holdsku[counter] = 0;
  return;
 }
```

```
/*IMPORTANT!!!  THE MODEM THAT COMET IS TALKING TO MUST BE SET UP FOR
                1200 BAUD COMMUNICATIONS OR COMET WILL SET A FLAG AS IF
                THE MODEM DOES NOT EXIST*/
/*****************************************************************************
*  FUNCTION NAME        MODULE NAME          PROGRAM NAME
*  DIAL                 CMODEM.C             COMET CONTROL
*============================================================================
*  DESCRIPTION:
*    THIS FUNCTION WILL HANDLE THE DIAL ROUTINE FOR THE MODEM.
*  FUNCTIONS CALLED
*    W CLK     CLOCK.C
*    STATUS    MTEST.C
*    MEMPUT    INOUT.C
*    ECHO      MTEST.C
*    MESSAGE   MTEST.C
*    TALK      CMODEM.C
*    HEADER2   MODTALK.C
*    SENDSTK   OUT.C
*    LF_CR     MODTALK.C
*    MEMGET    INOUT.C
*    DELAY     KEYBOAD.C
*    CLR_SALE  MODTALK.C
*  PARAMETERS PASSED
*    MODE   THIS HAS THE CODE FOR WHAT MESSAGE SHOULD BE SENT OVER
*  PARAMETERS RETURNED
*    RECIEVE THIS IS TRUE IF A CARRIAGE RETURN IS RECIEVED AFTER SENDING DATA
*            AND IS FALSE IF THERE IS NO RETURN
*  REVISIONS:
*  REV    DATE    ENGINEER       DESCRIPTION OF CHANGE
*****************************************************************************/

#include "io.h"

extern char phone[], phncnt, mexist, error[];

/*GLOBAL*/
char modem; /*THIS IS A FLAG TO TELL US IF WE ARE COMMUNICATING WITH THE MODEM*/
char pcat;  /*THIS IS A FLAG TO TELL US IF WE ARE COMMUNICATING WITH THE PC*/
char errmach; /*THIS FLAG WILL KEEP MACHERR ROUTINE IN LOOP*/
char *errmesg:  /*ERROR MESSAGE TO BE WRITTEN TO DISPLAY*/

char dial(mode)
 char mode;
 {
  char *messg;    /*STORAGE FOR A COMMAND TO BE WRITTEN TO THE MODEM*/
  char number[maxnum+5]; /*HOLDS THE ADDRESS OF THE MESSAGE*/
  char x;         /*COUNTER*/
  char i;         /*COUNTER*/
  char stat;      /*STATUS OF MODEM*/
  char value;     /*STATUS VALUE*/
  char recieve;   /*FLAG TO TELL US IF WE CONNECTED*/
  char ascimode;
```

```
recieve = FALSE:    /*INITIALIZE TO FALSE*/
memput(ACIA1SR.0X15); /*RTS LOW*/
delay(0X0700);
memget(ACIA1SR);    /*CLEAR DCD BIT BY READING STATUS REGISTER AND READING*/
memget(ACIA1DR):    /*THE DATA REGISTER*/


if (mexist == TRUE) /*MODEM HOOKED UP*/
 {
  reset();
  messg = "DIAL, MODE = ":
  w_str(messg);
  ascimode = mode + 48;
  busy();
  w_disp(ascimode);
  delay(0X1000);
  messg = "ATDT"; /*MAKE A PHONE CALL*/
  x = 0;
  if (phncnt > 1) /*IS A PHONE NUMBER PRESENT*/
   {
    modem = TRUE:
    r clk(0X00);
    w_clk(0X03);        /*INTERRUPT REGISTER SELECTED*/
    w_clk(0XF6);        /*30 SECOND INTERRUPT*/
    w_clk(0X00);        /*START TIMER*/
    while (*messg != '\0')
     number[x++] = *messg++;
    for (i = 0;i < phncnt;i++)  /*CONCATENATES THE PHONE NUMBER WITH MESSAGE*/
     number[x++] = phone[i];
    number[x] = '\0'; /*THIS HAS NOT BEEN TESTED YET*/
    value = command(number);
   }
  else
   {
    value = 0;
    recieve = 0XFF;
   }
  if (value == 0X0D)
   {
    w_clk(0X00);              /*RESTART TIMER*/
    stat = 11;                /*LOOP WHILE GET A RING SIGNAL BACK*/
    while (stat == 11)
     stat = message();
    delay(0X0700);
    if (stat == 5)      /*CONNECTION AT 1200 BAUD*/
     recieve = sndcode(mode);
   }
 }

 else
  {
/*    pcat = TRUE;              PCAT ON LINE*/
/*    w_clk(0X03);        INTERRUPT REGISTER SELECTED*/
/*    w_clk(0XFE);        30 SECOND INTERRUPT*/
/*    w_clk(0X00);        START TIMER*/
/*    recieve = sndcode(mode);*/
      recieve = TRUE;
  }
 w_clk(0X03);        /*TURN CLOCK INTERRUPT OFF*/
 w_clk(0XF0);
 w_clk(0X01);
 r_clk(0X00);       /*MAKE SURE INTERRUPT BIN IS CLEAR*/
 if (mexist == TRUE)
  {
```

```
    memput(ACIA1SR,0X55);  /*RTS LINE IS HIGH. HANG UP MODEM*/
    modem = FALSE;     /*MODEM HUNG UP*/
    delay(0X0500);
    memput(ACIA1SR,0X15);   /*RTS LINE LOW*/
    delay(0X0700);
   } }
  memget(ACIA1SR);        /*CLEAR DCD BIT BY READING STATUS REGISTER AND*/
  memget(ACIA1DR);        /*DATA REGISTER*/
  return(recieve);
 }

/****************************************************************************
*  FUNCTION NAME
*  COMMAND
*===========================================================================
*  DESCRIPTION:
*     THIS FUNCTION SENDS A COMMAND TO THE MODEM.
*  PARAMETER PASSED:
*     VALUE   (CONTAINS A COMMAND STRING TO BE SENT TO MODEM)
*  FUNCTIONS CALLED
*     STATUS   MTEST.C
*     MEMPUT   INOUT.C
*     ECHO     MTEST.C
*  REVISIONS:
*   REV    DATE   ENGINEER      DESCRIPTION OF CHANGE
****************************************************************************/


command(value)
 char *value;
 {
  char letter; /*ECHOED LETTERED*/

  while (*value != '\0')
   {
    letter = status1(2,0X7F,1);
    if (letter != 0X02)
     {
      errmod(letter);
      return(0XFF);
     }
    memput(ACIA1DR,*value);
    letter = echo();
    if (letter != (*value))
         return(0XFF); /*RETURN A ERROR CODE*/
        *value++;
   }
  status1(2,0X7F,1);
  memput(ACIA1DR,0X0D);    /*CARRIAGE RETURN*/
  letter = echo();
  if (letter != 0X0D)
   return(0XFF);    /*RETURN AN ERROR CODE*/
  return(letter);
 }

/****************************************************************************
*  FUNCTION NAME
*  TALK
*===========================================================================
*  DESCRIPTION:
*    THIS FUNCTION WILL SEND THE DATA OVER THE MODEM.
*  FUNCTIONS CALLED
*    STATUS    MTEST.C
*    MEMPUT    INOUT.C
*  REVISIONS:
*  REV    DATE    ENGINEER    DESCRIPTION OF CHANGE
```

```
talk(data)
 char *data:
 {

  status1(2.0X7F.1):
  memput(ACIA1DR.0X0D):      /*CARRIAGE RETURN*/
  status1(2.0X7F.1):
  memput(ACIA1DR.0X0A):      /*LINE FEED*/
  while (*data != '\0')
   {
    status1(2.0X7F.1):
    memout(ACIA1DR.*data):
    *data++:
   }
  return:
 }


/***************************************************************************
*  FUNCTION NAME
*  ANSWER
*==========================================================================
*  DESCRIPTION:
*    THIS FUNCTION ANSWERS THE MODEM.  IT WILL THEN WAIT FOR A COMMAND
*    CHARACTER TO TELL COMET WHAT INFORMATION IS NEEDED.
*  FUNCTIONS CALLED
*    COMMAND  CMODEM.C
*    MESSAGE  MTEST.C
*    DELAY    KEYBOAD.C
*    HEADER1  MODTALK.C
*    CONNECT  MODTALK.C
*    W_CLK    CLOCK.C
*    MEMPUT   INOUT.C
*    MEMGET   INOUT.C
*  REVISIONS:
*  REV   DATE   ENGINEER     DESCRIPTION OF CHANGE
***************************************************************************/

char answer()
 {
  char *messg: /*MESSAGE TO BE SENT TO THE MODEM*/
  char baud:   /*BUAD RATE VARIABLE*/
  char value:  /*MODEM.STATUS MESSAGE*/
  char *string:

  if (mexist == TRUE) /*DON'T ANSWER IF NO MODEM (FALSE BIT SET)*/
   {
    memout(ACIA1SR.0X15): /*RTS LOW*/
    memget(ACIA1SR):     /*CLEAR DCD BIT BY READING STATUS REGISTER AND*/
    memget(ACIA1DR):     /*DATA REGISTER*/
    modem = TRUE:
    w_clk(0X03):         /*INTERRUPT REGISTER SELECTED*/
    w_clk(0XFE):         /*30 SECOND INTERRUPT*/
    w_clk(0X00):         /*START TIMER*/
    messg = "ATA";             /*ANSWER COMMAND*/
    value = command(messg):
    if (value == 0X0D)
     {
      w_clk(0X00):       /*RESTART TIMER*/
      baud = message():
      if (baud == 5)      /*DID WE CONNECT AT 1200 BAUD*/
       {
        reset():
        string = "ANSWER 1200":
```

```
        w_str(sendline);
/*        modem = TRUE;*/
        delay(0X1D00);
        header1();
        connect();
       }
      }
    w_clk(0X60);                 /*RESTART TIMER*/
    memout(ACIA1SR,0X55);   /*RTS LINE HIGH. HANG MODEM UP*/
    delay(0X0500);
    memout(ACIA1SR,0X15);   /*RTS LINE LOW. WE ARE NOW HUNG UP*/
    memget(ACIA1SR);           /*CLEAR DCD BIT BY READING STATUS REGISTER AND*/
    memget(ACIA1DR);           /*READING DATA REGISTER*/
    modem = FALSE;
    w_clk(0X03);                /*INTERRUPT REGISTER SELECTED*/
    w_clk(0X70);                /*NO INTERRUPT*/
    w_clk(0X01);                /*NORMAL OPERATION STARTED*/
    memget(PIACCRA);
    memget(PIACDRA);          /*CLEAR THE CA2 INTERRUPT VECTOR*/
   }
  return;
 }

/**********************************************************************
*  FUNCTION
*  ENCODE
*=====================================================================
*  DESCRIPTION
*    THIS FUNCTION WILL SEND THE CODE TO THE PC OR THE MODEM
*  FUNCTIONS CALLED
*  REVISIONS
*    REV     DATE      ENGINEER        DESCRIPTION OF CHANGE
**********************************************************************

encode(mode)
 char mode;
  {
   char recieve;  /*FLAG TO TELL US IF WE CONNECTED*/
   char value;    /*STATUS VALUE*/
   char *messg;   /*STORAGE FOR A COMMAND TO BE WRITTEN TO THE MODEM*/

   reset();
   messg = "CONNECT ";
   w_str(messg);
   recieve = FALSE;     /*WE HAVE NOT RECIEVED ANYTHING SO RECIEVE IS FALSE*/
   w_clk(0X03);         /*INTERRUPT REGISTER SELECTED*/
   w_clk(0XF6);         /*30 SECOND INTERRUPT*/
   w_clk(0X00);         /*START TIMER*/
   r_clk(0X00);         /*START TIMER*/
   switch (mode)
    {
     case 1:          /*SEND OUT OF STOCK MESSAGE*/
      messg = "OS";
      break;
     case 2:          /*SEND TEMPERATURE WARNING MESSAGE*/
      messg = "TW";
      break;
     case 3:          /*RETURN BIN FULL MESSAGE*/
      messg = "RF";
      break;
     case 4:          /*MACHINE MALFUNCTION MESSAGE*/
      messg = "MF";
      break;
     case 5:
      messg = "SD"; /*SALES DUMP*/
      break;
     case 6:
      messg = "VO"; /*VANILLA OUT OF STOCK*/
      break;
```

```
 }
 w_str(messo);
 delay(0X0700);
 talk(messo);
 header2();
 if (mode == 1 || mode == 6)
  sendstk();          /*SEND THE OUT OF STOCK MESSAGE*/
 if (mode == 5)       /*SEND THE SALES DATA*/
  tosale();
 w_clk(0X03);         /*INTERRUPT REGISTER SELECTED*/
 w_clk(0XF6);         /*30 SECOND INTERRUPT*/
 w_clk(0X00);         /*START TIMER*/
 r_clk(0X00);               /*RESTART TIMER*/
 value = status1(1,0XTD,1);       /*WAIT FOR RETURN SIGNAL*/
 if (value < 3)
  {
   value = memget(ACIA1DR); /*GET CARRIAGE RETURN IF COMMUNCATIONS OK*/
   if (value == 0X0D)
    {
     messo = "RECIEVED";
     recieve = TRUE;          /*WE SENT DATA OVER OKAY SO CARRIAGE RETURN*/
    }                         /*IS RECIEVED*/
   else
    messo = "NOT RECIEVED";
   reset();
   w_str(messo);
   delay(0X0700);
  }
/*   if (mexist == TRUE)
  {
   memout(ACIA1SR,0X55);  RTS LINE IS HIGH, HANG UP MODEM
   modem = FALSE;     MODEM HUNG UP
   delay(0X0500);
   memout(ACIA1SR,0X15);    RTS LINE LOW
  }*/
  w_clk(0X03);         /*TURN CLOCK INTERRUPT OFF*/
  w_clk(0XF0);
  w_clk(0X01);
  r_clk(0X00);
  memget(ACIA1SR);         /*CLEAR DCD BIT BY READING STATUS REGISTER AND*/
  memget(ACIA1DR);         /*DATA REGISTER*/
  modem = FALSE;          /*MODEM IS NOW HUNG UP*/
  pcat = FALSE;           /*WE ARE OFF LINE WITH THE PC-AT*/
  if (recieve == TRUE)
   {
    if (mode == 5)
    clr_sale(); /*CLEAR THE SALES FIELD*/
    if (mode == 1 || mode == 6)
     delstk();
   }

  return(recieve);
 }

/*****************************************************************************
*  FUNCTION NAME
*  MACHERR
*============================================================================
*  DESCRIPTION
*    CONTROL IS SENT HERE IF A MACHINE MALFUNCTION HAS OCCURRED.
*    REASONS FOR A MACHINE MALFUNCTION ARE:
*    1.  MICROPROCESSOR DID NOT GET PROPER RETURN CHARACTER FROM COMMUNICATING
*          WITH OTHER MICROPROCESSOR.
*    2.  ICE CREAM WAS NOT DELIVERED PROPERLY
*  FUNCTIONS THAT CALL MALFUNC:
*    MTRSRCH     MOTOR1.C
*    ALIGN       MOTOR1.C
```

```
*     MTRHOME      MOTOR1.C
*     GETSKU       GETSKU.C
*     MAIN         MAIN.C
*  REVISIONS
*  REV     DATE      ENGINEER        DESCRIPTION OF CHANGE
*****************************************************************************/

macherr()
 {
  char recieve;
/*   memout(PIA1DRA,0X0C);      TURN MOTORS OFF*/
  memout(PIA1CRA,0X3C);   /*TOGGLES WATCHDOG TIMER*/
  memout(PIA1CRA,0X34);
  mtrstp();                  /*STOP THE MOTORS*/
  errmach = TRUE;
  memout(ACIA2SR,0X55);                 /*DISABLE INTERRUPT*/
  reciave = FALSE;
  for(;;)
   {
    retbin();
    memout(PIA1CRA,0X3C);  /*TOGGLEE WATCHDOG TIMER*/
    memout(PIA1CRA,0X34);
    if (mexist == TRUE && recieve == FALSE)
     reciave = dial(4);
    if (reciave == TRUE || mexist == FALSE)
     {
      reset();
      w_str(errmesg);    /*WRITE THE ERROR MESSAGE*/
      for(;;)
       {
        retbin();
        memout(PIA1CRA,0X3C);   /*TOGGLEE WATCHDOG TIMER*/
        memout(PIA1CRA,0X34);
        beep(5);
       }
     }
   }
  return;
 }

/****************************************************************************
*  FUNCTION NAME
*  MODEMINT
*============================================================================
*  DESCRIPTION
*   THIS FUNCTION WILL RESET PARAMETERS SINCE THE MODEM WAS INTERRUPTED BY
*   A FIRQ OR IRQ INTERRUPT.
*  FUNCTIONS CALLED
*    R_CLK   CLOCK.C
*    W_CLK   CLOCK.C
*  REVISIONS
*  REV    DATE    ENGINEER     DESCRIPTION OF CHANGE
***************************************************************************/

modemint()
 {
  char regaddr;   /*REGISTER ADDRESS*/

  if (modem == TRUE || pcat == TRUE)
   {
/*    printf("modem is true\n");*/
    r_clk(0X00);                /*CLEAR THE TIMER INTERRUPT*/
    w_clk(0X00);                /*START TIMER AGAIN*/
    memput(ACIA1SR,0X15);
    memget(ACIA1SR);
    memget(ACIA1DR);
```

```
        regaddr = 0X00;              /*INTERRUPT REGISTER SELECTED*/
        w_clk(regaddr);
        regaddr = 0XF0;              /*NO INTERRUPT*/
        w_clk(regaddr);
        regaddr = 0X01;              /*NORMAL OPERATION STARTED*/
        w_clk(regaddr);
        r_clk(0X00);                 /*MAKE SURE INTERRUPT CLEARED*/
      }
    return;
   }

/************************************************************************
*  FUNCTION NAME       MODULE NAME        PROGRAM NAME
*  FIRQ                FINT.C             COMET CONTROL
*========================================================================
*  DESCRIPTION
*     THIS MODULE IS ENTERED WHEN THE DOOR IS OPENED.  A FIRQ INTTERUPT
*     HAS OCCURRED WHEN THIS ROUTINE IS ENTERED.
*     THIS MODULE CONSISTS OF THE FOLLOWING FUNCTIONS:
*       FIRQ       WAITS FOR A FUNCTION TO BE SELECTED
*       FNC_DISP   DISPLAYS THE FUNCTIONS THAT ARE AVAILABLE
*========================================================================
*  DESCRIPTION
*     THIS IS THE FIRQ INTERRUPT ROUTINE.  WHEN THIS ROUTINE IS ENTERED. THE
*     IRQ INTERRUPT IS DISABLED. AND NO CALLS FROM THE MODEM WILL BE ACCEPTED.
*     THE OPERATOR WILL HAVE THE CHOICE OF WHAT FUNCTION HE WANTS TO PERFORM.
*     THE CARTRIDGE CAN BE USED. HAND LOADING OF ICE CREAM. CLOCK OSCILLATOR
*     SETTING. CLOCK READ. CLOCK WRITE. AND RESETING THE RETURN BIN FLAG IF THE
*     RETURN BIN HAS BEEN EMPTIED.
*  FUNCTIONS CALLED
*     FNC_DISP   FINT.C
*     MEMPUT     INOUT.C
*     MEMGET     INOUT.C
*     DATAKEY    KEY.C
*     CLR_SALE   COMMUN.C
*     DISP_CLK   CLOCK.C
*     BINCNT     RETURN.C
*     DEL_SKU    OP.C
*     ASSIGN     OP.C
*     PRICING    PRICING.C
*     COMMND     TALK.C
*  REVISIONS
*  REV    DATE     ENGINEER     DESCRIPTION OF CHANGE
************************************************************************/

#include "io.h"

extern char pcat, modem, errmach;

/*GLOBAL*/
char cartrge; /*BOOLEAN VALUE. DETERMINES IF CARTRIDGE WAS AUTO LOADED*/

char firq()
 {
  char keystr; /*KEYSTROKE ENTERED FROM KEYBOARD*/
  char *string; /*VARIABLE TO HOLD STRING TO WRITE TO DISPLAY*/

  mtrstp();                  /*STOP THE MOTORS JUST IN CASE*/
  if (errmach == TRUE)
   return;
  memput(PIA1CRA,0X3C);  /*TOGGLES WATCHDOG TIMER*/
  memput(PIA1CRA,0X34);
  memput(ACIA1SR,0X55);            /*DISABLE MODEM AND PC*/
  modemint();                /*RESET PARAMETERS IF MODEM OR PC ON LINE*/
  pcat = FALSE;          /*PCAT OFF LINE*/
  modem = FALSE;         /*MODEM OFF LINE*/
  cartrge = FALSE;
  memget(ACIA2SR);     /*CLEAR DCD BIT BY READING STATUS REGISTER AND READING*/
  memget(ACIA2DR);     /*THE DATA REGISTER*/
```

```
memput(ACIACSR,0X12); /*DISABLE INTERRUPT*/
commnd('W');            /*PLEASE WAIT COMMAND*/
beep( S );              /*SHORT BEEP*/
for(;;)
{
 keystr = fnc_disp(maxfunc);      /*DISPLAY FUNCTION CODES AND DESCRIPTIONS*/
 switch (keystr)
  {
   case 1:        /*FUNCTION CODE 1*/
    loadpos();               /*MOTORS TO LOAD POSITION*/
    datakey();  /*DATA KEY READ*/
    break;
   case 2:        /*FUNCTION CODE 2*/
    string = "CLEARING SALES";
    reset();
    w_str(string);
    clr_sale(); /*CLEARS THE SALES*/
    delay(0X0D50);
    string = "SALES CLEARED";
    reset();
    w_str(string);
    delay(0X0D50);
    break;
   case 3:        /*FUNCTION CODE 3*/
    bincnt();  /*RESET THE RETURN BIN COUNTER*/
    break;
   case 4:         /*FUNCTION CODE 4*/
    disp_clk(); /*READ CLOCK*/
    break;
   case 5:        /*FUNCTION CODE 5*/
    del_sku(); /*DELETE AN SKU*/
    break;
   case 6:        /*FUNCTION CODE 6*/
    assign();   /*ASSIGN AN SKU*/
    break;
/*    case 7:       FUNCTION CODE 7
    pricing();
    break;*/
  }
 }
}


/******************************************************************************
*   FUNCTION NAME
*   FNC_DISP
*=============================================================================
*   DESCRIPTION
*     THIS FUNCTION DISPLAYS EACH FUNCTION CODE NUMBER AND DESCRIPTION WHEN THE
*     OPERATOR ENTERS CLEAR.  IF ENTER OR ANOTHER DIGIT IS ENTERED THEN WE
*     RETURN TO FIRQ.
*   PARAMETERS PASSED
*     FUNCODE   IF = MAXFUNC THEN WE ARE IN THE FIRQ INTERRUPT. IF = MAXTEST
*     THEN TEST MODE
*   FUNCTIONS CALLED
*     W_STR     DISPLAY.C
*     GETKEY    KEYBOARD.C
*     RESET     DISPLAY.C
*     BEEP      KEYBOARD.C
*   REVISIONS
*   REV   DATE    ENGINEER     DESCRIPTION OF CHANGE
*****************************************************************************/

fnc_disp(funcode)
 char funcode;
 {
```

```
char keystr:  /*KEYSTROKE ENTERED FROM KEYBOARD*/
char *string: /*STORAGE FOR A STRING TO BE WRITTEN TO THE DISPLAY*/
char tablecnt: /*COUNTER FOR SWITCH STATEMENT*/
char entry1:   /*VALID KEY THAT WILL BE SENT TO GETKEY*/
char entry2:   /*VALID KEY THAT WILL BE SENT TO GETKEY*/

entry1 = 'Y':
entry2 = 'N':
keystr = 'N':
tablecnt = 1:
while (keystr == 'N')
 {
  if (funcode == maxfunc) /*FIRQ INTERRUPT*/
   {
       switch (tablecnt)
     {
      case 1:
       string = "AUTO LOAD Y/N? ":
       break:
      case 2:
       string = "CLEAR SALES Y/N?":
       break:
      case 3:
       string = "CLR RET BIN Y/N?":
       break:
      case 4:
       string = "READ CLOCK Y/N?":
       break:
      case 5:
       string = "DELETE SKU Y/N?":
       break:
      case 6:
       string = "ASSIGN SKU Y/N?":
       break:
/*      case 7:
       string = "ENTER PRICE Y/N?":
       break:*/
     }
   }
  else /*ELSE WE ARE IN TEST MODE*/
   {
    switch (tablecnt)
     {
      case 1:
       string = "MODEM TEST Y/N?":
       break:
      case 2:
       string = "DISP. TEST Y/N?":
       break:
      case 3:
       string = "TEMP CHECK Y/N?":
       break:
          case 4:
       string = "LOCATE TEST Y/N?":
       break:
      case 5:
       string = "FREEZER CHK Y/N?";
       break:
      case 6:
       string = "INITIAL TST Y/N?";
       break;
      case 7:
       string = "EXERCISE Y/N?";
       break:
      case 8:
```

```
        string = "SPEED SET Y/N?";
        break;
       case 9:
        string = "ASSIGN ID# Y/N?";
        break;
      }
    }
   reset();
   w_str(string);
   keystr = getkey(entry1,entry2);
   if (keystr == 'N') /*DON'T INCREMENT IF WE HAVE A YES*/
    {
     if (tablecnt == maxfunc && funcode == maxfunc)
      tablecnt = 1;  /*BACK TO BEGINNING OF TABLE*/
     else
      {
       if (tablecnt == maxtest && funcode == maxtest) /*TEST MODE*/
        tablecnt = 1;
       else
        tablecnt++;    /*INCREMENT TABLECNT*/
      }
    }
   if (funccode == maxfunc && tablecnt > 1)
    cartrge = TRUE; /*SET FLAG ONLY IF FIRD AND A AUTO LOAD WAS NOT ENTERED*/
  }
 return(tablecnt);
}
```

```
/*****************************************************************************
*   FUNCTION NAME             MODULE NAME              PROGRAM NAME
*   W_DISP                    DISPLAY.C                COMET CONTROL
*============================================================================
*   DESCRIPTION
*     THIS FUNCTION WRITES A NUMBER TO THE DISPALY.
*     PA0 IS REGISTER SELECT (RS), PA1 IS READ/WRITE (R/W), AND PA2 IS ENABLE
*     (E), PA3-PA7 IS ADDRESSES TO THE CARTRIDGE SO WE DON'T CARE ABOUT
*     THEIR VALUES.  EVERYTHING WRITTEN TO PORT A AND PORT B IS INVERTED BY THE
*     BUFFERS ON THE PIA MODULE. CA2 AND CB2 LOW CONFIGURE PORT B AND PORT A
*     AS OUTPUTS. CA2 AND CB2 HIGH CONFIGURE THEM AS INPUTS.
*   FUNCTIONS CALLED
*     MEMPUT   INOUT.C
*     DDRAM    DISPLAY.C
*     HOME     DISPLAY.C
*   PARAMETERS PASSED
*     INPUTS   i      (VALUE TO BE WRITTEN TO DISPLAY)
*   REVISIONS
*   REV      DATE      ENGINEER        DESCRIPTION OF CHANGE
*****************************************************************************/

#include "io.h"

/*GLOBAL*/
char dispcount;   /*ADDRESS COUNT FOR DISPLAY*/

 char w_disp(i)
  char i;
  {
        memput(PIA4DRA,0XC0);            /*3F HEX, RS HIGH, R/W LOW, E LOW*/
        memput(PIA4DRA,0X40);            /*BF HEX, PA7 (E) GOES HIGH*/
        memput(PIA4DRB,~i);               /*WRITE KEY SELECTION DATA*/
        memput(PIA4DRA,0XC0);            /*3F HEX, PA7 (E) GOES LOW*/
        dispcount = dispcount + 1;                /*FIRST 8 CHARACTERS ADDRESS 0-8
. SECOND 8*/
        if (dispcount == 8)                  /*CHARACTERS FROM 40-47*/
     {
      dispcount = 0X40;
          ddram(dispcount);                       /*GO TO ADDRESS 40*/
     }
    if (dispcount == 16)
        {
         home();                         /*BACK TO ADDRESS 0*/
         dispcount = 0;
        }
        return;
  }

/*****************************************************************************
*   FUNCTION NAME
*   BUSY
*============================================================================
*   DESCRIPTION
*     CHECKS BIT 7 OF THE BUSY FLAG/ADDRESS COUNTER REGISTER. IF BUSY FLAG IS
*     SET, THEN WE MUST WAIT TO PERFORM THE NEXT OPERATION.  ALL VALUES WRITTEN
*     TO THE CONTROL AND DATA REGISTERS ARE INVERTED BECAUSE THE PIA MODULE
*     USES THE MC8T26 INVERTED BUS EXTENDERS.
```

```
*   FUNCTIONS CALLED
*     MEMPUT  INOUT.C
*     MEMGET  INOUT.C
*   REVISIONS
*   REV      DATE      ENGINEER         DESCRIPTION OF CHANGE
*************************************************************************************

char busy()
 {
  char value; /*VALUE OF THE BUSY BIT*/

    prt4in();                          /*PORT4 ARE INPUTS*/
    memout(PIA4DRA,0XA0);              /*5F HEX, RS LOW, R/W HIGH, E LOW*/
        memout(PIA4DRA,0X20);              /*DF HEX, PA7 (E) HIGH*/
    value = *memget(PIA4DRB);          /*READ DATA*/
        while (value > 127)                /*BUSY FLAG IS BIT 7. IF SET THEN WAIT
UNTIL CLEAR*/
         value = *memget(PIA4DRB);
    prt4out();                         /*PORT4 ARE OUTPUTS*/
        memout(PIA4DRA,0XE0);              /*1F HEX, PA7 (E) LOW*/
        return;
 }

/*=========================================================================*/
/*=========================================================================*/
/*SET LENGTH OF DATA TRANSFERS, AND SELECTS DISPLAY FORMAT.  8 BIT DATA     */
/*TRANSFERS WILL BE USED AND THE FORMAT IS 1 LINE.                          */
/*=========================================================================*/
/*=========================================================================*/

char fncset()

        memout(PIA4DRA,0XE0);          /*1F HEX, RS, R/W, E LOW*/
        memout(PIA4DRA,0X60);          /*9F HEX, E HIGH*/
        memout(PIA4DRB,0XC7);
        memout(PIA4DRA,0XE0);          /*E LOW*/
        return;
  }

/*=========================================================================*/
/*=========================================================================*/
/*CLEARS DISPLAY AND ADDRESS COUNTER IS RESET TO 0.                         */
/*=========================================================================*/
/*=========================================================================*/

char clear()
 {
    memout(PIA4DRA,0XE0);
        memout(PIA4DRA,0X60);
        memout(PIA4DRB,0XFE);
        memout(PIA4DRA,0XE0);
        return;
 }

/*=========================================================================*/
/*=========================================================================*/
/*DISPLAY IS TURNED ON, CURSOR IS DISPLAYED, AND THE CURSOR DOES NOT BLINK.  */
/*=========================================================================*/
/*=========================================================================*/

char cont()
  {
        memout(PIA4DRA,0XE0);
        memout(PIA4DRA,0X60);
        memout(PIA4DRB,0XF1);
```

```
        memout(PIA4DRA,0XE0);
        return;
  }

/*=========================================================================*/
/*=========================================================================*/
/*SETS ENTRY MODE. ADDRESS COUNTER WILL BE INCREMENTED BY ONE AND THE DISPLAY*/
/*WILL NOT BE SHIFTED.                                                    */
/*=========================================================================*/
/*=========================================================================*/

char entry()
   {
    memout(FIA4DRA,0XE0);
        memout(FIA4DRA,0X60);
        memout(FIA4DRB,0XF9);
    memout(FIA4DRA,0XE0);
        return;
   }

/*=========================================================================*/
/*=========================================================================*/
/*RETURNS CURSOR HOME. THE ADDRESS COUNTER IS RETURNED TO 0.              */
/*=========================================================================*/
/*=========================================================================*/

home()
  {
   memout(FIA4DRA,0XE0);
   memout(FIA4DRA,0X60);
   memout(FIA4DRB,0XFD);
   memout(FIA4DRA,0XE0);
   return;
  }

/*=========================================================================*/
/*=========================================================================*/
/*SETS DD RAM ADDRESS.  SETS DD RAM ADDRESS TO 40 HEX.                    */
/*=========================================================================*/
/*=========================================================================*/

ddram(address)
 char address;
 {
  memout(FIA4DRA,0XE0);
  memout(FIA4DRA,0X60);
  memout(FIA4DRB,((~address) & 0X7F)); /*BIT 7 WILL BE A ONE FOR WRITE TO DD RAM
*/
  memout(FIA4DRA,0XE0);
  return;
 }
/*=========================================================================*/
/*=========================================================================*/
/*THIS FUNCTION TURNS THE DISPLAY ON OR OFF, DISPLAYS CURSOR, AND INITITATES */
/*BLINKING.                                                               */
/*PARAMETERS PASSED                                                       */
/* VALUE   CONTAINS VALUE TO BE WRITTEN TO DISPLAY                        */
/*=========================================================================*/
/*=========================================================================*/

char onoff(value)
 char value;
  {
        memout(FIA4DRA,0XE0);          /*RS, R/W, E LOW*/
        memout(FIA4DRA,0X60);          /*E HIGH*/
        memout(FIA4DRB,value);
        memout(FIA4DRA,0XE0);          /*E LOW*/
        return;
  }
```

```
/*=========================================================================*/
/*=========================================================================*/
/*THIS FUNCTION WILL CLEAR THE DISPLAY AND RESET THE RAM ADDRESS TO 0.    */
/*=========================================================================*/
/*=========================================================================*/

reset()
 {
  busy();
  clear();
  busy();
  home();
  busy();
  dispcount = 0;
  return;
 }

/**************************************************************************
*  FUNCTION
*  w_STR
*==========================================================================
*DESCRIPTION
* THIS FUNCTION WILL WRITE A STRING OF CHARACTERS TO THE DISPALY.
* PARAMETERS PASSED    VALUE     VALUE IS THE STRING OF CHARACTERS.
*FUNCTIONS CALLED
*  W_DISP  DISPLAY.C
**************************************************************************/

w_str(value)
 char *value;
 {
  char i;  /*STORAGE VALUE FOR VALUE*/
  while (*value != '\0')
   {
    i = *value;
        w_disp(i);
        *value++;
   }
  return;
 }
```

```
/*****************************************************************************
*  FUNCTION NAME          MODULE NAME            PROGRAM NAME
*  CHKOUT.C               CHKOUT                 COMET CONTROL
*============================================================================
*  DESCRIPTION
*   THIS FUNCTION IS CALLED BY IRQ.C TO SEE IF A SKU IS OUT OF STOCK.  IF SO
*   WE WILL RECORD THE SKU OUT OF STOCK AND SEND THE OUT OF STOCK BUTTON TO
*   THE KEYBOARD CONTROL.  WE WILL NEED TO CHECK BOTH BANKS OF DATA BEFORE
*   TURNING THE OUT OF STOCK LIGHT ON.
*  FUNCTIONS CALLED
*    FNDBUT    SEARCH1.C
*    ITOA      ITOA.C
*    STRFIND   SEARCH1.C
*    MEMSET    INOUT.C
*    REC_OUT   OUT.C
*    SENDMIC   TALK.C
*  VARIABLES PASSED
*    DATA        CONTAINS THE ADDRESS OF BANK1 OR BANK2
*    SAVE1       POINTER TO THE BUTTON FIELD
*    SAVE2       POINTER TO THE QUANTITY FIELD
*    BANK        IF = 1. BANK1 ELSE IF = 2. BANK2
*  REVISIONS
*  REV.    DATE      ENGINEER           DESCRIPTION OF CHANGE
*****************************************************************************/

#include "io.h"

extern char bank1[], bank2[], skudata[], price[];
extern unsigned dataloc, found;


chkout(button,save1,save2,bank)
 char button, bank;
 unsigned save1, save2;
 {
  char loop;              /*COUNTER*/
  char count;             /*OUT OF STOCK COUNTER*/
  char outquan;           /*FLAG FOR OUT OF STOCK QUANTITY*/
  char *data;             /*TEMPORARY POINTER FOR BANK1 OR BANK2*/
  char *temp;             /*TEMPORARY POINTER FOR DATA*/
  char prswtch;           /*PRICE SWITCH FLAG TO TELL US IF PRICE DISPLAYS ARE INSE
RTED*/
  char keystr[5];         /*CONTAINS THE ASCII BUTTON NUMBER*/
  char stock[36];         /*ARRAY TO HOLD OUT OF STOCK BUTTONS*/
  unsigned strtquan;      /*START OF QUANTITY POINTER*/
  unsigned strtbin;       /*START OF BIN POINTER*/
  unsigned j;             /*COUNTER*/

  if (bank == 2)
    data = &bank2[0];
  else
    data = &bank1[0];
  outquan = TRUE;                     /*INITIALIZE TO TRUE*/
  for (loop = 0;loop < 2;loop++)
   {
    if (data[save2] != STX)
     {
```

```
   while (data[save2] != ETX)        /*CHECK TO SEE IF DATA IS OUT OF STOCK*/
    {                                /*SAVE2 CONTAINS START OF QUANTITY FIELD*/
     if (data[save2] != 0X2F)
      {
       if (data[save2] == '0')
        outquan = TRUE;              /*OUTQUAN = TRUE MEANS WE ARE OUT OF QUANTIT
Y*/
       else
        {
         outquan = FALSE;     /*OUTQUAN = FALSE MEANS WE HAVE ICE CREAM SO BREA
K*/
         break;
        }
      }
     save2++;
    } /*END WHILE LOOP*/
  }
 else
  outquan = TRUE;
 if (outquan == TRUE && loop == 0)   /*BANK IS OUT OF STOCK. CHECK OTHER BANK*

  {
   if (bank == 1)
    {
     bank = 2;
     temp = &bank2[0];  /*TEMPORARY BANK*/
    }
   else
    {
     bank = 1;
     temp = &bank1[0];  /*TEMPORARY BANK*/
    }
       itoa(button,keystr);   /*CONVERT INTEGER TO ASCII*/
   findbut(keystr,temp);                   /*FIND THE BUTTON*/
   if (dataloc != 0)
    {
     data = temp;                     /*DATA = ADDRESS OF TEMPORARY BANK*/
     save1 = dataloc;                   /*SAVE THE ADDRESS*/
     while (data[dataloc] != STX)    /*GETS US TO THE BIN FIELD*/
      dataloc++;
     strtbin = dataloc;
     dataloc++;
     while (data[dataloc] != STX)
      dataloc++;                      /*GET TO QUANTITY FIELD*/

     strtquan = dataloc + 1;             /*POINTS TO FIRST QUANTITY*/
     save2 = strtquan;                   /*SAVE FOR OUT-OF STOCK CHECK*/
    }
   else
    break; /*BUTTON NOT FOUND SO GET OUT*/
  } /*END IF*/
 else
  break;  /*OUTQUAN = FALSE*/
} /*END FOR LOOP*/
if (outquan == TRUE)  /*WE ARE OUT OF STOCK*/
{
 dataloc = save1;             /*GET ORGINAL BUTTON ADDRESS*/
 while (data[dataloc] != STX)  /*LOOP UNTIL BEGINNING OF BUTTON FIELD*/
  dataloc--;
 save1 = dataloc;
 count = 0;
 prswtch = memget(PIA2DRB) & 0X20;
 if (prswtch == 0X20)
  {
   dataloc--;                   /*WE ARE NOW AT END OF SKU FIELD*/
   j = 2;
```

```
    while (data[dataloc] != ETX)    /*LOOP UNTIL BEGINNING OF SKU FIELD*/
      keystr[j--] = data[dataloc--]; /*RECORD THE SKU NUMBER*/
    strfind(price,keystr);
    j = found + 1;                        /*WE NOW POINT TO THE PRICE FIELD*/
    while (price[j] != ETX)
      {
       stock[count] = price[j++] - '0';        /*RECORD IN DECIMAL TO SEND OVER*/
       if (price[j] == ETX)
        stock[count] = stock[count] + 10; /*ADDING 10 WILL TELL MICRO OUT OF ST
OCK*/
       count++;
      }
    }
   j = savel + 1;                    /*J POINTS TO FIRST BUTTON*/
   while (data[j] != ETX)         *LOOP UNTIL BIN FIELD IS REACHED*/
    {
     button = 0;
     while (data[j] != ' ')
      {
       button = 10 * button + data[j] - '0';
       j++;
      }
     stock[count] = button;       /*RECORD THE OUT OF STOCK BUTTON*/
     count++;
/*     printf("out of stock button is %d\n", button);*/
     j++;
    }
   stock[count] = 99;                 /*TERMINATE WITH A 99*/
   if (prswtch != 0X20)
    sendmic(stock,0,TRUE,'0');         /*WE HAVE OUT OF STOCK LAMPS*/
   else
    sendmic(stock,0,0,'P');              /*SEND TO PRICE DISPLAYS*/
   rec_out(skudata);               /*RECORD THE OUT OF STOCK*/
  }
 return(outquan);
}
```

```
/**************************************************************************
*   FUNCTION NAME                  MODULE NAME          PROGRAM NAME
*   PRICING                        PRICING.C            COMET CONTROL
*=========================================================================
*   DESCRIPTION
*    THIS FUNCTION WILL GET PRICE INFORMATION FROM THE KEYBOARD BASED ON
*    SKU NUMBER.  THE SKU NUMBER WILL BE ENTERED AND THEN SEARCHED FOR.
*    IF THE SKU NUMBER IS FOUND WE WILL SEARCH TO MAKE SURE THERE IS AN
*    ASSOCIATED BUTTON NUMBER. IF THERE IS, WE WILL STORE THAT PRICE
*    INFORMATION SO IT CAN BE SENT TO THE KEYBOARD MICROPROCESSOR.
*    A COLON IS USED FOR A BLANK. THE REASON FOR THIS IS THAT THE
*    CONTROL MICROPROCESSOR EXPECTS A 10 DECIMAL TO DISPLAY A BLANK.
*    A COLON IS ASCII 58 DECIMAL. 58 - 48 = 10 DECIMAL.
*    GLOBAL VARIABLE PRICE
*      THERE CAN BE A TOTAL OF 32 DIFFERENT SKUS IN EACH PRICE FIELD.  EACH
*      PRICE FIELD HOLDS 10 BYTES. THERE ARE TWO MAGAZINES THAT CAN HOLD UP
*      TO 32 SKUS EACH.  64 * 10 + 1 (ETB) = 641 BYTES.
*   FUNCTIONS CALLED
*    ENTERSKU    OP.C
*    STRFIND     OP.C
*    RESET       DISPLAY.C
*    W_STR       DISPLAY.C
*    BEEP        KEYBOAD.C
*    KEYBOARD    KEYBOAD.C
*    W_DISP      DISPLAY.C
*    CDRAM       DISPLAY.C
*    GETKEY      KEYBOAD.C
*   REVISIONS
*   REV      DATE      ENGINEER        DESCRIPTION OF CHANGE
**************************************************************************/

#include "io.h"

extern char skukey[], bank1[], bank2[], dispcount, intflag;
extern unsigned found;

/*GLOBAL*/
char price[maxprc];

pricing()
 {
  char valid;
  char clear;
  char keystr;
  char savekey[5];      /*SAVES THE KEYSTROKE SO WE CAN WRITE TO THE DISPLAY*/
  char loopcnt;         /*LOOP COUNTER*/
  char *string;
  unsigned count;
  char *data;
  unsigned first;
  unsigned last;

  valid = FALSE;
  for (;;)          /*LOOP UNTIL CLEAR IS ENTERED*/
   {
    while (valid == FALSE)
     {
```

```
clear = entersku(): /*ENTER THE SKU NUMBER*/
if (clear == TRUE)
 return:              /*CLEAR WAS ENTERED SO GET OUT*/
valid = strfind(price.skukev): /*MAKE SURE IN DATA FIELD*/
if (valid == FALSE)  /*SKU IS NOT VALID*/
 {
  reset();
  string = "SKU Not Found":
  w_str(string);
  beep('L'): /*BAD BEEP*/
 }
}
first = found + 2:      /*WE NOW POINT AT ETX CHARACTER OR A PRICE*/
last = first + 3: /*WE ARE KNOW AT LAST POSITION OF PRICE FIELD*/
valid = strfind(bank1.skukev);
if (valid == TRUE)
 data = &bank1[0]:
else
 {
  valid = strfind(bank2.skukev);
  if (valid == TRUE)
   data = &bank2[0]:
  else
   {
    beep('L'):  /*LONG BEEP*/
    return:
   }
 }
datadis(price);
strfind(price.skukev): /*FIND THE POSITION OF THE SKU*/

datadis(price);
reset();
string = "PRICE? $":          /*WE WANT THE PRICE ENTERED*/
w_str(string);
dispcount = 0X42;            /*WE WANT TO WRITE A PERIOD TO THE DISPLAY*/
ddram(dispcount);
w_disp('.');
dispcount = 0X44;            /*SET SO DATA WILL BE ENETERED LEFT TO RIGHT*/
ddram(dispcount);
keystr = 0;
count = 0;
savekey[count++] = 0;
while (keystr != 'E')     /*WAIT UNTIL ENTER IS ENTERED*/
 {
  keystr = keyboard();
  if (keystr == 'C' && (last == (first + 3))) /*WE DON'T WANT TO ENTER ANYTH
ING*/
   {
    beep('S');     /*SHORT BEEP*/
    return;
   }
  if (keystr == 'C')
   {
    last = first + 3;  /*POINT TO LAST ENTRY*/
    beep('S');        /*SHORT BEEP*/
    reset();
    w_str(string);
    dispcount = 0X42;            /*WE WANT TO WRITE A PERIOD TO THE DISPLAY*/
    ddram(dispcount);
    w_disp('.');
    dispcount = 0X44;
    ddram(dispcount);
    count = 1;
   }
```

```
    else
     {
      if (price[last] != STX && keystr != 'E') /*ONLY 4 ENTRYS CAN BE ENTERED*/
       {
        savekey[count++] = keystr;          /*SAVE THE KEYSTROKE*/
        price[last--] = keystr;
        beep('S'); /*GOOD BEEP*/
        discount = 0X44;
        ddram(discount); /*SET THE DATA DISPALY RAM*/
        for (loopcnt = count - 1;savekey[loopcnt] != 0;loopcnt--)
         {
          busy(); /*MAKE SURE DISPLAY IS NOT BUSY*/
          wrdisp(savekey[loopcnt]); /*WRITE THE DATA*/
          if (discount != 0X44)
            discount = discount - 2;
          else
           discount = discount - 3;
         ddram(discount);
        }
       }
      else
       if (keystr != 'E')
        beep('L'); /*BAD BEEP*/
     }
   }
  beep('S');
  if (price[last] != STX)
   {
    last++;
    for (count = first;price[last] != ETX;count++)
     price[count] = price[last++]; /*SHIFT OVER SINCE PRICE WAS NOT 4 DIGITS*/
    while (price[count] != ETX)
    price[count++] = ':';          /*FILL UP WITH COLONS*/
   }
  datadis(price);
  valid = FALSE;
 }
return;
}

/**********************************************************************
*  FUNCTION NAME
*  CHGPRC
*=====================================================================
* DESCRIPTION
*  THIS FUNCTION WILL READ PRICE INFORMATION FROM THE MODEM TO BE DISPLAYED
*  WE WILL READ EACH SKU PRICE DATA IN AND IF THE SKU IS VALID WE WILL SEND
*  A CARRIAGE RETURN FOR ACKOWLEDGEMENT. IF THE SKU IS NOT VALID WE WILL SEND
*  A LINE FEED FOR INVALID SKU. A ETB CHARACTER WILL TERMINATE THE DATA
*  TRANSMISSION.
* FUNCTIONS CALLED
*  MEMGET   INOUT.C
*  STATUS   MTEST.C
* REVISIONS
*  REV    DATE     ENGINEER       DESCRIPTION OF CHANGE
**********************************************************************/

chgprc()
 {
  char value;    /*VALUE WILL BE AN STX CHARACTER OR AN ETB CHARACTER*/
  char stacia;   /*STATUS OF THE ACIA STATUS REGISTER*/
  char i;        /*DATA ARRAY COUNTER*/
  char data[10]; /*CONTAINS SKU AND PRICE INFORMATION*/
  char ackowldg; /*ACKNOWLEDGEMENT (LINE FEED OR CARRIAGE RETURN)*/
  unsigned x;    /*LOCATION OF PRICE FIELD VARIABLE*/
```

```
incflag = FALSE;    /*WE ENTER GETSKU WE DON NOT WANT TO RECORD ANY OUT OF STOCKS*/
w_clk(0X00);                    /*RESTART TIMER*/
stacia = status1(1,0X7D,1);
value = ~memget(ACIA1DR);
if (value == STX)
 {
  while (value != ETB)
   {
    ackowldg = 0X0A;    /*LINE FEED, ACKOWLEDGEMENT CHARACTER*/
    i = 0;
    while (value != ETX)
     {
      stacia = status1(1,0X7D,1);
      if (stacia < 3)
       {
        data[i] = ~memget(ACIA1DR); /*READ THE DATA IN*/
        value = data[i];
        i++;
        if (i == 9 && value != ETX)  /*ERROR IN RECIEVING DATA*/
         {
          value = ETB;
          break;      /*GET OUT OF HERE*/
         }
       }
      else   /*ELSE WE HAVE A RECIEVE ERROR*/
       {
        memget(ACIA1SR); /*CLEAR DCD BIT BY READING STATUS REGISTER AND*/
        memget(ACIA1DR); /*READING THE DATA REGISTER*/
        value = ETB;
        break;
       }
     }
    if (value != ETB)  /*IF THERE IS NO ERROR THEN RECORD*/
     {
      x = 0;
      for (i = 0;data[i] != STX;i++)    /*LOOP UNTIL END OF SKU FIELD*/
       skukey[x++] = data[i];          /*READ IN SKU INFORMATION*/
      stacia = strfind(price,skukey);  /*IS SKU VALID ?*/
      if (stacia == TRUE)
       {
        while (data[i] != ETX)  /*LOOP UNTIL THE END OF THE PRICE FIELD*/
         i++;
        i--;                    /*BACK UP BEFORE THE ETX CHARACTER*/
        for (x = (found + 2);price[x] != ETX;x++)
         price[x] = data[i--]; /*RECORD DATA IN REVERSE*/
        ackowldg = 0X0D;  /*CARRIAGE RETURN, ACKOWLEDGEMENT CHARACTER*/
       }
     }
    else   /*ELSE GET OUT OF HERE*/
     break;
    stacia = status1(2,0X7F,1);
    if (stacia >= 3)   /*IF THERE IS AN ERROR THEN GET OUT*/
     break;
    memout(ACIA1DR,~ackowldg); /*SEND ACKOWLEDGEMENT*/
    stacia = status1(1,0X7D,1);
    if (stacia >= 3)
     break;
    value = ~memget(ACIA1DR);    /*GET THE STX OR ETB CHARACTER*/
   }
  w_clk(0X00);       /*RESET THE TIMER*/
/*  printf("price");
  datadis(price);*/
  if (ackowldg == 0X0D)  /*IF EVERYTHING WAS OKAY THE DISPLAY NEW PRICES*/
```

```
  delsku();
  intflag = TRUE;   /*RESET THE INTERRUPT FLAG*/
  }
 }




/*****************************************************************************
*   FUNCTION NAME                          MODULE NAME          PROGRAM NAME
*   DEL_SKU                                OP.C                 COMET CONTROL
*=============================================================================
*   DESCRIPTION:
*     THIS FUNCTION WILL GIVE THE OPERATOR OF THE KEYBOARD THE CHOICE OF
*     DELETING A SKU.
*   FUNCTIONS CALLED FROM DEL_SKU()
*     KEYBOARD    KEYBOAD.C
*     BEEP        KEYBOAD.C
*     STRFIND     SEARCH1.C
*     W_STR       DISPLAY.C
*     ENTERSKU    OP.C FILE
*     W_DISP      DISPLAY.C
*     RESET       DISPLAY.C
*     BANK1OR2    OP.C
*   FUNCTIONS THAT CALL DEL_SKU
*     FIFO        FINT.C FILE
*   REVISIONS
*   REV    DATE    ENGINEER       DESCRIPTION OF CHANGE
******************************************************************************/
#include "io.h"

extern char bank1[], bank2[], sale[], price[], *string, cold, select;
extern unsigned found;

/*GLOBALS*/
char skukey[8]; /*ARRAY TO HOLD SKU NUMBER ENTRYS FROM KEYBOARD*/

del_sku()
 {
  char clear;            /*FLAG TELLS US IF WE SHOULD GET OUT OF DELETE*/
  char valid;            /*FLAG TO TELL US IF ENTERED SKU IS VALID*/
  char keydata;          /*KEYBOARD DATA*/
  char *data;            /*TEMPORARY POINTER FOR BANK1 AND BANK2*/
  char bank;             /*BANK = 1 FOR BANK1 OR BANK = 2 FOR BANK2*/
  unsigned j;            /*COUNTER*/

 for (;;)
  {
   valid = FALSE;
   while (valid == FALSE)
    {
     keydata = bank1or2();     /*ARE WE GOING TO SEARCH BANK1 OR BANK2*/
     if (keydata == 'C')
      return;
     else
      if (keydata == '1')
       {
        bank = 1;
        data = &bank1[0];       /*BANK1 SEARCH*/
       }
      else
       {
        bank = 2;
        data = &bank2[0];       /*BANK2 SEARCH*/
       }
```

```
      clear = enterskU();
      if (clear == TRUE)          /*IF CLEAR = TRUE THEN FIRST KEYSTROKE WAS A CLEAR
*/
       return;
      valid = strfind(data.skukey); /*CALL STRFIND TO SEE IF ENTERED SKU IS VALID
*/
      if (valid == FALSE)                   /*IF VALID EQUALS 0 THEN NO SKU IS FOUND*/
       {
        reset();
        string = "SKU Not Found";
        w_str(string);
        beep('L');
       }
     }
   reset();
   string = "Delete ";          /*ASK OPERATOR AGAIN IF SKU SHOULD BE DELETED*/
   w_str(string);
   for (j = 0;j < 3;j++)
    w_disp(skukey[j]);
   string = " Y/N?";
   w_str(string);
   keydata = getkey('Y','N');
   if (keydata == 'Y')
    {

   /*THIS NEXT SECTION OF CODE WILL DELETE EVERYTHING IN THE SKU FIELD THAT
   *WAS ENTERED AND WE WILL DELETE THE SALE FIELD AND THE PRICE FIELD AND
   *SHIFT EVERYTHING TO THE LEFT.  AN EXAMPLE OF HOW THE DATA FIELD WILL
   *LOOK LIKE IS STX(SKU)STX(BUTTON)STX(BIN)STX(QUANTITY)ETXETB
   *AN EXAMPLE OF THE SALE FIELD IS
   *STX(SKU)STX(TIME AND DATE)ETXETB
   *AN EXAMPLE OF HOW THE PRICE FIELD WILL LOOK LIKE IS
   *STX(SKU)STX(PRICE)ETXETB*/

     sftleft(data); /*DELETE SKU DATA*/
/*     printf("data");                  THE OTHER BANK SO WE DON'T DELETE DATA IN*/
     datadis(data);                 /*PRICE FIELD OR THE SALE FIELD*/
     if (bank == 1)
      data = &bank2[0];
     else
      data = &bank1[0];
      valid = strfind(data.skukey); /*WE WANT TO MAKE SURE THAT DATA IS NOT IN*/
     if (valid == FALSE)            /*DATA NOT IN OTHER BANK*/
      {
       strfind(sale.skukey);                /*FIND SKU IN TIME AND DATE FIELD*/
       sftleft(sale);   /*DELETE SALE SKU*/
       strfind(price.skukey);
       sftleft(price);   /*DELETE PRICE SKU*/
      }
/*       printf("in delete\n");*/
/*     printf("price");
     datadis(price);
     printf("sale");
     datadis(sale);*/

     reset();
     string = "SKU Deleted";
     w_str(string);
     delay(0X1A00);
    }
  }
 return;
}
```

```
/***********************************************************************
*  FUNCTION NAME
*  SFTLEFT
*======================================================================
*  DESCRIPTION
*   THIS FUNCTION WILL SHIFT DATA TO THE LEFT.  WE USE THIS TO DELETE DATA.
*  PARAMTERS PASSED
*   ARRAY   HOLDS THE DATA FIELD WE ARE TO DELETE. DATA, PRICE OR SALE
*  REVISIONS
*   REV    DATE      ENGINEER       DESCRIPTION OF CHANGE
***********************************************************************/

sftleft(array)
 char array[];
  {
   unsigned k;   /*POSITION COUNTER*/
   unsigned j;   /*LOOP COUNTER*/

   k = found - 2;                     /*GO BACK TO START OF SKU FIELD*/
   while (array[k] != ETX) /*LOOP UNTIL THE END OF THE FIELD*/
    k++;
   k++;
   for (j = (found - 3);array[j] != ETB;j++)       /*DELETE FIELD*/
     array[j] = array[k++];
   return;
  }

/***********************************************************************
*   FUNCTION NAME
*   ASSIGN
*======================================================================
*   DESCRIPTION
*     THIS FUNCTION WILL CALL ENTERSKU.  THE ENTERED SKU WILL BE RETURNED.  IF
*     SKU IS FOUND WE WILL CALL REVIEW.  IF NOT THEN WE WILL FIND THE FIRST
*     AVAILABLE SKU SLOT. FILL THE SLOT UP AND THEN CALL REVIEW TO ENTER BIN
*     AND BUTTON NUMBERS.
*     THE SKU FIELD MAY LOOK LIKE THIS STX(SKU)STX(BUTTON)STX(BIN)STX(QUANTITY)
*     EXTSTX000000STX(100 0'S)STX(220 0'S)STX(150 0'S)ETXETB.
*     WHEN WE FIND THAT VACANT SKU NUMBER (000000) WE FILL THAT UP WITH THE NEW
*     SKU ENTRY.
*     MEMORY LIMIT IS 545 BYTES. WE GET THIS BY THERE BEING 15 BYTES PER DATA
*     FIELD. COUNTING THE BUTTON FIELD IF THERE IS ONE BUTTON, AND ONE BIN
*     ASSIGNED FOR THE FIELD. 560 - 15 = 545 BYTES. THIS WILL
*     ALLOW FOR ONE BIN ENTRY AND ONE QUANTITY ENTRY.  MEMORY LIMIT FOR THE
*     PRICE FIELD IS 690 BYTES.  10 BYTES PER SKU FIELD.  700 - 10 = 690.
*     THE SALE FIELD LIMIT IS 4265 BYTES.
*   FUNCTIONS CALLED
*     ENTERSKU     OP.C
*     STRFIND      SEARCH1.C
*     REVIEW       REVIEW.C
*     KEYBOARD     KEYBOAD.C
*     BEEP         KEYBOAD.C
*     W_STR        DISPLAY.C
*     W_DISP       DISPLAY.C
*     RESET        DISPLAY.C
*     BANK1OR2     OP.C
*   FUNCTIONS THAT CALL ASSIGN()
*     FIRQ()       FINT.C FILE
*   REVISIONS
*   REV   DATE     ENGINEER        DESCRIPTION OF CHANGE
***********************************************************************/

assign()
{
 char *data;      /*TEMPORARY POINTER FOR BANK1 OR BANK2*/
 char keystr;     /*KEYSTROKE ENTRY BY USER*/
```

```
char valid;        /*FLAG THAT DETERMINES IF A VALID SKU HAS BEEN ENTERED*/
char clear;        /*IF CLEAR IS TRUE WE GET OUT OF ASSIGN*/
char bank;         /*BANK = 1 IF BANK1, BANK = 2 IF BANK2*/
char x;            /*COUNTER*/
char k;            /*COUNTER*/
unsigned  i;       /*COUNTER*/
unsigned j;        /*COUNTER*/
unsigned m;        /*COUNTER*/

k = 0;
for (;;)
 {
  keystr = cankicr2();     /*ARE WE GOING TO SEARCH BANK1 OR BANK2*/
  if (keystr == 'C')
   return;
  else
   if (keystr == '1')
    {
/*      if (select == 0)    WE ARE HAND LOADING*/
      select = 2;
     bank = 1;
     data = &bank1[0];       /*BANK1 SEARCH*/
    }
   else
    {
/*      if (select == 0)    WE ARE HAND LOADING*/
      select = 1;
     bank = 2;
     data = &bank2[0];       /*BANK2 SEARCH*/
    }
  clear = entersku();                      /*CHECK IF SKU IS ALREADY PRESENT*/
  if (clear == TRUE)                         /*CLEAR WAS ENTERED*/
   return;
  valid = strfind(data,skukey); /*CALL STRFIND TO SEE IF ENTERED SKU IS VALID*/
  if (valid == TRUE)                          /*VALID = 1 SKU IS FOUND*/
   {
    reset();
    string = "VALID SKU";
    w_str(string);
    delay(0X1500);
    review(data);                               /*REVIEW SKU ENTRY*/
   }
  else
   {
    i = 0;
    j = 0;
    m = 0;
    if (data[i] == STX)     /*DATA IS IN MEMORY*/
     {
      while (data[i] != ETB && i < (maxbank - 16)) /*LOOP UNTIL END OF BLOCK CH
ARACTER*/
       i++;      /*OR THERE IS NO MORE ROOM. 16 BYTES IS 4 STX + 1 ETX + 3 SKU
                   + 3 BUTTON + 3 BIN + 2 QUNATITIES*/
/*      printf("data count is %d\n", i);*/
      while (sale[j] != ETB && j < (maxsale - 14))
       j++;                                 /*MAKE SURE WE HAVE ROOM IN SALE ARRAY*/
/*      printf("sale count is %d\n", j);*/
      while (price[m] != ETB && m < (maxprc - 10))
       m++;                          /*MAKE SURE WE HAVE ROOM IN THE PRICE ARRAY*/
/*      printf("price count is %d\n", m);*/
      if (cold == 0 && i >= (maxbank - 96 - 13)) /*MAXBANK - 96 BUTTONS - 13 (1
6 - 3 BUTTONS)*/
       i = maxbank;
      if (i >= (maxbank - 16) || m >= (maxprc - 10) || j >= (maxsale - 14))
                                      /*MEMORY IS FULL, ALL 32 SKU FOSTIONS*/
       {                                         /*HAVE BEEN FILLED*/
        reset();
        string = "Memory Full";
```

```
        w_str(string);
        beep('L');
        delay(0X1500);
        return;
       }
     }
    data[i++] = STX;
    for (k = 0;k < 3;k++)
     data[i++] = skukey[k];   /*FILL UP SKU NUMBER*/
    for (x = 0;x < 3;x++)
     data[i++] = STX;
    data[i++] = ETX;
    data[i] = ETB;
    found = i - 5;
    review(data);                    /*ENTER BINS, BUTTONS, AND QUANTITIES*/
/*    printf("data");
    datadis(data);*/
    if (bank == 1)
     data = &bank2[0];
    else
     data = &bank1[0];
    valid = strfind(data,skukey);
    if (valid == FALSE)
     {
      data = &price[0];          /*DATA IS NOW POINTING TO PRICE FIELD*/
      valid = strfind(data,skukey);  /*SEARCH TO SEE IF PRICE SKU IS VALID*/
      if (valid == FALSE)            /*SKU NOT FOUND*/
       {
        m = 0;
        if (price[m] == STX)      /*WE HAVE DATA ENTERED*/
         {
          while (price[m] != ETB)
           m++;
         }
        price[m++] = STX;
        for (k = 0;k < 3;k++)
         price[m++] = skukey[k]; /*FILL UP PRICE FIELD*/
        price[m++] = STX;
        for (k = 0;k < 4;k++)
        price[m++] = ':';
        price[m++] = ETX;
        price[m] = ETB;
       }
      data = &sale[0];          /*DATA IS NOW POINTING TO SALE FIELD*/
      valid = strfind(data,skukey);
      if (valid == FALSE)      /*DATA NOT FOUND, ENTER NEW SKU NUMBER*/
       {
        j = 0;
        if (sale[j] == STX)   /*WE HAVE DATA ENTERED*/
         {
/         while (sale[j] != ETB)                  /*LOOP UNTIL THE END OF FIELD*
           j++;                                  /*SINCE THERE IS NO VACANCY*/
         }
        sale[j++] = STX;
        for (k = 0;k < 3;k++)
         sale[j++] = skukey[k];  /*FILL UP SALES SKU FIELD*/
        sale[j++] = STX;
        sale[j++] = ETX;
        sale[j] = ETB;
       }
     }
  }
/*  printf("in assign\n");
   printf("price");
   datadis(price);
```

```
  printf("sale");
  datadis(sale);*/
 }
 return;
}

/***************************************************************************
* FUNCTION NAME
* BANK1OR2
*==========================================================================
* DESCRIPTION
*  THIS FUNCTION WILL GIVE THE KEYBOARD OPERATOR THE CHOICE OF CHOOSING BANK1
*  OR BANK2 DEPENDING ON WHICH MAGAZINE HE WANTS TO ASSIGN OR DELETE A SKU
* FUNCTIONS CALLED
*   W_STR       DISPLAY.C
*   KEYBOARD    KEYBOAD.C
*   BEEP        KEYBOAD.C
*   W_DISP      DISPLAY.C
* PARAMETERS RETURNED
*   KEY    KEYBOARD ENTRY
* REVISIONS
* REV     DATE      ENGINEER        DESCRIPTION OF CHANGE
***************************************************************************/

bank1or2()
 {
  char keydata;   /*KEYBOARD ENTRY*/
  char key;       /*KEYBOARD ENTRY TO BE RETURNED*/

  reset();
  string = "MAGAZINE 1/2? ";
  w_str(string);
  key = 0;
  keydata = 0;
  while (keydata != 'E' || key == 0) /*LOOP UNTIL A 1 OR 2 IS ENTERED*/
   {
    keydata = keyboard();
    if (keydata < '3' && keydata > '0' && key == 0)
     {
      w_disp(keydata);
      beep('S');
      key = keydata;
     }
    else
     if (keydata == 'C')      /*GET OUT SINCE CLEAR HAS BEEN ENTERED*/
      {
       reset();
       beep('S');
       if (key == 0)
        {
         key = 'C';
         return(key);
        }
       w_str(string);
       key = 0;
      }
     else
      if (keydata != 'E' || key == 0)
       beep('L');          /*INVALID KEY HAS BEEN ENTERED*/
   }
  beep('S');
  return(key);
 }
```

```
/****************************************************************************
*  FUNCTION NAME
*  ENTERSKU
*============================================================================
*  DESCRIPTION
*     THIS FUNCTION WILL LOOK FOR THE ENTERED SKU.  IF A VALID SKU IS FOUND THEN
*     WE WILL ASSIGN BUTTONS. BIN. AND AMOUNT ELSE WE WILL REVIEW THE SKU.
*  FUNCTIONS CALLED
*   KEYBOARD       KEYBOAD.C
*   BEEP           KEYBOAD.C
*   W_STR          DISPLAY.C
*   W_DISP         DISPLAY.C
*   STRFIND        SEARCH1.C
*   RESET          DISPLAY.C
*  FUNCTIONS THAT CALL ENTERSKU
*   ASSIGN         OP.C FILE
*   DEL_SKU        OP.C FILE
*  PARAMTERS RETURNED
*   CLEAR    FLAG TO TELL CALLING FUNCTION IF A CLEAR HAS BEEN ENTERED
*  REVISIONS
*  REV     DATE     ENGINEER      DESCRIPTION OF CHANGE
****************************************************************************/

entersku()
{
 char i:        /*I IS A COUNTER*/
 char clear:  /*CLEAR IS A FLAG THAT RETURNS TRUE IF 'CLEAR' ENTERED*/

 clear = FALSE:
 loop:
  for (i = 0:i < 8:i++)           /*CLEAR THE SKU ENTRYS*/
   skukey[i] = 0:
  i = 0:
  reset():
  string = "SKU No. ":
  w_str(string);
  while (skukey[i] != 'E' !! i < 3)  /*LOOP UNTIL A ENTER */
   {
    skukey[i] = keyboard();
    if (skukey[0] == 'C')           /*ESCAPE IF FIRST ENTRY IS A CLEAR*/
     {
      beep('S');
      clear = TRUE:
      return(clear);
     }
    else
     {
      if (skukey[i] == 'C')           /*LOOP AGAIN IF CLEAR*/
       {
        beep('S');
        goto loop:
       }
      else
       {
        if (skukey[i] <= '9' && i < 3)/*ONLY 0-9 CAN BE ENTERED AND ONLY 3 DIGIT
S*/
         {
          w_disp(skukey[i]);
          beep('S');
          i++;
         }
        else
         if(skukey[i] != 'E' !! (skukey[i] == 'E' && i < 3))
          beep('L');         /*ILLEGAL DIGIT ENTERED*/
       }
     }
   }
```

```
 beep( 5');
 return(clear);
```

```
/************************************************************************
*   FUNCTION NAME           MODULE NAME        PROGRAM NAME
*   RETBIN                  RETURN.C           COMET CONTROL
*========================================================================
*   DESCRIPTION
*      THIS IS THE RETURN BIN ROUTINE WHICH COUNTS THE NUMBER OF RETURNS AND IF
*      THE NUMBER IS GREATER THAN THE CAPACITY WE TURN AN LED WARNING LIGHT ON.
*   FUNCTIONS CALLED
*      MEMGET   INOUT.C
*   REVISIONS
*   REV     DATE     ENGINEER        DESCRIPTION OF CHANGE
************************************************************************/

#include "io.h"

char retcnt1; /*KEEPS COUNT OF THE NUMBER OF RETURNS IN THE BIN*/
char retcnt2;

retbin()
 {
  char sense; /*SENSE HOLDS THE VALUE THAT IS READ FROM PIA 2*/

  sense = memget(PIA1CRA) & 0X80;
  if (sense != 0X00)
    retcnt1++;        /*ONE RETURN BIN WAS INPUTED*/
  memget(PIA1DRA);              /*CLEAR INTERRUPT FLAGS FOR NEXT RETURN*/
  return;
 }

/************************************************************************
*   FUNCTION NAME
*   BINCNT
*========================================================================
*   DESCRIPTION
*      THIS FUNCTION WILL SHOW THE OPERATOR THE NUMBER OF 1/2 GALLONS IN THE
*      RETURN BIN.  HE WILL THEN BE ABLE TO RESET THE RETURN COUNT IF NEEDED.
*   FUNCTIONS CALLED
*      RESET    DISPLAY.C
*      W_STR    DISPLAY.C
*      W_DISP   DISPLAY.C
*      RESET    DISPLAY.C
*      BEEP     KEYBOAD.C
*      KEYBOARD KEYBOAD.C
*      DELAY    KEYBOARD.C
*   REVISIONS
*   REV     DATE     ENGINEER        DESCRIPTION OF CHANGE
************************************************************************/

bincnt()
 {
  char keystr;  /*KEYSTROKE ENTERED FROM KEYBOARD*/
  char *string; /*STORAGE FOR A STRING THAT IS TO BE WRITTEN TO THE DISPLAY*/
  int ascibin[5];
  char asciret;
  char count;
  char x;
```

```
char retcnt;

retcnt = retcnt1;
for (count = 1;count < 3;count++)
 {
  reset();
  string = "RETURN BIN";
  w_str(string);
  asciret = count + 48;
  busy();
  w_disp(asciret);
  string = " = ";
  w_str(string);
  ascibin[1] = retcnt / 10 + 48;     /*CONVERT TO TWO ASCII CHARACTERS*/
  ascibin[2] = retcnt % 10 + 48;
  for (x = 1;x < 3;x++)
   {
    busy();
    w_disp(ascibin[x]);
   }
  keystr = getkey('E','C');
  if (keystr == 'C')                /*IF CLEAR RETURN BIN HAS BEEN EMPTIED*/
   {
    beep('S');
    if (retcnt == retcnt1)
     retcnt1 = 0;
    else
     retcnt2 = 0;
    reset();
    string = "BIN CLEARED";
    w_str(string);
    delay(0X2000);
   }
  retcnt = retcnt2;
 }
return;
}
```

```
/*****************************************************************************
*  FUNCTION NAME
*  MTRSTP
*============================================================================
*  DESCRIPTION
*   THIS FUNCTION WILL STOP THE CLOCK INTERRUPT, BRAKE THE MOTOR AND THEN TURN
*   THE MOTORS OFF
*  REVISIONS
*  REV      DATE      ENGINEER       DESCRIPTION OF CHANGE
*****************************************************************************/

mtrstp()
{
  char motors;        /*HORIZONTAL AND VERTICAL MOTOR STATUS*/
  char horzmot;       /*HORIZONTAL MOTOR STATUS*/
  char vertmot;       /*VERTICAL MOTOR STATUS*/

  vertmot = vertbrk;
  horzmot = horzbrk;
  motors = vertmot & horzmot;
  memput(PIA1DRA,motors);
  w_clk(0X03);               /*STOP INTERRUPT*/
  w_clk(0XF0);               /*NO INTERRUPT*/
  w_clk(0X01);               /*NORMAL OPERATION STARTED*/
  r_clk(0X00);               /*CLEAR INTERRUPT FLAG*/
  delay(0X0500);            /*DELAY FOR MOTORS TO BRAKE*/
  vertmot = vertoff;        /*TURN BOTH MOTORS OFF*/
  horzmot = horzoff;
  motors = horzmot & vertmot;
  memput(PIA1DRA,motors);
  return;
}
```

```
/*****************************************************************************
*   FUNCTION NAME              MODULE NAME              PROGRAM NAME
*   ITOA                       ITOA.C                   COMET CONTROL
*============================================================================
*   DESCRIPTION
*     THIS WILL BE A LIBRARY ROUTINE THAT IS CALLED TO CONVERT A CHARACTER
*     TO AN ASCII STRING.  FOR EXAMPLE.  A FF HEX IS 255 DECIMAL AND WILL
*     BE RETURNED AS 323535 ASCII.
*   FUNCTIONS CALLED
*     NONE
*   PARAMETERS RETURNED
*     TEMP  LENGTH OF ASCII DATA
*     S[]   ASCII DATA
*   REVISIONS
*   REV      DATE      ENGINEER       DESCRIPTION OF CHANGE
*****************************************************************************/

itoa(data,s)
 char data, s[];
 {
  char i;        /*COUNTER*/
  char k;        /*COUNTER*/
  char hold[5]; /*TEMPORARY STORAGE FOR ASCII VALUE*/
  char temp;     /*TEMPORARY STORAGE FOR COUNTER*/

  i = 0;
  do {              /*GENERATES DIGITS IN REVERSE ORDER*/
   s[i++] = data % 10 + '0';  /*GET NEXT DIGIT*/
  } while ((data /= 10) > 0);  /*DELETE IS*/

 if (i == 1)
  {
   s[i++] = '0';
   s[i++] = '0';
  }
 if (i == 2)         /*IF TWO DIGIT NUMBER. WE WANT THREE DIGIT NUMBER*/
  s[i++] = '0';
 temp = i;
 k = 0;
 i--;
 while (k < temp)          /*REVERSE THE ORDER AND HOLD IN TEMP*/
  {
   hold[k] = s[i];
   i--;
   k++;
  }
 for (i = 0;i < temp;i++) /*PUT BACK IN S*/
  s[i] = hold[i];
 return(temp);
 }
```

```
/******************************************************************************
*  FUNCTION NAME            MODULE NAME          PROGRAM NAME
*  GETSKU                   GETSKU.C             COMET CONTROL
*==============================================================================
*  DESCRIPTION
*     THIS FUNCTION WILL BE ENTERED AFTER THE DOORS HAVE BEEN CLOSED.  WE WILL
*     SEND A MESSAGE TO THE COMET KEYBOARD TO READ THE SKU INFORMATION AND
*     SEND THE INFORMATION BACK.  WE WILL THEN CONVERT THIS HEX SKU NUMBERS
*     TO ASCII.  WE WILL THEN DO A SEARCH TO SEE IF ANY OF THE SKU NUMBERS
*     DO NOT MATCH WHAT IS IN MEMORY.  IF THEY DON'T MATCH WE WILL SEND OUT
*     OF STOCK INFORMATION.  IF THEY DO MATCH WE WILL PUT THE BUTTON NUMBERS
*     IN THE DATA FIELD.
*  FUNCTIONS CALLED
*     RESET     DISP.C
*     W_STR     DISP.C
*     STRFIND   SEARCH1.C
*     COMMND    TALK.C
*     SENDMIC   TALK.C
*     CHKOUT    CHKOUT.C
*     ITOA      ITOA.C
*     STATUS    MTEST.C
*     DIAL      CMODEM.C
*     MEMPUT    INOUT.C
*     MEMGET    INOUT.C
*     DELAY     KEYBOAD.C
*  CALLING CONVECTION
*     .DOOR FILE START.ASM
*  REVISIONS
*  REV    DATE      ENGINEER        DESCRIPTION OF CHANGE
******************************************************************************/

#include "io.h"

extern char bank1[], bank2[], cartrge, skudata[], price[], stkout[];
extern unsigned found;

/*GLOBAL*/
char datashft;   /*FLAG TO TELL US IF DATA IS BEING ALTERED OR NOT*/

getsku()
 {
  char *data;         /*TEMPORARY POINTER FOR BANK1 AND BANK2*/
  char temp;.         /*TEMPORARY STORAGE VALUE*/
  char number;        /*BUTTON NUMBER COUNTER*/
  char bank;          /*BANK 1 OR BANK 2 FLAG*/
  char hold;          /*TEMPORARY STORAGE FOR EXTERNAL FOUND*/
  char info[33];      /*INTEGER SKU NUMBER*/
  char sku[5];        /*ASCII SKU NUMBER*/
  char count;         /*COUNTER FOR OUTSTOCK ARRAY*/
  char find;          /*FLAG FOR VALID SKU NUMBERS*/
  char stckarry[38]; /*CONTAINS OUT OF STOCK BUTTON NUMBERS*/
  char instock[195]; /*INSTOCK BUTTON NUMBERS*/
  char index;         /*INSTOCK COUNTER*/
  char prswtch;       /*PRICE DISPLAY FLAG*/
  char button[5];     /*ASCII BUTTON NUMBER*/
  char loopcnt;       /*COUNTER*/
  char outquan;_      /*IF OUTQUAN = TRUE, WE ARE OUT OF STOCK, RETURNS FROM CHKOU
```

```
T()*/
  char dataerror;     /*ERROR FLAG FOR DATA*/
  char *string;
  unsigned j;         /*COUNTER*/
  unsigned i;         /*COUNTER*/
  unsigned save;      /*TEMPORARY STORAGE VALUE*/
  unsigned strtbut;    /*CONTAINS START OF BUTTON FIELD*/
  unsigned strtquan:  /*START OF QUANTITY FIELD*/
  unsigned datacnt:   /*DATA COUNTER*/

/*  printf("datashft is %x\n", datashft);*/
  if (datashft == TRUE)
   {
    for (datacnt = 0;datacnt < maxbank;datacnt++)
     bank1[datacnt] = 0X00;          /*ERASE ALL PREVIOUS DATA*/
    for (datacnt = 0;datacnt < maxbank;datacnt++)
     bank2[datacnt] = 0X00;          /*ERASE ALL PREVIOUS DATA*/
    cartrge = FALSE;   /*SET CARTRGE = FALSE SINCE WE LOST DATA*/
    datashft = FALSE;
   }
  if (cartrge == FALSE)    /*DON'T RECORD BUTTON DATA UNLESS CARTRGE IS TRUE*/
   return;
  reset();
  string = "READING SKU's";
  w_str(string);
  orswtch = memget(PIA2DRB) & 0X20;
  memget(ACIA2SR);  /*CLEAR ANY ERROR CONDITION*/
  memget(ACIA2DR);  /*CLEAR ANY DATA IN DATA REGISTER*/
  memout(ACIA2SR,0X15);         /*DISABLE THE INTERRUPT*/
  commnd('W');                  /*PLEASE WAIT COMMAND*/
  commnd('R');                  /*READ SKU COMMAND*/
  number = 0;
  while (number < 32)
   {
    memout(PIA1CRA,0X3C);    /*TOGGLE WATCHDOG TIMER*/
    memout(PIA1CRA,0X34);
    number++;
    status(1,0X75,2);
    memout(ACIA2SR,0X55);  /*DISABLE RTS*/
    info[number] = ~memget(ACIA2DR);    /*GET THE SKU NUMBER*/
/*    printf(" %x", info[number]);*/
  }
  data = &bank1[0];
  dataerror = FALSE;
  for (loopcnt = 0;loopcnt < 2;loopcnt++)
   {
    i = 0;
    if (data[i] == STX)                    /*NO DATA IN RAM*/
     {
      while (data[i] != ETB)     /*ERASE ALL PREVIOUS BUTTON ENTRYS*/
       {
        memout(PIA1CRA,0X3C);  /*TOGGLES WATCHDOG TIMER*/
        memput(PIA1CRA,0X34);
        i++;                   /*WE ARE AT FIRST SKU ENTRY*/
        while (data[i] != STX) /*GET TO BUTTON FIELD*/
         i++;
        i++;                  /*FIRST BUTTON OR A STX CHARACTER*/
        j = i;             /*SAVE IT*/
        save = i;
        if (data[i] != STX)
         {
          while (data[i] != STX)  /*LOOP UNTIL BIN FIELD*/
           i++;
          while (data[i] != ETB)   /*SHIFT EVERYTHING LEFT*/
           data[j++] = data[i++];
         data[j] = data[i];     /*DON'T FORGET THE ETB CHARACTER*/
```

```
      while (data[save] != ETX) /*LOOP UNTIL END OF SKU FIELD*/
       save++;
      i = save + 1;  /*WE ARE AT A STX OR A ETB CHARACTER*/
     }
    datashft = TRUE;    /*SET FLAG TO LET KNOW DATA IS BEING ALTERED*/
    for (number = 1;number < 33;number++)   /*SHIFT ALL DATA RIGHT 3 TIMES FOR B
UTTON*/
     {
      memout(PIA1CRA,0X3C);  /*TOGGLES WATCHDOG TIMER*/
      memout(PIA1CRA,0X34);
      temp = info[number];
      itoa(temp,sku);              /*CONVERT TO ASCII*/
      find = strfind(data,sku);
      if (find == TRUE)
       {
        i = found + 2;     /*WE ARE NOW AT THE BEGINNING OF THE BUTTON FIELD*/
        save = i;
        while (data[i] != ETB)
         i++;               /*GET US TO THE END OF THE FIELD*/
        j = i + 3;         /*WE NEED TO SHIFT RIGHT 3 TIMES WHEN ENTERING BUTTON*
/
        while (i >= save)
         data[j--] = data[i--];  /*SHIFT EVERYTHING TO THE RIGHT*/
        itoa(number,button);
        data[save++] = button[1]; /*WE WANT ONLY FIRST TWO ASCII DIGITS*/
        data[save++] = button[2];
        data[save] = '/';         /*BUTTON SEPERATOR*/
        while (data[save] != STX)
         save++;                /*WE ARE AT BEGINNING OF BIN FIELD*/
        save++;
        while (data[save] != STX)
         save++;                  *WE ARE AT BEGINIUNING OF QUANTITY FIELD*/
        save--;
       }
     }
   }
  else
   dataerror = TRUE:  /*SET FLAG FOR DATA ERROR*/
      datadis(data);
  data = &bank2[0];
 }
if (dataerror == FALSE)  /*DON'T DO IF WE HAVE ERROR IN DATA*/
 {
  count = 0;
  index = 0;
  hold = 0;
  if (prswtch == 0X20)     /*PRICE DISPLAYS*/
   {
    while (count < 4)
     stckarry[count++] = 0x00; /*OUT OF STOCK CODE*/
   }
  for (number = 1;number < 33;number++)
   {
    memout(PIA1CRA,0X3C);  /*TOGGLES WATCHDOG TIMER*/
    memout(PIA1CRA,0X34);
    outquan = TRUE;
    temp = info[number];
    itoa(temp,sku); /*CONVERT TO ASCII*/
    for (i = 0;i < 3;i++)
     skudata[i] = sku[i];
    find = strfind(bank1,sku);
    if (find == TRUE)
     {
      bank = 1;
```

```
    strtbut = found + 1;
    i = found + 2; /*WE ARE NOW AT THE START OF BUTTON FIELD*/
    while (bank1[i] != STX) /*GET US TO THE START OF THE BIN FIELD*/
     i++;
    i++;
    while (bank1[i] != STX)
     i++;
    i++;
    strtquan = i;
    outquan = chkout(number,strtbut,strtquan,bank);
   }
  else
   {
    find = strfind(bank2,sku);
    if (find == TRUE)
     {
      bank = 2;
      strtbut = found + 1;
      i = found + 2; /*WE ARE NOW AT THE START OF BUTTON FIELD*/
      while (bank2[i] != STX) /*GET US TO THE START OF THE BIN FIELD*/
       i++;
      i++;
       while (bank2[i] != STX)
       i++;
      i++;                    /*WE NOW POINT AT THE FIRST DATA IN QUANTITY FIELD*

      strtquan = i;
      outquan = chkout(number,strtbut,strtquan,bank);
     }
    else
     stckarry[count++] = number;
   }
  if (outquan == FALSE)
   {
    if (prswtch != 0X20)
     instock[index++] = number;  /*RECORD THE INSTOCK BUTTON*/
    else
     {
      if (found == hold) /*HAVE WE ALREADY RECORDED THE PRICE?*/
       instock[index++] = number;
      else
       {
        if (index > 0)          /*HAVE WE ALREADY RECORDED A INSTOCK PRICE?*/
         instock[index++] = 33;
        hold = found;         /*TEMPORARY STORAGE*/
        strfind(price,sku); /*FIND THE SKU IN THE PRICE FIELD*/
        for (i = found + 2;price[i] != ETX;i++)
         instock[index++] = price[i] - '0'; /*RECORD THE PRICE FIELD*/
        instock[index++] = number; /*RECORD THE BUTTON*/
       }
     }
   }
}
instock[index] = 33;       /*NUMBER TO TERIMINATE DATA TRANSFER*/
stckarry[count] = 33;
datashft = FALSE;     /*SET FLAG TO LET KNOW DATA IS NOT BEING ALTERED*/
if (index != 0)            /*WE HAVE IN STOCK DATA*/
 {
  if (prswtch != 0X20)
   sendmic(instock,0,FALSE,'0');
  else
   {
    i = 0;
    while (i < index)      /*LOOP UNTIL DONE SENDING DATA*/
     i = sendmic(instock,i,0,'F');
   }
 }
```

```
    if (count != 0)                  /*WE HAVE OUT OF STOCK DATA*/
     {
      if (prswtch != 0X20)       /*OUT OF STOCK LAMPS IN PLACE*/
       sendmic(stckarry,0,TRUE, 0 );
      else                          /*ELSE PRICE DISPLAYS IN PLACE*/
       {
        if (count   4)             /*MAKE SURE A OUT OF STOCK WAS COUNTED*/
         sendmic(stckarry,0,0,'P');
       }
     }
  }
 else
  {
   for (count = 0;count    10;count++)
    {
     beep('S');                    /*WARN USER THAT DATA IS LOST*/
     delay(0X0050);
    }
  }
 commnd('A');                     /*SEND MAKE ANOTHER SELECTION COMMAND*/
 status(1,0X75,2);                  /*WAIT FOR ACKOWLEDGEMENT*/
 temp = memget(ACIA2DR);          /*SHOULD RECIEVE A CARRIAGE RETURN*/
 if (temp != 0X0D)
  {
/*   printf("dial %x\n", temp);*/
   dial(4);                     /*MACHINE MALFUNCTION*/
  }

/* printf("stock");
 datadis(stkout);*/
 memout(ACIA2SR,0x95);             /*ENABLE THE INTERRUPT*/
 return;
```

```
/*****************************************************************************
*   FUNCTION NAME              MODULE NAME             PROGRAM NAME
*   TEST                       TESTMDE.C               COMET CONTROL
*============================================================================
*   DESCRIPTION
*    THIS IS WHERE THE PROGRAM JUMPS IF IN TEST MODE (JUMPER IN PLACE).  THIS
*    PROGRAM WILL JUMP TO OSC TO PUT THE CRYSTAL FREQUENCY OF THE CLOCK ON
*    PIN 13. THE INTERRUPT OUTPUT.  WE WILL THEN HAVE THE CHOICE OF AN
*    ANALOG LOOP TEST. OR A RAM CHECK.
*   FUNCTIONS CALLED
*    MEMPUT    INOUT.C
*    COMMND    TALK.C
*    RESET     DISPLAY.C
*    W_STR     DISPLAY.C
*    DELAY     KEYBOAD.C
*    OSC       TESTMDE.C
*    W_CLK     CLOCK.C
*    LOOPTEST  TESTMDE.C
*    TEMP_CHK  TESTMDE.C
*    DISP_TST  TESTMDE.C
*    GETKEY    KEYBOAD.C
*    FNC_DISP  FIRQ.C
*   REVISIONS
*   REV      DATE      ENGINEER        DESCRIPTION OF CHANGE
*****************************************************************************/

#include "io.h"

extern char dispcount, ascideg[], moderr[], horzoff, vertoff, vertrev, vertfwd;
extern char horzccw, horzcw, vertbrk, horzbrk;
extern char phone[], phncnt, mexist;
extern char id[], idcnt;
test()
 {
  char *string; /*STORAGE FOR A STRING THAT WILL BE WRITTEN TO THE DISPLAY*/
  char keystr;  /*KEYSTROKE ENTERED FROM THE KEYBOARD*/

  beep('S');
  memput(ACIA2SR,0X15);
  commnd('W');            /*PLEASE WAIT COMMAND*/
  memput(PIA2DRA,0X80);   /*7F HEX, KEYBOARD SELECTED*/
  osc();                  /*SET THE OSCILLATOR OF THE CLOCK CHIP*/
  reset();
  string = "TEST MODE";
  w_str(string);
  delay(0X1D00);
  for(;;)
   {
    keystr = fnc_disp(maxtest);      /*DISPLAY FUNCTION CODES AND DESCRIPTIONS*/
    switch (keystr)
     {
      case 1:    /*FUNCTION CODE 1*/
       looptest(); /*MODEM TEST*/
       break;
      case 2:      /*FUNCTION CODE 2*/
       disp_tst(); /*DISPLAY TEST*/
       break;
```

```
      case 3:        /*FUNCTION CODE 3*/
       temp_chk(): /*TEMPERATURE CHECK*/
       break;
      case 4:        /*FUNCTION CODE 4*/
       mtrinit():  /*MOTORS HOME*/
       mtrtest(1):  /*MOTOR TEST*/
       break;
      case 5:
       tstfrig():   /*REFRIGATION CHECK*/
       break;
      case 6:
       inittest():  /*INITIAL TEST*/
       break;
      case 7:
       mtrinit():  /*MOTORS HOME*/
       exercise():  /*EXCERCISE MOTOR*/
       break;
      case 8:
       setpot():    /*SET HORIZONTAL AND VERTICAL SPEED POTS*/
       break;
      case 9:
       machid():    /*ASSIGN A MACHINE ID NUMBER*/
       break;
     }
   }
 }


/*****************************************************************************
*  FUNCTION NAME
*  LOOPTEST
*============================================================================
*  DESCRIPTION:
*     THIS FUNCTION GIVES THE USER THE OPTION TO PERFORM A ANALOG
*     TEST TO TEST THE MODEM.
*  FUNCTIONS CALLED
*     RESET    DISPLAY.C
*     W_STR    DISPLAY.C
*     DELAY    KEYBOAD.C
*     KEYBOARD KEYBOAD.C
*     MEMPUT   INOUT.C
*     STATUS   MTEST.C
*     MESSAGE  MTEST.C
*     COMMAND  CMODEM.C
*     BEEP     KEYBOARD.C
*  REVISIONS
*  REV    DATE    ENGINEER            DESCRIPTION OF CHANGE
****************************************************************************/

looptest()
{
 char *string; /*STORAGE FOR STRING TO BE WRITTEN TO DISPLAY*/
 char *messg:  /*STORAGE FOR A COMMAND TO BE WRITTEN TO THE MODEM*/
 char value:   /*RETURN STATUS MESSAGE*/
 char count;   /*COUNTER*/
 char x;
 char keystr;
 int ascierr[5];

  reset();
  if (mexist == FALSE)
   {
    string = "NO MODEM";
    w_str(string);
    delay(0X1D00);
    return;
```

```
string = "SELF TEST Y/N?";
w_str(string);
keystr = getkey('Y','N');
if (keystr == 'Y')
 {
  messg = "AT S16=3 4";                          /*ANALOG LOOP SELF TEST*/
  command(messg);
  reset();
  value = message();                               /*STATUS MESSAGE OF MODEM*/
  if (value != 5)                              /*CONNECT 1200 STATUS MESSAGE*/
   {
    string = "ERROR ";
    reset();
    w_str(string);
    asciierr[1] = value / 10 + 48;       /*CONVERT TO TWO ASCII CHARACTERS*/
    asciierr[2] = value % 10 + 48;
    for (x = 1;x < 3;x++)
     {
      busy();
      w_disp(asciierr[x]);
     }
    delay(0X1D00);
    return;
   }
  string = "CONNECT 1200";
  reset();
  w_str(string);
  delay(0X1000);
  keyboard();
  beep('S');       /*SHORT BEEP*/
  for (count = 0;count < 3;count++)
   {
    status1(2,0X7F,1);
    memout(ACIA1DR,'+');
   }
  message();
/*  reset();
  string = "ERRORS = ";
  w_str(string);
  for (count = 0;count < 3;count++)
   {
    busy();
    w_disp(moderr[count]);             WRITE THE MODEM ERROR CODE
   }*/
  delay(0X1000);
  messg = "AT S16=0";                  /*RESET S16 REGISTER*/
  command(messg);
  message();
 }
reset();
string = "DIAL NUMBER Y/N?";
w_str(string);
keystr = getkey('Y','N');
if (keystr == 'Y')
 {
  while (keystr != 'E')
   {
    reset();
    string = "ENTER PHONE #";
    w_str(string);
    delay(0X1D00);
    reset();
    phncnt = 0;
    while (keystr != 'E')
```

```
    keystr = keyboard();
    if (keystr == 'C')
     {
      beep('S');
      if (phncnt == 0)
       return;
      else
       break;
     }
    if (keystr != 'E')
     {
      if (phncnt < 20)
       {
        phone[phncnt++] = keystr;
            if (keystr == '9' && phncnt == 1)
         phone[phncnt++] = ',';
            beep('S');
        busy();
        w_disp(keystr);
       }
      else
       beep('L');
     }
  }
 }
beep('S');
string = "SEND OS Y/N?";    /*SEND OUT OF STOCK DATA*/
reset();
w_str(string);
keystr = getkey('Y','N');
if (keystr == 'Y')
 dial(1);
string = "SEND TW ERR Y/N?";    /*SEND TEMPERATURE WARNING FLAG*/
reset();
w_str(string);
keystr = getkey('Y','N');
if (keystr == 'Y')
 dial(2);
string = "SEND RF Y/N?";      /*SEND RETURN BIN FULL FLAG*/
reset();
w_str(string);
keystr = getkey('Y','N');
if (keystr == 'Y')
 dial(3);
string = "SEND MF ERR Y/N?";     /*SEND MACHINE MALFUNCTION FLAG*/
reset();
w_str(string);
keystr = getkey('Y','N');
if (keystr == 'Y')
 dial(4);
string = "SEND SD Y/N?";    /*SEND SALES DATA FLAG*/
reset();
w_str(string);
keystr = getkey('Y','N');
if (keystr == 'Y')
 dial(5);
string = "SEND VO Y/N?";    /*SEND VANILLA OUT OF STOCK DATA*/
reset();
w_str(string);
keystr = getkey('Y','N');
if (keystr == 'Y')
 dial(6);
}
```

```
 return;
}

/******************************************************************************
* FUNCTION NAME
* OSC
*==============================================================================
* DESCRIPTION
*   THIS ROUTINE WILL SET THE OSCILLATOR OF THE MM58274.
* FUNCTION CALLED
*   MEMPUT   INOUT.C
*   W_CLK    CLOCK.C
* REVISIONS
* REV     DATE     ENGINEER       DESCRIPTION OF CHANGE
******************************************************************************/

osc()
{
 char regaddr; /*REGISTER ADDRESS TO BE WRITTEN TO THE CLOCK*/

 memout(PIACDRA,0X00);            /*FF HEX, DISABLE REAL TIME CLOCK*/
 regaddr = 0X0F;                  /*DISABLE INTERRUPT FOR OSCILLATOR SETTING*/
 w_clk(regaddr);
 regaddr = 0XF0;                  /*SET OSCILLATOR FREQUENCY*/
 w_clk(regaddr);
 return;
}

/******************************************************************************
* FUNCTION NAME
* DISP_TST
*==============================================================================
* DESCRIPTION
*  THIS FUNCTION WILL TEST THE DISPLAY. WE WILL WRITE 0 - 9 TO THE DISPLAY AND
*  A - Z. WE WILL THEN WRITE A CHARACTER TO DISPLAY ALL THE DOT CHARACTERS.
*  FUNCTIONS CALLED
*   BUSY    DISPLAY.C
*   W_DISP  DISPLAY.C
*   DELAY   KEYBOAD.C
*   BEEP    KEYBOAD.C
*   HOME    DISPLAY.C
*   GETKEY  KEYBOAD.C
*  REVISIONS
*  REV    DATE     ENGINEER        DESCRIPTION OF CHANGE
******************************************************************************/

disp_tst()
 {
  char test;    /*STORAGE FOR DATA TO BE WRITTEN TO DISPLAY*/
  char length; /*LENGTH OF DISPLAY CHARACTERS*/
  char low;     /*LOW END OF DATA WRITEEN TO DISPLAY*/
  char high;    /*HIGH END OF DATA WRITTEN TO DISPLAY*/
  char doloop; /*LOOP COUNTER*/

  low = '0';
  high = '9';
  doloop = 0;
  while (doloop < 2)
   {
    for (test = low;test <= high;test++)
     {
      for (length = 0;length < 16;length++)
       {
        busy();
        w_disp(test);
       }
```

```
        delay(0x1500);
        busy();
        home();
        dispcount = 0;
       }
     low = 'A';
     high = 'Z';
     doloop++;
    }
  for (length = 0;length < 16;length++)
   {
    busy();
    w_disp(0xFF);
   }
  delay(0x1500);
  return;
 }

/****************************************************************************
*  FUNCTION NAME
*  TEMP_CHK
*===========================================================================
*  DESCRIPTION
*   THIS FUNCTION WILL CALL TEMP TO READ THE TEMPERATURE AND THEN DISPLAY THE
*   TEMPERATURE ON THE DISPLAY.  WE WILL SET WARN WHICH IS USED IN MAIN. WE
*   RESET WARN WHEN WE GET OUT
*  FUNCTIONS CALLED
*   TEMP      TEMP.C
*   RESET     DISPLAY.C
*   W_STR     DISPLAY.C
*   BUSY      DISPLAY.C
*   W_DISP    DISPLAY.C
*   KEYBOARD KEYBOAD.C
*  REVISIONS
*  REV      DATE      ENGINEER         DESCRIPTION OF CHANGE
****************************************************************************/

temp_chk()
 {
  char keystr;    /*KEYSTOKE ENTERED FROM THE KEYBOARD*/
  char x;            /*COUNTER*/
  char *string;      /*STORAGE FOR A STRING TO BE WRITTEN TO THE DISPLAY*/

  keystr = 0;
  while (keystr != 'C')
   {
    temp();        /*READ THE TEMPERATURE*/
    string = "TEMPERATURE=";
    reset();
    w_str(string);
    for (x = 0;x < 3;x++)
     {
      busy();
      w_disp(ascideg[x]);
     }
    keystr = getkey('C','E');
   }
  return;
 }

/****************************************************************************
*  FUNCTION NAME
*  MTRTEST
*===========================================================================
```

```
*  DESCRIPTION .
*   THIS MODULE WILL ALLOW THE SERVICE MAN TO GO TO ANY BIN HE WISHES FOR
*   TESTING THE MOTORS AND MOTOR CONTROLLERS.
*  REVISIONS
*  REV    DATE        ENGINEER     DESCRIPTION OF CHANGE
*****************************************************************************/

mtrtest()
 {
  char *string;      /*POINTER TO STRING WRITTEN TO DISPLAY*/
  int bin;          /*BIN NUMBER TO GO TO*/
  char number;       /*COUNTER SO WE DO NOT ENTER MORE THAN 2 ENTRYS*/
  char keystr;       /*KEYBOARD ENTRY*/
  char bank;         /*BANK THAT WE ARE TO DELIVER TO*/
  char aligned;      /*ALIGNEMENT FLAG*/
  keystr = 0;
  while (keystr != 'C')  /*LOOP UNTIL CLEAR*/
   {
    reset();
    string = "BIN NUMBER ? ";
    w_str(string);
    bin = 0;
    number = 0;
    keystr = 0;
    while (keystr != 'E')  /*LOOP UNTIL ENTER*/
     {
      keystr = keyboard();
      beep('S');
      if (keystr == 'C' && bin == 0) /*CLEAR WAS ENTERED*/
       break;
      if (keystr == 'C')   /*CLEAR ENTRY*/
       {
        reset();
        w_str(string);
        bin = 0;
        number = 0;
       }
      else
       {
        if (number < 2 && keystr != 'E')   /*ONLY TWO NUMBERS CAN BE ENTERED*/
         {
          busy();
          w_disp(keystr);  /*WRITE THE ENTRY*/
          bin = 10 * bin + keystr - '0'; /*CONVERTS BIN TO INTEGER*/
          number++;
         }
       }
     }
   if (keystr != 'C')     /*IF CLEAR WAS ENTERED WE WILL GET OUT*/
    {
     if (bin > 0 && bin < 37)   /*MAKE SURE A VALID BIN WAS ENTERED*/
      {
       mtrsrch(bin,FALSE,1);
       aligned = align();
       if (aligned == FALSE)
        {
         reset();
         string = "NOT ALIGNED";
         w_str(string);
         delay(0X4000);
        }
       tstpick();         /*GET THE ICE CREAM OUT OF THE BIN*/
       string = "DELIVER Y/N?";
       reset();
       w_str(string);
       keystr = getkey('Y','N');
       if (keystr == 'Y')
        {
```

```
        keystr = bank1or2();      /*MAGAZINE 1 OR 2?*/
        if (keystr == '1')
         bank = 1;
        else
         bank = 2;
        mtrsrch(bin,1,bank);
        aligned = align();
        if (aligned == FALSE)
         {
          reset();
          string = "NOT ALIGNED";
          w_str(string);
          delay(0X4000);
         }
        tstpick();
        if (keystr == '1')
         bin = 37;
        else
         bin = 38;
       }
      string = "ANY KEY FOR HOME";
      reset();
      w_str(string);
      keyboard();
      mtrhome(bin);      /*GO HOME*/
     }
    else             /*ELSE INVALID BIN*/
     {
      reset();
      string = "INVALID BIN";
      w_str(string);
      delay(0X1000);
     }
   }
  }
 return;
}

/***************************************************************************
*  FUNCTION NAME
*  TSTPICK
*==========================================================================
*  DESCRIPTION
*    THIS FUNCTION WILL TEST THE SOLONOID OR THE ICE CREAM BIN.
*  FUNCTIONS CALLED
*   BANK1OR2     OP.C
*   MTRSRCH      MOTOR1.C
*   BINDUMP      MOTOR1.C
*   SKUGET       MOTOR1.C
*   W_STR        DISPLAY.C
*   GETKEY       KEYBOAD.C
*  REVISIONS
*   REV    DATE      ENGINEER      DESCRIPTION OF CHANGE
**************************************************************************/

tstpick()
 {
  char keystr;       /*KEYBOARD VALUE*/
  char savekey;      /*TEMPORARY VALUE*/
  char solonoid;     /*SOLONOID 1 OR 2*/
  char *string;      /*DISPLAY STRING*/
  char entry1;       /*KEYBOARD VALUE*/
  char entry2;       /*KEYBOARD VALUE*/
  char dump;         /*BIN DUMP*/
  char dumpret;      /*BIN RETURN*/
```

```
    entry1 = 'Y';
    entry2 = 'N';
    keystr = 'Y';
    while (keystr == 'Y')
     {
      savekey = 'Y';
      while (savekey == 'Y')    /*FIRE SOLONOID UNTIL N IS ENTERED*/
       {
        reset();
        string = "SOLONOID Y/N? ";  /*FIRE THE SOLONOID?*/
        w_str(string);
        keystr = getkey(entry1,entry2);
        savekey = keystr;
        if (keystr == 'Y')
         {
          keystr = bank1or2();     /*MAGAZINE 1 OR 2?*/
          if (keystr == '1')       /*MAGAZINE 1*/
           solonoid = 0X80;
          else                    /*MAGAZINE 2*/
           solonoid = 0X10;
          memout(PIA1DRB,solonoid);
          delay(0X0500);
          memout(PIA1DRB,0X00);  /*TURN SOLONOID OFF*/
         }
       }
      reset();
      string = "BIN DUMP Y/N? ";  /*DUMP THE ICE CREAM*/
      w_str(string);
      keystr = getkey(entry1,entry2);
      if (keystr == 'Y')
       {
        keystr = bank1or2();     /*MAGAZINE 1 OR 2?*/
        if (keystr == '1')       /*MAGAZINE 1*/
         {
          dump = 0X01;
          dumpret = 0X02;
         }
        else                     /*MAGAZINE 2*/
         {
          dump = 0X08;
          dumpret = 0X04;
         }
        memout(PIA2DRA,dump);      /*DUMP THE ICE CREAM*/
        delay(0X5000);
        memout(PIA2DRA,dumpret);     /*BRING PICKER BACK*/
        delay(0X5000); /*0E2A*/
        memout(PIA2DRA,0X00);      /*STOP THE MOTOR*/
       }
     reset();
     string = "AGAIN Y/N?";  /*RETURN TO HOME POSITION?*/
     w_str(string);
     keystr = getkey(entry1,entry2);
    }
  return;
 }

/*****************************************************************************
*  FUNCTION
*  TSTFRIG
*=============================================================================
*  DESCRIPTION
*   THIS FUNCTION WILL TEST THE REFRIGATION STATUS LINES.
*  FUNCTIONS CALLED
*  W_STR      DISPLAY.C
*  DELAY      KEYBOAD.C
```

```
*  RESET      KEYBOAD.C
*  REVISIONS
*  REV     DATE      ENGINEER      DESCRIPTION OF CHANGE
*************************************************************************************

tstfriq()
 {

  char value:     /*STATUS VALUES*/
  char adc:       /*ADAPTIVE DEFROST REQUEST*/
  char imr:       /*IMMEDIATE MAINTAINCE REQUEST*/
  char rmr;       /*ROUTINE MAINTAINCE REQUEST*/
  char *string:    /*STRING TO BE WRITTEN TO DISPLAY*/

  value = *memget(PIA2DRB) & 0X07;    /*GET THE STATUS VALUES*/
  adc = value & 0X01;          /*ADAPTIVE DEFROST CONTROL*/
  imr = value & 0X02:          /*IMMEDIATE MAINTAINCE REQUEST*/
  rmr = value & 0X04;          /*ROUNTINE MAINTAINCE REQUEST*/
  if (adc == 0X00)
   string = "ADC=PASS":
  else
   string = "ADC=FAIL":
  reset():
  w_str(string):
  delav(0X2500):
  if (imr == 0X02)
   string = "IMR=PASS":
  else
   string = "IMR=FAIL":
  reset():
  w_str(string):
  delav(0X2500):
  if (rmr == 0X04)
   string = "RMR=PASS":
  else
   string = "IMR=FAIL";
  reset();
  w_str(string);
  delav(0X2500);
  return;
 }

/*********************************************************************************
*  FUNCTION NAME
*  INITTEST
*================================================================================
*  DESCRIPTION
*    THIS TEST WILL BE USED TO INITIALLY TEST A MACHINE.  WE CAN MOVE THE
*    VERTICAL AND HORIZONTAL MOTORS BACK AND FORTH.  PICK ICE CREAM AND DUMP
*    ICE CREAM.  GO FROM LOAD TO HOME AND HOME TO LOAD.
*  REVISIONS
*    REV    DATE      ENGINEER      DESCRIPTION OF CHANGE
*********************************************************************************/

inittest()
 {
  char motors:
  char *string:
  char keystr;
  char horzdir;
  char vertdir;

  motors = horzoff & vertoff;   /*TURN BOTH MOTORS OFF*/
  memput(PIA1DRA,motors):
  reset();
  string = "VERT TEST Y/N?";     /*TEST VERTICAL MOTORS?*/
```

```
w_str(string);
keystr = getkey('Y','N');
while (keystr == 'Y')
 {
  string = "FAST SPEED Y/N?";  /*VERTICAL MOTOR ON FAST SPEED*/
  reset();
  w_str(string);
  keystr = getkey('Y','N');
  if (keystr == 'Y')
   memout(PIA1DRB,0X40);
  else
   memout(PIA1DRB,0X60);
  string = "VERT DOWN Y/N?";  /*MOTOR TO GO DOWN?*/
  reset();
  w_str(string);
  keystr = getkey('Y','N');
  if (keystr == 'Y')
   vertdir = vertrev;
  else
   vertdir = vertfwd;
  motors = horzoff & vertdir;
  memout(PIA1DRA,motors);
  reset();
  string = "ANY KEY TO BRAKE";
  w_str(string);
  keyboard();
  motors = horzoff & vertbrk;
  memout(PIA1DRA,motors);
  reset();
  string = "RUN AGAIN Y/N?";
  w_str(string);
  keystr = getkey('Y','N');
 }
motors = horzoff & vertoff;
memout(PIA1DRA,motors);
reset();
string = "HORZ TEST Y/N?";
w_str(string);
keystr = getkey('Y','N');
while (keystr == 'Y')
 {
  string = "FAST SPEED Y/N?";
  reset();
  w_str(string);
  keystr = getkey('Y','N');
  if (keystr == 'Y')
   memput(PIA1DRB,0X20);
  else
   memput(PIA1DRB,0X60);
  reset();
  string = "HORZ LEFT Y/N?";
  w_str(string);
  keystr = getkey('Y','N');
  if (keystr == 'Y')
   horzdir = horzccw;
  else
   horzdir = horzcw;
  motors = vertoff & horzdir;
  memput(PIA1DRA,motors);
  reset();
  string = "ANY KEY TO BRAKE";
  w_str(string);
  keyboard();
  motors = horzbrk & vertoff;
  memput(PIA1DRA,motors);
  reset();
```

```
    string = "RUN AGAIN Y/N?";
    w_str(string);
    keystr = getkey('Y','N');
   }
  string = "LOAD POS. Y/N?";
  reset();
  w_str(string);
  keystr = getkey('Y','N');
  if (keystr == 'Y')
   loadpos(1);
  string = "LOAD TO HME Y/N?";
  reset();
  w_str(string);
  keystr = getkey('Y','N');
  if (keystr == 'Y')
   ldtonme(1);
  reset();
  string = "TEST PICKER Y/N?";
  w_str(string);
  keystr = getkey('Y','N');
  if (keystr == 'Y')
   tstpick();
  return;
 }
/*****************************************************************************
*  FUNCTION NAME
*  EXERCISE
*============================================================================
*  DESCRIPTION
*  EXERCISES THE MOTOR
*****************************************************************************/

exercise()
 {
  int bin;
  char bank;
  char call;
  char binhme;
  char aligned;
  int ascibin[5];
  char x;
  char ascibank;
  char *string;

   bank = 2;
   binhme = 38;
   for(;;)
    {
     for (bin = 1;bin < 33;bin++)
      {
       reset();
       string = "BIN ";
       w_str(string);
       ascibin[1] = bin / 10 + 48;     /*CONVERT TO TWO ASCII CHARACTERS*/
       ascibin[2] = bin % 10 + 48;
       for (x = 1;x < 3;x++)
        {
         busy();
         w_disp(ascibin[x]);
        }
       string = " SELECTED";
       w_str(string);
       mtrsrch(bin,0,bank);
       string = "ALIGNING";
       reset();
       w_str(string);
```

```
        aligned = align();
        if (aligned == TRUE)
         {
          delay(0X0500);
          string = "DELIVER TO ";
          reset();
          w_str(string);
          ascibank = bank + 48;    /*CONVERT TO TWO ASCII CHARACTERS*/
          busy();
          w_disp(ascibank);
          mtrsrch(bin,1,bank);
          string = "ALIGINING";
          reset();
          w_str(string);
          align();
          aligned = align();
          if (aligned == TRUE)
            {
             delay(0X1000);
             mtrhome(binhme);
             delay(0X0100);
            }
          else
           {
            string = "NOT ALIGNED";
                 reset();
            w_str(string);
            delay(0X4000);
            mtrhome(0);
           }
         }
       else

         string = "NOT ALIGNED";
         reset();
         w_str(string);
         delay(0X500);
         mtrhome(0);
        }
      }
     if (bank == 1)
      {
       bank = 2;
       binhme = 38;
      }
     else
      {
       bank = 1;
       binhme = 37;
      }
  }
  mtrstp();      /*STOP THE MOTORS*/
  mtrhome(0);
  return;
 }
/****************************************************************************
*   FUNCTION NAME
*   SETPOT
*===========================================================================
*   DESCRIPTION
*   WE CAN SET THE POTS FOR THE MOTORS
****************************************************************************/

setpot()
 {
```

```
char *keystr;

keystr = 'Y';
while (keystr == 'Y')
  {
   reset();
   string = "SET SLOW SPEED";
   w_str(string);
   memout(PIA1DRB,0X60);
   keyboard();
   reset();
   string = "SET FAST SPEED";
   w_str(string);
   memout(PIA1DRB,0X00);
   keyboard();
   reset();
   string = "SET AGAIN Y/N?";
   w_str(string);
   keystr = getkey('Y','N');
  }
 memout(PIA1DRB,0X00);
 return;
}
/*****************************************************************************
*  FUNCTION NAME
*  MACHID
*============================================================================
*  THIS FUNCTION WILL ASSIGN A MACHINE ID NUMBER
*****************************************************************************/

machid()
 {
  char keystr;
  char *string;

  keystr = 0;
  while (keystr != 'E')
   {
    reset();
    string = "ID = ";
    w_str(string);
    idcnt = 0;
    keystr = 0;
    while (keystr != 'E')
     {
      keystr = keyboard();
      if (keystr == 'C')
       {
        beep('S');
        if (idcnt == 0)
         return;
        else
         break;
       }
      if (keystr != 'E')
       {
        if (idcnt < 20)
         {
          id[idcnt++] = keystr;
          beep('S');
          busy();
          w_disp(keystr);
         }
       }
     }
   }
 beep('S');
 return;
}
```

```
/*===========================================================================*/
/*===========================================================================*/
/*THIS IS THE MAIN ROUTINE OF THE COMET SOFTWARE                             */
/*===========================================================================*/
/*===========================================================================*/
#include "io.h"

extern char outstock, time[], mexist, asciseg[], pcat;
extern char error[];   /*ERROR CODE TABLE*/
extern char retcnt1, retcnt2;
extern int degree;
extern char vanilla, intflag, vertbrk;
extern char vertbin[], horzbin[];
extern char *errmesg;

/*GLOBALS*/
char bincall;    /*DEFINES IF MODEM CALL WAS EXECUTED FOR A FULL RETURN BIN*/
char stock:    /*OUT OF STOCK FLAG*/
char fullbin; /*FULLBIN FLAG FOR OUT OF STOCKS*/
char saleflag;    /*FLAG FOR OVERFLOW OF SALES*/

char price[maxord];



main()

 char ring;       /*DETECTS RING SIGNAL FROM MODEM*/
 char *string:    /*HOLDS STRING TO BE WRITTEN TO THE DISPLAY*/
 char message;    /*HOLDS MESSAGE FROM MODEM OR KEYBOARD CONTROL BOARD*/
 char hour;       /*HOLDS THE UNITS OF HOURS*/
 char tmin;       /*HOLDS TENS OF MINUTES*/
 char tempwarn; /*FLAG TO SIGNAL FOR A CALL FOR A TEMPERATURE WARNING*/
 char pctalk;     /*FLAG FOR PC COMMUNICATIONS PORT*/
 char x;          /*COUNTER*/
 char frstrd;     /*FIRST READ FLAG FOR TEMPERATURE WARNING*/

 r_clk(0X00);                /*READ THE CONTROL REGISTER TOCLEAR ANY INTERRUPT*/
 w_clk(0X01);                /*START THE OPERATION OF THE CLOCK*/
 mtrinit();                  /*INITIALIZE MOTORS*/
 memget(ACIA2SR);    /*CLEAR DCD BIT BY READING STATUS REGISTER AND READING*/
 memget(ACIA2DR);    /*THE DATA REGISTER*/
 memput(ACIA2CR,0X15);       /*DISABLE INTERRUPT. ENABLE RTS*/
 commnd('A');                /*PLEASE MAKE ANOTHER SELECTION COMMAND*/
 status(1,0X7D,2);           /*WE EXPECT A CARRIAGE RETURN FOR RESPONSE*/
 message = memget(ACIA2DR);
 if (message != 0X0D)
  {
   dial(4);           /*MACHINE MALFUNCTION*/
   for(;;);                  /*LOOP FOREVER SINCE MACHINE WILL NOT RUN*/
  }
 memput(ACIA2CR,0X95);       /*ENABLE INTERRUPT*/
 memput(PIA3DRA,0X00);    /*FF HEX. TURN SERVICE KEYBOARD OFF*/
 memget(PIA3DRA);         /*CLEAR CA2 INTERRUPT FLAG*/

 tempwarn = FALSE:  /*TEMPERATURE WARNING = FALSE*/
 if (intflag == FALSE)
  frstrd = TRUE;   /*TEMPERATURE WARNING FLAG FOR FUNCTION TEMP*/
 else
```

```
 {
  intflag = FALSE;
  frstrd = FALSE;      /*A BUTTON WAS PRESSED SO DO NOT RESET FIRST READ*/
 }

for(;;)
{
 memout(PIA1CRA,0X3C);            /*TOGGLE WATCHDOG TIMER*/
 memout(PIA1CRA,0X34);
 temp();        /*READ THE TEMPERATURE*/
 string = "TEMPERATURE=";
 reset();
 w_str(string);
 for (i = 0; i < 3;i++)
  {
   busy();
   w_disp(ascideg[i]);
  }
 if (degree >= -5 && frstrd == TRUE)   /*IS THIS FIRST READ DEGREE > -5*/
  {                                     /*AND WAS THERE NO IRQ INTERRUPT*/
   temp();                  /*READ TEMPERATURE AGAIN TO MAKE SUE > -5*/
   if (degree >= -5)
    {
     message = read_clk();
     if (message < 0XFF)   /*MAKE SURE WE HAVE A VALID TIME*/
      {
       tmin = time[2]; /*TENS OF MINUTES*/
       hour = time[1]; /*UNITS OF HOURS*/
       if (time[0] == 2 && time[1] == 3)  /*IF END OF DAY THEN NEXT HOUR WILL BE
*/
        hour = 9;                            /*0 SO SET HOUR TO 9*/
      }
     else             /*CLOCK ERROR*/
      {
       clkinit();   /*INITIALIZE CLOCK*/
       hour = 0;
       tmin = 0;
      }
     frstrd = FALSE;
    }
  }
 else
  if (degree < -5 && frstrd == FALSE)      /*TEMPERATURE LESS THAN -5 DEGREES*/
   {
    temp();                                /*MAKE SURE TEMP IS < -5*/
    if (degree < -5)
     frstrd = TRUE;     /*FIRST READ = TRUE*/
   }
/*  if (mexist == FALSE)
  {
   pctalk = memget(ACIA1SR) & 0X7D;
   if (pctalk == 0X01)
    pccommun();
   pcat = FALSE;
  }
 else
  {*/
   if (mexist == TRUE)
    {
     ring = ~memget(PIA3CRA) & 0X40;  /*RING INDICATOR FLAG*/
     if (ring == 0X40)
      {
       memget(PIA3DRA);                /*CLEAR THE FLAG*/
       answer();                      /*ANSWER THE MODEM*/
       memget(PIA3CRA);
       memget(PIA3DRA);
```

```
      }
     }
/*   }*/
 read_clk();    /*READ THE CLOCK*/
 retoin();      /*CHECK FOR A RETURN*/
 if (saleflag == TRUE)    /*WE HAVE A SALES OVERFLOW*/
  {
   message = dial(error[4]);   /*SALE OVERFLOW. SO WE NEED TO DUMP SALES*/
   if (message == TRUE)
    saleflag = FALSE;            /*RESET FLAG SINCE ALL SALES ARE CLEARED*/
  }
 if (hour == ? && tmin == time[2])
  {
   if (time[1] == . && degree >= -5)
    tempwarn = TRUE;          /*TEMPERATURE WARNING = TRUE*/
  }
 else
  {
   if (time[1] > hour && degree >= -5 && tmin == time[2])
      {
/*        printf("tempwarn = TRUE\n");*/
    tempwarn = TRUE;          /*TEMPERATURE WARNING = TRUE*/
      }
  }
 memout(PIA1CRA,0X3C);            /*TOGGLE WATCHDOG TIMER*/
 memout(PIA1CRA,0X34);

 if (tempwarn == TRUE)
  {
   temp();                    /*READ THE TEMPERATURE AGAIN*/
   if (degree >= -5)

     errmesg = "TEMPERATURE";
     message = dial(error[1]);   /*TEMPERATURE WARNING*/
     if (message == TRUE || message == 0XFF)   /*CALL ACKNOWLEDGE OR NO PHONE LIN
E PRESENT*/
       machERR();
    }
  }

 if ((retcnt1 > 15 || retcnt2 > 15) && fullbin == FALSE)
  {
   message = dial(error[2]);
   if (message = TRUE)
     bincall = TRUE;
   beep('L');
  }
 if (outstock > 5)
  dial(error[0]);
 if (vanilla == TRUE)
  dial(error[5]);

}
return;
}
```

```
/*****************************************************************************
*   FUNCTION NAME           MODULE NAME             PROGRAM NAME
*   FILLSKU                 FILLSKU.C               COMET CONTROL
*=============================================================================
*   DESCRIPTION
*     THIS FUNCTION WILL INPUT THE BIN, BUTTON, AND AMOUNTS. FOR EACH SKU.
*
*   FUNCTIONS CALLED
*     KEYBOARD      KEYBOARD.C
*     BEEP          KEYBOAD.C
*     FNDBIN        SEARCH1.C
*     W_STR         DISPLAY.C
*     W_DISP        DISPLAY.C
*     RESET         DISPLAY.C
*   PARAMETERS PASSED
*     KEY       MAXIMUM KEYSTROKE NUMBER THAT CAN BE ENTERED
*     I         LOCATION IN MEMORY THAT DATA IS TO BE STORED
*     DATA      DATA TO BE FILLED
*   PARAMETER RETURNED
*     I         LOCATION IN MEMORY AFTER DATA HAS BEEN FILLED
*   REVISIONS
*   REV     DATE      ENGEINEER      DESCRIPTION OF CHANGE
*****************************************************************************/

#include "io.h"

extern char *string;

char clr;           /*USED FOR FLAG TO SEE IF A CLEAR HAS BEEN ENTERED*/

fillsku(i,key,data)
char key, data[];
unsigned i;
{
 char valkey;        /*FLAG FOR VALID KEYSTROKE*/
 char keystr[10];    /*HOLDS THE KEYSTROKE ENTRYS FROM THE KEYBOARD*/
 char k;             /*COUNTER*/
 char find;          /*FLAG THAT IS RETURNED IF A BIN IS ALREADY ASSIGNED*/
 char *tstring;      /*TEMPORARY STRING TO BE PASSED TO THE DISPLAY*/
 char save;          /*TEMPORARY STORAGE*/
 unsigned m;         /*COUNTER*/
 unsigned j;         /*COUNTER*/
 unsigned memory;    /*FLAG FOR MEMORY SIZE AVIALABLE*/

 find = TRUE;
 while (find == TRUE)
  {
   for (k = 0; k < 6;k++)
    keystr[k] = 0;                   /*CLEAR KEYSTROKE*/
   k = 0;
   while (keystr[k] != 'E')          /*LOOP UNTIL ENTER IS PUSHED*/
    {
     valkey = FALSE;
     keystr[k] = keyboard();
     if (keystr[0] == 'C')           /*IF CLEAR IS ENTERED FIRST THEN RETURN*/
      {
       beep('S');        /*SHORT BEEP*/
       clr = TRUE;
       return(i);
      }
```

```
    if (k == 0 && keystr[k] < 'C')   /*FIRST ENTRY*/
  {
   if (key == '1')   /*MAGAZINE 1 OR 2, BINS 1 -36*/
    {
     if (keystr[k] < '1') /*CAN T ENTER BIN 0*/
      beep('L');      /*LONG BEEP*/
     else
      valkey = TRUE;
    }
   else   /*KEY = '6'*/
    {
     if (keystr[k] > '6')  /*TUBES ONLY HOLD 6 HALF GALLONS*/
      beep('L');      /*LONG BEEP*/
     else
      {
       valkey = TRUE;
       ring = FALSE;   /*ONLY ONE ENTRY PER BIN SO WE ARE DONE WITH OUTER LOOP
*/
      }
    }
  }
 else
  if (k == 1 && keystr[k] < 'C') /*SECOND ENTRY*/
   {
    if (key == '3')         /*MAGAZINE 1, BINS 1 - 36*/
     {
      if (keystr[0] == '3')
        {
         if (keystr[k] > '6') /*ONLY ENTER BINS 30, 31, 32, 33, 34, 35, 36*/
          beep('L');    /*LONG BEEP*/
         else
          valkey = TRUE;
        }
      else
       {
        if (keystr[0] > '3')
         beep('L');    /*LONG BEEP*/
        else
         valkey = TRUE;
       }
     }
    else /*KEY = '6'*/
     beep('L');    /*LONG BEEP*/
   }
  else  /*KEYSTR[K] = CLEAR, ENTER, OR INVALID KEY*/
   {
    if (keystr[k] != 'E')
     {
      if (keystr[k] == 'C')
       {
        reset();
        w_str(string);
        beep('S');      /*SHORT BEEP*/
        k = 0;
        keystr[1] = 0X00;
        keystr[2] = 0X00;
       }
      else
       {
        keystr[k] = 0X00;
        beep('L');    /*LONG BEEP*/
       }
```

```
            }
          else
            {
            if (key == '6' && k == 0)
              {
              keystr[k] = 0;
              beep('L');    /*LONG BEEP*/
              }
            else
              {
              beep('S');          /*SHORT BEEP*/
              if (keystr[0] == 'E')
                return(1);
              }
            }
          }
        if (valkey == TRUE)
          {
          w_disp(keystr[k]);
          beep('S');          /*SHORT BEEP*/
          k++;
          }
      } /*END WHILE LOOP*/

      if (k == 1 && key != '6')      /*ONLY ONE KEYSTROKE ENTERED, NO QUANTITY*/
        {
        keystr[1] = keystr[0];
        keystr[0] = '0';           /*ALWAYS PUT 0 IN FRONT OF ONE DIGIT ENTRY*/
        k = 2;
        }
      if (key == '3')      /*BIN SEARCH*/
       find = fndbin(keystr,data);
      if (find == TRUE)                  /*DUPLICATE HAS BEEN FOUND*/
        {
        reset();
        tstring = "Already Assigned";
        w_str(tstring);
        beep('L');          /*LONG BEEP*/
        delay(0X1D00);
        reset();
        w_str(string);
        }
      else
        {
        j = i + 1;
        while (data[j] != ETB)   /*LOOP UNTIL END OF BLOCK*/
          j++;
        if (key == '6')          /*IF KEY = 6 WE ARE IN THE QUANTITY FIELD*/
          {
          m = j + 2;              /*AND WE ONLY NEED TO SHIFT LEFT TWO TIMES*/
          memory = j + 2;
          }
        else
          {
          m = j + 3;              /*ELSE SHIFT RIGHT 3 TIMES FOR BIN*/
          memory = j + 5;         /*MAKE SURE A QUANTITY CAN BE ENTERED*/
          }
/*        printf("FILLSKU\n");
        printf("j is %d\n", j);
        printf("m is %d\n", m);*/
        if (m < maxbank && memory < maxbank)     /*MAKE SURE NOT OUT OF MEMORY*/
          {
          while (j >= i)        /*SHIFT EVERYTHING RIGHT*/
            data[m--] = data[j--];
          data[i++] = keystr[0];
          if (k == 2)           /*WRITE KEYSTR ONLY IF SECOND ENTRY IS VALID*/
```

```
      data[i++] = keystr[i];
      data[i++] = '/';
     }
    else
     {
      reset();
      tstring = "MEMORY FULL";
      w_str(tstring);
      beep('L');                 /*LONG BEEP*/
      delay(0X1000);
      reset();
      w_str(string);
     }
   }
  }
 return(i);
}
```

```
/*****************************************************************************
*   FUNCTION NAME            MODULE NAME            PROGRAM NAME
*   DATAKEY                  KEY.C                  COMET CONTROL
*============================================================================
*   DESCRIPTION
*     THIS MODULE IS CALLED FROM FIRQ.C WHEN THE KEYBOARD OPERATOR WISHES
*     TO AUTO LOAD THE MACHINE.
*     THIS MODULE CONSISTS OF THE FOLLOWING FUNCTIONS:
*       DATAKEY.C  -    READS THE DATA FROM THE CARTRIDGE
*       CHK_SUM.C  -    COMPUTES THE CHECK SUM OF THE DATA BEING READ
*       ADDR_SET.C -    SETS UP THE ADDRESS OF THE CARTRIDGE THAT IS TO BE READ
*=============================================================================
*     THIS IS THE CARTRIDGE FUNCTION WHERE WE READ THE DATA OFF THE CARTRIDGE.
*     DATA FROM THE KEY IS STORED IN A FIELD BY SKU'S. WE FILL UP THE FIELD
*     BY STX(SKU)STXSTY(BIN)STX(QUANTITY)ETXETB. FOR  A MAXIMUM OF 32 SKU
*     FIELDS AND 1500 BYTES.  THIS DATA FIELD IS STORED IN THE ARRAY DATA[].
*     ARRAY STORAGE FOR BANK1 AND BANK2 (WORST CASE ANALYSIS)
*   FUNCTIONS CALLED
*     MEMPUT   INOUT.C
*     MEMGET   INOUT.C
*     RESET    DISPLAY.C
*     W_STR    DISPLAY.C
*     DELAY    KEYBOAD.C
*     ADDR_SET KEY.C
*     CHK_SUM  KEY.C
*     INITDATA INITDATA.C
*   REVISIONS
*   REV    DATE    ENGINEER       DESCRIPTION OF CHANGE
*****************************************************************************/

#include "io.h"

extern char cartrge, datashft;

/*GLOBALS*/
char id[maxid];         /*CONTAINS THE MACHINE ID NUMBER*/
char phone[maxnum]; /*CONTAINS THE PHONE NUMBER*/
char phncnt;            /*WILL HAVE ONE MORE DIGIT THEN THE PHONE NUMBER*/
char idcnt;             /*WILL HAVE ONE MORE NUMBER THAN IN THE ID NUMBER*/
char select;             /*CONTAINS VALUE FOR WHICH MAGAZINE WAS LAST LOADED*/
char bank1[maxbank]; /*CONTAINS SKU, BUTTON, BIN, AND QUANTITY INFORMATION*/
char bank2[maxbank]; /*CONTAINS SKU, BUTTON, BIN, AND QUANTITY INFORMATION*/
char holdsku[maxsku]; /*HOLDS SKUS THAT ARE READ FROM CARTRIDGE*/

/*STATIC GLOBALS*/
static unsigned sum;     /*USED FOR CHECK SUM CALCULATION*/
static unsigned value;  /*ADDRESS COUNTER*/
static unsigned highaddr; /*HIGHER ORDER ADRESS VALUE*/
static unsigned lowaddr; /*LOWER ADDRESS VALUE, A0 - A7*/


char datakey()
 {
  char flag;        /*FLAG USED TO FOR PRICE AND SALE FIELD FOR START OF NEW SKU*/
  char start;       /*FLAG USED TO INDICATE START OF NEW SKU INFORMATION*/
  char css;         /*CHECK SUM READ FROM CARTRIDGE*/
  char cs;          /*CHECK SUM CALCULATED*/
```

```
  char *string;      /*POINTER FOR - STRING TO BE PASSED TO THE DISPLAY*/
  char keyinfo:     /*ACTUAL DATA READ OFF THE CARTRIDGE*/
  char mag1:        /*MAGAZINE 1 TRIP SWITCH*/
  char mag2:        /*MAGAZINE 2 TRIP SWITCH*/
  char cartrg1:     /*VALUE THAT WILL TELL US IF CARTRIDGE 1 IS INSERTED*/
  char cartrg2:     /*VALUE THAT WILL TELL US IF CARTRIDGE 2 IS INSERTED*/
  char *data:       /*TEMPORARY POINTER FOR BANK1 OR BANK2*/
  char pass1;       /*FLAG TO TELL US IF WE READ AT LEAST ONE CARTRIDGE*/
  char error;       /*ERROR FLAG IF WE HAVE BAD DATA*/
  unsigned datacnt: /*COUNTER FOR ARRAY BANK1 OR BANK2 WHEN READING DATA*/
  unsigned k;       /*K WILL BE THE ADDRESS OF THE ARRAY. THE KTH ELEMENT*/
  unsigned holdcnt: /*USED AS A ADDRESS COUNTER FOR HOLDSKU*/
  unsigned savecnt; /*SAVES THE VALUE OF N. THE COUNTER FOR HOLDSKU*/
  unsigned address: /*ADDRESS OF CARTRIDGE THAT IS TO BE READ*/
  char temosel:       /*TEMORARY HOLD OF SELECT VARIABLE*/
  char bptime;        /*TIME OF BEEPER VARIABLE*/
  char keystr;

  reset();
  string = "DONE LOADING Y/N";
  w_str(string);
  keystr =  getkey('Y', N');
  if (keystr == 'N')
   return;
  mag1 = memget(PIA2CRA) & 0X80;    /*MAGAZINE 1 TRIP SWITCH*/
  mag2 = memget(PIA2CRA) & 0X40;    /*MAGAZINE 2 TRIP SWITCH*/
  memput(PIA3DRA,0X40);             /*BF HEX. CARTRIDGE ADDRESS ENABLE SELECTED*/
  cartrg1 = chkcart(0XFA22):        /*CHECK TO SEE IF CARTRIDGE1 IS PRESENT*/
  cartrg2 = chkcart(0XFA21);        /*CHECK TO SEE IF CARTRIDGE2 IS PRESENT*/
  pass1 = FALSE;          /*PASS 1 TELLS US THAT WE HAVE NOT SUCESSFULLY MADE ONE
READ*/
  holdcnt = 0;
  savecnt = holdcnt:     /*SAVE THE VALUE*/
  temosel = select;


  for (;;)   /*LOOP UNTIL DONE READING CARTRIDGES*/
  {
/*   printf("select is %x\n". select);*/
   if (cartrg1 == TRUE && mag1 == 0X80)
    {
     for (datacnt = 0;datacnt < maxbank;datacnt++)
      bank1[datacnt] = 0X00;          /*ERASE ALL PREVIOUS DATA*/
     data = &bank1[0]; /*DATA POINTS TO ZEROTH ELEMENT OF BANK1*/
     address = 0XFA22;
     string = "READING CART. 1";
     select = 2;
    }
   else
    {
     if (cartrg2 == TRUE && mag2 == 0X40)
      {
       for (datacnt = 0;datacnt < maxbank;datacnt++) /*ERASE ALL PREVIOUS DATA*/
        bank2[datacnt] = 0X00;
       data = &bank2[0];  /*DATA POINTS TO ZEROTH ELEMENT OF BANK2*/
       address = 0XFA21;
       string = "READING CART. 2";
       select = 1;
      }
     else
      {
       if (pass1 == FALSE)        /*MAGAZINE OR CARTRGE IS NOT LOADED*/
        {
         string = "NO MAG. or CART.";
         bptime = 'L';         /*BEEP TIME IS BAD BEEP*/
        }
```

```
        else
         {
          string = "STORING DATA";
          reset();
          w_str(string);
          memget(PIA3DRA); /*CLEAR INTERRUPT FLAG TO GET READY FOR MAGAZINE LOAD
/
          holdsku[holdcnt] = ETB;   /*TERMINATE THE FIELD*/
/*          printf("holdcnt is %x\n", holdcnt);*/
          initdata();
          string = "READING COMPLETE";
          bptime = '5';  /*BEEP TIME IS GOOD BEEP*/
          datashft = FALSE;    /*WE ARE DONE ALTERING DATA*/
         }
        reset();
        w_str(string);
        beep(bptime);     /*CALLING BEEP WILL ALSO DISABLE ADDRESS ENABLE*/
        delay(0X0550);
        memout(PIA3DRA,0X00);   /*FF HEX, DISABLE CARTRIDGE ADDRESS ENABLE*/
        return;
      }
   }
 datashft = TRUE:            /*DATA IS BEING ALTERED*/
 memout(PIA3DRA,0X40);        /*BF HEX, ENABLE CARTRIDGE ADDRESS ENABLE*/
 reset();
 w_str(string);
 delay(0X1A00);
 highaddr = 0X60;
 memout(PIA4DRA,~highaddr);                  /*START AT ADDRESS */
 lowaddr = 0X00;
 memout(PIA4DRB,~lowaddr);                    /*PORTB ARE ALL 0*/
 value = 0;
 sum = 0;datacnt = 0;k = 0X0000;
 flag = TRUE:start = TRUE:pnncnt = 0;
 idcnt = 0X00;
 error = FALSE;
 addr_set();
 keyinfo = memget(address);
 memout(PIA1CRA,0X3C);  /*TOGGLES WATCHDOG TIMER*/
 memput(PIA1CRA,0X34);

/*LOOP UNTIL AN SOH CHARACTER IS FOUND OR IF DATACNT IS EQUAL TO 8193 THEN*/
/*THERE IS AN ERROR ON THE CARTRIDGE OR CARTRIDGE HAS BEEN PULLED*/
 while (keyinfo != SOH && datacnt < (maxbank - 1))
   {
    cs = chk_sum(keyinfo);
    if (keyinfo == ETX && error == FALSE)  /*IF DATA IS EQUAL TO END OF TEXT*/
     {
      *(data+k) = keyinfo;                 /*END OF TEXT CHARACTER*/
      k++;
      holdsku[holdcnt++] = ETX;
      flag = TRUE;
      start = TRUE;
     }
    else
     {
      *(data+k) = keyinfo;          /*SKU IS READ IN*/
      k++;
      if (start == FALSE && keyinfo == STX)
       flag = FALSE;
      if (flag == TRUE && error == FALSE)
       {
        holdsku[holdcnt++] = keyinfo;
        start = FALSE;
       }
     }
```

```
    addr_set();
    keyinfo = memget(address);
/*     if (keyinfo == 0X03)
     printf("E");
    else
     if (keyinfo == 0X02)
      printf("S");
    else
     if (keyinfo == 0X17)
      printf("B");
         else
           printf("%c", keyinfo);
    if (keyinfo == 255)
     {
      printf("high order address is %x\n", highaddr);
      printf("low order address is %x\n", lowaddr);
     getchar();
     keyinfo = memget(address);
     printf("address is %x\n", keyinfo);
        }*/
    datacnt++;
    if (holdcnt > maxsku)      /*HOLDCNT IS A COUNTER FOR THE SKU FIELD*/
     error = TRUE;                   /*WE DON'T WANT TO OVERWRITE RAM IF ERROR*/
   }
  memout(PIA1CRA,0X3C);   /*TOGGLES WATCHDOG TIMER*/
  memout(PIA1CRA,0X34);
/*  printf("datacnt is %d\n", datacnt);*/
 if (datacnt < maxbank)
  {
   cs = chk_sum(keyinfo);
   addr_set();
   keyinfo = memget(address);
   datacnt = 0;
   while (keyinfo != ' ' && datacnt < maxid)    /*LOOP UNTIL A BLANK IS READ*/
    {
     id[idcnt++] = keyinfo;                /*READ IN THE ID NUMBER*/
     cs = chk_sum(keyinfo);
     addr_set();
     keyinfo = memget(address);
     datacnt++;
    }
   if (datacnt < maxid)
    {
     datacnt = 0;
     cs = chk_sum(keyinfo);
     addr_set();
     keyinfo = memget(address);
     while (keyinfo != ETB && datacnt < maxnum)  /*LOOP UNTIL ETB CHARACTER IS R
EAD*/
       {
        phone[phncnt++] = keyinfo;          /*READ IN THE PHONE NUMBER*/
        cs = chk_sum(keyinfo);
        addr_set();
        keyinfo = memget(address);

/*        printf("high order address is %x\n", highaddr);
       printf("low order address is %x\n", lowaddr);
      getchar();
      keyinfo = memget(address);
      printf("data is %x\n", keyinfo);*/
        datacnt++;
       }

      cs = chk_sum(keyinfo);
/*      printf("computed check sum is %x\n", cs);*/
      addr_set();
```

```
    css = memget(address);                  /*READ IN THE CHECK SUM CHARACTER*/
/*     printf("cartridge check sum is %x\n", css);*/

     + data-k) = ETB;
  /*   printf("data array is %d", k);
     datadis(data);*/
   }
  }
  if (datacnt >= maxid || datacnt >= maxnum || datacnt >= maxbank)
   {
    cs = FALSE;
    css = TRUE;
   }
  reset();
  if (cs == css)
   {
    tempsel = select;
    string = "Good Data";        /*CHECKSUMS MATCH, GOOD DATA*/
    w_str(string);
    beep('S');
    delay(0X0550);
    savecnt = holdcnt;                  /*SAVE THE VALUE*/
    cartrge = TRUE;            /*SET FLAG SO WE KNOW CARTRGE WAS INSERTED*/
   }
  else
   {
    select = tempsel;
    for (datacnt = 0;datacnt < maxbank;datacnt++)
     data[datacnt] = 0X00;         /*ERASE ALL PREVIOUS DATA*/
    for (datacnt = savecnt;datacnt < holdcnt;datacnt++);
     holdsku[datacnt] = 0;       /*ERASE ALL DATA IN HOLDSKU*/
    holdcnt = savecnt;                  /*GO BACK TO ORIGINAL VALUE*/
    string = "Bad Data";         /*CHECKSUMS DON'T MATCH, BAD DATA*/
    w_str(string);
    beep('L');
    delay(0X0550);
   }
  if (address == 0XFA22)   /*CARTRIDGE ONE SELECTED*/
   {
    mag1 = 0;
    cartrg1 = FALSE;        /*WE JUST READ CARTRIDGE 1 SO SET TO 0 SO DON'T READ
AGAIN*/
   }
  else
   {
    mag2 = 0;
    cartrg2 = FALSE;
   }
  pass1 = TRUE;
 }


}
/******************************************************************************
*   FUNCTION NAME
*   CHK_SUM
*==============================================================================
*   DESCRIPTION
*     THIS IS THE CHECKSUM ROUTINE.
*   FUNCTIONS CALLED
*     NONE
*   PARAMETERS PASSED
*     KEYINFO    THIS IS THE DATA THAT WILL BE COMPUTED FOR THE CHECKSUM
*   PARAMETERS RETURNED
*     CS  CHECK SUM
```

```
*   REVISIONS
*   REV     DATE     ENGINEER      DESCRIPTION OF CHANGE
*****************************************************************************/

chk_sum(keyinfo)
 char keyinfo;
  {
   char cs;           /*CHECK SUM*/
   unsigned dtemp;  /*TEMPORARY VALUE*/
   unsigned atemp;  /*TEMPORARY VALUE*/

   dtemp = keyinfo + sum;
   atemp = dtemp & 256;
   sum = (dtemp + (atemp/256)) & 255;
   cs = sum & 127;
   return(cs);
  }


/*****************************************************************************
*   FUNCTION NAME
*   ADDR_SET
*============================================================================
*   DESCRIPTION
*     THIS ROUTINE SETS THE ADDRESS OF THE DATA CARTRIDGE
*   FUNCTIONS CALLED
*     MEMPUT  INOUT.C
*   REVISIONS
*   REV    DATE     ENGINEER      DESCRIPTION OF CHANGE
*****************************************************************************/

addr_set()
  {
   if (value > 0XFF)
    {
     highaddr = highaddr + 1;
     memout(PIA4DRA,~highaddr);
     memput(PIA4DRB,~lowaddr);
     lowaddr = 0X0001;
     value = 0X0001;
    }
   else
     {
      memout(PIA4DRB,~lowaddr);
      lowaddr = lowaddr + 1;
      value = value + 1;
     }
   return;
  }

/*****************************************************************************
*  FUNCTION NAME
*  CHKCART
*============================================================================
*  DESCRIPTION
*   WE WILL READ THE FIRST CHARACTER IN THE CARTRIDGE.  IF IT IS A STX
*   CHARACTER, WE WILL WRITE A 55 HEX TO THAT DATA LOCATION, AND THEN
*   READ BACK THAT DATA, IF DATA MATCHES THEN CARTRIDGE IS PRESENT AND
*   THE BATTERY IS GOOD.  WE WILL THEN WRITE BACK THE STX CHARACTER.
*  PARAMETERS PASSED
*   ADDRESS       HOLDS ADDRESS OF CARTRIDGE TO READ AND WRITE TO
*  PARAMETERS RETURNED
*   STATUS        RETURNS THE STATUS OF THE TEST
*  REVISIONS
*  REV        DATE        ENGINEER          DESCRIPTION OF CHANGE
*****************************************************************************/
```

```
chkcart(address)
 unsigned address;
 {
  char hidval;            /*VALUE THAT IS READ FROM ADDRESS 0*/
  char status;            /*STATUS OF CARTRIDGE*/

  highaddr = 0X60;
  lowaddr = 0X00;
  memput(PIA4DRA,~highaddr);
  memput(PIA4DRB,~lowaddr);
  memput(address,0XE5);
  hidval = memget(address);           /*GET THE DATA AT ADDRESS 0*/
/*  printf("hidval is %x\n", hidval);*/
  if (hidval == STX)                  /*VALID READ*/
    status = TRUE;
  else
   status = FALSE;
  return(status);
 }
```

```
/*************************************************************************
*    FUNCTION NAME             MODULE NAME            PROGRAM NAME
*    STRFIND                   SEARCH1.C              COMET CONTROL
*========================================================================
*    DESCRIPTION
*      THIS FUNCTION ATTEMPT TO FIND A SKU NUMBER.
*    FUNCTIONS CALLED
*      NONE
*    PARAMETERS PASSED
*      TDATA          THIS IS THE DATA STRING. IT WILL EITHER BE THE SALE
*                     RECORDS, OR THE CARTRIDGE DATA.
*      TSKUKEY        THIS HAS THE SKU NUMBER THAT WE ARE TRYING TO FIND.
*    PARAMETERS RETURNED
*      FIND    TRUE IF WE FOUND IT AND FALSE IF WE DIDN'T
*    REVISIONS
*    REV    DATE     ENGINEER        DESCRIPTION OF CHANGE
*************************************************************************/

#include "io.h"


/*GLOBALS*/
unsigned dataloc: /*POSITION OF BUTTON FOUND*/
unsigned found:  /*FOUND = LAST POSITION OF NUMBER FOUND*/

strfind(tdata,tskukey)
 char tdata[],tskukey[]:
 {
  char k, find:
  unsigned i:

  k = 0;
  i = 0;
  find = FALSE:
  if (tdata[i] != STX)
   return(find):       /*ERROR IN DATA FIELD*/
  while (tdata[i] != ETB && find == FALSE) /*LOOP UNTIL ETB CHARACTER*/
   {
    if (tdata[i] == STX)      /*WE HAVE A STX CHARACTER*/
        {
      i++;
      while (tdata[i] != STX) /*LOOP UNTIL STX CHARACTER*/
       {
        if (tdata[i] != tskukey[k])
         {
          find = FALSE;        /*VALID SKU NOT FOUND*/
          k = 0;
          while (tdata[i] != ETX) /*GET TO NEXT SKU*/
           i++;
          break;
         }
        else
         {
          found = i:            /*FOUND WILL RETURN THE LAST DIGIT IN FIELD*/
          find = TRUE;          /*VALID SKU FOUND*/
         }
       k++; /*INCREMENT COUNTERS*/
       i++;
```

```
      }
          }
  k = 0; /*RETURN SKU COUNTER TO 0*/
  i++;
  }
 return(find);
 }


/***************************************************************************
*    FUNCTION NAME              MODULE NAME            PROGRAM NAME
*    FNDBUT                     SEARCH1.C              COMET CONTROL
*==========================================================================
*    DESCRIPTION
*      THIS IS THE FIND BUTTON ROUTINE.  WE WILL SEARCH THE BUTTON ARRAY TO
*      SEE IF A BUTTON ENTERED IS EQUAL TO A BUTTON ALREADY ASSIGNED.
*    FUNCTIONS CALLED
*      NONE
*    PARAMETERS PASSED
*      DATA      DATA TO BE SEARCHED
*      BUTTON    THE BUTTON NUMBER WE ARE TRYING TO FIND
*    PARAMETERS RETURNED
*      FIND  TRUE IF WE FOUND IT AND FALSE IF WE DIDN'T
*      EXTERNALS      DATALOC      WHEN A CORRECT BUTTON IS FOUND
*                                  DATALOC = POSTION OF BUTTON IN MEMORY
*    REVISIONS
*    REV      DATE      ENGINEER        DESCRIPTION OF CHANGE
****************************************************************************/

fndbut(button, data)
 char button[];
 char data[];
  {
   char find;   /*BOOLEAN FLAG RETURNED TO TELL US IF A BUTTON WAS FOUND*/
   unsigned i;  /*i IS A COUNTER FOR THE ARRAY BANK1 OR BANK2*/

   i = 0;
   find = FALSE;
   dataloc = 0;
   if (data[i] != STX)
    return(find);                   /*ERROR IN DATA FIELD*/
   while (data[i] != ETB)            /*LOOP UNTIL A END OF BLOCK*/
    {
     i++;
     while (data[i] != STX)          /*SKIP SKU FIELD TO BUTTON FIELD*/
      i++;
     i++;
     while (data[i] != STX && data[i] != ETB) /*LOOP UNTIL END OF BLOCK OR STX*/
      {
       if (data[i] != '/')       /*IS BUTTON EQUAL TO '/'*/
        {
         if (button[1] == data[i])
          {
           i++;
           if (button[2] == data[i])
            {
             find = TRUE;
             dataloc = i;        /*WHEN A BUTTON IS PUSHED THIS IS USED*/
             return(find);
            }
          }
        }
      i++;
     }
    while (data[i] != ETX)    /*GET US TO NEXT SKU FIELD*/
     i++;
    i++;      /*WE KNOW POINT AT A STX CHARACTER OR A ETB CHARACTER*/
```

```
  }
 return(find);
}

*******************************************************************************
*   FUNCTION NAME
*   FNDBIN
*==============================================================================
*   DESCRIPTION
*     THIS IS THE FIND BIN ROUTINE.  WE WILL SEARCH THE BIN ARRAY TO SEE IF
*     A BIN ENTERED IS EQUAL TO A BIN ALREADY ASSIGNED.
*   FUNCTIONS CALLED
*     NONE
*   PARAMETERS PASSED
*     DATA      DATA TO BE SEARCHED
*     KEYSTR    THIS HAS THE BIN NUMBER WE WANT TO FIND
*   PARAMETERS  RETURNED
*     FIND      TRUE IF WE FIND IT AND FALSE IF WE DON'T
*   REVISIONS
*   REV      DATE       ENGINEER       DESCRIPTION OF CHANGE
*******************************************************************************/

fndbin(keystr,data)
 char keystr[];
 char data[];
  {
   char find;   /*BOOLEAN FLAG TO TELL US IF WE FOUND A BIN*/
   unsigned i;  /*ADDRESS COUNTER FOR OUR ARRAY*/

   i = 0;
   find = FALSE;
   if (data[i] != STX)
    return(find);                    /*ERROR IN DATA FIELD*/
   while (data[i] != ETB)                      /*LOOP UNTIL END OF BLOCK*/
    {
     i++;
     while (data[i] != STX)                /*LOOP PAST SKU FIELD*/
      i++;
     i++;
     while (data[i] != STX)                /*LOOP PAST BUTTON FIELD*/
      i++;
     i++;
     while (data[i] != STX && data[i] != ETB) /*LOOP UNTIL END OF QUANTITY FIELD
*/
      {
       if (data[i] != '/')
        {
         if (keystr[0] == data[i])
          {
           i++;
           if (keystr[1] == data[i] && data[i] != '/')
            {
             find = TRUE;
             return(find);
            }
          }
        }
       i++;
      }
    while (data[i] != ETX)
     i++;
    i++;
   }
  return(find);
  }
```

```
/*******************************************************************************
*  FUNCTION NAME        MODULE NAME        PROGRAM NAME
*  IRQ                  IRQ.C              COMET CONTROL
*===============================================================================
*   DESCRIPTION
*      THIS IS THE IRQ INTERRUPT ROUTINE.  WE WILL ENTER THIS ROUTINE WHEN A
*      SELECTION BUTTON HAS BEEN PUSHED.
*   GLOBALS SALE1 AND SALE2 ARRAY CALCULATIONS (WORST CASE ANALYSIS)
*       EACH SKU CAN HAVE 6 BYTES WITHOUT THE TIME AND DATE FIELD.  ASSUMMING
*       32 SKUS, WE HAVE 6 * 32 = 192 + 1 (ETB) = 193 BYTES.  THERE ARE 36 BINS
*       SO IF EACH BIN IS FULL AND WE SELL OUT AND EACH TIME AND DATE FIELD
*       IS NINE BYTES LONG. WE HAVE 9 BYTES * 6 SALES PER BIN * 36 BINS =
*       1944 BYTES. ADD THE 193 BYTES TO GET A TOTAL OF 2137 BYTES. MULTPLY
*       2137 BY TWO FOR TWO CARTRIDGES AND WE GET 4274.
*   CALLING CONVENTION
*      ITEMS      START.ASM FILE
*   FUNCTIONS CALLED FROM IRQ()
*      STRFIND    SEARCH1.C
*      MODEMINT   CMODEM.C
*      FNDBUT     SEARCH1.C
*      MEMGET     INOUT.C
*      MEMPUT     INOUT.C
*      CHKOUT     CHKOUT.C
*      ITOA       ITOA.C
*      STRFIND    SEARCH1.C
*      HANGUP     CMODEM.C
*      R_CLK      CLOCK.C
*      W_CLK      CLOCK.C
*      MTRSRCH    MOTOR1.C
*      MTRHOME    MOTOR1.C
*      STATUS     MTEST.C
*   EXAMPLE OF DATA STORED IN SALE
*   STX(SKU)STXETXSTX(SKU)STX(TIME AND DATE)ETXETB
*   REVISIONS
*   REV    DATE      ENGINEER      DESCRIPTION OF CHANGE
*******************************************************************************/

#include "io.h"

extern unsigned found, dataloc;
extern char bank1[], bank2[], time[], date[], modem, saleflag, pcat, select;
extern char retcnt1, retcnt2;

/*GLOBALS*/
char sale[maxsale]; /*STORES THE TIME AND DATE OF EACH SKU THAT IS SOLD*/
char skudata[4];  /*SKU DATA*/

irq()
 {
  char *data;        /*POINTER USED FOR ARRAY BANK1 OR BANK2*/
  char keystr[5];    /*ASCII BUTTON NUMBER*/
  char cnt1;         /*CNT1 WILL BE USED A COUNTER VARIABLE*/
  char message;      /*MESSAGE FROM MICRO*/
  char deliver;      /*FLAG FOR DELIVERY BIN*/
  int bin;      /*BIN WILL HOLD THE INTEGER VALUE THAT WE SEND TO MOTOR1*/
  char bank;         /*BANK = 1, BANK1. BANK = 2, BANK2*/
```

```
char quant;          *QUANT HOLDS THE QUANTITY IN THE QUANTITY FIELD*/
char button;        /*HOLDS THE INTERGER VALUE OF THE BUTTON PRESSED*/
char temp1;         /*TEMPORARY STORAGE*/
char temp2;          *TEMPORARY STORAGE*/
char regaddr;       /*REGISTER ADDRESS TO BE SENT TO THE CLOCK*/
char count;         /*COUNTER FOR THE STOCK ARRAY*/
char search;        /*FLAG TO SEARCH SECOND BANK IF OUT OF STOCK IN FIRST BANK*/
char skutake;       /*SKU TAKEN FLAG*/
char aligned;       /*FLAG TO MAKE SURE BIN ALIGNED*/
char dumpret;
unsigned cnt2;          /*ADDRESS COUNTER FOR AN ARRAY*/
unsigned cnt3;          /*ADDRESS COUNTER FOR AN ARRAY*/
unsigned salecnt;   *HOLDS THE VALUE OF THE ARRAY FOR SALES*/
unsigned add;        *TEMPORARY STORAGE VALUE*/
unsigned save1;     /*TEMPORARY STORAGE VALUE*/
unsigned save2;     /*TEMPORARY STORAGE VALUE*/
unsigned strtquan;  /*START QUANTITY ADDRESS*/
unsigned strtbin;   /*START OF BIN FIELD ADDRESS*/
unsigned tempcnt;   /*TEMORARY COUNTER*/

memout(PIA1CRA,0X3C);   /*TOGGLES WATCHDOG TIMER*/
memout(PIA1CRA,0X34);
button = memget(ACIA2DR);
status(2,0X7F,2);
memout(ACIA2DR,'W');  /*PLEASE WAIT COMMAND*/
memout(ACIA2SR,0X55);               /*DISABLE INTERRUPT*/
memout(ACIA1SR,0X55);            /*DISABLE MODEM AND PC*/
itoa(button,keystr);                /*CONVERT INTEGER TO ASCII*/
if (select == 1)
 {
  bank = 1;
  data = &bank1[0]; /*BANK1 (MAGAZINE 1)*/
 }
else
 {
  if (select == 2)
   {
    data = &bank2[0];
    bank = 2; /*BANK2 (MAGAZINE 2)*/
   }
  else
   {
    beep('L');
    goto end;
   }
 }
memout(PIA1CRA,0X3C);  /*TOGGLES WATCHDOG TIMER*/
memout(PIA1CRA,0X34);
fndbut(keystr,data);                 /*FIND THE BUTTON*/
search = TRUE;
if (dataloc == 0)
 {
 search2:
  search = FALSE;
  if (bank == 1)
   {
    bank = 2;
    data = &bank2[0];
   }
  else
   {
    bank = 1;
    data = &bank1[0];
   }
  memout(PIA1CRA,0X3C);  /*TOGGLES WATCHDOG TIMER*/
  memout(PIA1CRA,0X34);
```

```
  fndbut(keystr,data);     /*IS THE BUTTON IN VALID*/
  if (dataloc == 0)
   {
    beep('L');          /*BAD BEEP*/
    goto end;           /*BUTTON NOT FOUND*/
   }
 }
save1 = dataloc;                   /*SAVE THE ADDRESS*/
while (data[dataloc] != STX)     /*GETS US TO THE BIN FIELD*/
 dataloc++;
strtbin = dataloc;
dataloc++;
while (data[dataloc] != STX)
 dataloc++;                      /*GET TO QUANTITY FIELD*/

strtquan = dataloc + 1;              /*POINTS TO FIRST QUANTITY*/
save2 = strtquan;                    /*SAVE FOR OUT OF STOCK CHECK*/
quant = '0';
memput(PIA1CRA,0X3C);  /*TOGGLES WATCHDOG TIMER*/
memput(PIA1CRA,0X34);
while (quant == '0')               /*KEEP LOOPING UNTIL QUANTITY IS NOT 0*/
 {
  if (data[strtquan] == ETX)
    goto out;                      /*WE ARE OUT OF STOCK FIRST TIME*/
  dataloc = strtbin + 1;            /*DATALOC = START BIN*/
  bin = 0;
  while (data[dataloc] != 0X2F) /*LOOP UNTIL READ IN FIRST BIN. 2F = '/'*/
   {
    bin = 10 * bin + data[dataloc] - '0'; /*CONVERTS BIN TO INTEGER*/
        dataloc++;
   }
  strtbin = dataloc;               /*START BIN = DATALOC*/
  dataloc = strtquan;               /*DATALOC = START QUANTITY*/
  quant = data[dataloc];          /*GET THE QUANTITY*/
  strtquan = dataloc + 2;          /*POINTS TO NEXT QUANTITY*/
  if (data[strtquan] == ETX && data[dataloc] == '0')
   {
out:
    if (search == TRUE)
     goto search2;
    beep('L');
    goto end;     /*OUT OF STOCK HAS BEEN PUSHED*/
   }
 }

beep('S');    /*GOOD BEEP*/
if (bank == 1)
  dumpret = 0X02;
else
  dumpret = 0X04;

deliver = FALSE;         /*WE ARE NOT GOING DELIVERY BIN*/
mtrsrch(bin,deliver,bank);
aligned = align();
if (aligned == FALSE)
 {
  mtrhome(0);
  goto end;
 }
memput(PIA2DRA,dumpret);      /*PICKER IN POSITION*/
skuget(bank);          /*GET THE ICE CREAM OUT OF THE BIN*/
deliver = TRUE;        /*WE ARE GOING TO DELIVERY POSITION*/
mtrsrch(bin,deliver,bank);  /*GO TO DELIVERY POSITION*/
aligned = align();
if (aligned == FALSE)
 {
```

```
  dial(4);
  for(;;);                     /*LOOP UNTIL RESET OCCURS*/
 }
skutake = bindump(bank);          /*DUMP THE ICE CREAM*/
status(2,0X7F,2);
memout(ACIADR,'W'); /*PLEASE WAIT COMMAND*/
delay(0X0500);
if (bank == 1)
 bin = 37;             /*GO TO 5TH VANE ON HORIZONTAL BAR FOR DELIVERY*/
else
 bin = 38;             /*GO TO 2ND VANE ON HORIZONTAL BAR FOR DELIVERY*/
mtrhome(bin);
memout(PIA1CRA,0X3C);   /*TOGGLES WATCHDOG TIMER*/
memout(PIA1CRA,0X34);
data[dataloc] = data[dataloc] - 1; /*SUBTRACT THE QUANTITY*/
dataloc = save1;                   /*GET ORGINAL BUTTON ADDRESS*/
while (data[dataloc] != STX)
 dataloc--;                     /*LOOP UNTIL REACH BEGINNING OF BUTTON FIELD*/
save1 = dataloc;
dataloc--;
cnt1 = 3;
while (data[dataloc] != STX)
  {
   cnt1--;
   skudata[cnt1] = data[dataloc--]; /*LOOP UNTIL THE BEGINNING OF THE SKU FIELD
*/
  }
memout(PIA1CRA,0X3C);  /*TOGGLES WATCHDOG TIMER*/
memout(PIA1CRA,0X34);
cnkout(button,save1,save2,bank);
memout(PIA1CRA,0X3C);  /*TOGGLES WATCHDOG TIMER*/
memout(PIA1CRA,0X34);
dataloc++;                     /*SETS US TO THE FIRST ENTRY OF SKU FIELD*/
strfind(sale,skudata);          /*FIND THE POSITION OF THE SKU*/
read_clk();
cnt2 = found;
for (cnt3 = found;sale[cnt3] != ETB;cnt3++) /*MAKE SURE ENOUGH ROOM IN ARRAY*/
 ;
salecnt = cnt3;
memout(PIA1CRA,0X3C);  /*TOGGLES WATCHDOG TIMER*/
memout(PIA1CRA,0X34);
if (skutake == FALSE)
 {
  if (bin == 37)      /*BIN 1 SELECTED*/
   retcnt1++;
  else
   retcnt2++;         /*BIN 2 SELECTED*/
 }
if (cnt3 < (maxsale - 9) && skutake == TRUE) /*MAKE SURE WE HAVE ROOM*/
 {
  while (sale[cnt2] != ETX)    /*LOOP UNTIL END OF TIME AND DATE FIELD*/
   cnt2++;
  for (cnt3 = cnt2;sale[cnt3] != ETB;cnt3++); /*LOOP UNTIL END OF SALE FIELD*/
  add = cnt3 + 9;
  while (cnt3 >= cnt2)
   sale[add--] = sale[cnt3--]; /*SHIFT EVERYTHING TO THE RIGHT*/
  found = cnt2;
  for (cnt1 = 0;cnt1 < 4;cnt1++)                /*FILL UP WITH THE TIME*/
   sale[found++] = time[cnt1] + 48;          /*SAVE ASCII VALUE*/
  for (cnt1 = 0;cnt1 < 4;cnt1++)
   sale[found++] = date[cnt1] + 48;            /*FILL THE DATE*/
  sale[found] = '/';                 /*SEPERATE TIME AND DATE*/
  saleflag = FALSE;
 }
if (salecnt >= (maxsale - 45)) /*WE ONLY HAVE ROOM FOR 5 MORE SALES*/
 saleflag = TRUE;  /*WE HAVE A OVERFLOW OF SALES*/
```

```
 datadis(sale);
end:
 memout(PIA1CRA,0X3C);   /*TOGGLES WATCHDOG TIMER*/
 memout(PIA1CRA,0X34);
 modemint();               /*RESET PARAMETERS IF MODEM OR PC ON LINE*/
 if (modem == TRUE || pcat == TRUE)
  {
   pcat = FALSE;          /*PCAT OFF LINE*/
   modem = FALSE;         /*MODEM OFF LINE*/
   hangup();                         /*BACK TO THE MAIN ROUTINE*/
  }
 memout(PIA1CRA,0X3C);   /*TOGGLES WATCHDOG TIMER*/
 memout(PIA1CRA,0X34);
 status(2,0X7F,2);
 memout(ACIA2DR, A );
 memout(PIA1CRA,0X3C);   *TOGGLES WATCHDOG TIMER*/
 memout(PIA1CRA,0X34);
 status(1,0X7D,2);
 message = memget(ACIA2DR);          /*RECIEVE THE CARRIAGE RETURN*/
 if (message != 0X0D)
  {
   disl(4);            /*MACHINE MALFUNCTION*/
   for(;;);                 /*LOOP FOREVER SINCE MACHINE WILL NOT RUN*/
  }
/*  printf("IRQ0\n");*/
/*  memout(ACIA2SR,0X95);     ENABLE INTERRUPT*/
 return;
}
```

```
/**************************************************************************
*  FUNCTION NAME                  MODULE NAME          PROGRAM NAME
*  INITDATA                       INITDATA.C           COMET CONTROL
*=========================================================================
*  DESCRIPTION
*    THIS FUNCTION WILL WRITE DATA TO THE PRICE FIELD AND THE DATA FIELD AFTER
*    A CARTRIDGE LOAD IS SUCCESSFUL.
*  FUNCTIONS CALLED
*    STRFIND  SEARCH1.C
*  FUNCTIONS THAT CALL INITDAT
*    DATAKEY  FILE KEY.C
*  REVISIONS
*  REV        DATE       ENGINEER       DESCRIPTION OF CHANGE
**************************************************************************/
#include "io.h"

extern char price[], sale[], bank1[], bank2[], stkout[], holdsku[], outstock;

initdata()
  {
   unsigned save;    /*TEMPORARY COUNTER STORAGE*/
   char find;        /*TRUE IF SKU FOUND, FALSE IF SKU NOT FOUND*/
   char k;           /*COUNTER*/
   char doloop;      /*COUNTER TO DO LOOP 2 TIMES FOR SALE AND PRICE FIELD*/
   char sku[5];      /*TEMPORARY STORAGE FOR SKU*/
   unsigned max;     /*MAXIMUM ARRAY SIZE FOR PRICE OR SALE FIELDS*/
   char *data;       /*POINTER TO SALE OR PRICE FIELD*/
   unsigned i;       /*COUNTER*/
   unsigned count;   /*COUNTER*/
   unsigned j;       /*COUNTER*/

   if (holdsku[0] == ETB)
    return;                /*BAD DATA WAS ENTERED, DON'T RECORD DATA*/
   max = maxprc;
   data = &price[0]; /*DATA = PRICE FIELD*/
   for (doloop = 0;doloop < 2;doloop++) /*LOOP TWICE FOR PRICE AND SALE FIELDS*/
    {
     i = 0;
     while (data[i] != ETB && i < max) /*LOOP UNTIL END OF DATA FIELD*/
      i++;
     j = 0;
     if (data[i] == ETB && i < max) /*WE HAVE VALID DATA IN RAM*/
      {
       i = 0;
       while (data[i] != ETB) /*LOOP UNTIL END OF FIELDS*/
        {
         memput(PIA1CRA,0X3C);  /*TOGGLES WATCHDOG TIMER*/
         memput(PIA1CRA,0X34);
         save = i;
         i++;
         k = 0;
         while (data[i] != STX)     /*READ IN SKU NUMBER*/
          sku[k++] = data[i++];
         while (data[i] != ETX) /*LOOP UNTIL NEXT SKU FIELD*/
```

```
  i++;
 i++;                          /*WE NOW POINT AT THE NEXT SKU NUMBER*/
 find = strfind(bank1,sku); /*IS THE SKU VALID*/
 if (find == FALSE) /*SKU NOT FOUND IN BANK1*/
  {
   find = strfind(bank2,sku); /*IS THE SKU IN BANK2*/
   if (find == FALSE) /*SKU NOT FOUND IN BANK2*/
    {                   /*DELETE THE SKU IN THE FIELD*/
     count = i;
     i = save;
     while (data[count] != ETB)    /*SHIFT EVERYTHING LEFT*/
      data[save++] = data[count++];
     data[save] = ETB;
    }
  }
}
while (holdsku[j] != ETB)
 {
  memout(PIA1CRA,0X3C);   /*TOGGLES WATCHDOG TIMER*/
  memout(PIA1CRA,0X34);
  save = j;
  k = 0;
  j++;                          /*GET US PASSED THE STX CHARACTER*/
  while (holdsku[j] != ETX) /*READ IN THE SKU NUMBER*/
   sku[k++] = holdsku[j++];
  j++;
  find = strfind(data,sku);       /*FIND THE SKU*/
  if (find == FALSE)        /*IF SKU NOT RECORDED*/
   {                        /*BUILD FIELD*/
    while (holdsku[save] != ETX)
     data[i++] = holdsku[save++]; /*BUILD THE FIELD*/
    data[i++] = STX;
    if (max == maxprc) /*IF MAX = MAXPRC THEN BUILD PRICE FIELD*/
     {
      for (k = 0;k < 4;k++)
       data[i++] = ':'; /*':' = TO A BLANK ON THE DISPLAY*/
     }
    data[i++] = ETX;
    data[i] = ETB;
   }
 }
}
else /*ELSE THIS IS THE FIRST TIME DATA HAS BEEN ENTERED IN MACHINE*/
 {
  j++;
  i = 0;
  k = 0;
  while (holdsku[j] != ETX)
   sku[k++] = holdsku[j++];
  find = FALSE;
  while (holdsku[j] != ETB) /*BUILD THE FIELD*/
   {
    memout(PIA1CRA,0X3C);   /*TOGGLES WATCHDOG TIMER*/
    memout(PIA1CRA,0X34);
    j++;
    if (find == FALSE)
     {
      data[i++] = STX;
      for(k = 0;k < 3;k++)
       data[i++] = sku[k];
      data[i++] = STX;
      if (max == maxprc) /*COMPLETE THE PRICE FIELD IF MAX = 641*/
       {
        for (k = 0;k < 4;k++)
         data[i++] = ':';
       }
```

```
            data[i++] = ETX;
            data[i] = ETB;
           }
          if (holdsku[j] != ETB) /*WE STILL HAVE MORE DATA TO RECORD*/
           {
            j++;
            k = 0;
            while (holdsku[j] != ETX)
             sku[k++] = holdsku[j++];
            find = strfind(data.sku);
           }
         }
       }
      data = &sale[0]; /*SALE FIELD*/
      max = maxsale; /*MAXIMUM CHARACTERS ALLOWED IN THE FIELD*/
     }
*       printf("outstock is %x\n", outstock);
     printf("initdata stock");
        datadis(stkout);*/
     i = 0;
     while (stkout[i] != ETB && i <= maxout) /*LOOP UNTIL END OF DATA FIELD*/
      i++;
     j = 0;
     if (stkout[i] == ETB && i <= maxout) /*WE HAVE VALID DATA IN RAM*/
      {
       i = 0;
/*      printf("valid out of stock data\n");*/
      while (stkout[i] != ETB) /*WE WILL DELETE ANY OUT OF STOCK INFORMATION*/
       {                      /*IF THE SKU DOES NOT EXIST*/
        memout(PIA1CRA,0X3C);  /*TOGGLES WATCHDOG TIMER*/
        memout(PIA1CRA,0X34);
        save = i;
        i++;
        k = 0;
        while (stkout[i] != ETX)     /*READ IN SKU NUMBER*/
         sku[k++] = stkout[i++];
        while (stkout[i] != ETX)
         i++;
        i++;                         /*WE NOW POINT AT THE NEXT SKU NUMBER*/
        find = strfind(bank1.sku); /*IS THE SKU VALID*/
        if (find == FALSE)
         {
          find = strfind(bank2.sku); /*LOOK IN BANK2*/
          if (find == FALSE) /*IF FALSE THEN DELETE OUT OF STOCK*/
           {
            count = i;
            i = save;
            while (stkout[count] != ETB)    /*SHIFT EVERYTHING LEFT*/
             stkout[save++] = stkout[count++];
            stkout[save] = ETB;
            outstock--;
           }
         }
       }

     }
/*   printf("outstock is %x\n", outstock);
   datadis(stkout);
   printf("price");
   datadis(price);
   printf("sale");
   datadis(sale);*/

   return;
  }
```

```
*****************************************************************************
*   FUNCTION NAME              MODULE NAME              PROGRAM NAME
*   SETUP                      INIT.C                   COMET CONTROL
*============================================================================
*   DESCRIPTION
*     THIS SUBROUTINE WILL INITIALIZE ALL PIA'S AND ACIA'S.  I WILL ALSO
*     DISABLE ALL CHIP SELECTS, READS, AND WRITES.  ALL OUT OF STOCK LED'S
*     WILL BE TURNED OFF, KEYBOARD DISPALY WILL BE CLEARED.
*   DESCRIPTION OF PORTS
*     PIA2 U6 ON CONTROL MODULE
*      PA6 -      LIMIT SWITCH RELAY RELASE OUTPUT
*      PA5 -      SIDE 2 DOOR LATCH
*      PA4 -      SIDE 1 DOOR LATCH
*      PA3 -      PICKER DUMP 2
*      PA2 -      PICKER DUMP RTURN 2
*      PA1 -      PICKER DUMP RETURN 1
*      PA0 -      PICKER DUMP 1
*      PB0 -      HOME VERTICAL SWITCH INPUT
*      PB1 -      HOME HORIZONTAL SWITCH INPUT
*      PB2 -      DOOR SWITCH INPUT (FIRQ INTERRUPT)
*      PB3 -      FRONT PICKER SWITCH INPUT
*      PB4 -      BACK PICKER SWITCH INPUT
*      PB5 -      PRICE DISPLAY SWITCH INPUT
*      PB6 -      TEST SWITCH INPUT
*      PB7 -      ICE CREAM TAKEN SWITCH
*      CA1 -      MAGAZINE 2 INPUT TRIP SWITCH
*      CA2 -      MAGAZINE 1 INPUT TRIP SWITCH
*     NOT USED PINS ARE PA7, CB1, AND CB2.
*     PIA1 U7 ON CONTROL MODULE
*      PB0 -      TOP VERTICAL HALL EFFECT SENSOR FOR MOTOR POSITION
*      PB1 -      BOTTON VERTICAL HALL EFFECT SENSOR FOR MOTOR POSITION
*      PB2 -      RIGHT HORIZONTAL HALL EFFECT SENSOR FOR MOTOR POSITION
*      PB3 -      LEFT HORIZONTAL HALL EFFECT SENSOR FOR MOTOR POSITION
*      PB4 -      DC SOLONOID 2
*      PB5 -      SPEED CONTROL FOR VERTICAL MOTOR
*      PB6 -      SPEED CONTROL FOR HORIZONTAL MOTOR
*      PB7 -      DC SOLONOID 1
*      PA0 -      HORIZONTAL BRAKE CONTROL FOR MOTOR
*      PA1 -      HORIZONTAL CW/CWW CONTROL FOR MOTOR
*      PA2 -      HORIZONTAL START/STOP CONTROL FOR MOTOR
*      PA3 -      VERTICAL FOWARD/REVERSE CONTROL FOR MOTOR
*      PA4 -      VERTICAL BRAKE CONTROL FOR MOTOR
*      PA5 -      VERTICAL START/STOP CONTROL FOR MOTOR
*      PA6 -      DELIVERY DOORS INPUT SWITCH
*      PA7 -      HOME VERTICAL SWITCH FOR AUTO LOADING INPUT
*      CA2 -      WATCHDOG TIMER
*      CA1 -      RETURN BIN INPUT
*      NOT USED PINS ARE CB1, CB2
*     PIA4 U2 ON PIA MODULE (CB2 AND CA2 ARE USE FOR I/O CONTROL)
*      PB0 - PB7 I/O DATA BUSS FOR A/D, CLOCK, DISPLAY, CARTRIDGES, SERVICE KEYB
OARD
*      PA0 - PA4 UPPER ADDESSES FOR CARTRIDGES, ADDRESS FOR CLOCK
*      PA5 - REGISTER SELECT FOR DISPLAY
*      PA6 - READ/WRITE FOR DISPLAY
*      PA7 - ENABLE FOR DISPLAY
*      CA1 - INTERRUPT INPUT FROM A/D
*      NOT USED PIN IS CB1
```

```
*      PINOUT OF PIA MODULE (PORT A) DEDICATED FOR OUTPUTS, PORT B IS CONTROLLED
*      BY CB2.
*       PA0 - CHIP SELECT FOR REAL TIME CLOCK
*       PA1 - READ FOR REAL TIME CLOCK
*       PA2 - WRITE FOR REAL TIME CLOCK
*       PA3 - WRITE FOR A/D
*       PA4 - CHIP SELECT FOR A/D
*       PA6 - CARTRIDGE ADDRESS/CLOCK SELECT
*       PA7 - KEYBOARD OUTPUT ENABLE
*       CA1 - DATA AVAILABLE OUTPUT FROM 74C922
*       CA2 - RING INDICATOR INPUT
*        NOT USED PINS ARE PB0 - PB7, CB1, PA5
*    FUNCTIONS CALLED
*     MEMPUT  INOUT.C
*     PUCSET  DISPLAY.C
*     BUSY    DISPLAY.C
*     ICNT    DISPLAY.C
*     ENTR.   DISPLAY.C
*     RESET   DISPLAY.C
*     R_CLK   CLOCK.C
*     W_CLK   CLOCK.C
*     MEMGET  INOUT.C
*     TEST    TESTMDE.C
*     CLRRAM  UTILITY.C
*    REVISIONS
*    REV     DATE     ENGINEER      DESCRIPTION OF CHANGE
*****************************************************************************/

#include "ic.h"

extern char modem, bincall, phncnt, icnt, outstock, pcat, cartrge;
extern char intflag, vanilla, load;
extern char retcnt1, retcnt2, errmsch, select;

 *GLOBAL*
char cold;   /*VARIABLE IN RAM TO CHECK IF COLD START*/
char initread: /*FLAG USED IN REC_OUT SO WE DON'T RECORD OUT OF STOCK INFO*/

char setup()
{
 char flag, testmde; /*FLAG FOR TEST MODE*/
 char *string;

/*IN PRODUCTION WE CANNOT DELAY 1.2 SECONDS SINCE IF WE USE THE WATCHDOG TIMER
  THERE WILL BE A RESET EVERY .85 SECONDS.  WE DELAYED 1.2 SECONDS SINCE THERE
  IS A RESET AFTER POWER UP AT .35 SECONDS. THIS RESET LASTS .85 SECONDS SO THE
  TIME POWER IS APPLIED UNTIL THE TIME RESET STAYS HIGH THERE IS A 1.7 SECOND
  DELAY*/

  memput(ACIA2CR,0X03);       /*RESET ACIA*/
  memput(ACIA2CR,0X55);       /*8 DATA BITS, NO PARITY, 1 STOP BIT, INT SET*/

/*  memput(ACIA3CR,0X03);
  memput(ACIA3CR,0X55);*/   /*for extra boards*/

/*  memput(ACIA1CR,0X03);
  memput(ACIA1CR,0X55);  TAKE COMMENT OUT WHEN PROMS BURNED*/

  memput(PIA1CRA,0X30);      /*CA2 OUTPUT, CA1 INPUT ACTIVE LOW*/
  memput(PIA1CRB,0X32);      /*CB2 OUTPUT, CB1 INPUT ACTIVE HIGH*/
  memput(PIA1DRB,0XF0);      /*PB0 - PB3 ARE INPUTS*/
  memput(PIA1DRA,0XFF);      /*ALL OUTPUTS*/
  memput(PIA1CRA,0X34);      /*OUTPUT REGISTER SELECTED*/
  memput(PIA1CRB,0X36);      /*OUTPUT REGISTER SELECTED*/
  memput(PIA1DRA,0X3C);      /*TURN MOTORS OFF*/
  memput(PIA1DRB,0X60);      /*PB5, PB6 ARE HIGH, PB4, PB7 ARE LOW (SOLONOIDS OFF)
*/
```

```
 memout(PIA2CRA,0X00);      /*PORT A SETUP*/
 memout(PIA2DRA,0XFF);      /*PORT A BITS 0,1,2,3,4,5,6,7 OUTPUTS.*/
 memout(PIA2CRA,0X34);      /*CA2, CA1 SET HIGH TO LOW*/
 memout(PIA2DRA,0X00);
 memout(PIA2DRA,0X40);      /*OPEN UP REED RELAY, DISABLE BEEPER*/

 memout(PIA2CRB,0X00);      /*PORT B SETUP*/
 memout(PIA2DRB,0X00);      /*PORT B ALL INPUTS*/
 memout(PIA2CRB,0X04);      /*DATA OUTPUT REGISTER SELECTED, CA1, CB1 SET HIGH TO
LOW*/


 memout(PIA3CRA,0XFD);      /*02 HEX, CA1 SET LOW TO HIGH, CB2 INPUT HIGH TO LO*
/

 memout(PIA3DRA,0X00);      /*FF HEX, PORTA ALL OUTPUTS*/
 memout(PIA3CRA,0XFF);      /*06 HEX, DATA OUTPUT REGISTER SELECTED*/
 memout(PIA3DRA,0X00);      /*REAL TIME CLOCK, A/D, 74C922 CARTRIDGE ADDRESS DISA
BLED*/
 memdat(PIA3DRA);           /*CLEAR THE CA2 INTERRUPT FLAG*/
 memout(PIA3CRB,0XFF);      /*00 HEX*/
 memout(PIA3DRB,0XFF);      /*00 HEX, PORT B ALL INPUTS*/
 memout(PIA3CRB,0XFB);      /*DATA OUTPUT REGISTER SELECTED*/

 /*CA2 AND CB2 CONTROL THE PORTS DIRECTION*/
 memout(PIA4CRB,0XCF);       /*30 HEX, CB2 LOW, DATA DIRECTION REGISTER SELECTED*
/
 memout(PIA4CRA,0XCF);       /*30 HEX, CA2 LOW, DATA DIRECTION REGISTER SELECTED*

 memout(PIA4DRB,0X00);       /*FF HEX, PORTB ALL OUTPUTS*/
 memout(PIA4DRA,0X00);       /*FF HEX, PORTA ALL OUTPUTS*/
 memout(PIA4CRB,0XCB);       /*34 HEX, CB2 LOW (PORTB OUTPUTS), OUTPUT REGISTER S
ELECTED*/
 memout(PIA4DRB,0XFF);       /*00 HEX, ALL 0'S WRITTEN TO PORTB*/
 memout(PIA4CRA,0XCB);       /*34 HEX, CA2 LOW (PORTA OUTPUTS), OUTPUT REGISTER S
ELECTED*/
 memout(PIA4DRA,0XDF);       /*20 HEX, PA0-PA4, PA6, PA7 ARE LOW, PA5 HIGH*/


/*  dalav(0X4500);   */



  fncset();                   /*THIS IS THE SETUP FOR THE DISPLAY MODULE*/
  delay(0X0016);              /*WAIT AT LEAST 4.1 msec*/
  fncset();
  delay(0X000D);              /*WAIT AT LEAST 100 usec*/
  fncset();
  busy();
  fncset();
  busy();
  onoff(0XF7);                /*TURN DISPLAY OFF*/
  busy();
  clear();
  busy();
  entry();
  busy();
  onoff(0XF3);               /*TURN DISPLAY ON*/
  reset();                   /*END DISPLAY MODULE SETUP*/
  string = "INITIALIZING";
  w_str(string);
  delay(0X4500);
 /* delay(0X0A00);              DELAY TO LET KEYBOARD MICRO TO INITIALIZE*/
```

```
intflag = FALSE;            /*WE ARE NOT IN AN INTERRUPT*/
errmach = FALSE;
if (cold != 0X55)           /*COLD START*/
  {
   clrram();                /*CLEAR ALL RAM*/
   retcrtl = 0;             /*INITIALIZE*/
    stcntl = 0;
   select = 0;
   idcnt = 0;
   outstock = 0;
   cincall = 0;
   phncnt = 0;
   tanillg = FALSE;
   clkinit();               /*INITIALIZE CLOCK*/
   status(1,0X0E,2);        /*WAIT FOR CLEAR TO SEND FROM MICRO*/
   load = TRUE;
   cold = 0X55;       /*SET FLAG FOR WARM START*/
  }
else
  {
   r_clk(0X00);                 /*CLEAR INTERRUPT FLAG IF SET*/
   w_clk(0X01);                 /*START OPERATION OF CLOCK*/
   status(1,0X0E,2);      /*WAIT FOR A CLEAR TO SEND FROM OTHER MICROPROCESSOR*/
   cartrge = TRUE;            /*SET UP FOR GETSKU CALL*/
   memget(ACIA2SR);
   memget(ACIA2DR);
   initread = TRUE;           /*SET INITIAL READ FLAG*/
   getsku();                  /*READ THE SKU DATA*/
   cartrge = FALSE;           /*CARTRGE NOT LOADED FLAG*/
   initread = FALSE;          /*SET INITIAL READ FLAG TO FALSE*/
  }
r_clk(0X00);                   /*CLEAR INTERRUPT FLAG IF SET*/
w_clk(0X01);                   /*START OPERATION OF CLOCK*/
train();                       /*TRAIN THE MODEM*/
modem = FALSE;                 /*MODEM NOT ON LINE SO MODEM IS FALSE*/
pcat = FALSE;                  /*PC AT IS NOT ON LINE SO PCAT IS FALSE*/
memget(PIA2DRA); /*CLEAR INTERRUPT FLAG TO GET READY FOR MAGAZINE LOAD*/
testmde = memget(PIA2DRB) & 0X40; /*ARE WE IN TEST MODE*/
if (testmde == 0X40)
 test();
return;
}
```

```
/*****************************************************************************
*   FUNCTION NAME              MODULE NAME           PROGRAM NAME
*   REVIEW                     REVIEW.C              COMET CONTROL
*=============================================================================
*   DESCRIPTION
*     THIS FUNCION WILL REVIEW THE SKU'S.  THE USER WILL BE ABLE TO EDIT AND
*     AND DELETE BUTTON AND BIN ASSIGNMENTS AND QUANTITIES.
*   FUNCTIONS CALLED
*     FILLSKU    OP.C
*     W_STR      DISPLAY.C
*     LOOK       REVIEW.C
*     KEYBOARD   KEYBOAD.C
*     GETKEY     KEYBOAD.C
*   FUNCTIONS THAT CALL REVIEW
*     ASSIGN     OP.C
*   REVISIONS
*   REV    DATE    ENGINEER      DESCRIPTION OF CHANGE
*****************************************************************************/

#include "io.h"

extern unsigned found;
extern char clr;

/*GLOBALS*/
char clrbin;   /*FLAG IF BIN WAS CLEARED*/
char *string;  /*USED WITH FILE OP.C TO PASS STRING TO DISPLAY*/

review(data)
 char data[];
 {
  unsigned position; /*POSITION COUNTER*/
  unsigned j;        /*COUNTER*/
  unsigned save;     /*TEMPORARY STORAGE*/
  unsigned startbut: /*START BUTTON*/
  unsigned startb:   /*START BIN*/
  unsigned startq:   /*START QUANTITY*/
  char mode:         /*MODE = 0, BUTTON MODE. MODE = 1, BIN MODE, MODE =2, QUANT
ITY MODE*/
  char keystr;       /*DATA FROM KEYBOARD*/

  position = found + 2:           /*POINTS TO FIRST ENTRY IN BUTTON FIELD*/
  startbut = position:            /*START BUTTON. FIRST BUTTON IN FIELD*/
  clr = FALSE:                    /*SET FLAG*/
  mode = 0;                       /*BUTTON MODE*/
  string = "Button # ";
  while (clr == FALSE)            /*LOOP UNTIL CLEAR IS ENTERED*/
   {
    save = position;     /*SAVE THE POSITION COUNTER*/
    position = look(position,mode,data); /*LOOK AT DATA IN BUTTON FIELD*/
    if (clr == TRUE)              /*IF A CLEAR WAS ENTERED*/
     {
      while (data[position] != STX) /*LOOP UNTIL WE REACH BIN FIELD*/
       position++;
     }
    else
     {
```

```
      if (position == save)              /*MUST BE AT END OF BIN FIELD*/
       {
        keystr = getkey('C','E');
        if (keystr == 'C')           /*KEYSTROKE = CLEAR*/
          clr = TRUE;                    /*GET OUT OF REVIEW*/
        else
         if (keystr == 'E')        /*KEYSTROKE = ENTER*/
           position = found + 2; /*GO BACK TO BEGINNING OF BUTTON FIELD*/
        }
      }
   }
  clr = FALSE;
  position++;                      /*POINT TO FIRST ENTRY IN BIN FIELD*/
  startb = position;               /*START BIN = POSTION COUNTER*/
  save = position;  /*SAVE THE POSITION COUNTER*/
  while (data[position] != STX)            /*GET TO QUANTITY FIELD*/
   position++;
  position++; /*WE ARE NOW AT FIRST ENTRY IN QUANTITY FIELD*/
  startq = position;        /*SAVE LOCATION OF START QUANTITY*/
  for (;;)
   {
    position = save;            /*POSITION IS AT FIRST LOCATION IN BIN FIELD*/
    mode = 1;                   /*BIN MODE*/
    string = "Bin # ";
  loop:
    position = look(position,mode,data); /*LOOK AT DATA IN BIN FIELD*/
    if (clrbin == FALSE && position == save) /*ENTER A BIN NUMBER IF THESE ARE T
RUE*/
      {
      position = fillsku(position,'3',data);    /*FILL THE BIN NUMBER*/
      if (clr == TRUE)               /*CLEAR WAS PUSHED*/
       break;                        /*SO WE GET OUT*/
      if (position == save)          /*ENTER WAS PUSHED*/
        {
        position = startb;           /*POSITION EQUALS START BIN*/
        while (data[position] != STX) /*GETS US TO THE QUANTITY FIELD*/
         position++;
        position++;                  /*WE ARE AT FIRST LOCATION OF QUANTITY FIELD*/
        startq = position;           /*SAVE THE POSITION*/
        position = startb;           /*POSITION IS FIRST LOCATION OF BIN FIELD*/
        save = position;             /*SAVE THE POSITION VALUE*/
        goto loop;                   /*LETS LOOK AT FIRST BIN ENTRY*/
       }
      startq = startq + 3;       /*ADD 3 SINCE A BIN WAS ENTERED AND EVERYTHING*/
     }                           /*WAS SHIFTED TO THE RIGHT 3 TIMES*/
    save = position;
    position = startq;
    if (clrbin == TRUE)          /*IF CLRBIN IS TRUE THEN WE WANT TO CLEAR THE*/
     {                           /*ASSOCIATED QUANTITY WITH THAT BIN*/
      position = startq - 3;     /*SINCE BIN WAS DELETED EVERYTHING WAS SHIFTED*/
      if (data[position] == ETX) /*TO THE LEFT 3 TIMES*/
       {                         /*IF ETX THEN WE ARE AT END OF QUANTITY FIELD*/
        while (data[position] != STX) /*LOOP TO FIRST LOCATION OF QUANTITY*/
         position--;
        position++;       /*WE ARE NOW AT FIRST LOCATION OF THE QUANTITY FIELD*/
       }
      startq = position;  /*WE ARE NOW AT FIRST LOCATION OF QUANTITY FIELD*/
      for (j = position;j < (position + 2);j++) /*CLEAR THE FIELD ENTRY*/
           {
        data[j] = '0'; /*WE FILL WITH 0'S*/
               }
        while (data[j] != ETB)  /*SHIFT EVERYTHING TO THE LEFT*/
         data[position++] = data[j++];
        data[position] = data[j];       /*DON'T FORGET THE ETB CHARACTER*/
      }
    else
```

```
    {
     mode = 2;                          /*QUANTITY MODE*/
     string = "Quantity ";
     position = look(position,mode,data); /*LOOK AT THE QUANTITY FIELD*/
     while (clrbin == FALSE && position == start1)
      position = fillsku(position,'6',data);    /*MAKE USER ENTER A QUANTITY NUM
BER*/
     start1 = position;        /*WE GET BACK LAST ENTRY IN QUANTITY FIELD*/
     clr = FALSE;             /*JUST IN CASE A CLEAR WAS ENTERED*/
    }
   }
  return;
 }


/*****************************************************************************
*   FUNCTION NAME
*   LOOK
*============================================================================
*   DESCRIPTION
*     THIS FUNCTION WILL LOOK AT THE KEYBOARD ENTRY AND IF A CLEAR IS ENTERED
*     THE DATA IN THE FIELD WILL BE DELETED THEN SHIFTED TO THE LEFT UNTIL THE
*     THE NEXT ENTRY IN THE FIELD IS ENCOUNTERED.
*     VARIABLES RECIEVED     I     ADDRESS LOCATION OF DATA
*                                  MODE FLAG FOR QUANTITY, BIN, OR BUTTON MODE
*   FUNCTIONS CALLED
*     W_STR      DISPLAY.C
*     W_DISP     DISPLAY.C
*     RESET      DISPLAY.C
*     KEYBOARD   KEYBOAD.C
*     GETKEY     KEYBOAD.C
*   FUNCTIONS THAT CALL LOOK
*     REVIEW     REVIEW.C
*   REVISIONS
*   REV      DATE      ENGINEER       DESCRIPTION OF CHANGE
****************************************************************************/

look(i,mode,data)
 unsigned i;
 char mode, data[];
 {
  unsigned j;     /*COUNTER*/
  unsigned save;  /*TEMPORARY STORAGE*/
  char keystr;    /*DATA FROM KEYBOARD*/

  clrbin = FALSE;
  reset();
  w_str(string);
  save = i;
  if (data[i] != STX && data[i] != ETX)
   {
    while (data[i] != 0X2F)          /*NOT EQUAL TO '/'*/
     {
      w_disp(data[i]); /*DISPLAY THE DATA*/
      i++;
     }
      keystr = getkey('C','E');            /*WAIT FOR RESPONSE*/
      if (keystr == 'C' && mode != 0)     /*CLEAR THE ENTRY, BIN OR QUANTITY*/
       {
        reset();
        w_str(string);
        for (j = save;j <= i;j++)    /*FILL WITH NULLS*/
         data[j] = '0';
        i = save;                    /*SAVE THE POSITION COUNTER*/
        while (data[j] != ETB)       /*SHIFT EVERYTHING TO THE LEFT*/
         data[i++] = data[j++];
        data[i] = data[j];         /*DON'T FORGET THE ETB CHARACTER*/
```

```
        i = save;
        if (mode != 2)                    /*IF BIN MODE*/
          clrbin = TRUE;
        }
      else
        i++;
    }
  if (mode == 0 && keystr == 'C')
    clr = TRUE;
  return(i);
 }

/*TEST ROUTINE*/
datadis(tdata)
 char tdata[];
 {
  unsigned i;
/*  printf("\n");
  i = 0;
  if (tdata[i] == STX)
   {
    for (i = 0;tdata[i] != ETB;i++)
     {
      memout(PIA1CRA,0X3C);
      memout(PIA1CRA,0X34);
      if (tdata[i] == 0X03)
       printf("E");
      else
       if (tdata[i] == 0X02)
        printf("S");
         else
          printf("%c", tdata[i]);
        }
    printf("\n");
  }*/
 return;
}
```

```
/***************************************************************************
*    FUNCTION NAME            MODULE NAME         PROGRAM NAME
*    MEMGET                   INOUT.C             COMET CONTROL
*==========================================================================
*    DESCRIPTION
*      THIS FUNCTION WILL READ MEMORY FROM THE ACIA AND THE PIA'S.
*    PARAMETERS PASSED
*      ADDRESS  CONTAINS ADDRESS THAT WE ARE TO READ
*    PARAMETERS RETURNED
*      *ADDRESS CONTAINS THE DATA THAT WE READ
*    REVISIONS
*    REV    DATE        ENGINEER         DESCRIPTION OF CHANGE
***************************************************************************/

#include "ic.h"

char memget(address)
 char *address;
 {
  return(*address);
 }

/***************************************************************************
*   FUNCTION NAME
*   MEMPUT
*==========================================================================
*   DESCRIPTION
*    THIS FUNCTION WILL WRITE TO MEMORY (PIA'S AND ACIA'S).
*   PARAMETERS PASSED
*    ADDRESS  CONTAINS THE ADDRESS WE ARE TO WRITE TO
*    VALUE    CONTAINS THE BYTE THAT WE ARE TO WRITE
*   REVISIONS
*   REV    DATE      ENGINEER         DESCRIPTION OF CHANGE
***************************************************************************/

char memput(address,value)
 char value, *address;
 {
  *address = value;
  return;
 }

/***************************************************************************
*  FUNCTION NAME
*  PRT4IN
*==========================================================================
*  DESCRIPTION
*   THIS FUNCTION CONFIGURES PORT B (PIA4) ON THE PIA MODULE AS INPUTS.
*   WE SET CB2 HIGH WHICH SETS THE 74LS245'S TO INPUTS
*  FUNCTIONS CALLED
*   MEMPUT      INOUT.C
*  REVISIONS
*  REV      DATE      ENGINEER      DESCRIPTION OF CHANGE
***************************************************************************/

prt4in()
  {
```

```
  memout(PIA4CRB,0xC7);   /*38 HEX, DATA DIRECTION REGISTER SELECTED, CB2 HIGH*/

  memout(PIA4DRB,0xFF);   /*00 HEX, PB0-PB7 ARE INPUTS*/
  memout(PIA4CRB,0xCC);   /*33 HEX, DATA OUTPUT REGISTER SELECTED*/
 }

/**************************************************************************
* FUNCTION NAME
* PRT4OUT
*=========================================================================
* DESCRIPTION
*  THIS FUNCTION CONFIGURES PORT B (PIA4) ON THE PIA MODULE AS OUTPUTS.
*  WE SET CB2 LOW WHICH SETS THE 74LS245'S TO OUTPUTS.
* FUNCTIONS CALLED
*  MEMPUT   INOUT.C
* REVISIONS
*  REV     DATE        ENGINEER          DESCRIPTION OF CHANGE
**************************************************************************/

prt4out()
 {
  memout(PIA4CRB,0xCF);   /*30 HEX, DATA DIRECTION REGISTER SELECTED, CB2 LOW*/
  memout(PIA4DRB,0x00);   /*FF HEX, PB0-PB7 ARE OUTPUTS*/
  memout(PIA4CRB,0xCB);   /*34 HEX, DATA OUTPUT REGISTER SELECTED*/
 }
```

```
/*****************************************************************************
*  FUNCTION NAME          MODULE NAME        PROGRAM NAME
*  CONNECT                MODTALK.C          COMET CONTROL
*============================================================================
*  DESCRIPTION:
*    IF WE AUTO ANSWER THEN WE COME HERE FOR COMMANDS FROM THE WHAREHOUSE
*    MODEM.  WE WILL EITHER CLEAR SALES. SEND ALL INFORMATION. SEND PART
*    INFORMATION. SEND TIME AND DATE OF SALES. SEND OUT OF STOCK
*    INFORMATION. OR CHANGE THE DATE.
*  FUNCTIONS CALLED
*    W_CLK       CLOCK.C
*    STATUS      MTEST.C
*    MEMGET      INOUT.C
*    CLR_SALE    COMMUN.C
*    MEMPUT      INOUT.C
*    LF_CR       COMMUN.C
*    TDSALE      COMMUN.C
*    SENDSTK     OUT.C
*    CDATE       COMMUN.C
*  REVISIONS:
*  REV   DATE   ENGINEER    DESCRIPTION OF CHANGE
*****************************************************************************/

#include "io.h"

extern char sale[], id[], idcnt, time[], date[], bank1[], ascideg[];
extern char bank2[];
extern char retcnt1, retcnt2;
 connect()
  {
   char save;       /*CHARACTER RECIEVED FROM ACIA. CONTROL N*/
   char control;    /*CONTROL CHARACTER TO SELECT FUNCTION*/
   char stat;       /*STATUS MESSAGE RETURNED BY THE ACIA STATUS REGISTER*/
   char regaddr;    /*REGISTER ADDRESS THAT WILL BE WRITTEN TO THE CLOCK*/

   save = 0;
   regaddr = 0X03;              /*CLOCK INTERRUPT REGISTER SELECTED*/
   w_clk(regaddr);
   regaddr = 0XFE;              /*SINGLE INTERRUPT OF 30 SECONDS*/
   w_clk(regaddr);
   while (save != 0X11)         /*LOOP UNTIL A CONTROL Q IS ENTERED*/
    {
     regaddr = 0X00;              /*START THE INTERRUPT*/
     w_clk(regaddr);
     stat = status1(1,0X7D,1); /*WAIT FOR A MESSAGE FROM PC MODEM*/
     if (stat > 3)
      break;
     regaddr = 0X01;          /*STOP THE INTERRUPT WHILE SENDING DATA*/
     w_clk(regaddr);
     control = memget(ACIA1DR);
     if (save == 0X0E)    /*IF SAVE = CONTROL N*/
      {
       switch (control)
        {
         case 'R':    /*REMOVE ALL SALES*/
          clr_sale();
```

```
        break;
       case 'A':     /*SEND DATA AND TIME OF DATE OF SALE*/
        senddat();
        lf_cr();
        tdsale();    /*TIME AND DATE OF SALE*/
        break;
       case 'P':     /*SEND ONLY DATA*/
        senddat();
        break;
       case 'T':     /*SEND THE TIME AND DATE OF THE SALES*/
        tdsale();
        break;
       case 'O':     /*SEND THE OUT OF STOCK LIST*/
        sendstk();
        break;
       case 'C':      *CHANGE THE TIME AND DATE*/
        cdate();
        break;
/*      case 'D':      CHANGE PRICING
        chgprc();
        break;*/
       case 'S':     /*REFRIGATION STATUS*/
        refrig();
        break;
      }
     lf_cr();
    }
   save = control;
  }
 return;
}


/**************************************************************************
*  FUNCTION NAME
*  HEADER1
*=========================================================================
*  DESCRIPTION:
*     THIS SUBROUTINE WILL SEND THE MACHINE ID#, CURRENT TIME AND DATE,
*     THE TEMPERATURE, AND THE RETURN BIN QUANTITY.
*  FUNCTIONS CALLED
*     BLANKS     COMMUN.C
*     READ_CLK   CLOCK.C
*     SEND_CLK   COMMUN.C
*     STATUS     MTEST.C
*     MEMPUT     INOUT.C
*     LF_CR      COMMUN.C
*  REVISIONS:
*   REV   DATE   ENGINEER     DESCRIPTION OF CHANGE
**************************************************************************/

header1()
 {
  char i;  /*COUNTER VARIABLE*/
  char retcnt;
  int asciret[5];

  for (i = 0;i < idcnt;i++)
   {                         /*SEND OVER THE MACHINE ID NUMBER*/
    status1(2,0X7F,1);
    memput(ACIA1DR,id[i]);
   }
  blanks(1);                 /*SEND BLANKS OVER FOR READIBILITY*/
  read_clk();
  send_clk();                 /*SEND THE TIME AND DATE*/
  blanks(1);                 /*SEND OVER THE BLANKS*/
```

```
[illegible]
  {
   status1(2,0X7F,1);
   memput(ACIA1DR,ascideg[i]); /*SEND TEMPERATURE*/
  }
 blanks(1);
 retcnt = retcnt1 + retcnt2;
 asciret[1] = retcnt / 10 + 48;    /*CONVERT TO TWO ASCII CHARACTERS*/
 asciret[2] = retcnt % 10 + 48;
 status1(2,0X7F,1);
 memput(ACIA1DR,asciret[1]); /*SEND RETURN BIN QUANTITY*/
 status1(2,0X7F,1);
 memput(ACIA1DR,asciret[2]); /*SEND RETURN BIN QUANTITY*/
 lf_cr();
 return;
}


/****************************************************************************
*  FUNCTION NAME
*  HEADER2
*============================================================================
*  DESCRIPTION:
*     THIS SUBROUTINE WILL SEND THE MACHINE ID#, CURRENT TIME AND DATE
*  FUNCTIONS CALLED
*     BLANKS   COMMUN.C
*     STATUS   MTEST.C
*     MEMPUT   INOUT.C
*     READ_CLK CLOCK.C
*     SEND_CLK COMMUN.C
*  REVISIONS:
*   REV   DATE   ENGINEER     DESCRIPTION OF CHANGE
****************************************************************************/

header2()
 {
  char i; /*COUNTER VARIABLE*/

  blanks(1);
  for (i = 0;i < idcnt;i++)
   {                           /*SEND OVER THE MACHINE ID NUMBER*/
    status1(2,0X7F,1);
    memput(ACIA1DR,id[i]);
   }
  blanks(1);                   /*SEND BLANKS OVER FOR READIBILITY*/
  read_clk();
  send_clk();                   /*SEND THE TIME AND DATE*/
  lf_cr();
  return;
 }


/****************************************************************************
*  FUNCTION NAME
*  LF_CR
*============================================================================
*  DESCRIPTION:
*     THIS SUBROUTINE SENDS A LINE FEED AND A CARRIAGE RETURN TO THE MODEM.
*  FUNCTIONS CALLED
*     STATUS   MTEST.C
*     MEMPUT   INOUT.C
****************************************************************************/

lf_cr()
 {
  status1(2,0X7F,1);
  memput(ACIA1DR,0X0A);     /*SEND A LINE FEED*/
  status1(2,0X7F,1);
  memput(ACIA1DR,0X0D);     /*SEND A CARRIAGE RETURN*/
  return;
 }
```

```
**************************************************************************************
*  FUNCTION NAME
*  BLANKS
*=====================================================================================
*  DESCRIPTION:
*      THIS SUBROUTINE WILL SEND BLANKS (20 HEX) TO THE MODEM.
*  FUNCTIONS CALLED
*      STATUS   MTEST.C
*      MEMPUT   INOUT.C
*  PARAMETERS PASSED:
*      VALUE      THE NUMBER OF BLANKS THAT ARE TO BE SENT TO THE MODEM.
*************************************************************************************/

blanks(value)
 char value;
 {
  char i; /*COUNTER VARIABLE*/

  for (i = 0;i <= value;i++)
   {
    status1(2,0X7F,1);
    memput(ACIA1DR,(' '));       /*SEND THE BLANKS TO THE MODEM*/
   }
  return;
 }

/*************************************************************************************
*  FUNCTION NAME
*  SEND_CLK
*=====================================================================================
*  DESCRIPTION:
*    THIS SUBROUTINE WILL SEND THE CURRENT TIME AND DATE TO THE MODEM.
*    EXAMPLE OF TIME AND DATE SENT  03:33 08/4/87
*  FUNCTIONS CALLED
*      STATUS  MTEST.C
*      MEMPUT  INOUT.C
*      BLANKS  COMMUN.C
*  REVISIONS:
*   REV   DATE   ENGINEER      DESCRIPTION OF CHANGE
*************************************************************************************/

send_clk()
 {
  char i; /*COUNTER VARIABLE*/

  for (i = 0; i < 4;i++)          /*LOOP 7 TIMES TO SEND TIME*/
   {
    status1(2,0X7F,1);
    memput(ACIA1DR,(time[i] + 48)); /*SEND THE ASCII VALUE OF TIME*/
   }
  blanks(1);
  for (i = 0;i < 6;i++)               /*LOOP 6 TIMES TO SEND THE DATE*/
   {
    status1(2,0X7F,1);
    memput(ACIA1DR,(date[i] + 48)); /*SEND THE ASCII DATE*/
   }
 return;
}
```

```
/*****************************************************************************
*  FUNCTION NAME
*  TDSALE
*============================================================================
*  DESCRIPTION:
*     THIS FUNCTION WILL SEND TO THE MODEM THE TIME AND DATE OF EACH SALE
*  FUNCTIONS CALLED
*     STATUS   MTEST.C
*     MEMPUT   INOUT.C
*     SEND_CLK COMMUN.C
*     LF_CR    COMMUN.C
*  REVISIONS:
*  REV   DATE    ENGINEER      DESCRIPTION OF CHANGE
*****************************************************************************/

tdsale()
 {
  char k:       /*COUNTER VARIABLE*/
  unsigned i: /*ADDRESS COUNTER FOR SALE ARRAY*/

  i = 0:
  if (sale[i] != STX)           /*NO DATA IN MACHINE*/
   return:
  while (sale[i] != ETB)         /*LOOP UNTIL END OF BLOCK CHARACTER*/
   {
    status1(2,0X7F,1);              /*ETX CHARACTER IS WRITTEN*/
    memput(ACIA1DR,sale[i]);
    i++;
    while (sale[i] != STX)     /*SEND THE SKU NUMBER*/
     {
      status1(2,0X7F,1);
      memput(ACIA1DR,sale[i]);
      i++;
     }
    status1(2,0X7F,1);              /*WRITE STX CHARACTER*/
    memput(ACIA1DR,sale[i]);
    i++;
    while (sale[i] != ETX)
     {
      status1(2,0X7F,1);
      memput(ACIA1DR,sale[i]);
      i++;
     }
    status1(2,0X7F,1);
    memput(ACIA1DR,sale[i]);   /*SEND OVER ETX CHARACTER*/
    i++;
   }
 status1(2,0X7F,1);
 memput(ACIA1DR,sale[i]); /*SEND OVER THE ETB CHARACTER*/
 return;
}

/*****************************************************************************
*  FUNCTION NAME
*  CLR_SALE
*============================================================================
*  DESCRIPTION:
*     THIS IS THE CLEAR SALE SUBROUTINE.  THIS SUBROUTINE WILL CLEAR ALL
*     SALES RECORDED.
*  FUNCTIONS CALLED
*     LF_CR  COMMUN.C
*  REVISIONS:
*  REV   DATE   ENGINEER     DESCRIPTION OF CHANGE
*****************************************************************************/

clr sale()
```

```
{
 unsigned temp; /*TEMPORARY VALUE TO HOLD K*/
 unsigned i;    /*ADDRESS COUNTER FOR ARRAY*/
 unsigned k;    /*ADDRESS COUNTER FOR ARRAY*/

 i = 0;
 while (i < maxsale && sale[i] != ETB)
  i++;
 if (i < maxsale)
  {

   i = 0;
   while (sale[i] != ETB)
    {
     memout(PIA1CRA,0X3C);          /*TOGGLE WATCHDOG TIMER*/
     memout(PIA1CRA,0X34);
     i++;               /*WE POINT AT FIRST POSITION OF THE SKU NUMBER*/
     while (sale[i] != ETX)
      i++;              /*LOOPS US PAST THE SKU NUMBER*/
     i++;               /*WE ARE AT THE SALE FIELD*/
     sale[i++] = ETX;   /*TERMINATE WITH A ETX CHARACTER*/
     k = i - 1;         /*K POINTS TO THE STX CHARACTER*/
     while (sale[i] != STX && sale[i] != ETB)
      i++;              /*LOOP TO THE NEXT SKU*/
     temp = k;          /*SAVE THAT POSITION*/
     while (sale[k] != ETB)
      {
       k++;
       sale[k] = sale[i++]; /*DELETE THE SALE FIELD*/
      }
     i = temp + 1; /*I PONITS TO STX OF NEXT SKU WHOSE SALE FIELD IS TO BE DELE
TED*/
    }
  }
 return;
}

/*******************************************************************************
*  FUNCTION NAME
*  CDATE
*==============================================================================
*  DESCRIPTION:
*    THIS FUNCTION WILL READ IN THE TIME AND DATE FROM THE MODEM.  DATA WILL
*    COME IN TENS OF YEARS, UNITS OF YEARS, TENS OF MONTHS, UNIT OF MONTHS,
*    TENS OF DAYS, UNITS OF DAYS, TENS OF HOURS, UNITS OF HOURS, TENS OF
*    MINUTES, UNITS OF MINUTES, AND A CARRIAGE RETURN WILL TERMINATE THE
*    ENTRY.
*    FUNCTIONS CALLED
*     W_CLK     CLOCK.C
*     STATUS    MTEST.C
*     MEMGET    INOUT.C
*     READ_CLK  CLOCK.C
*     SEND_CLK  COMMUN.C
*  PARAMETER PASSED:
*    REGADDR   REGADDR HIGHER ORDER BITS CONTAIN THE ADDRESS TO WRITE TO AND
*              THE LOWER ORDER BITS CONATAIN THE DATA TO WRITE.
*  REVISIONS:
*  REV     DATE     ENGINEER          DESCRIPTION OF CHANGE
*******************************************************************************/

cdate()
 {
  char stat;        /*STATUS MESSAGE RETURNED FROM ACIA*/
  char x;           /*ADDRESS COUNTER FOR TIMEDT ARRAY*/
```

```
RN*/
  char timedt[15]; /*AN ARRAY TO HOLD THE TIME DATA*/
  char regaddr;    /*REGISTER ADDRESS TO SEND TO THE CLOCK*/
  char addr;       /*ADDRESS OF EACH TIME UNIT*/

  for(x = 0;x < 11;x++)
   timedt[x] = 0;          /*INITIALIZE*/
  x = 0;
  for (x = 0;end != 0X0D;x++) /*LOOP UNTIL A CARRIAGE RETURN IS ENTERED*/
   {
    if (x > 13)                 /*ERROR IN ENTERING DATA*/
     return;                  /*GET OUT*/
    stat = status1(1,0X7D,1);     /*WAIT FOR INPUT*/
    if (stat > 3)
         return;
    timedt[x] = memget(ACIA1DR);
    end = timedt[x];
   }
  addr = 0XD0;                   /*START ADDRESS AT TENS OF YEARS*/
  x = 0;
  while (addr != 0X40)           /*LOOP UNTIL ADDRESS = UNITS OF MINUTES*/
   {                             /*LOOK AT MM58274 REGISTER ADDRESSING*/
    regaddr = addr | (timedt[x] - 48); /*DON'T WANT ASCII VALUE*/
    w_clk(regaddr);
    addr = addr - 0X10;           /*GET TO NEXT REGISTER*/
    x++;
   }
  regaddr = 0X30;                 /*TENS OF SECONDS = 0*/
  w_clk(regaddr);
  regaddr = 0X20;                 /*UNITS OF SECONDS = 0*/
  w_clk(regaddr);
  read_clk();
  send_clk();                     /*SEND BACK NEW VALUE*/
  return;
 }

/*****************************************************************************
*  FUNCTION NAME
*  SENDDAT
*============================================================================
*  DESCRIPTION
*   SENDS ALL THE DATA IN BANK1 AND BANK2
*  FUNCTIONS CALLED
*    STATUS     MTEST.C
*    MEMPUT     INOUT.C
*  REVISIONS
*   REV      DATE       ENGINEER      DESCRIPTION OF CHANGE
*****************************************************************************/

senddat()
 {
  char x;            /*LOOP COUNTER*/
  char *data;        /*DATA POINTER TO BANK1 OR BANK2*/
  unsigned datacnt; /*POSITION COUNTER FOR DATA*/

  data = &bank1[0];               /*DATA NOW POINTS TO BANK1 DATA*/
  for (x = 0; x < 2;x++)
   {
    if (data[0] != STX)           /*NO DATA IN MACHINE*/
     return;
    for (datacnt = 0;data[datacnt] != ETB;datacnt++)
     {
      status1(2,0X7F,1);
      memput(ACIA1DR,data[datacnt]);
     }
    if (x == 1)  /*ONLY SEND OVER ETB CHARACTER IF WE ARE DONE SENDING*/
     {
```

```
      status1(2,0X7F,1);
      memout(ACIA1DR.data[datacnt]);  /*SEND OVER THE ETB CHARACTER*/
     }
    else
     lf_cr();    /*SEND OVER A LINE FEED AND A CARRIAGE RETURN TO SEPERATE CARTRI
DGES*/
    data = &bank2[0];
   }
  return;
 }

/***************************************************************************
*  FUNCTION NAME
*  REFRIG
* =========================================================================
*  DESCRIPTION
*   THIS FUNCTION WILL CHECK THE STATUS OF REFRIGATION INPUTS.
*  REVISIONS
*   REV      DATE      ENGINEER      DESCRIPTION OF CHANGE
****************************************************************************/

refrig()
 {
  char value;     /*STATUS VALUES*/
  char adc;       /*ADAPTIVE DEFROST REQUEST*/
  char imr;       /*IMMEDIATE MAINTAINCE REQUEST*/
  char rmr;       /*ROUTINE MAINTAINCE REQUEST*/
  char *messg;    /*MESSAGE TO BE WRITTEN TO MODEM*/

  value = ~memget(PIA3DRB);
  value = ~memget(PIA3DRB) & 0X07;    /*GET THE STATUS VALUES*/
  adc = value & 0X01;        /*ADAPTIVE DEFROST CONTROL*/
  imr = value & 0X02;        /*IMMEDIATE MAINTAINCE REQUEST*/
  rmr = value & 0X04;        /*ROUNTINE MAINTAINCE REQUEST*/
  if (adc == 0X00)
   messg = "ADC=PASS ";
  else
   messg = "ADC=FAIL ";
  talk(messg);
  if (imr == 0X02)
   messg = "IMR=PASS ";
  else
   messg = "IMR=FAIL ";
  talk(messg);
  if (rmr == 0X04)
   messg = "RMR=PASS ";
  else
   messg = "IMR=FAIL ";
  talk(messg);
  lf_cr();
  return;
 }
```

```
/*****************************************************************************
*   FUNCTION NAME          MODULE NAME          PROGRAM NAME
*   KEYBOARD               KEYBOAD.C            COMET CONTROL
*============================================================================
*   DESCRIPTION
*      THIS MODULE READS DATA FROM THE KEYBOARD.  WE THEN CALL W_DISP TO
*      DISPLAY THE SELECTION.
*   FUNCTIONS CALLED
*      MEMGET   INOUT.C
*      BEEP     KEYBOAD.C
*      OUT      START.ASM
*      PRT4IN   INOUT.C
*      PRT4OUT  INOUT.C
*   PARAMTER RETURNED      KEYSTR    (RETURNS THE VALUE PRESSED)
*   REVISIONS
*   REV    DATE    ENGINEER      DESCRIPTION OF CHANGE
*****************************************************************************/

#include "io.h"

extern char keys[];

char Keyboard()
 {
  char i;          /*VARIABLE TO HOLD DATA AFTER READING IT*/
  char keystr;     /*KEYSTROKE ENTERED FROM KEYBOARD*/
  char interr;     /*INTERRUPT FLAG TO TELL US DOOR HAS BEEN CLOSED*/

  keystr = 'I';
  while (keystr == 'I')
   {
    memget(PIA3DRA);                              /*CLEARS INTERRUPT FLAGS*/
    prt4in();  /*PORT4 ARE INPUTS*/
    memput(PIA3DRA,0X80);  /*7F HEX, KEYBOARD SELECTED*/
    i= 0;interr = 0;
    while ((i != 0X79 && i != 0X39) && interr != 0X04)    /*WAIT UNTIL KEY HAS BE
EN PUSHED*/
      {
       memput(PIA1CRA,0X3C);  /*TOGGLES WATCHDOG TIMER*/
       memput(PIA1CRA,0X34);
       i =  memget(PIA3CRA);
       interr = memget(PIA2DRB) & 0X04;        /*LOOK FOR AN INTERRUPT*/
      }
     i = ~memget(PIA4DRB) & 0X0F;    /*MASK OFF TOP 4 BITS*/
     memput(PIA3DRA,0X00);  /*FF HEX, KEYBOARD DESELECTED*/
     prt4out(); /*PORT4 ARE OUTPUTS*/
     if (interr == 0X04)
      out();                        /*IF AN INTTERUPT HAS OCCURRED THEN GET OUT*/
     keystr = keys[i];
     if (keystr == 'I')             /*INVALID KEY HAS BEEN PRESSED*/
      beep('L');
   }
  return(keystr);
 }
```

```
*    FUNCTION NAME
*    GETKEY
*==========================================================================
*    DESCRIPTION
*      THIS FUNCTION WILL GET A KEYSTROKE FROM THE KEYBOARD AND WE WILL RETURN
*      THE KEYSTROKE IF IT IS ENTRY1 OR ENTRY2.  ALL OTHER KEYS WILL BE INVALID
*      ENTRY1 AND ENTRY2 WILL BE A 'Y', 'N', 'C', OR 'E'.
*    PARAMETERS PASSED
*      ENTRY1    VALID KEY
*      ENTRY2    VALID KEY
*    PARAMETER RETURNED
*      KEYSTR    A YES OR A NO
*    FUNCTIONS CALLED
*      KEYBOARD  KEYBOAD.C
*    REVISIONS
*    REV      DATE       ENGINEER       DESCRIPTION OF CHANGE
***************************************************************************/

getkey(entry1,entry2)
 char entry1, entry2;
 {
  char keystr;

  keystr = 0;
  while (keystr != entry1 && keystr != entry2)
   {
    keystr = keyboard();
    if (keystr != entry1 && keystr != entry2) /*BAD BEEP IF WRONG ENTRY*/
      beep('L');
   }
/*  if (entry1 != 'C' && entry1 != 'E')  WE DON'T WANT TO DISPLAY THESE CHARACTE
RS
    w_disp(keystr); WRITE THE CHARACTER*/
  beep('S');
  return(keystr);
 }


/**************************************************************************
*    FUNCTION NAME
*    BEEP
*==========================================================================
*    DESCRIPTION
*      THIS IS THE KEYBOARD BEEP ROUTINE.  IF THE KEY SELECTION IS VALID THEN
*      BEEP IS CALLED.
*    FUNCTIONS CALLED
*      MEMPUT  INOUT.C
*      BEEP    KEYBOAD.C
*    PARAMETERS PASSED
*      LENGTH        LENTH IS USED FOR THE TIME OF THE BEEPER TO BE ON
*    REVISIONS
*    REV   DATE    ENGINEER     DESCRIPTION OF CHANGE
***************************************************************************/

beep(length)
 char length;
 {
  char message;

  commnd('B');                      /*BEEPER COMMAND*/
  delay(0X0050);
  status(2,0X7F,2);
  memput(ACIA2DR,length);
  delay(0X0550);
  return;
 }
```

```
/******************************************************************************
*  FUNCTION
*  DELAY
*=============================================================================
*  DESCRIPTION
*    THIS FUNCTION WILL CAUSE A DELAY WHICH IS EQUAL TO TIME x 30 uSEC.
*    THEREFORE, AN INPUT OF A000 HEX (40960 DECIMAL) IS APPROXIMATELY 1.2
*    SECONDS.
*  FUNCTIONS CALLED
*    NONE
*  PARAMETERS PASSED
*    TIME    THE LENGTH OF TIME THE DISPLAY WILL BE
*  REVISIONS
*  REV     DATE     ENGINEER     DESCRIPTION OF CHANGE
*****************************************************************************/

delay(time)
 unsigned time;
 {
  unsigned count;
  for (count = 0; count < time; count++)
   {
    memout(PIA1CRA,0X3C);   /*TOGGLES WATCHDOG TIMER*/
    memout(PIA1CRA,0X34);
   }
  return;
 }
```

```
/******************************************************************************
*  FUNCTION NAME          MODULE NAME              PROGRAM NAME
*  SETTIME                 CLOCK.C                   COMET CONTROL
*=============================================================================
*  DESCRIPTION
*     THIS ROUTINE WILL ENABLE THE OPERATOR TO SET THE CLOCK.  HE WILL BE ABLE
*     TO ENTER THE TIME IN HOURS AND MINUTES USING MILITARY TIME.
*  FUNCTIONS CALLED
*     MEMPUT    INOUT.C
*     W_CLK     CLOCK.C
*     RESET     DISPLAY.C
*     W_STR     DISPLAY.C
*     CLOCK     CLOCK.C
*     CLEAR     DISPLAY.C
*     HOME      DISPLAY.C
*  REVISIONS
*  REV     DATE      ENGINEER       DESCRIPTION OF CHANGE
******************************************************************************/

#include "io.h"

extern char dispcount;

/*GLOBALS*/
char time[10]; /*ARRAY THAT HOLDS TIME INFORMATION, MINUTES, SECONDS, ETC.*/
char date[10]; /*ARRAY THAT HOLDS DATE INFOMATION, MONTH, DAY, ETC*/

/*STATIC GLOBAL*/
static char *string; /*POINTER TO A STRING THAT WILL BE PASSED TO DISPLAY*/

char settime()
{
 char tens;     /*TENS PLACE*/
 char units;    /*UNITS PLACE*/
 char tnumber;  /*TENS MAXIMUM NUMBER*/
 char unumber;  /*UNITS MAXIMUM NUMBER*/
 char regaddr;  /*REGISTER ADDRESS*/
 char flag;     /*FLAG TO TELL SU IF A CLEAR HAS BEEN ENTERED*/

 memout(PIA3DRA,0X00); /*FF HEX, DISABLE REAL TIME CLOCK*/
 regaddr = 0X05;        /*STOP OPERATION OF CLOCK*/
 w_clk(regaddr);
 regaddr = 0XFD;        /*24 HOUR MODE*/
 w_clk(regaddr);

 flag = FALSE;
 while (flag == FALSE)
  {
   reset();
   string = "Enter Hours ";
   w_str(string);
   tens = 0X70;                  /*TENS OF HOURS*/
   units = 0X60;                 /*UNITS OF HOURS*/
   tnumber = 2;                   /*TENS OF HOURS CAN'T BE OVER 2*/
   unumber =4;                   /*UNITS CAN'T BE > THAN 4 IF TENS IS 2*/
   flag = clock(tens,units,tnumber,unumber);
  }
```

```
 flag = FALSE;
while (flag == FALSE)
 {
  reset();
  string = "Enter Minutes ";
  w_str(string);
  tens = 0X50;                          /*TENS OF MINUTES*/
  units = 0X40;                         /*UNITS OF MINUTES*/
  tnumber = 5;                           /*TENS OF MINUTES CAN'T BE GREATER THAN 5*/
  unumber = 9;
  flag = clock(tens,units,tnumber,unumber);
 }
regaddr = 0X30;
w_clk(regaddr);                                 /*TENS OF SECONDS = 0*/
regaddr = 0X20;
w_clk(regaddr);                                 /*UNITS OF SECONDS = 0*/
regaddr = 0X01;                                 /*START CLOCK*/
w_clk(regaddr);
clear();
home();
dispcount = 0;
return;
}

/***************************************************************************
*   FUNCTION NAME
*   SETDATE
*===========================================================================
*   DESCRIPTION
*     THIS FUCNTION WILL ALLOW THE OPERATER TO ENTER THE MONTH. DAY. AND THE
*     YEAR.
*   FUNCTIONS CALLED
*     MEMPUT   INOUT.C
*     W_CLK    CLOCK.C
*     RESET    DISPLAY.C
*     W_STR    DISPLAY.C
*     CLOCK    CLOCK.C
*     CLEAR    DISPLAY.C
*     HOME     DISPLAY.C
*   REVISIONS
*   REV       DATE      ENGINEER       DESCRIPTION OF CHANGE
****************************************************************************/

setdate()
{
 char tens;     /*TENS PLACE*/
 char units;    /*UNITS PLACE*/
 char tnumber;  /*TENS MAXIMUM NUMBER*/
 char unumber;  /*UNITS MAXIMUM NUMBER*/
 char regaddr;  /*REGISTER ADDRESS*/
 char flag;     /*FLAG TO TELL SU IF A CLEAR HAS BEEN ENTERED*/

 memput(PIA3DRA,0X00);      /*FF HEX. DISABLE REAL TIME CLOCK*/
 regaddr = 0X05;            /*STOP OPERATION OF CLOCK*/
 w_clk(regaddr);
 flag = FALSE;
 while (flag == FALSE)
  {
   reset();
   string = "Enter Month ";
   w_str(string);
   tens = 0XB0;                         /*TENS OF MONTHS*/
   units = 0XA0;                        /*UNITS OF MONTHS*/
   tnumber = 1;                          /*TENS OF MONTHS CAN'T BE OVER 1*/
   unumber = 2;
   flag = clock(tens,units,tnumber,unumber);
  }
```

```
flag = FALSE;
while (flag == FALSE)
 {
  reset();
  string = "Enter Day ";
  w_str(string);
  tens = 0X90;                              /*TENS OF DAY*/
  units = 0X80;                             /*UNIT OF DAY*/
  tnumber = 3;                               /*TENS OF DAY CAN'T BE OVER 3*/
  unumber = 2;
  flag = clock(tens,units,tnumber,unumber);
 }
flag = FALSE;
while (flag == FALSE)
 {
  reset();
  string = "Enter Year ";
  w_str(string);
  tens = 0XD0;                              /*TENS OF YEARS*
  units = 0XC0;                             /*UNITS OF YEARS*/
  tnumber = 9;                              /*TENS OF YEARS CAN'T BE OVER 9*/
  unumber = 9;
  flag = clock(tens,units,tnumber,unumber);
 }
regaddr = 0X01;                                   /*START CLOCK*/
w_clk(regaddr);
clear();
home();
dispcount = 0;
return;
}

/*****************************************************************************
*   FUNCTION NAME
*   CLKINIT
*============================================================================
*   DESCRIPTION
*    THIS ROUTINE SETS THE CLOCK TO 00:00 IF WE READ THE CLOCK ON POWER UP
*    OR WHEN THE DOORS CLOSE THE THERE IS A CLOCK ERROR.
*   FUNCTIONS CALLED
*    MEMPUT    INOUT.C
*    W_CLK     CLOCK.C
*   REVISIONS
*   REV    DATE      ENGINEER        DESCRIPTION OF CHANGE
*****************************************************************************/

clkinit()
 {
  char regaddr; /*REGISTER ADDRESS*/

  memput(PIA3DRA,0X00);                 /*FF HEX, DISABLE REAL TIME CLOCK*/
  regaddr = 0X05;                       /*STOP OPERATION OF CLOCK*/
  w_clk(regaddr);
  regaddr = 0XFD;                       /*24 HOUR MODE*/
  w_clk(regaddr);
  w_clk(0X20); /*UNITS SECONDS*/
  w_clk(0X30); /*TENS SECONDS*/
  w_clk(0X40); /*UNITS MINUTES*/
  w_clk(0X50); /*TENS MINUTES*/
  w_clk(0X60); /*UNITS HOURS*/
  w_clk(0X70); /*TENS HOURS*/
  w_clk(0X01); /*START CLOCK*/
  return;
 }
```

```
/*********************************************************
*   FUNCTION NAME
*   DISP_CLK
/=========================================================================
*   DESCRIPTION
*     THIS SUBROUTINE WILL READ THE CLOCK AND DISPLAY IT.  IF THE OPERATOR
*     ENTERS THE CLEAR BUTTON THEN WE MUST RESET THE CLOCK.  THE REASON
*     FOR DOING THIS IS THAT IT IS RECOMMENDED THAT WE STOP THE CLOCK WHEN
*     CHANGING A REGISTER.
*   FUNCTIONS CALLED
*     RESET     DISPLAY.C
*     W_STR     DISPLAY.C
*     READ_CLK  CLOCK.C
*     DELAY     DISPLAY.C
*     SETTIME   CLOCK.C
*     W_DISP    DISPLAY.C
*     BEEP      KEYBOAD.C
*     SETDATE   CLOCK.C
*     KEYBOARD  KEYBOAD.C
*   REVISIONS
*   REV    DATE     ENGINEER    DESCRIPTION OF CHANGE
************************************************************************/

char disp_clk()
{
 char  i;            /*VALUE RETURNED FROM READ_CLK*/
 char temp;          /*TEMPORARY STORAGE FOR ASCII TIME*/
 char keystr;        /*KEYSTROKE ENTERED FROM KEYBOARD*/

 temp = 0;
 keystr = 0;
 while (keystr != 'E')
 {
 loop:
  i = 0XFF;
  while (i == 0XFF)
   {
    i = read_clk();
    if (i == 0XFF)              /*CLOCK ERROR, CAN'T READ DATA*/
     {
      reset();
      string = "Clock Error";
      w_str(string);
      delay(0X1D00);
      delay(0X1D00);
      settime();                  /*NEED TO ENTER TIME*/
     }
   }
  reset();
  if (time[0] == 0)
   w_disp(0XA0);             /*WRITE A SPACE TO DISPLAY*/
  else
   {
    temp = time[0] + 48;     /*ADD 48 SO WE WRITE IN ASCII*/
    w_disp(temp);
   }
  temp = time[1] + 48;
  w_disp(temp);
  w_disp(0X3A);              /*WRITE A ':' TO DISPLAY*/
  temp = time[2] + 48;
  w_disp(temp);
  temp = time[3] + 48;
  w_disp(temp);
  w_disp(0X3A);              /*WRITE A ':' TO DISPLAY*/
  temp = time[4] + 48;
  w_disp(temp);
```

```
  temp = time[3] + 48;
  w_disp(temp);
  keystr = keyboard();
  if (keystr == 'C')              /*IF CLEAR WAS ENTERED THEN WE HAVE A WRONG TIME-
   {
    beep('S');
    settime();                   /*START ALL OVER AND ENTER TIME*/
   }
 }
 beep( 'S' );
 keystr = 0;
 while (keystr != 'E')      /*READ THE DATE*/
 {
  i = read_clk();
  if (i == 0XFF)
   {
    reset();
    string = "Clock Error";
    w_str(string);
    delay(0X1D00);
    delay(0X1D00);
        settime();
        goto loop;
   }
  reset();
  temp = date[0] + 48;
  w_disp(temp);
  temp = date[1] + 48;
  w_disp(temp);
  w_disp(0X2F);                  /*WRITE A '/' TO DISPLAY*/
  temp = date[2] + 48;
  w_disp(temp);
  temp = date[3] + 48;
  w_disp(temp);
  w_disp(0X2F);
  temp = date[4] + 48;
  w_disp(temp);
  temp = date[5] + 48;
  w_disp(temp);
  keystr = keyboard();
  if (keystr == 'C')
   {
    beep('S');
    setdate();
   }
 }
 beep('S');
 return;
}


/*****************************************************************************
*   FUNCTION NAME
*   R_CLK
*=============================================================================
*   DESCRIPTION
*     THIS SUBROUTINE READS THE CLOCK.
*   FUNCTIONS CALLED
*     MEMPUT INOUT.C
*     MEMGET INOUT.C
*   PARAMETERS PASSED
*     REGADDR   CONTAINS ADDRESS TO BE READ FROM
*   PARAMETERS RETURNED
*     REG       REGISTER THAT IS READ
*   REVISIONS
*   REV.  DATE    ENGINEER     DESCRIPTION OF CHANGE
*****************************************************************************/
```

```
r_clk(regaddr)
 char regaddr;
 {
  char reg;   /*REGISTER THAT IS READ*/
  char address: /*ADDRESS TO BE SENT TO CLOCK*/

  address = ((~regaddr >> 4) & 0X0F) | 0XD0;
  memput(PIA4DRA,address):    /*READS UNITS OF SECONDS*/
  prt4in():                   /*PORT4 IS AN INPUT*/
  memput(PIA3DRA,0x03):       /*FC HEX. READ. CS SET LOW*/
  reg = ~memget(PIA4DRB) & 0X0F;        /*MASK OFF TOP 4 BITS*/
  memput(PIA3DRA,0X00);       /*FF HEX. READ. CS SET HIGH*/
  prt4out();
  return(reg);
 }


/***************************************************************************
*   FUNCTION NAME
*   CLOCK
*==========================================================================
*   DESCRIPTION
*     THIS SUBROUTINE CALLS KEYBOARD FOR INPUTS OF MONTH. DAY. YEAR. AND HOURS
*   FUNCTIONS CALLED
*     KEYBOARD KEYBOAD.C
*     BEEP     KEYBOAD.C
*     W_DISP   DISPLAY.C
*     W_CLK    CLOCK.C
*   PARAMETERS PASSED
*     TENS             TENS OF MONTH. DAY. YEAR. OR HOURS
*     UNITS            ONES OF MONTH. DAY. YEAR. OR HOURS
*     NUMBER           MAXIMUM NUMBER IN TENS PLACE
*    PARAMETER RETURNED
*     FLAG             IF CLEAR IS ENTERED FLAG IS SET
*   REVISIONS
*   REV    DATE    ENGINEER       DESCRIPTION OF CHANGE
***************************************************************************/

clock(tens,units,maxten,maxunit)
  char tens, units, maxten, maxunit;
  {
  char x;          /*COUNTER*/
  char array[5];   /*STORAGE FOR ASCII KEYBOARD ENTRY*/
  char i;          /*KEYSTROKE KEYBOARD ENTRY*/
  char tempnum;   /*TEMPORARY INTEGER STORAGE FOR KEYBOARD ENTRY*/
  char flag;      /*FLAG TO TELL CALLING FUNCTION IF A CLEAR HAS BEEN ENTERED*/
  char regaddr;

   x = 0;
   i = 0;
   flag = TRUE;
   while (i != 'E')                  /*LOOP UNTIL ENTER IS ENTERED*/
    {
   loop:
     i = keyboard();
     if (i == 'C')                   /*WAS CLEAR ENTERED*/
     {
          beep('S');
      flag = FALSE;
      return(flag);
     }
     else
      if (x < 2 && i <= '9')         /*ONLY DISPLAY NUMBERS 0 THROUGH 9 ASCII*/
       {
```

```
        tempnum = i - 48;
        if (x == 1 && array[0] >= maxten)
         {
          if (array[0] > maxten || (array[0] == maxten && tempnum > maxunits))
            {
             beep('L'); /*INVALID ENTRY*/
             goto loop;
            }
         }
        w_disp(i);
        beep('S');
        array[x] = i - 48;
        x++;
       }
      else                              /*ELSE INVALID KEY ENTERED*/
       if (i != 'E')
        beep('L');
    }
  beep('S');
  if (array[0] > maxten || x < 2)   /*WRITE THE DATA TO THE CLOCK*/
   {
    regaddr = tens;                 /*ONLY ONE TENS DIGIT WAS ENTERED*/
    w_clk(regaddr);
    regaddr = units + array[0];
    w_clk(regaddr);
   }
  else
   {
    regaddr = tens + array[0];
    w_clk(regaddr);
    regaddr = units + array[1];
    w_clk(regaddr);
   }
  return(flag);
 }

/*****************************************************************************
*   FUNCTION NAME
*   W_CLK
*============================================================================
*   DESCRIPTION
*     THIS SUBROUTINE WRITES DATA TO THE CLOCK
*   FUNCTIONS CALLED
*     MEMPUT  INOUT.C
*   PARAMETERS PASSED
*     INPUTS    REGADDR      REGISTER DATA AND ADDRESS. HIGHER ORDER BITS ARE
*                            ADDRESS. LOWER ORDER BITS ARE DATA
*   REVISIONS
*   REV    DATE    ENGINEER     DESCRIPTION OF CHANGE
*****************************************************************************/

w_clk(regaddr)
 char regaddr;
 {
  char data;  /*DATA TO BE SENT TO CLOCK*/
  char address; /*ADDRESS TO BE SENT TO CLOCK*/

  address = (~regaddr >> 4) & 0XCF;
  data = ~regaddr & 0X0F;       /*DATA IS AT LOWER NIBBLE*/
  prt4out();                    /*PORT B IS OUTPUTS*/
  memput(PIA4DRA,address);
  memput(PIA4DRB,data);
  memput(PIA3DRA,0X05);         /*FA HEX, WR, CS SET LOW*/
  memput(PIA3DRA,0X00);         /*FF HEX, WR, CS SET HIGH*/
  return;
 }
```

```
*************************************************************************
*   FUNCTION NAME
*   READ_CLK
*========================================================================
*   DESCRIPTION
*     THIS FUNCTION WILL SET UP THE CLOCK SO IT CAN BE READ.  WE CALL R_CLK
*     TO READ THE CLOCK.
*   FUNCTIONS CALLED
*     R_CLK CLOCK.C
*   PARAMETER RETURNED
*     I  FLAG FOR CALLING ROUTINE TO RECOGINIZE A CLOCK ERROR
*   REVISIONS
*   REV     DATE     ENGINEER      DESCRIPTION OF CHANGE
*************************************************************************
read_clk()
{
char i;          /*FLAG FOR CALLING ROUTINE*/
char temp;       /*TEMPORARY STORAGE FOR I*/
char regaddr;    /*REGISTER ADDRESS*/

i = 0;
time[5] = 1;
while (temp != time[5] && i != 0XFF)
 {
  regaddr = 0X20;              /*UNITS OF SECONDS*/
  time[5] = r_clk(regaddr);
  regaddr = 0X30;              /*TENS OF SECONDS*/
  time[4] = r_clk(regaddr);
  regaddr = 0X40;              /*UNITS OF MINUTES*/
  time[3] = r_clk(regaddr);
  regaddr = 0X50;              /*TENS OF MINUTES*/
  time[2] = r_clk(regaddr);
  regaddr = 0X60;              /*UNITS OF HOURS*/
  time[1] = r_clk(regaddr);
  regaddr = 0X70;              /*TENS OF HOURS*/
  time[0] = r_clk(regaddr);
  regaddr = 0X20;              /*READ UNITS OF SECONDS AGAIN TO VERIFY*/
  temp = r_clk(regaddr);
  i++;
 }
 regaddr = 0X80;              /*UNITS OF DAYS*/
 date[3] = r_clk(regaddr);
 regaddr = 0X90;              /*TENS OF DAYS*/
 date[2] = r_clk(regaddr);
 regaddr = 0XA0;              /*UNITS OF MONTHS*/
 date[1] = r_clk(regaddr);
 regaddr = 0XB0;              /*TENS OF MONTHS*/
 date[0] = r_clk(regaddr);
 regaddr = 0XC0;              /*UNITS OF YEARS*/
 date[5] = r_clk(regaddr);
 regaddr = 0XD0;              /*TENS OF YEARS*/
 date[4] = r_clk(regaddr);
 return(i);
}
```

```
/*****************************************************************************
*   FUNCTION NAME            MODULE NAME            PROGRAM NAME
*   COMMAND                  TALKMIC.C              COMET CONTROL
*============================================================================
*   DESCRIPTION
*     THIS FUNCTION WILL SEND A COMMAND TO THE COMET KEYBOARD
*   PARAMETERS PASSED
*     CODE    THE CODE THAT IS TO BE SENT TO THE KEYBOARD
*   FUNCTIONS CALLED
*     STATUS  MTEST.C
*     MEMPUT  INOUT.C
*   REVISIONS
*   REV    DATE      ENGINEER        DESCRIPTION OF CHANGE
*****************************************************************************/

#include "io.h"

extern char pdat;

commnd(code)
 char code;
  {
   status(2,0X7F,2);
   memput(ACIACDR,code);
   return;
  }

 /****************************************************************************
 *  FUNCTION NAME
 *  SENDMIC
 *===========================================================================
 *  DESCRIPTION
 *    THIS FUNCTION WILL SEND THE PRICE AND THE BUTTON NUMBERS TO THE
 *    KEYBOARD CONTROLLER. OR OUT OF STOCK INFORMATION.  THE BUTTONS WILL
 *    BE IN INTEGER FORM AND THE PRICE WILL BE IN INTEGER FORM.
 *  PARAMETERS PASSED
 *     INFO         AN ARRAY THAT CONTAINS THE BUTTON NUMBERS THAT ARE OUT OF
 *                  STOCK. OR PRICE DISPLAY INFORMATION.
 *     ON           THIS CHARACTER IS EITHER TRUE OR FALSE.  IF WE WANT TO TURN
 *                  LEDS ON IT IS TRUE. IF WE WANT TO TURN THE LEDS OFF. IT IS
 *                  FALSE.
 *     COUNT        ARRAY POINTER FOR INFO
 *     CODE         TELLS US WHAT CODE WE ARE TO SEND TO KEYBOARD MICROPROCESSOR
 *   PARAMETERS RETURNED
 *     COUNT        ARRAY POINTER
 *   FUNCTIONS CALLED
 *     COMMND    TALK.C
 *     STATUS    MTEST.C
 *     MEMPUT    INOUT.C
 *     DELAY     KEYBOAD.C
 *  REVISIONS
 *  REV     DATE      ENGINEER        DESCRIPTION OF CHANGE
 ****************************************************************************/

 sendmic(info.count.on,code)
  char info[]. count, on. code;
  {
```

```
  commnd(code);
  if (code == 'O')    /*OUT OF STOCK COMMAND*/
    {
    status(2,0X7F,2);
    memout(ACIA2DR,on); /*SEND THE LED ON FLAG*/
   }
  while (info[count] != 3D)  /*3D IS THE TERMINATOR*/
   {
    memout(PIA1CRA,0X3C);    /*TOGGLE WATCHDOG TIMER*/
    memout(PIA1CRA,0X34);
    delay(0X0050);
    status(2,0X7F,2);
    memout(ACIA2DR,info[count]);   /*SEND THE PRICE INFORMATION*/
    count++;
   }
  delay(0X0050);
  status(2,0X7F,2);
  memout(ACIA2DR,info[count]);    /*SEND 3D TO TERMINATE SENDING DATA*/
  count++;
  return(count);
 }

/*************************************************************************************
*   FUNCTION NAME
*   PCCOMMUN
*====================================================================================
*   DESCRIPTION
*     THIS FUNCTION WILL ACKOWLEDGE THE PC WITH A LINE FEED AND A CARRIAGE
*     RETURN AND THEN WE WILL CALL CONNECT.
*   FUNCTIONS CALLLED
*     CONNECT      MODTALK.C
*   REVISIONS
*     REV        DATE       ENGINEER         DESCRIPTION OF CHANGE
*************************************************************************************

pccommun()
 {
  char header;

  header = memget(ACIA1DR);     /*GET THE HEADER DATA*/
/*  printf("header is %x\n", header);*/
  if (header == STX)
   {
    pcat = TRUE;
    connect();            /*CONNECT WITH PC*/
   }
  memget(ACIA1SR);
  memget(ACIA1DR);
  return;
 }
```

```
*******************************************************************************
*   FUNCTION NAME          MODULE NAME          PROGRAM NAME
*   TEMP                   TEMP.C               COMET CONTROL
*==============================================================================
*   DESCRIPTION
*     THIS ROUTINE WILL READ THE A/D CONVERTER TO CHECK IF THE TEMPERATURE HAS
*     GONE ABOVE . DEGREES F.  IF SO, THE BEEPER WILL BE SOUNDED TO WARN THE
*     STORE MANAGER AND A FLAG WILL BE SET TO WARN THE WAREHOUSE OF HIGH
*     TEMPERATURES.
*   FUNCTIONS CALLED
*     MEMGET    INOUT.C
*     MEMPUT    INOUT.C
*     BEEP      KEYBOAD.C
*   REVISIONS
*   REV     DATE      ENGINEER       DESCRIPTION OF CHANGE
*******************************************************************************

#include "io.h"


/*GLOBALS*/
char ascideg[3]:  /*HOLDS THE ASCII NUMBERS OF THE TEMPERATURE*/
int degree:      /*INTEGER VALUE OF DEGREE*/

char temp()
 {
  char i:          /*FALG TO DETERMINE IF INTTERUPT FROM A/D HAS OCCURRED*/
  char value:      /*VALUE OF THE A/D READING*/
  float hold:       /*HOLDS VALUE OF A/D*/
  char samples:    /*COUNTER FOR LOOP*/
  int ascval:      /*ASCII VALUE OF DEGREE*/
  float tempdeg: /*FLOATING VALUE OF DEGREE*/


  ort4in():                      /*PORT4 ARE INPUTS*/
  i = 0:
  hold = 0:
  memput(PIA1CRA,0X3C):              /*TOGGLE WATCHDOG TIMER*/
  memput(PIA1CRA,0X34):
  memput(ACIACR,0XD5):           /*RTS LINE HIGH*/
  for (samples = 0:samples < 4:samples++)
   {
    memget(PIA4DRA):             /*CLEARS THE INTERRUPT FLAG IN CONTROL REGISTER*/
    memput(PIA3DRA,0X10):        /*EF HEX, SET CS LOW*/
    memput(PIA3DRA,0X18):        /*E7 HEX, SET WRITE LOW*/
    memput(PIA3DRA,0X10):        /*EF HEX, SET WRITE HIGH*/
    do
     {
      i = memget(PIA4CRA):
     } while (i == 0XCB):        /*34 HEX, LOOP UNTIL INTERRUPT FLAG IS SET*/

  /*EACH DEGREE IS .1961 V. WE WANT -40 TO 10 DEGREES, OR 0 TO .5 VOLTS.*/
  /*50/255 = .1961*/
    value = ~memget(PIA4DRB):
    tempdeg = value * .1961:
    hold = tempdeg + hold:                      /*HOLD THE VALUE*/
    memput(PIA3DRA,0X00):              /*SET CS HIGH*/
   }
```

```
memout(PIA1CRA,0X3C);          /*TOGGLE WATCHDOG TIMER*/
memout(PIA1CRA,0X34);
memout(ACIACR,0x95);           /*RTS LOW, INTERRUPT ENABLED*/
tempdeg = hold/4;              /*DIVIDE BY 4 SINCE WE SAMPLED 4 TIMES*/
degree = tempdeg;              /*CONVERT FLOAT TO CHARACTER*/
degree -= 40;                  /*SUBTRACT 40 DEGREES*/
ascval = degree;
if (degree < 0)
  {
   ascval = (ascval * (-1));
   asciideg[0] = '-';              /*MINUS SIGN*/
  }
else
 asciideg[0] = '+';                /*PLUS SIGN*/
asciideg[1] = ascval / 10 + 48;   /*CONVERT TO TWO ASCII CHARACTERS*/
asciideg[2] = ascval % 10 + 48;
if (asciideg[1] > 57)
 asciideg[1] += 7;
if (asciideg[2] > 57)
 asciideg[2] += 7;

memget(PIA4CRA);                    /*CLEAR THE INTERRUPT FLAG*/
crt4out();
return;
}
```

```
/****************************************************************************
*  FUNCTION NAME                  MODULE NAME                  PROGRAM NAME
*  SKUGET                         SKUDEL                       COMET CONTROL
*============================================================================
*  DESCRIPTION
*     THIS FUNCTION WILL GET THE ICE CREAM FROM THE BIN.  WE WILL WAIT FOR
*     A SWITCH TO BE ACTIVATED TO INDICATE A ICE CREAM IS RECIEVED.
*  FUNCTIONS CALLED
*     MEMPUT    INOUT.C
*     MEMGET    INOUT.C
*     DELAY     KEYBOAD.C
*     RETBIN    RETURN.C
*  PARAMETERS PASSED
*     BANK      VALUE TO TELL US WHICH MAGAZINE WE ARE TO PICK FROM
*  REVISIONS
*  REV    DATE      ENGINEER         DESCRIPTION OF CHANGE
****************************************************************************/

#include "io.h"

extern char retcnt1, retcrt2;
extern char *errmesg;

/*GLOBALS*/
char load;

skuget(bank)
 char bank;
 {
   char solonoid; /*VARIABLE TO FIRE SOLONOID 1 OR 2*/
   char sensors;  /*VALUE OF HALL EFFECT SENSORS*/
   char frpicker; /*SWITCH AT FRONT OF PICKER*/
   char bkpicker; /*SWITCH AT BACK OF PICKER*/
   char time;     /*FLAG TO FOR TIMER*/
   char dump;
   char dumpret;
   char second;

   sensors = memget(PIA1DRB) & 0X0F;
   frpicker = memget(PIA2DRB) & 0X02;  /*FRONT PICKER SWITCH*/
   bkpicker = memget(PIA2DRB) & 0X10;  /*BACK PICKER SWITCH*/
   if (sensors != 0X00)
    align();                /*ALIGN MOTORS IF COASTED*/
   if (bkpicker != 0X00 || frpicker != 0X00)
    {
     errmesg = "ERROR PACKAGE";
     macherr();                          /*ERROR*/
    }

   if (bank == 1)           /*MAGAZINE 1 SELECTED*/
    {
     dump = 0X01;
     dumpret = 0X02;
     solonoid = 0X80;
     }
   else                     /*MAGAZINE 2 SELECTED*/
    {
     dump = 0X08;
```

```
    dumprst = 0X04;
    solonoid = 0X10;
   }
  time = 0X00;

  w_clk(0X03);          /*CLOCK INTERRUPT REGISTER IS SELECTED*/
  w_clk(0XFB);          /*SET INTERRUPT AT 1 SECOND REPEATABLE*/
  w_clk(0X00);          /*ENABLE INTERRUPT*/
  r_clk(0X00);
  second = 1;
  memput(PIA1CRA,0X3C);  /*TOGGLES WATCHDOG TIMER*/
  memput(PIA1CRA,0X34);
  memput(PIA1DRB,solonoid);     /*TURN SOLONOID ON*/
  while (frpicker == 0X00 && time == 0X00)   /*LOOP UNTIL ICE CREAM IN BACK OF -
ICKER*/
    {
     memput(PIA1CRA,0X3C);  /*TOGGLES WATCHDOG TIMER*/
     memput(PIA1CRA,0X34);
     time = r_clk(0X00) & 0X01;
     if (time == 0X01 && second == 1)
      {
       time = 0X00;
       second = 2;
      }
     frpicker = memget(PIA2DRB) & 0X08;
    }
  memput(PIA1DRB,0X00);      /*TURN SOLONOID OFF*/
  if (time == 0X01)       /*SOMETHING IS WRONG*/
   {
    delay(0X0500);
    frpicker = memget(PIA2DRB) & 0X08;
    if (frpicker == 0X00)
      {
       errmesg = "ERR FRONT PICKER";
       macherr();
      }
   }
  w_clk(0X03);          /*CLOCK INTERRUPT REGISTER IS SELECTED*/
  w_clk(0XF2);          /*SET INTERRUPT AT .5 SECONDS*/
  w_clk(0X00);          /*ENABLE INTERRUPT*/
  r_clk(0X00);
  time = 0X00;
  while (bkpicker == 0X00 && time == 0X00)   /*LOOP UNTIL ICE CREAM IN BACK OF P
ICKER*/
    {
     memput(PIA1CRA,0X3C);  /*TOGGLES WATCHDOG TIMER*/
     memput(PIA1CRA,0X34);
     time = r_clk(0X00) & 0X01;
     bkpicker = memget(PIA2DRB) & 0X10;
    }

   memput(PIA2DRA,dump);    /*TILT DUMMPER BACK*/
   delay(0X0200);
   memput(PIA2DRA,0X00);    /*TURN DUMPER OFF*/

   delay(0X0600);
   bkpicker = memget(PIA2DRB) & 0X10;
   if (bkpicker == 0X00)   /*MAKE SURE ICE CREAM IN BACK OF DUMPER*/
    {
     delay(0X0600);
     bkpicker = memget(PIA2DRB) & 0X10;
     if (bkpicker == 0X00)    /*CHECK AGAIN*/
      {
       memput(PIA2DRA,dump);
       delay(0X0200);
       memput(PIA2DRA,0X00);
```

```
       delay(0X0200);
       bkpicker = memget(PIA2DRB) & 0X10;
       if (bkpicker == 0X00)              /*CHECK ONE MORE TIME*/

         errmesg = "ERR BACK PICKER";
         macherr();
        }
      }
    }
   w_clk(0X03);               /*STOP INTERRUPT*/
   w_clk(0XF0);               /*NO INTERRUPT*/
   w_clk(0X01);               /*NORMAL OPERATION STARTED*/
   r_clk(0X00);                *CLEAR INTERRUPT FLAG*/
   retbin();
   return;
  }

/***********************************************************************
*  FUNCTION NAME
*  BINDUMP
*======================================================================
*  DESCRIPTION
*    THIS ROUTINE WILL DUMP THE ICE CREAM
*  PARAMETERS PASSED
*    BANK     VALUE OF MAGAZINE 1 OR 2
*  REVISIONS
*    REV       DATE        ENGINEER       DESCRIPTION OF CHANGE
***********************************************************************

bindump(bank)
 char bank;
  {
   char dump;       /*VARIABLE TO DUMP PICKER 1 OR 2*/
   char dumpret;    /*VARIABLE TO RETURN PICKER 1 OR 2 TO UPRIGHT POSITION*/
   char sensors;    /*VALUE OF HALL EFFECT SENSORS*/
   char frpicker;   /*FRONT PICKER SWITCH*/
   char time;       /*TIME FLAG*/
   char skutake;    /*ICE CREAM TAKEN FLAG*/
   char doorcls;    /*INPUT FOR PRODUCT DELIVERY DOORS*/
   char latch;      /*FLAG FOR LATCH1 OR TWO*/
   char bkpicker;
   char second;
   char picker;
   unsigned count;

   skutake = memget(PIA2DRB) & 0X80;
   load = FALSE;
   sensors = memget(PIA1DRB) & 0X0F;
   if (sensors != 0X00)
    align();                 /*ALIGN MOTORS IF COASTED*/
   if (bank == 1)            /*MAGAZINE 1 SELECTED*/
    {
     latch = 0X12;    /*PA4 IS LATCH 0X10*/
     dump = 0X01;
     dumpret = 0X02;
    }
   else                      /*MAGAZINE 2 SELECTED*/
    {
     latch = 0X24;     /*PA5 IS LATCH 0X20*/
     dump = 0X08;
     dumpret = 0X04;
    }
   w_clk(0X03);          /*CLOCK INTERRUPT REGISTER IS SELECTED*/
   w_clk(0XFB);          /*SET INTERRUPT AT 1 SECOND, REPEATABLE*/
   w_clk(0X00);          /*ENABLE INTERRUPT*/
   r_clk(0X00);
```

```
time = 0X00;
second = 1;
picker = 0X18;
while (picker == 0X18 && time == 0X00)
 {
  while (picker == 0X18 && time == 0X00)      /*MAKE SURE ICE CREAM IS DUMPED*

   {
    memput(PIA1CRA,0X3C);   /*TOGGLES WATCHDOG TIMER*/
    memput(PIA1CRA,0X34);
    time = r_clk(0X00) & 0X01;
    if (time == 0X01 && second <= 2)
     {
      time = 0X00;
      second++;
     }
    memput(PIA2DRA,dump);       /*DUMP THE ICE CREAM*/
    picker = memget(PIA2DRB) & 0X18;    *PICKER SWITCHES*/
   }
  delay(0X0050);   /*15 MILLISECOND DELAY*/
  picker = memget(PIA2DRB) & 0X18;   /*BACK PICKER SWITCHES*/
 }


      here: /*TEST*/
/*      memput(PIA2DRA,dump);*/


/*   delay(0X1000);*/
/****************************************/
   count = 0;
   while (count < 0X0800 && skutake == 0X00)
    {
     memput(PIA1CRA,0X3C);   /*TOGGLES WATCHDOG TIMER*/
     memput(PIA1CRA,0X34);
     count++;
     skutake = memget(PIA2DRB) & 0X80;
    }
   memput(PIA2DRA,0X00);   /*TURN OFF DUMPER*/
/****************************************/

   memput(PIA2DRA,dumpret);       /*BRING PICKER BACK*/
   second = 1;
   w_clk(0X03);          /*CLOCK INTERRUPT REGISTER IS SELECTED*/
   w_clk(0XF3);          /*SET INTERRUPT AT 1 SECOND REPEATABLE*/
   w_clk(0X00);          /*ENABLE INTERRUPT*/
   r_clk(0X00);
   time = 0X00;
   while (skutake == 0X00 && time == 0X00)
    {
     time = r_clk(0X00) & 0X01;
     if (time == 0X01 && second <= 2)
      {
       time = 0X00;
       second++;
      }
     skutake = memget(PIA2DRB) & 0X80;  /*DO NOT WANT TO RESET MICRO IF NEVER HA
PPENS*/
     memput(PIA1CRA,0X3C);  /*TOGGLES WATCHDOG TIMER*/
     memput(PIA1CRA,0X34);
    }
   if (time != 0X01)
    delay(0X0700);
   frpicker = memget(PIA2DRB) & 0X08;  /*FRONT PICKER SWITCH*/
   bkpicker = memget(PIA2DRB) & 0X10;  /*BACK PICKER SWITCH*/
   if (frpicker == 0X00 && bkpicker == 0X00)
```

```
 memput(FIA2DRA,latch); /*UNLATCH DOORS*/
else
 {
  errmesg = "ERROR DELIVER";
  macherr();
 }
time = 0X00;
skutake = 0X00;
w_clk(0X03);          /*CLOCK INTERRUPT REGISTER IS SELECTED*/
w_clk(0XFE);          /*SET INTERRUPT AT 30 SECONDS*/
w_clk(0X00);          /*ENABLE INTERRUPT*/
r_clk(0X00);
status(2,0X7F,2);
memput(ACIA2DF,'T'); /*THANK YOU*/
retbin();
while (time == 0X00 && skutake == 0X00)
 {
  doorcls = memget(PIA1DRA) & 0X40;
  while (doorcls == 0X00 && time == 0X00)      /*LOOP UNTIL DOOR IS OPEN*/
   {
    time = r_clk(0X00) & 0X01;
    retbin();
    doorcls = memget(PIA1DRA) & 0X40;
    memput(PIA1CRA,0X3C);  /*TOGGLES WATCHDOG TIMER*/
    memput(PIA1CRA,0X34);
    if (doorcls == 0X00)
     {
      delay(0X0050);       /*DELAY 15 MILLISECONDS FOR DEBOUNCE*/
      doorcls = memget(PIA1DRA) & 0X40;
     }
   }
  skutake = memget(FIA2DRB) & 0X80;
  while (skutake != 0X80 && time == 0X00)
   {
    time = r_clk(0X00) & 0X01;
    skutake = memget(PIA2DRB) & 0X80;      /*IS ICE CREAM TAKEN?*/
    memput(PIA1CRA,0X3C);  /*TOGGLES WATCHDOG TIMER*/
    memput(PIA1CRA,0X34);
   }
  retbin();
  doorcls = memget(PIA1DRA) & 0X40;
  while (doorcls == 0X40)      /*LOOP UNTIL DOOR IS CLOSED*/
   {
    retbin();
    doorcls = memget(PIA1DRA) & 0X40;
    memput(PIA1CRA,0X3C);  /*TOGGLES WATCHDOG TIMER*/
    memput(PIA1CRA,0X34);
    if (doorcls == 0X00)
     {
      delay(0X0050);       /*DELAY 15 MILLISECONDS FOR DEBOUNCE*/
      doorcls = memget(PIA1DRA) & 0X40;
     }
   }
  skutake = memget(PIA2DRB) & 0X80;
 }

w_clk(0X03);               /*STOP INTERRUPT*/
w_clk(0XF0);               /*NO INTERRUPT*/
w_clk(0X01);               /*NORMAL OPERATION STARTED*/
r_clk(0X00);               /*CLEAR INTERRUPT FLAG*/

skutake = memget(PIA2DRB) & 0X80;      /*IS ICE CREAM TAKEN?*/
memput(PIA2DRA,0X00);    /*LATCH DOORS*/
delay(0X0500);
retbin();
doorcls = memget(PIA1DRA) & 0X40;
```

```
 if (doorcls == 0X40)
  {
   while (doorcls == 0X40)
    {
     retbin();
     doorcls = memget(PIA1DRA) & 0X40;
     memput(PIA1CRA,0X3C);   /*TOGGLES WATCHDOG TIMER*/
     memput(PIA1CRA,0X34);
     beep('3');
    }
  }
 frpicker = memget(PIA2DRB) & 0X08;   /*FRONT PICKER SWITCH*/
 bkpicker = memget(PIA2DRB) & 0X10;   /*BACK PICKER SWITCH*/
 if (bkpicker == 0X10 || frpicker == 0X08)
  {
   errmesg = "ERROR PICKER";
   macherr();
  }

 if (skutake == 0X00)
  skutake = FALSE;          /*ICE CREAM NOT TAKEN*/
 else
  skutake = TRUE;           /*ICE CREAM TAKEN*/
 retbin();
 return(skutake);
}

/***************************************************************************
*  FUNCTION NAME
*  MTRINIT
*==========================================================================
*  DESCRIPTION
*    THIS ROUTINE WILL MAKE SURE THE MOTORS ARE HOME AND THERE IS NO ICE
*  CREAM IN THE PICKER.  IF THERE IS ICE CREAM IN THE PICKER WE WILL DUMP IT
*  TO THE RETURN BIN.  IF THE FLAG IS SET FOR A MACHINE MALFUNCTION WE WILL
*  CALL MODEM.  IF THERE IS NO ICE CREAM IN PICKER WE WILL GO BACK TO HOME
*  REVISIONS
*  REV     DATE      ENGINEER       DESCRIPTION OF CHANGE
****************************************************************************/

mtrinit()
 {
  char frpicker; /*SWITCH AT FRONT OF PICKER*/
  char bkpicker; /*SWITCH AT BACK OF PICKER*/
  char bin;      /*BIN DELIVER*/
  char bank;     /*BNAK TO BE DUMPED*/
  char retvalue; /*RETVALUE IS THE RETURN BIN COUNT*/
  char dump;     /*DUMP BIN*/
  char dumpret;  /*RETURN BIN*/
  char *string;

   status(2,0X7F,2);
   memput(ACIA2DR,'W');  /*PLEASE WAIT COMMAND*/
   memput(ACIA2SR,0X55);              /*DISABLE INTERRUPT*/
   frpicker = memget(PIA2DRB) & 0X08;  /*FRONT PICKER SWITCH*/
   bkpicker = memget(PIA2DRB) & 0X10;  /*BACK PICKER SWITCH*/
   memput(PIA1CRA,0X3C);  /*TOGGLES WATCHDOG TIMER*/
   memput(PIA1CRA,0X34);
   if (frpicker == 0X00 && bkpicker == 0X00)
    {
     if (load == TRUE)
      {
       load = FALSE;
       memput(PIA2DRA,0X00);  /*CLOSE REED RELAYS*/
       ldtohme(0);          /*GO DOWN FIRST*/
```

```
      load = TRUE;
     }
   }
  memput(PIA2DRA,0X00);
  memput(PIA2DRA,0X40);        /*RELEASE THE FEED RELAYS*/
  memput(PIA2DRA,0X46);        /*BRING BOTH PICKERS BACK*/
  delay(0X2000);
  memput(PIA2DRA,0X40); /*STOP PICKER MOTOR*/
  if (bkpicker == 0X00 && frpicker == 0X08)
   {
    errmesg = "ERR FRONT PICKER";
    macherr();                 /*WE HAVE A MACHINE ERROR*/
   }
  mtrhome(0);                  /*GO HOME*/
  memput(PIA2DRA,0X00);  /*LIMIT SWITCHES SET*/
  if (frpicker == 0X08 && bkpicker == 0X10)      /*ICE CREAM NOT IN PICKER*/
   {
    bin = 37;
    bank = 1;
    dump = 0X01;
    dumpret = 0X02;
    while (frpicker == 0X08 && bkpicker == 0X10)   /*LOOP UNTIL RETURN BIN UPDAT
ED BY ONE*/
     {
      mtrsrch(1,0,bank);    /*GO TO BIN1, DELIVER IS FALSE, BANK*/
      align();
      mtrsrch(1,1,bank);    /*GO TO DELIVERY POSITION*/
          align();
      memput(PIA2DRA,dump);
      delay(0X2000);
      memput(PIA2DRA,dumpret);       /*BRING PICKER BACK*/
          delay(0X2000);
      memput(PIA2DRA,0X00);
      mtrhome(bin);               /*GO HOME*/
      frpicker = memget(PIA2DRB) & 0X08;   /*FRONT PICKER SWITCH*/
      bkpicker = memget(PIA2DRB) & 0X10;   /*BACK PICKER SWITCH*/
      if (frpicker == 0X08 && bkpicker == 0X10)
       {
        bin = 38;
        bank = 2;
        dump = 0X08;
        dumpret = 0X04;
       }
     }
    if (bank == 1)
     retcnt1++;
    else
     retcnt2++;
   }
  memput(ACIA1SR,0X15);    /*RTS LINE LOW*/
  delay(0X0700);
  memget(ACIA1SR);
  memget(ACIA1DR);    /*CLEARS DCD BIT*/
 return;
}
```

```
/***************************************************************************
*  FUNCTION NAME          MODULE NAME           PROGRAM NAME
*  MTRSRCH                MOTOR1.C              COMET CONTROL
*==========================================================================
*  DESCRIPTION
*     THIS IS THE MOTOR SEARCH ROUTINE WHICH WILL SEARCH FOR THE BIN NUMBER
*     THAT IS SELECTED.
*     TABLE OF SIGNAL INPUT MODES FOR BRUSHLESS DC MOTOR CONTROLLER
*     MODE           CW/CCW        START/STOP        BRAKE
*     CW ROTATION    HIGH          HIGH              HIGH
*     CCW ROTATION   LOW           HIGH              HIGH
*     STOP            X            LOW               HIGH
*     BRAKE           X             X                LOW
*
*     PB0 OF U1, PIA1 ON CONTROL MODULE IS TOP SENSOR OF VERTICAL DIRECTION
*     PB1 OF U1, PIA1 ON CONTROL MODULE IS BOTTOM SENSOR OF VERTICAL DIRECTION
*     PB2 OF U1, PIA1 ON CONTROL MODULE IS RIGHT SENSOR IN HORIZONTAL DIRECTION
*     PB3 OF U1, PIA1 ON CONTROL MODULE IS LEFT SENSOR IN HORIZONTAL DIRECTION
*     PB4 OF U1, PIA1 ON CONTROL MODULE IS ICE CREAM SENSE
*     PB5 OF U1, PIA1 ON CONTROL MODULE IS VERTICAL SPEED CONTROL (HIGH = SLOW S
PEED)
*     PB6 OF U1, PIA1 ON CONTROL MODULE IS HORIZONTAL SPEED CONTROL (HIGH = SLOW
 SPEED)
*
*  FUNCTIONS CALLED
*     MEMPUT    INOUT.C
*     DELAY     KEYBOAD.C
*     GETKEY    KEYBOAD.C
*     W_STR     DISPLAY.C
*     MEMGET    INOUT.C
*     W_CLK     CLOCK.C
*     R_CLK     CLOCK.C
*  PARAMETERS PASSED
*     BIN   BIN NUMBER THAT CORRESPONDS TO THE POSTION OF COLUMN AND ROW
*     DELIVER  DELIVER IS TRUE IF WE ARE TO GO TO THE DELIVERY POSITION
*  CALLING CONVENTION
*     IRQ() FILE IRQ.C
*  REVISIONS
*  REV     DATE     ENGINEER      DESCRIPTION OF CHANGE
***************************************************************************/

#include "io.h"

/*THERE WILL BE AN ARRAY OF 36 POSITIONS FOR                                */
/*EACH BIN.  THE NUMBERS STORED ARE COUNTERS FOR EACH SENSOR ON THE         */
/*HORIZONTAL AND THE VERTICAL MOTORS.  THERE WILL BE ONE SENSER FOR EACH    */
/*COLUMN AND EACH ROW.  THERE WILL BE 9 ROWS AND 8 COLUMNS. THEREFORE THERE */
/*WILL BE 9 SENSORS FOR THE ROWS AND 4 SENSORS FOR THE COLUMNS. BINCOL[X]   */
/*REPRESENTS THE HORIZONTAL MOTOR AND BINROW[X] REPRESENTS THE VERTICAL     */
/*MOTOR.  WHEN BIN 12 IS SELECTED, THE SKU WILL BE LOCATED AT BINCOL[12]    */
/*AND BINROW[12]. THEREFORE, BIN 12 WILL BE LOCATED AT ROW 2, COLUMN 4.     */
/*THE HORZIONTAL MOTOR WILL COUNT 4 PLACES, AND THE VERTICAL MOTOR WILL     */
/*COUNT 2 PLACES. THE ARRAY STARTS AT LOCATION 0, NOT 1!                    */


/*EXTERNALS*/
extern char vertfwd;   /*ROW (VERTICAL) MOTOR ON IN FORWARD DIRECTION*/
```

```
extern char vertrev;     /*ROW (VERTICAL) MOTOR ON IN REVERSE DIRECTION*/
extern char vertoff;     /*ROW (VERTICAL) MOTOR OFF*/
extern char vertbrk;     /*ROW (VERTICAL) MOTOR BRAKE*/

extern char horzcw;   /*COLUMN (HORIZONTAL) MOTOR ON IN FORWARD DIRECTION*/
extern char horzccw;  /*COLUMN (HORIZONTAL) MOTOR ON IN REVERSE DIRECTION*/
extern char horzoff;  /*COLUMN (HORIZONTAL) MOTOR OFF*/
extern char horzbrk;     /*COLUMN (HORIZONTAL) MOTOR BRAKE*/

extern char horzbin[];  /*CONTAINS THE COLUMN THAT THE SKU IS LOCATED*/
extern char vertbin[];  /*CONTAINS THE ROW THAT THE SKU IS LOCATED*/

extern char load;       /*LOAD FLAG*/
extern char *errmesg;
extern char retcntl;

/*GLOBALS*/

static char vertdirf;       /*VERTICAL DIRECTION OF MOTOR*/
static char vertdirr;       /*REVERSE DIRECTION OF MOTOR*/
static char horzdirf;       /*HORIZONTAL DIRECTION OF MOTOR*/
static char horzdirr;       /*REVERSE DIRECTION OF MOTOR*/
static char hensvane;     /*HORIZONTAL VANE SENSOR FLAG*/
static char vensvane;     /*VERTICAL VANE SENSOR FLAG*/
static char cpnsens;      /*COMPLIMENT OF HORIZONTAL VANE SENSOR FLAG*/
static char cpvens;       /*COMPLIMENT OF VERTICAL VANE SENSOR FLAG*/
static char horzmot;      /*HORIZONTAL MOTOR STATUS*/
static char vertmot;      /*VERTICAL MOTOR STATUS*/


search(bin,deliver,bank)
 int bin;
 char deliver;
 char bank;
 {
  char time;           /*FLAG FOR INTERRUPT OF CLOCK*/
  char horzsense;      /*HORIZONTAL SENSORS*/
  char vertsense;      /*VERTICAL SENSORS*/
  char waithorz;     /*FLAG THAT IS SET TO WAIT FOR RIGHT SENSOR TO PASS VANE*/
  char waitvert;     /*FLAG THAT IS SET TO WAIT FOR TOP SENSOR TO PASS VANE*/
  char onhorz;       /*FLAG TO TEILL US IF HORIZONTAL MOTOR ON*/
  char onvert;       /*FLAG TO TELL US IF VERTICAL MOTOR ON*/
  char horzloc;      /*HORZONTAL LOCATION OF BIN*/
  char vertloc;      /*VERTICAL LOCATION OF BIN*/
  char motors;       /*FLAG USED FOR THE STATE OF THE HORZONTAL AND VERTICAL MOTO
RS*/
  char speed;        /*FLAG FOR SPEED CONTROL*/
  char vvane;        /*VERTICAL VANE FLAG*/
  char hvane;        /*HORIZONTAL VANE FLAG*/
  int rowloc;        /*LOCATION VERTICAL MOTOR WILL GO*/
  int colloc;        /*LOCATION HORIZONTAL MOTOR WILL GO*/
  unsigned lngwait;   /*TIME DELAY FLAG FOR BRAKING*/
  unsigned vbrkdly;   /*VERTICAL BRAKE DELAY*/
  unsigned hbrkdly;   /*HORIZONTAL BRAKE DELAY*/
  char sensors;      /*FLAG USED FOR STATE OF VERTICAL AND HORZONTAL SENSORS*/


/*INITIALIZATION*/


  lngwait = 0X0000;
  vbrkdly = 0X0300;   /*0X0200*/
  hbrkdly = 0X0400;
  vvane = FALSE;
  hvane = FALSE;
```

```
  vertloc = 0;
  horzloc = 0;
/*  waithorz = FALSE; START WITH WAITHORZ = FALSE SINCE LEFT POSITON SENSOR STAR
TS IN A VANE*/

  onhorz = FALSE;
  onvert = FALSE;
  speed = 0X00;             /*MOTORS AT FULL SPEED*/
  vsnsvane = 0X02;
  oppvsns =  0X01;           /*OPPOSITE OF HORIZONTAL SENSE VANE*/
  hsnsvane = 0X08;
  opphsns =  0X04;           /*OPPOSINE OF VERTICAL SENSE VANE*/
  horzmot = horzccw;             /*HORIZONTAL MOTOR COUNTER COUNTER CLOCK WISE*/
  horzdirf = horzccw;
  horzdirr = horzcw;
  vertmot = vertrev;             /*VERTICAL MOTOR REVERSE*/
  vertdirf = vertrev;
  vertdirr = vertfwd;

  if (bin == 0)
   return;
  if (deliver == TRUE)   /*GO TO DELIVERY BIN*/
   {
    waithorz = FALSE;
    waitvert = FALSE;    /*START WITH WAITVERT = FALSE SINCE BOTTOM SENSOR STARTS
 IN VANE*/
         if (bank == 2)
     colloc = 6 - horzbin[bin];          /*HORIZONTAL LOCATION AT 5th VANE*/
    else
     colloc = 3 - horzbin[bin];          /*HORIZONTAL LOCATION AT 2nd VANE*/
    rowloc = 8 - vertbin[bin];          /*VERTICAL LOCATION AT 7th ROW*/
    if (colloc == 1)
     horzmot = horzoff;
    if (rowloc == 1)
     vertmot = vertoff;
    if (colloc <= 0)
     {
      hsnsvane = 0X04;
      opphsns =  0X08;         /*OPPOSINE OF VERTICAL SENSE VANE*/
      horzmot = horzcw;
      horzdirf = horzcw;
      horzdirr = horzccw;
      colloc = (colloc * -1) + 2;
     }
    if (rowloc <= 0)
     {
      vsnsvane = 0X01;
      oppvsns =  0X02;         /*OPPOSITE OF HORIZONTAL SENSE VANE*/
      vertmot = vertfwd;     /*HORIZONTAL MOTOR FOWARD*/
      vertdirf = vertfwd;
      vertdirr =vertrev;
      rowloc = (rowloc * -1) + 2;
     }

    if (colloc <= 2)
     speed = speed | 0X40; /*TURN HORIZONTAL MOTOR ON SLOW SPEED*/
    if (rowloc <= 2)
     speed = speed | 0X20; /*TURN VERTICAL MOTOR ON SLOW SPEED*/
    sensors = memget(PIA1DRB) & vsnsvane;
    if (sensors == vsnsvane)    /*VERTICAL OUT OF POSITION*/
     {
      waitvert = TRUE;      /*SENSOR OUT OF VANE*/
      rowloc = rowloc - 1; /*WE HAVE ONE LESS VANE TO SENSE*/
/*          printf(" less vertical ");*/
     }
    sensors = memget(PIA1DRB) & hsnsvane;
```

```
   if (sensors == hsnsvane)   /*SENSOR OUT OF VANE*/
     {
/*        printf(" less horizontal1 ");*/
      waithorz = TRUE
      colloc = colloc - 1;    /*WE HAVE ONE LESS VANE TO SENSE*/
     }
   }
  else
   {
    waithorz = FALSE;
    waitvert = FALSE;
    colloc = horzbin[bin];
    rowloc = vertbin[bin];
    if (colloc != 1)
     speed = speed | 0X40;  /*TURN HORIZONTAL MOTOR ON SLOW SPEED*/
    if (rowloc != 1)
     speed = speed | 0X20;  /*TURN VERTICAL MOTOR ON SLOW SPEED*/
    sensors = memget(PIA1DRB) & vsnsvane;
    if (sensors == vsnsvane)    /*VERTICAL OUT OF POSITION*/
      waitvert = TRUE;       /*SENSOR OUT OF VANE*/
    sensors = memget(PIA1DRB) & hsnsvane;
    if (sensors == hsnsvane)   /*SENSOR OUT OF VANE*/
     {
/*        printf(" less horizontal2 ");*/
      waithorz = TRUE;
      colloc = colloc - 1;    /*WE HAVE ONE LESS VANE TO SENSE*/
     }
   }
/*  printf("waithorz is %x\n", waithorz);
  printf("waitvert is %x\n", waitvert);*/
  memput(PIA1DRB,speed);
  motors = vertmot & horzmot;     /*TURN MOTORS ON*/
  r_clk(0X00);          /*READ THE CLOCK TO CLEAR INTERRUPT BIT*/
  w_clk(0X0D);          /*CLOCK INTERRUPT REGISTER ID SELECTED*/
  w_clk(0XF5);          /*SET INTERRUPT AT 10 SECONDS*/
  w_clk(0X00);          /*ENABLE INTERRUPT*/
  memput(PIA1DRA,motors);
  while (vertloc < rowloc && horzloc < colloc)
   {
    sensors = memget(PIA1DRB);
    vertsense = sensors & vsnsvane;          /*VERTICAL SENSE*/
    horzsense = sensors & hsnsvane;          /*HORIZONTAL SENSE*/
    if (vertsense == vsnsvane && waitvert == TRUE  && vvane == FALSE)
     waitvert = FALSE;                /*WAIT UNTIL SENSOR IS PAST VANE*/
    if (horzsense == hsnsvane && waithorz == TRUE && hvane == FALSE)
     waithorz = FALSE;                /*WAIT UNTIL SENSOR IS PAST VANE*/
    if (vertsense == 0X00 && waitvert == FALSE)
     {                          /*WAITVERTICAL = FALSE MEANS SENSOR PAST VAN
E*/
      waitvert = TRUE;
      vertloc++;                   /*INCREMENT SENSOR COUNT*/
      vvane = TRUE;
      if (vertloc == rowloc)
       {
        vertmot = vertbrk;            /*BRAKE THE VERTICAL MOTOR*/
        motors = horzmot & vertmot;
        memput(PIA1DRA,motors);
       }
     }
    else
     {
      if (vvane == TRUE)
       if (vertsense == vsnsvane)   /*WE ARE NOW PAST VANE RECORDED SO RESET FLAG
*/
        vvane = FALSE;
     }
```

```
    if (horzsense == 0X00 && waithorz == FALSE)
     {                                  /*WAITVERTICAL = FALSE MEANS SENSOR PAST V
ANE*/
      waithorz = TRUE;
      horzloc++;                        /*INCREMENT HORIZONTAL VANE COUNT*/
      hvane = TRUE;
      if (horzloc == colloc)
       {
        horzmot = horzbrk;               /*BRAKE THE HORIZONTAL MOTOR*/
        motors = vertmot & horzmot;
        memout(PIA1DRA,motors);
       }
     }
    else
     {
      if (hvane == TRUE)
       if (horzsense == hsnsvane) /*HORIZONTAL VANE IS CLEARED SO RESET FLAG*/
        hvane = FALSE;
     }
    time = r_clk(0X00) & 0X01;
    if (time == 0X01)         /*SOMETHING IS WRONG*/
     locerr();
    memout(PIA1CRA,0X3C);  /*TOGGLES WATCHDOG TIMER*/
    memout(PIA1CRA,0X34);
   }
/*  w_clk(0X00); */

    /*RESET TIMER FOR ANOTHER 5 SECONDS*/
  if (horzloc == colloc && vertloc != rowloc)    /*WE ARE AT THE DESIRED HORIZONT
AL VANE*/
   {
    while (vertloc < rowloc)
     {                              /*LOOP UNTIL VERTICALS = BINVERTICALDIGIN*/
      sensors = memget(PIA1DRB);
      vertsense = sensors & vsnsvane;
      horzsense = sensors & 0X0C;
      if (lngwait < hbrkdly)       /*WAIT TIME TO LET HORIZONTAL MOTOR BRAKE*/
       lngwait++;
      if (lngwait == hbrkdly || horzsense == 0X0C)    /*ARE WE DONE WAITING TO D
ELAY BREAK*/
       {                                             /*WAS HORZONTAL MOTOR PULLED O
FF*/
        speed == speed | 0X40;
        memput(PIA1DRB,speed);
        horzmot = horzdirf;
        motors = vertmot & horzmot;
        memput(PIA1DRA,motors); /*TURN VERTICAL MOTOR ON FOR ALIGNMENT*/
        onhorz = TRUE;          /*SET FLAG TO TELL US HORIZONTAL MOTOR ON*/
        lngwait = hbrkdly + 1;     /*SET LNGWAIT SO DON'T COME IN HERE AGAIN*/
       }
      if (horzsense == 0X00 || horzsense == hsnsvane)
       {
        lngwait = hbrkdly + 1; /*SET LNGWAIT SO WE DON'T TURN ON MOTOR AGAIN*/
        horzmot = horzbrk;
        onhorz = FALSE;
        motors = vertmot & horzmot;
        memput(PIA1DRA,motors);  /*IF HORIZONTALS ARE ALIGNED THEN BRAKE MOTOR*/
       }
      if (vertsense == 0X00 && vvane == FALSE) /*ARE WE AT ANOTHER VANE?*/
       {
        vertloc++;             /*INCREMENT VERTICAL VANE COUNT*/
        vvane = TRUE;
        if (vertloc == rowloc)   /*BRAKE THE VERTICAL MOTOR OFF*/
         {
          vertmot = vertbrk;
          motors = horzmot & vertmot;
```

```
          memout(PIA1DRA,motors);
         }
       }
      else
       {
        if (vvane == TRUE)
         if (vertsense == vsnsvane)  /*WE ARE NOW PAST VANE RECORDED SO RESET FL
AG*/
          vvane = FALSE;
       }
      time = r_clk(0X00) & 0X01;
      if (time == 0X01)        /*SOMETHING IS WRONG*/
       locerr();
      memout(PIA1CRA,0X3C);   /*TOGGLES WATCHDOG TIMER*/
      memout(PIA1CRA,0X34);
     }
   }
  else       /*ELSE WE ARE AT THE DESIRED VERTICAL VANE*/
   if (horzloc != colloc)
    {
    while (horzloc < colloc)
     {
      sensors = memget(PIA1DRB);
      horzsense = sensors & hsnsvane;
      vertsense = sensors & 0X03;
      if (lngwait < vbrkdly)        /*WAIT TIME TO LET HORIZONTAL MOTOR BRAKE*/
       lngwait++;
      if (lngwait == vbrkdly)            /*ARE WE DONE WAITING TO DELAY BREAK*/
       {
        speed = speed | 0X20;
        memout(PIA1DRB,speed);
        vertmot = vertdirf;
        motors = vertmot & horzmot;
        memout(PIA1DRA,motors);  /*TURN VERTICAL MOTOR ON FOR ALIGNMENT*/
        onvert = TRUE;                /*SET FLAG TO TELL US VERTICAL MOTOR ON*/
        lngwait = vbrkdly + 1;      /*SET LNGWAIT SO DON'T COME IN HERE AGAIN*/
       }
      if (vertsense == 0X00 || vertsense == vsnsvane)
       {
        lngwait = vbrkdly + 1; /*SET LNGWAIT SO WE DON'T TURN ON MOTOR AGAIN*/
        vertmot = vertbrk;
        onvert = FALSE;
        motors = vertmot & horzmot;
        memout(PIA1DRA,motors);  /*IF HORIZONTALS ARE ALIGNED THEN BRAKE MOTOR*/
       }
      if (horzsense == 0X00 && hvane == FALSE) /*ARE WE AT ANOTHER VANE?*/
          {
        horzloc++;
        hvane = TRUE;
        if (horzloc == colloc)
         {
          horzmot = horzbrk;
          motors = vertmot & horzmot;
          memput(PIA1DRA,motors); /*BRAKE HORIZONTAL MOTOR*/
         }
       }
      else
       {
        if (hvane == TRUE)
         if (horzsense == hsnsvane) /*HORIZONTAL VANE IS CLEARED SO RESET FLAG*/
          hvane = FALSE;
       }
      time = r_clk(0X00) & 0X01;
      if (time == 0X01)       /*SOMETHING IS WRONG*/
       locerr();
      memout(PIA1CRA,0X3C);  /*TOGGLES WATCHDOG TIMER*/
```

```
     memput(PIA1CRA,0X34);
    }
   }
  sensors = memget(PIA1DRB) & 0X0F;
  speed = speed | 0X40;
  memout(PIA1DRB,speed);           /*TURN HORIZONTAL MOTOR ON SLOW SPEED*/


  if (onhort == TRUE)            /*ARE WE TRYING TO ALIGN HORIZONTAL MOTOR*/
   {
    horzsense = 0X0C;
    memout(PIA1CRA,0X3C);  /*TOGGLES WATCHDOG TIMER*/
    memout(PIA1CRA,0X34);
    while (horzsense != 0X00 && horzsense != hsnsvane)   /*LOOP UNTIL ALIGNED OR
OVERSHOOT*/
     horzsense = memget(PIA1DRB) & 0X0C;
    horzmot = horzbrk;                       /*BRAKE THE MOTOR*/
    motors = horzmot & vertmot;
    memout(PIA1DRA,motors);
   }
  if (onvert == TRUE)      /*ARE WE TRYING TO ALIGN VERTICAL MOTOR*/
   {
    vertsense = 0X03;
    memout(PIA1CRA,0X3C);  /*TOGGLES WATCHDOG TIMER*/
    memout(PIA1CRA,0X34);
    while (vertsense != 0X00 && vertsense != vsnsvane) /*LOOP UNTIL ALIGNED OR O
VERSHOOT*/
     vertsense = memget(PIA1DRB) & 0X03;
    vertmot = vertbrk;      /*BRAKE THE MOTOR*/
    motors = horzmot & vertmot;
    memout(PIA1DRA,motors);
   }
  morstp();
  return;
 }

/*****************************************************************************
*  FUNCTION NAME
*  LOCERR
*=============================================================================
*  DESCRIPTION
*  THIS ROUTINE DISPLAYS AN ERROR MESSAGE AND THEN CALLS MACHERR
*****************************************************************************/

locerr()
 {

  errmesg = "ERROR LOCATE";
  macherr();
  return;
 }

/*****************************************************************************
*   FUNCTION NAME
*   ALIGN.C
*=============================================================================
*   DESCRIPTION
*    THIS FUNCTION WILL ALLIGN THE MOTORS TO THE CORRECT BIN
*   REVISIONS
*   REV      DATE       ENGINEER        DESCRIPTION OF CHANGE
*****************************************************************************/

align()
 {
  char sensors;      /*SENSOR VALUES*/
  char topsense;     /*TOP VERTICAL SENSOR*/
```

```
  char botsense:      /*BOTTOM VERTICAL SENSOR*/
  char lftsense:      /*LEFT HORZONTAL SENSOR*/
  char rgtsense:      /*RIGHT HORZONTAL SENSOR*/
  char motors:        /*STATE OF THE MOTORS*/
  char time:          /*FLAG FOR CLOCK TIMER*/
  char aligned:       /*THIS FLAG IS RETURNED FOR ALIGNMENT*/
  unsigned rgtdly:    /*LENGTH OF TIME FOR HORIZONTAL MOTOR TO STEP RIGHT*/
  unsigned lftdly:    /*LENGTH OF TIME FOR HORIZONTAL MOTOR TO STEP LEFT*/
  unsigned lftmax:    /*LFTMAX-LFTDLY = TIME FOR HORIZONTAL MOTOR TO BRAKE*/
  unsigned rgtmax:    /*RGTMAX-RGTDLY = TIME FOR VERTICAL MOTOR TO BRAKE*/
  unsigned lftcnt:     /*LEFT SENSOR COUNT*/
  unsigned rgtcnt:     /*RIGHT SENSOR CPUNT*/

/*INITIALIZATION*/
  rgtcnt = 0:     /*RIGHT COUNT = 0*/
  lftcnt = 0:    /*LEFT COUNT = 0*/
  rgtdly = 30; /*50*/
  lftdly = 30: /*50*/
  lftmax = 400:   /*400*/
  rgtmax = 400:   /*400*/

reset:
  r_clk(0X00):           /*READ THE CLOCK TO CLEAR INTERRUPT BIT*/
  w_clk(0X03):           /*CLOCK INTERRUPT REGISTER IS SELECTED*/
  w_clk(0XF4):           /*SET INTERRUPT AT 5 SECONDS*/
  w_clk(0X00):           /*ENABLE INTERRUPT*/
  memout(PIA1DRB,0X60):                      /*HORIZONTAL MOTOR ON SLOW SPEED*/
  sensors = memget(PIA1DRB) & 0X0F:
/*  printf("sensor before is %x\n". sensors):*/
  aligned = TRUE:
  while (sensors != 0X00)
   {
    sensors = memget(PIA1DRB) & 0X0F:
    topsense = sensors & oppvsns:     /*TOP VERTICAL SENSOR*/
    botsense = sensors & vsnsvane:     /*BOTTOM VERTICAL SENSOR*/
    rgtsense = sensors & opphsns:     /*RIGHT HORIZONTAL SENSOR*/
    lftsense = sensors & hsnsvane:     /*LEFT HORIZONTAL SENSOR*/
    if (topsense == oppvsns)
      vertmot = vertdirf:            /*TURN MOTOR ON REVERSE DIRECTION*/
    else
     {
      if (botsense == vsnsvane)
        vertmot = vertdirr:     /*TURN MOTOR ON FOWARD DIRECTION*/
      else
        {
         vertmot = vertbrk:    /*BRAKE THE MOTORS*/
         motors = horzmot & vertmot:
         memput(PIA1DRA,motors):
        }
     }
    if (rgtsense == opphsns && rgtcnt <= rgtdly)   /*RIGHT COUNT < 50 MEANS TURN
ON FOR LESS THAN 50 COUNTS*/
     {
      rgtcnt++:
      horzmot = horzdirf:    /*TURN HORIZONTAL MOTOR ON COUNTER CLOCKWISE*/
     }
    else
     {
      if (rgtcnt > rgtmax)   /*IF WE BRAKED 500 COUNTS THEN RESET RIGHT COUNT*/
       rgtcnt = 0:
      else
        {
         if (lftsense == hsnsvane && lftcnt <= lftdly) /*LEFT COUNT < 50 MEANS T
URN ON FOR LESS THAN 50 COUNTS*/
          {
           lftcnt++:
```

```
        horzmot = horzdirr;
        }
      else
       if (lftcnt > lftdl)    /*IF WE BRAKED THE COUNTS THEN RESET LEFT COUNT*/
        lftcnt = 0;
      }
   }
  if (rgtcnt < rgtdly || lftcnt < lftdly)   /*BRAKE THE MOTOR IF IT HAS BEEN TU
RNED ON > 50 COUNTS*/
   {
    if (lftcnt < lftdly)
     lftcnt++;
    if (rgtcnt < rgtdly)
      rgtcnt++;
    horzmot = horzbrk;
   }
  motors = horzmot & vertmot;
  memput(PIA1DRA,motors);

  memput(PIA1CRA,0X3C);   /*TOGGLES WATCHDOG TIMER*/
  memput(PIA1CRA,0X34);
  if (sensors == 0X00)
   {
    delay(0X0050);     /*DELAY  15 MILLISECONDS*/
    sensors = memget(PIA1DRB) & 0X0F;
   }
  time = r_clk(0X00) & 0X01;
  if (time == 0X01)        /*SOMETHING IS WRONG*/
   {
/*      sensors = 0X00;       GET OUT OF LOOP*/
/*      aligned = FALSE;      SET FLAG TO SO WE KNOW WE ARE NOT ALIGNED*/

/****************************************************************/
     if (aligned == TRUE)
      {
       rgtcnt = 0;    /*RIGHT COUNT = 0*/
       lftcnt = 0;    /*LEFT COUNT = 0*/
       rgtdly = 40;
       lftdly = 40;
       r_clk(0X00);         /*READ THE CLOCK TO CLEAR INTERRUPT BIT*/
       w_clk(0X03);         /*CLOCK INTERRUPT REGISTER IS SELECTED*/
       w_clk(0XF4);         /*SET INTERRUPT AT 5 SECONDS*/
       w_clk(0X00);         /*ENABLE INTERRUPT*/
       time = 0X00;
       aligned = FALSE;
      }
     else
      sensors = 0X00;       /*GET OUT OF LOOP*/
/****************************************************************/
    }
  }
 mtrstp();
 sensors = memget(PIA1DRB) & 0X0F;
 if (sensors != 0X00 && aligned == TRUE)
  {
   if (rgtdly != 10 && lftdly !=10)
    {
     rgtcnt = 0;
     lftcnt = 0;
     rgtdly = rgtdly - 10;
     lftdly = lftdly - 10;
     goto reset;
    }
   else
    aligned = FALSE;
```

```
  return(aligned);
  }


/***************************************************************************************
*  FUNCTION NAME
*  MTRHOME
*======================================================================================
*  DESCRIPTION
*    THIS FUNCTION WILL SEND THE MOTORS BACK TO HOME POSITION
*  PARAMATERS PASSED
*    BIN   HOLDS VALUE OF BIN THAT PICKER IS LOCATED AT
*  FUNCTIONS CALLED
*    MEMPUT  INOUT.C
*    MEMGET  INOUT.C
*    DELAY   KEYBOAD.C
*    RETBIN  RETURN.C
*  REVISIONS
*    REV      DATE      ENGINEER      DESCRIPTION OF CHANGE
***************************************************************************************/

mtrhome(bin)
 char bin;
  {
   char *string;
   char motors;       /*HORIZONTAL AND VERTICAL MOTOR STATUS*/
   char horzmot;      /*HORIZONTAL MOTOR STATUS*/
   char vertmot;      /*VERTICAL MOTOR STATUS*/
   char switchon;     /*FLAG TO DETERMINE IF BOTH MOTORS ON*/
   char horbrake;     /*HORIZONTAL BRAKE FLAG*/
   char speed;        /*SPEED FOR MOTORS*/
   int horzcnt;       /*HORIZONTAL COUNT FOR SENSORS*/
   int vertcnt;       /*VERTICAL COUNT FOR SENSORS*/
   char sensors;      /*SENSOR FLAG*/
   char vertsense;    /*VERTICAL SENSOR FLAG*/
   char horzsense;    /*HORIZONTAL SENSOR FLAG*/
   char vvane;        /*VERTICAL VANE FLAG*/
   char hvane;        /*HORIZONTAL VANE COUNTER*/
   char time;         /*FLAG FOR INTERRUPT OF CLOCK CHIP*/
   char length;       /*LENGTH OF TIME WE HAVE TO GET HOME*/
   char vertpos;      /*POSITION OF LOAD SWITCH*/
   char sense;
   unsigned cnthorz; /*COUNTS HORIZONTAL DELAY*/
   unsigned hbrkdly; /*HORIZONTAL BREAK DELAY*/

   /*INITIALIZATION*/
   vertmot = vertoff;
   horzmot = horzoff;
   horbrake = FALSE;
   if (bin != 0)
    {
     horzcnt = horzbin[bin] - 1;    /*SET UP HORIZONTAL COUNT*/
     vertcnt = vertbin[bin] - 1;    /*SET UP VERTICAL COUNT*/
    }
   else
    {
     horzcnt = 0;
     vertcnt = 0;
    }
/*   printf("\n");
   printf("horzcnt is %x\n", horzcnt);
   printf("vertcnt is %x\n", vertcnt);*/

   cnthorz = 0;
   hbrkdly = 200;
```

```
vvane = TRUE;
hvane = TRUE;
sense = 0X00;
beep();
string = "MOTORS HOME";
w_str(string);
switchon = memget(PIA2DRB) & 0X03;   /*BOTH SWITCHES*/
retbin();
vertpos = memget(PIA1DRA) & 0X80;
if (horzbin[bin] <= 1 && vertbin[bin] <= 1)
 {
  length = 0XF7;     /*TIME = 60 SECONDS TO GET HOME*/
  speed = 0X60;    /*HORIZONTAL AND VERTICAL MOTOR ON SLOW SPEED*/
 }
else
 {
  if (horzbin[bin] > 1 && vertbin[bin] > 1)
  speed = 0X00; /*HORIZONTAL AND VETICAL MOTORS ON FAST SPEED*/
  else
   {
    if (horzbin[bin] > 1)
     speed = 0X20; /*HORIZONTAL ON FAST SPEED*/
    else
     {
      if (vertbin[bin] > 1)
       speed = 0X40; /*VERTICAL ON FAST SPEED*/
     }
   }
  length = 0XF2;     /*TIME = 10 SECONDS TO GO HOME*/
 }
memput(PIA1DRB,speed);
vertmot = vertfwd;
horzmot = horzcw;
motors = vertmot & horzmot;  /*BOTH ON IN REVERSE DIRECTION*/
r_clk(0X00);
w_clk(0X03);         /*CLOCK INTERRUPT REGISTER IS SELECTED*/
w_clk(length);       /*SET INTERRUPT AT "LENGTH" SECONDS*/
w_clk(0X00);         /*ENABLE INTERRUPT*/
while (switchon != 0X00) /*LOOP UNITL BOTH HORIZONTAL AND VERTICAL HOME*/
 {
  sensors = memget(PIA1DRB);
  vertsense = sensors & 0X01;
  horzsense = sensors & 0X04;
  if (vertsense == 0X00 && vvane == FALSE) /*SENSOR SEES A VANE*/
   {
    vvane = TRUE;
    if (vertcnt > 0)
     vertcnt--;             /*SUBTRACT VERTICAL COUNT*/
    if (vertcnt <= 0)    /*IF ON LAST VANE THEN REDUCE SPEED*/
     speed = speed | 0X20;     /*VERTICAL MOTOR ON SLOW SPEED*/
   }
  else
   {
    if (vvane == TRUE)
     if (vertsense == 0X01)  /*IF OUT OF VANE THEN RESET FLAG*/
      vvane = FALSE;
   }
  if (horzsense == 0X00 && hvane == FALSE)
   {
    hvane = TRUE;
/*       printf(" %x", horzcnt);*/
    if (horzcnt == 1)    /*BRAKE ON LAST VANE*/
     {
      horzmot = horzbrk;
      speed = speed | 0X40;    /*HORIZONTAL MOTOR ON SLOW SPEED*/
      horbrake = TRUE;   /*SET HORIZONTAL BRAKE FLAG*/
```

```
   w_clk(0X..);          /*CLOCK INTERRUPT REGISTER IS SELECTED*/
    w_clk(0XF4);       /*SET INTERRUPT AT 5 SECONDS*/
    w_clk(0X00);         /*ENABLE INTERRUPT*/
   }
  else
   if (cnthorz == horzdly)
    {
     if (horzcnt > 0)
      horzcnt--;     /*SUBTRACT HORIZONTAL COUNT IF NOT ON LAST VANE*/
    }
  }
 else
  {
  if (nvane == TRUE)
   if (horizsense == 0X04)    /*IF OUT OF VANE THEN COUNT*/
    nvane = FALSE;
  }
 if (horbrake == TRUE)     /*IF BRAKE IS ON*/
  {
  cnthorz++;
  if (cnthorz == horzdly)        /*START MOTOR AGIAN AFTER DELAY*/
   {
    horzmot = horzcw;
    horzcnt = 0;     /*MAKE SURE BRAKE NOT TURNED ON AGAIN*/
   }
  }
 switchon = memget(PIA2DRB) & 0X03;
 if (switchon == 0X02)
  {
  horzmot = horzcw;
  vertmot = vertbrk;                    /*BRAKE THE VERTICAL MOTOR*/
  }
 if (switchon == 0X01)
  {
  vertmot = vertfwd;
  horzmot = horzbrk;          /*BRAKE THE HORIZONTAL MOTOR*/
  }
 motors = vertmot & horzmot:
 memout(PIA1DRB,speed):
 memout(PIA1DRA,motors):
 memout(PIA1CRA,0X3C):   /*TOGGLES WATCHDOG TIMER*/
 memout(PIA1CRA,0X34):
 time = r_clk(0X00) & 0X01;          /*READ THE CLOCK*/
 if (time == 0X01)              /*SOMETHING IS WRONG*/
  {
   errmesg = "ERROR HOME";
   macherr();                     /*GET OUT*/
  }
 if (sense == 0X00)
  {
   sense = memget(PIA1CRA) & 0X80;
   if (sense == 0X80)
    retcnt1++;
  }
 vertpos = memget(PIA1DRA) & 0X80;
 if (vertpos == 0X00)
  {
   errmesg = "ERROR LIMIT";
   macherr();                  /*WE HIT THE LIMIT SWITCH*/
  }
 }

 mtrstp();
/*  printf("horzcnt is %d\n", horzcnt);
 printf("vertcnt is %d\n", vertcnt);*/
 load = TRUE;
 return;
}
```

```
*******************************************************************************
*  FUNCTION                    MODULE NAME              PROGRAM NAME
*  REC_OUT                      OUT.C                   COMET CONTROL
*==============================================================================
*  DESCRIPTION
*    IF A BUTTON IS PUSHED AND THE SKU GOES OUT OF STOCK WE CALL THIS
*    SUBROUTINE TO RECORD THE OUT OF STOCK SELECTION. AN EXAMPLE OF HOW DATA
*    IS STORED IN STKOUT IS STX(SKU)STX(DATE)ETX AND IS TERMINATED BY A ETB.
*    THERE IS ENOUGH MEMORY FOR 64 OUT OF STOCK RECORDINGS. AN OUT OF STOCK
*    SKU WILL HAVE THE LASTEST DATE THAT THE SKU WENT OUT OF STOCK.
*    ANY CARTRIDGE LOAD WILL ERASE THE OUT OF STOCKS THAT ARE NOT IN BANK1
*    OR BANK2.  THERE IS NO CHECKING FOR AN END OF ARRAY CONDITION IN THIS
*    ROUTINE SINCE THERE WILL NEVER BE MORE THAN 32 SKUS PER MAGAZINE.  THE
*    ARRAY VALUE OF 729 IS THE WORST CASE WHERE THERE CAN BE 32 SKUS IN ONE
*    MAGAZINE AND THEY ALL GO OUT OF STOCK, THEN ANOTHER MAGAZINE IS LOADED
*    WITH 32 DIFFERENT SKUS AND THEY ALL GO OUT OF STOCK.
*  FUNCTIONS CALLED
*    READ_CLK    CLOCK.C
*    STRFIND     SEARCH1.C
*  REVISIONS
*   REV    DATE      ENGINEER       DESCRIPTION OF CHANGE
******************************************************************************/

#include "io.h"

extern char date[], time[], intflag, initread;
extern unsigned found;

/*GLOBAL*/
char stkout[maxout]; /*CONTAINS THE SKU NUMBERS THAT ARE OUT OF STOCK*/
char outstock;     /*KEEP TRACK OF THE NUMBER OF SKU'S OUT OF STOCK*/
char vanilla;      /*TELLS US IF VANILLA (001) IS OUT OF STOCK*/

rec_out(skukey)
 char skukey[];
  {
   char k;
   char find;
   char count;     /*COUNTER*/
   char intsku;    /*DECIMAL VALUE OF SKU*/
   unsigned i;

   i = 0;
   read_clk();                  /*GET DATE OF OUT OF STOCK*/
   if (initread == TRUE)        /*INITIAL POWER UP, DON'T RECORD OUT OF STOCK*/
    return;
   while (stkout[i] != ETB && i < maxout)
    i++;
   if (i > (maxout - 17) && stkout[i] == ETB)
    {
/*     printf("FIELD FULL\n");*/
     return;
      }
   if (stkout[i] != ETB) /*FIELD HAS NOT BEEN INITIALIZED*/
    {
     find = FALSE;
```

```
      i = 0; /*POSTION COUNTER = 0*/
      }
   intsku = 0;
   for (count = 0;count < 3;count++)
    intsku = skukey[count] + intsku;      /*RECORD THE SKU IN DECIMAL*/
   if (intsku == 0X91)     /*VANILLA IS OUT OF STOCK, 91 = 001 (30 + 30 + 31)*/
    vanilla = TRUE;
   if (intflag == FALSE)               /*THERE IS NO IRQ INTERRUPT*/
     {
      if (stkout[i] == ETB)
       find = strfind(stkout,skukey);    /*FIND THE SKU*/
      if (find == FALSE)
        {
         stkout[i++] = STX;
         for (k = 0;k < 3;k++)
          stkout[i++] = skukey[k];
         stkout[i++] = ETX;
         for (k = 0;k < 4;k++)
          stkout[i++] = time[k] + 48;  /*RECORD THE TIME IN ASCII*/
         for (k = 0;k < 4;k++)
          stkout[i++] = date[k] + 48;  /*RECORD THE DATE IN ASCII*/
         stkout[i++] = '/';
         stkout[i++] = ETX;
         stkout[i] = ETB;
         outstock++;
        }
     }
   else
     {
      stkout[i++] = STX;
      for (k = 0;k < 3;k++)
      stkout[i++] = skukey[k];
      stkout[i++] = ETX;
      for (k = 0;k < 4;k++)
       stkout[i++] = time[k] + 48;  /*RECORD THE TIME IN ASCII*/
      for (k = 0;k < 4;k++)
       stkout[i++] = date[k] + 48;  /*RECORD THE DATE IN ASCII*/
      stkout[i++] = '/';
      stkout[i++] = ETX;
      stkout[i] = ETB;
      outstock++;  /*INCREMENT OUT OF STOCK COUNTER*/
     }
/*   printf("outstock is %x\n", outstock);*/
   return;
  }


/*****************************************************************************
*  FUNCTION NAME
*  SENDSTK
*=============================================================================
*  DESCRIPTION
*    THIS IS ROUTINE WILL SEND THE OUT OF STOCK LIST TO THE MODEM.
*  FUNCTIONS CALLED
*    BLANKS  COMMUN.C
*    STATUS  MTEST.C
*    MEMPUT  INOUT.C
*  REVISIONS
*  REV   DATE     ENGINEER       DESCRIPTION OF CHANGE
****************************************************************************/

sendstk()
  {
```

```
unsigned i;
char *messg;

i = 0;
while (stkout[i] != ETB && i < maxout)
  i++;
/* printf("stkout count is %d\n", i);
printf("stkout[i] %x\n", stkout[i]);*/

if (stkout[i] == ETB && i < maxout)
  {
   i = 0;
   while (stkout[i] != ETB)            /*LOOP UNTIL THE END OF THE FIELD*/
    {
     status1(2,0X7F,1);
     memout(ACIA1DR,stkout[i]);
     i++;
    }
   status1(2,0X7F,1);
   memout(ACIA1DR,stkout[i]);    /*SEND THE ETB CHARACTER*/
  }
 lf_cr();
 return;
}

/*****************************************************************************
*  FUNCTION NAME
*  DELSTK
*============================================================================
*  DESCRIPTION
*  THIS FUNCTION WILL BE CALLED AFTER A DUMP OF THE OUT OF STOCK LIST
*  REVISIONS
*  REV     DATE     ENGINEER      DESCRIPTION OF CHANGE
*****************************************************************************/

delstk()
 {
  unsigned count;  /*COUNTER FOR OUT OF STOCK LIST*/

  count = 0;
  vanilla = FALSE;
  while (stkout[count] != ETB && count < maxout)  /*LOOP UNTIL END OF FIELD*/
   stkout[count++] = 0;
  stkout[count] = 0;
  outstock = 0;
 }
```

```
/*****************************************************************************
* FUNCTION NAME
* LOADPOS
*============================================================================
* DESCRIPTION
*   THIS FUNCTION WILL ALIGN THE HORIZONTAL AND VERTICAL MOTORS IN THE LOAD
*   POSITION.   THIS SUBROUTINE WILL BE CALLED EVERY TIME THE DOOR IS OPENED.
* FUNCTIONS CALLED
*   MTRSRCH
*   W_CLK     CLOCK.C
*   R_CLK     CLOCK.C
*   MTRSRCH
*   DELAY     KEYBOAD.C
* REVISIONS
* REV     DATE           ENGINEER        DESCRIPTION OF CHANGE
*****************************************************************************

#include "io.h"

/*EXTERNALS*/
extern char vertfwd:    /*ROW (VERTICAL) MOTOR ON IN FORWARD DIRECTION*/
extern char vertrev:    /*ROW (VERTICAL) MOTOR ON IN REVERSE DIRECTION*/
extern char vertoff:    /*ROW (VERTICAL) MOTOR OFF*/
extern char vertbrk:    /*ROW (VERTICAL) MOTOR BRAKE*/


extern char horzcw:   /*COLUMN (HORIZONTAL) MOTOR ON IN FORWARD DIRECTION*/
extern char horzccw: /*COLUMN (HORIZONTAL) MOTOR ON IN REVERSE DIRECTION*/
extern char horzoff: /*COLUMN (HORIZONTAL) MOTOR OFF*/
extern char horzbrk:    /*COLUMN (HORIZONTAL) MOTOR BRAKE*/

extern char errmach:
extern char *errmesg:


loadpos()
 {
  char vertpos:      /*POSITON OF VERTICAL MOTOR*/
  char vertmot:      /*VERTICAL MOTOR*/
  char horzmot:      /*HORIZONTAL MOTOR*/
  char motors:       /*FLAG FOR BOTH MOTORS*/
  char time:         /*TIMER FLAG*/
  char horzsense:    /*HORIZONTAL SENSOR*/
  char *string;

  vertpos = memget(PIA1DRA) & 0X80;
  if (vertpos == 0X00)
   return:
  memput(PIA2DRA.0X06);      /*BRING BOTH PICKERS BACK*/
  delay(0X2000);
  memput(PIA2DRA.0X00); /*STOP PICKER MOTOR*/
  mtrhome(0);            /*MAKE SURE AT HOME POSITION*/
  reset();
  string = "LOAD POSITION";
  w_str(string):
  mtrsrch(3,0,1);        /*HORIZONTAL MOTOR AT BIN 4. DELIVERY IS FALSE, BANK IS
1*/
  memput(PIA1DRB.0X60); --/*MOTOR ON SLOW SPEED*/
```

```
vertmot = vertoff:
horzmot = horzcw:
motors = vertmot & horzmot: /*BOTH ON IN REVERSE DIRECTION*/
memout(PIA1DRA,motors):
horzsense = memget(PIA1DRB) & 0X0C:          /*HORIZONTAL SENSE*/
while (horzsense != 0X0C)
  {
   while (horzsense != 0X0C)
    horzsense = memget(PIA1DRB) & 0X0C:          /*HORIZONTAL SENSE*/
   delay(0X0050):  /*SOFTWARE DEBOUNCE*/
   horzsense = memget(PIA1DRB) & 0X0C:          /*HORIZONTAL SENSE*/
  }
vertmot = vertfwd:    /*VERTICAL MOTOR ON IN FOWARD DIRECTION*/
horzmot = horzbrk:
motors = vertmot & horzmot:
memout(PIA1DRA,motors):
r_clk(0X30):               /*CLEAR INTERRUPT FLAG IF SET*/
w_clk(0X03):
w_clk(0XF3):               /*SET INTERRUPT AT 10 SECONDS*/
w_clk(0X00):
memout(PIA1DRA,motors):
vertpos = memget(PIA1DRA) & 0X80:
while (vertpos == 0X80)
  {
   while (vertpos == 0X80)          /*LOOP UNTIL AT LOAD POSITION SWITCH*/
     {
      memout(PIA1CRA,0X3C):
      memout(PIA1CRA,0X34):          /*TOGGLE WATCHDOG TIMER*/
      vertpos = memget(PIA1DRA) & 0X80:
      time = r_clk(0X00) & 0X01:          /*READ THE CLOCK*/
      if (time == 0X01)          /*SOMETHING IS WRONG*/
       {
        mtrstp():          /*STOP THE MOTORS*/
        reset():
        string = "ERROR LOAD POS":
        w_str(string):
        errmach = TRUE:
        for(;;)
          {
           memout(PIA1CRA,0X3C):
           memout(PIA1CRA,0X34):          /*TOGGLE WATCHDOG TIMER*/
           beep('S'):
          }
       }
     }
    delay(0X0050):                    /*SWITCH DEBOUNCE FOR 15 MILLISECONDS*/
    vertpos = memget(PIA1DRA) & 0X80:
  }
 mtrstp():
 return:
}

/****************************************************************************
*  FUNCTION NAME
*  LDTOHME
*============================================================================
*  DESCRIPTION
*  THIS FUNCTION WILL BE CALLED WHEN THE DOORS ARE CLOSED.  THE MOTORS WILL
*  GO FROM A LOAD POSITION TO A HOME POSITION
*  PARAMETER PASSED
*   MODE       IF MODE = 0 THEN WE ARE INITIALIZING MOTORS. IF MODE = 1 WE
*              ARE CLOSING THE DOORS AND GOING TO HOME POSITION
*  FUNCTIONS CALLED
*  MTRHOME
*  W_CLK    CLOCK.C
*  R_CLK    CLOCK.C
```

```
*  MACHERA CMUIEM.C
*  DELAY   KEYBOAD.C
*  REVISIONS
*  REV     DATE    ENGIUNER          DESCRIPTION OF CHANGE
****************************************************************************

ldtohme(mode)
 char mode;
 {
  char vertpos;        /*POSITON OF VERTICAL MOTOR*/
  char vertmot;       /*VERTICAL MOTOR*/
  char horzmot;       /*HORIZONTAL MOTOR*/
  char motors;        /*FLAG FOR BOTH MOTORS*/
  char time;          /*TIMER FLAG*/
  char length;        /*LENGTH OF TIME OUT*
  char *string;

  reset();
  string = "LOAD TO HOME";
  w_str(string);
  vertmot = vertrev;    /*VERTICAL MOTOR ON IN REVERSE DIRECTION*/
  horzmot = horzoff;    /*HORIZONTAL MOTOR OFF*
  motors = vertmot & horzmot;
  memout(PIA1DRB,0X60);    /*MOTOR ON SLOW SPEED*/
  r_clk(0X00);          /*CLEAR INTERRUPT FLAG IF SET*/
  w_clk(0X03);
  if (mode == 1)
   length = 0XF5;       /*TIME OUT AFTER 10 SECONDS*/
  else
   length = 0XF4;       /*TIME OUT AFTER 5 SECONDS*/
  w_clk(length);               /*SET TIME OUT*/
  w_clk(0X00);
  memout(PIA1DRA,motors);
  vertpos = memget(PIA2DRB) & 0X01;
  while (vertpos == 0X01)
   {
    while (vertpos == 0X01)          /*LOOP UNTIL AT HOME POSITION SWITCH*/
     {
      memout(PIA1CRA,0X3C);
      memout(PIA1CRA,0X34);          /*TOGGLE WATCHDOG TIMER*/
      vertpos = memget(PIA2DRB) & 0X01;
      time = r_clk(0X00) & 0X01;          /*READ THE CLOCK*/
      if (time == 0X01)             /*SOMETHING IS WRONG*/
       {
        if (mode == 1)
         {
          mtrstp();           /*STOP THE MOTORS*/
          reset();
          string = "ERROR LD TO HOME";
          w_str(string);
          errmach = TRUE;
          for(;;)
           {
            memout(PIA1CRA,0X3C);
            memout(PIA1CRA,0X34);          /*TOGGLE WATCHDOG TIMER*/
            beep('S');
              }
         }
        else
         goto stop;         /*GET OUT OF BOTH LOOPS*/
       }
     }
    delay(0X0025);                  /*SWITCH DEBOUNCE FOR 7 MILLISECONDS*/
    vertpos = memget(PIA2DRB) & 0X01;
   }
 stop:
```

```
mtrstop();
if (mode == 1)
 mtrhome(3);                /*MOTOR HOME FROM BIN 4*/
return;
}


/**************************************************************************
*  FUNCTION NAME          MODULE NAME            PROGRAM NAME
*  TRAIN                   MTEST.                 COMET CONTROL
*==========================================================================
*  DESCRIPTION:
*    THIS FUNTION INITIALIZES THE MODEM AFTER EVERY RESET.
*    WE USE THE CLOCK TIMER TO DETERMINE IF WE HAVE A MODEM AND IF WE HAVE
*    A FAULTY MODEM.  IF TRAIN IS NOT COMPLETED AFTER 5 SECONDS WE DO NOT
*    HAVE A MODEM.
*  FUNCTIONS CALLED
*   COMMAND     CMODEM.C
*   STATUS      MTEST.C
*   MEMPUT      INOUT.C
*   W_CLK       CLOCK.C
*   ECHO        MTEST.C
*   MESSAGE     MTEST.C
*  FUNCTIONS THAT CALL TRAIN
*   SETUP  FILE INIT.C
*  REVISIONS
*  REV     DATE     ENGINEER                DESCRIPTION OF CHANGE
**************************************************************************/

#include "io.h"


/*GLOBAL*/
char mexist;      /*DEFINES IF MODEM EXISTS OR NOT*/
char moderr[10]; /*HOLDS THE NUMBER OF ERRORS USED WHILE IN ANALOG LOOP TEST*/

/*STATIC GLOBAL*/
static char *string; /*POINTER TO A STRING THAT WILL BE PASSED TO THE DISPLAY*/

train()
 {
  char *messg; /*STORAGE FOR STRING TO BE SENT TO MODEM*/
  char value;  /*STATUS VARIABLE*/

/*  printf("TESTING FOR MODEM\n");*/
  reset();
  string = "MODEM TEST";
  w_str(string);
  mexist = FALSE;
  memout(ACIA1SR,0X55);  /*RTS LINE IS HIGH, HANG UP MODEM*/
  delay(0X0500);
  memout(ACIA1SR,0X15);    /*RTS LINE LOW*/
  delay(0X0700);           /*DELAY FOR RTS TO GO LOW*/
  memget(ACIA1SR);
  memget(ACIA1DR);       /*CLEARS DCD BIT*/
  w_clk(0X03);           /*CLOCK INTERRUPT REGISTER IS SELECTED*/
  w_clk(0XFC);           /*SET INTERRUPT AT 5 SECONDS, REPEATABLE*/
  w_clk(0X00);           /*ENABLE INTERRUPT*/
  r_clk(0X00);
  for(;;)
   {
    messg = "ATV0";        /*STATUS MESSAGES WILL BE ABBRIVEATED TO ONE DIGIT*/
    value = command(messg);
    if (value != 0X0D) /*WE HAVE AN ERROR*/
     break;
```

```
  value = message();
  if (value != 0)
   break;
  messg = [illegible]
  value = command(messg);
  if (value != 0X0D) /*WE HAVE AN ERROR*/
   break;
  value = message();
  if (value != 0)
   break;
  mexist = TRUE;          /*MODEM EXISTS AND IS WORKING*/
  break;
 }
w_clk(0X0C);              /*STOP INTERRUPT*/
w_clk(0XF0);              /*NO INTERRUPT*/
w_clk(0X01);              /*NORMAL OPERATION STARTED*/
r_clk(0X00);              /*CLEAR INTERRUPT FLAG*/
if (mexist == TRUE)
 string = "MODEM PASS";
else
 string = "MODEM FAIL";
reset();
w_str(string);
delay(0X1000);
memget(ACIA1SR); /*CLEAR ERROR CODES AND DCD BIT*/
memget(ACIA1DR);
return;
}

/************************************************************************
*  FUNCTION NAME
*  STATUS
*=======================================================================
*  DESCRIPTION:
*  THIS FUNCTION PERFORMS A STATUS CHECK OF THE ACIA.
*  FUNCTIONS CALLED
*     MEMPUT  INOUT.C
*     MEMGET  INOUT.C
*     BEEP    KEYBOAD.C
*     R_CLK   CLOCK.C
*  PARAMETERS PASSED
*     A AND B.   IF A IS A 2. WE ARE LOOKING FOR A EMPTY TRANSMIT DATA
*                REGISTER.  IF A IS A 1. WE ARE LOOKING FOR A FULL RECIEVE
*                DATA REGISTER.
*     ACIA       DETERMINES WHETHER ACIA1 OR ACIA2 IS SELECTED
*  PARAMETERS RETURNED
*     I     THE STATUS OF THE ACIA
*  REVISIONS
*  REV      DATE      ENGINEER         DESCRIPTION OF CHANGE
************************************************************************/
status(a,b,acia)
 char a, b, acia;
  {
   char stat;             /*TEMPORARY STORAGE*/
   char time;          /*FLAG FOR A TIME OUT IF NO DATA RECIEVED*/
   unsigned portst;    /*STATUS REGISTER*/
   unsigned portdat;  /*DATA REGISTER*/

   portst = ACIA2SR;
   portdat = ACIA2DR;
   memput(ACIA2SR,0X15);
   stat = memget(portst) & b;
   while (stat != a)    /*WAIT UNTIL ACIA IS READY*/
    {
```

```
      stat = memget(portst) & b;
      time = r_clk(0X00) & 0X01;       /*READ THE INTERRUPT CONTROL REGISTER*/
      if (time == 0X01)
       stat = 0X74;
      if (a == 2 && (stat == 3 || stat == 0X23))
        {
         reset();
         string = "TRANSMIT ERROR";
         w_str(string);
         delay(0X1000);
         memget(ACIA2SR);
         memget(ACIA2DR);
         for (;;);                  /*LOOP UNTIL RESET OCCURS*/
        }
      if (stat > 0X0F)      /*IF STAT > 15 THEN WE HAVE AN ERROR*/
        {
         if (stat == 0X74)
           {
            string = "TIME OUT";
            reset();
            w_str(string);
            delay(0X1000);
           }
         memget(ACIA2SR);
         memget(ACIA2DR);
         for (;;);          /*LOOP UNTIL RESET OCCURS*/
        }
      }
        return(stat);                   /*RETURN STATUS MESSAGE*/
   }


status1(a,b,acia)
 char a, b, acia;
  {
   char stat;             /*TEMPORARY STORAGE*/
   char time;         /*FLAG FOR A TIME OUT IF NO DATA RECIEVED*/
   unsigned portst;   /*STATUS REGISTER*/
   unsigned portdat; /*DATA REGISTER*/

   portst = ACIA1SR;
   portdat = ACIA1DR;
   stat = memget(portst) & b;
   while (stat != a)    /*WAIT UNTIL ACIA IS READY*/
    {
     memout(PIA1CRA,0X3C);     /*TOGGLE WATCHDOG TIMER*/
     memout(PIA1CRA,0X34);
     stat = memget(portst) & b;
     time = r_clk(0X00) & 0X01;      /*READ THE INTERRUPT CONTROL REGISTER*/
     if (time == 0X01)
      stat = 0X74;
      if (a == 2 && (stat == 3 || stat == 0X23))
       {
        reset();
        string = "TRANSMIT ERROR";
        w_str(string);
        delay(0X1000);
        errmod(stat);
        memget(ACIA1SR);
        memget(ACIA1DR);
        return(stat);
       }
      if (a == 1 && stat > 1 && stat <= 0X0F)
            return(stat);
          if (stat > 0X0F)      /*IF STAT > 15 THEN WE HAVE AN ERROR*/
       {
        if (stat == 0X74)
```

```
  {
   string = "TIME OUT";
   reset();
   w_scr(string);
   delay(0x1D00);
  }
 memget(ACIA1SR);
 memget(ACIA1DR);
 return(stat);
 }
  }
 return(stat);                       /*RETURN STATUS MESSAGE*/
}
/*****************************************************************************
*  FUNCTION NAME
*  ECHO
*============================================================================
*  DESCRIPTION:
*    EACH TIME A COMMAND CHARACTER IS SENT THE MODEM. THE CHARACTER WILL BE
*    ECHOED BACK.
*  FUNCTIONS CALLED
*    MEMGET  INOUT.C
*  PARAMETERS RETURNED
*    VALUE   RETURNED VALUE FROM MODEM
*  REVISIONS:
*  REV   DATE   ENGINEER         DESCRIPTION OF CHANGE
*****************************************************************************/

echo()
 {
  char value: /*RETURNED VALUE FROM MODEM*/

  value = status1(1,0X7D,1);
  if (value > 0)
   {
    errmod(value);
    return(value):
   }
  value = memget(ACIA1DR);
  return(value):
 }

/*****************************************************************************
*  FUNCTION
*  MESSAGE
*============================================================================
*  DESCRIPTION:
*    THIS FUNCTION WILL GET THE STATUS MESSAGE FROM THE MODEM.
*  FUNCTIONS CALLED
*    MEMGET  INOUT.C
*    STATUS  MTEST.C
*    BEEP    KEYBOAD.C
*  PARAMETERS RETURNED
*    CODE   INTEGER VALUE OF OF THE STATUS MESSAGE FROM THE MODEM
*    X       ERROR MESSAGE
*  REVISIONS:
*  REV   DATE   ENGINEER       DESCRIPTION OF CHANGE
*****************************************************************************/
message()
 {
  char i;          /*COUNTER*/
  char x;          /*ERROR MESSAGE FROM STATUS*/
  char value[17]; /*HOLDS STATUS MESSAGE FROM MODEM*/
  char code:       /*INTEGER VALUE OF STATUS MESSAGE*/
  char tempval;
```

```
temoval = 0;

reset();
string = "RESULT = ".
w_str(string):
for (i = 0;temoval != 0X0D;i++) /*LOOP UNTIL CARRIAGE RETURN*/
  {
   x = status1(1,0X7D,1);
   if (x > 0)                                    /*ERROR*/
    {
     errmod(x);
     return(0XFF):
    }
   value[i] = memget(ACIA(DR));
   temoval = value[i];
  }
 i = 0;
 code = 0;
 while (value[i] != 0X0D)
  {
   busy();
   w_disp(value[i]):
/*       moderr[i] = value[i];*/
   code = 10 * code + value[i] - '0'; /*CONVERTS VALUE TO INTEGER*/
   i++;
  }
 return(code);
}
/**************************************************************************
*   FUNCTION NAME
*   ERRMOD
*=========================================================================
-   DESCRIPTION
*   THIS ROUTINE REPORTS ERROR MESSAGES WHEN COMMUNICATING WITH THE MODEM
**************************************************************************/

errmod(value)
 char value:
 {
  reset();
  switch (value)
   {
    case 0X03:
     string = "TDRE, RDRF SET";
     break:
    case 0X09:
     string = "CTS, RDRF SET";
     break:
    case 0X0C:
     string = "CTS AND DCD SET";
     break;
    case 0X08:
     string = "CTS SET":
     break;
    case 0X04:
     string = "DCD SET";
     break:
    case 0X0D:
     string = "DCD, CTS, RDRF";
     break;
    case 0X23:
     string = "OVRN, TDRE, RDRF";
     break;
    default:
     string = "ERROR";
     break:
```

```
w_str(string);
delay(0X1D00);
return;
}


          NAM tables
              TTL 'TABLE LOOKUP AND MOTOR SETUP'
          GLOBAL vertfwd
          GLOBAL vertrev
          GLOBAL vertoff
          GLOBAL vertbrk
          GLOBAL horzcw
          GLOBAL horzccw
          GLOBAL horzoff
          GLOBAL horzbrk
          GLOBAL setmt
          GLOBAL error
          GLOBAL keys
          GLOBAL horzbin
          GLOBAL vertbin

          DSCT
vertfwd   RMB 1
vertrev   RMB 1
vertoff   RMB 1
vertbrk   RMB 1
horzcw    RMB 1
horzccw   RMB 1
horzbrk   RMB 1
horzoff   RMB 1

          PSCT


setmt CLRA
      LDA #$0F
      STA vertfwd   ROW (VERTICAL) MOTOR ON IN FORWARD DIRECTION
      LDA #$07
      STA vertrev   ROW (VERTICAL) MOTOR ON IN REVERSE DIRECTION
      LDA #$2F
      STA vertoff   ROW (VERTICAL) MOTOR OFF
      LDA #$1F
      STA vertbrk   ROW (VERTICAL) MOTOR BRAKE
      LDA #$3B
      STA horzcw    COLUMN (HORIZONTAL) MOTOR ON IN FORWARD DIRECTION
      LDA #$3A
      STA horzccw   COLUMN (HORIZONTAL) MOTOR ON IN REVERSE DIRECTION
      LDA #$3D      #3C
      STA horzoff   COLUMN (HORIZONTAL) MOTOR OFF
      LDA #$3D
      STA horzbrk   COLUMN (HORIZONTAL) MOTOR BRAKE
      RTS

* THIS IS THE LOOKUP TABLE FOR THE SERVICE KEYBOARD
keys FCC 'Y321N654I987IE0C'

* THIS IS THE ERROR MESSAGE TABLE
error FCB 1,2,3,4,5,6

*CONTAINS THE COLUMN THAT THE SKU IS LOCATED AT
horzbin FCB 1,1,3,4,6,1,3,4,6,1,3,4,6,1,3,4,6,1,3,4,6,1,3,4,6,1,3,4,6,1,3,4,6,1,
3,4,6,2,5
```

```
*CONTAINS THE ROW THAT THE SKU IS LOCATED AT
vertbin FCB 1,1,1,1,1,2,2,2,2,3,3,3,3,4,4,4,4,5,5,5,5,6,6,6,6,7,7,7,7,8,8,8,8,9
9,9,9,7,7

       END setmt


*THIS IS THE START UP ROUTINE FOR COMET

      TTL       'THE COMET STARTUP ROUTINE'
      NAM       relstrt
      GLOBAL    .START
          GLOBAL    .FIRQ
      GLOBAL    out
      GLOBAL    .IRQ
      GLOBAL    hangup
      GLOBAL    intflag,countbp
      GLOBAL    sndbeep
      EXTERN    main
      EXTERN    firq
      EXTERN    setup
      EXTERN    irq,beep,key,delay
      EXTERN    .LINK
      EXTERN    cartrge,getsku,ldtohme
      EXTERN    cold
      EXTERN    setmt

*RESERVE MEMORY FOR STACK
          DSCT
          RMB 2560
stack     EQU *
countbp   RMB 2
intflag   RMB 1

          PSCT

.START    LDS  #stack      PROGRAM WILL JUMP HERE ON A RESET
          CLRA
          JSR  setmt       SET UP MOTOR VALUES AND LOOK UP VALUES
          CLRA
          JSR  setup
                ANDCC #$AF
          JSR  main
          JMP  .START


out    CLRA                PROGRAM JUMPS HERE WHEN DOORS CLOSE. SERVICE MODE

       LDA    cartrge      HAS A FUNCTION BEEN PERFORMED?
       CMPA   #1
       BEQ    .out1        BRANCH IF THERE HAS
       JSR    sndbeep      SOUND THE BEEPER
.out1  LDS    #stack
       LDD    #1           MODE 1
       PSHS   D            PUSH ON STACK
       LDA    #2           TELL LDTOHME THERE IS A PARAMETER BEING PASSED
       JSR    ldtohme
       CLRA
       JSR    getsku
       ANDCC  #$AF         ENABLE THE INTERRUPTS
*       LDA    #$55         SET THE FLAG FOR A WARM START
*       STA    cold         STORE AWAY
       CLRA
       JSR main
```

```
.FIRQ LDA   #$00
      STA   intflag         CLEAR INTERRUPT FLAG
      CLRA
      JSR   firq            JUMP TO FIRQ INTERRUPT ROUTINE
      CLRA
      RTI


hangup CLRA                 PROGRAM JUMPS HERE IF MODEM WAS HUNG UP IN IRQ
       LDS   #stack         INTERRUPT
       ANDCC #$AF
       CLRA
       JSR   main

.IRQ  LDA   #$01            PROGRAM JUMPS HERE WHEN EMU BUTTON IS PRESSED
      STA   intflag         SET INTERRUPT FLAG
      CLRA
      JSR irq
      LDA   #$00
      STA   intflag         RESET INTERRUPT FLAG
      LDB   #$55            RESET INTERRUPT
      STB   $FF5D
      CLRA
      RTI                    RETURN FROM INTERRUPT

.PWRDWN   LDU   #$FB00   TURN MOTORS OFF
          LDB   #$003C
          STB   0,U
          LDU   #$FA80   OPEN UP REED SWITCHS
          LDB   #$0040
          STB   0,U
.PWR1     NOP
          BRA   .PWR1      WAIT FOR A WATCHDOG RESET

sndbeep   CLRA
          LDA   #$0A          COUNT TEN TIMES BEFORE EXITING
          STA   countbp
beep1     LDD   #$053         'S' OR SHORT BEEP
          PSHS  D
          LDA   #2
          JSR   beep          SOUND THE BEEPER
          LDA   countbp
          DECA
          BEQ   beep2         BRACH IF DONE
          STA   countbp
          LDD   #$0050        DELAY BEFORE BEEP AGAIN
          PSHS  D
          LDA   #2
          JSR   delay
          BRA   beep1         LOOP AGAIN
beep2     RTS                 RETURN

          ASCT
*INTERRUPT VECTORS

          ORG $FFF6              TEST VECTOR
*FIRQ INTERRUPT
          FDB .FIRQ
*IRQ INTERRUPT
          FDB .IRQ

          ORG $FFFC
*NMI INTERRUPT
          FDB .PWRDWN
```

```
*POWER ON RESET INTERRUPT
        FDB .START

        END .START


/*    WORST CASE ANALYSIS FOR DATA STORAGE
*     1. MAXBANK (STX(SKU)STX(BUTTON)STX(BIN)STX(QUANTITY)ETXETB)
*        (36 BINS * 3 BYTES PER) + (36 QUANTITYS * 2 BYTES PER) + (32 BUTTONS *
*        3 BYTES PER) + (32 SKUS * 3 BYTES PER) + (32 * (4 STX + 1 ETX)) = 532
*         + 1 ETB = 533 TOTAL BYTES.
*     2. MAXSKU (STX(SKU)ETXETB)
*        (32 SKU'S * 5(3 SKU + 1 ETX + 1 STX)) * 2 (2 CARTRIDGES)) =
*        320 BYTES + 1 ETB = 321 TOTAL BYTES.
*     3. MAXSALE (STX(SKU)STX(TIME)/(DATE)ETXETB)
*        (32 SKU'S * 6 (2 STX + 3 SKU + 1 ETX)) * 2 (2 CARTRIDGES)
*        + (72 BINS * 7 (TIME AND DATE + /) * 6 SALES PER BIN) = 4272 BYTES +
*        1 ETB = 4273 TOTAL BYTES
*     4. MAXOUT (STX(SKU)STX(DATE)ETXETB)
*        WE WILL ALLOW SPACE FOR 20 SKU'S TO GO OUT OF STOCK
*        (20 SKU'S * 6 (3 SKU + 2 STX + 1 ETX)) + (20 * 6 (DATE FIELD)) +
*        (20 * 4 (TIME FIELD)) = 320 BYTES + 1 ETB = 321 TOTAL BYTES.
*     5. MAXPRC (STX(SKU)STX(PRICE)ETXETB)
*        (64 SKU'S * 6 (3 SKU + 2 STX + 1 ETX)) + (64 SKU'S * 4 (PRICE FIELD))
*        = 640 BYTES + 1 ETB = 641 BYTES.                                      */
#define TRUE 1
#define FALSE 0
#define SOH 1            /*START OF HEADER*/
#define STX 2            /*START OF TEXT*/
#define ETX 3            /*END OF TEXT*/
#define ETB 23           /*END OF BLOCK*/
#define maxbank 533      /*MAX SIZE FOR CARTRIDGE DATA*/
#define maxsku 321       /*MAX SIZE FOR SKU NUMBERS*/
#define maxid 20         /*MAXIMUM NUMBER FOR ID NUMBER*/
#define maxnum 20        /*MAXIMUM NUMBER FOR PHONE NUMBER*/
#define maxfunc 6        /*MAXIMUM NUMBER FOR THE AMOUNT OF FUNCTIONS*/
#define maxtest 9        /*MAXIMUM NUMBER OF TEST FUNCTIONS*/
#define maxsale 4273     /*MAXIMUM LENGTH FOR SALE ARRAY. TIME AND DATE*/
#define maxout 321       /*MAXIMUM OUT OF STOCK DATA*/
#define maxprc 641       /*MAXIMUM PRICE FIELD*/

/*THIS FILE DEFINES THE I/O PORTS*/

/*    THE FIRST ACIA IS DEVICE U8.*/
#define    ACIA1CR    0XF940  /*F940 FOR REAL*/ /*F891-for extra board*/
#define    ACIA1SR    0XF940
#define    ACIA1DR    0XF941  /*F940 FOR REAL*/ /*F890 for extra board*/

#define    ACIA3CR    0XF940
#define    ACIA3SR    0XF940
#define    ACIA3DR    0XF941

/*    THE SECOND ACIA IS DEVICE U9. THIS DEVICE WILL CONTOL THE MODEM
      COMMUNICATIONS.*/
#define    ACIA2CR    0XF980
#define    ACIA2SR    0XF980
#define    ACIA2DR    0XF981

/*    THIS IS DEVICE U7 ON THE 6809 CONTROL MODULE. THIS PIA WILL BE USED FOR
      MOTOR CONTROL AND HALL EFFECT SENSOR DETECTION.*/
#define    PIA1DRA    0XFB00
#define    PIA1DRB    0XFB01
#define    PIA1CRA    0XFB02
#define    PIA1CRB    0XFB03
```

```
/*   THIS PIA WILL BE USED FOR THE BEEPER AND SWITCH DETECTION OF PRICE/LAMP.
     MAGAZINE LOAD. FIRE. HOME. ICE CREAM TAKEN. AND LAMP SWITCHES.
     IT WILL ALSO BE USED FOR SOLID STATE RELAY CONTROL.*/

#define   PIA2DRA    0XFA80
#define   PIA2DRB    0XFA81
#define   PIA2CRA    0XFA82
#define   PIA2CRB    0XFA83

/*    THIS PIA WILL BE USED FOR REAL TIME CLOCK. A/D. 74C922 CONTROL. ALSO.
      THE RING INDICATOR FOR THE MODEM IS DETECTED WITH THIS PORT.*/

#define   PIA3DRA    0XFA43
#define   PIA3DRB    0XFA42
#define   PIA3CRA    0XFA41
#define   PIA3CRB    0XFA40

/*   THIS IS DEVICE U2 ON THE PIA MODULE.  IT CONTROLS THE DISPLAY.  PORT3
     IS USED AS A BUS FOR THE REAL TIME CLOCK. A/D. CARTRIDGE AND DISPLAY.
     PORT4. PA0 - PA4. IS USED AS THE HIGHER ORDER ADDRESSES FOR THE
     CARTRIDGE*/

#define   PIA4DRA    0XFA47
#define   PIA4DRB    0XFA46
#define   PIA4CRA    0XFA45
#define   PIA4CRB    0XFA44
```

```
/*************************************************************************
*   MODULE NAME                  PROGRAM NAME
*   SCAN.C                       COMET KEYBOARD
*========================================================================
*   DESCRIPTION:
*     THIS MODULE WILL SCAN THE KEYBOARD.  WE WILL DO THIS BY SENDING A
*     1110B TO PA0 - PA3. THEN WE WILL READ PB0 - PB7, TO SEE IF A BUTTON
*     HAS BEEN PRESSED. IF NOT WE WILL SEND A 1101B, THEN A 1011B, AND
*     SO ON.  WHEN A BUTTON IS READ WE WILL CALL WAIT WHICH WILL DEBOUNCE
*     THE KEY.  WE THEN DECODE THE BUTTON AND SEND IT TO THE CONTROL
*     MICROPROCESSOR OVER THE ACIA
*
*   FUNCTIONS CALLED
*     MEMPUT    INOUT.C
*     TALK      TALKMICR.C
*     CONVERT   SCAN.C
*     WAIT      SCAN.C
*   REVISION
*   REV    DATE       ENGINEER         DESCRIPTION OF CHANGE
*************************************************************************/

#include "io.h"


scan()
 {
  char rows:     /*HOLDS THE VALUE THAT IS TO BE SENT TO THE ROWS OF THE KEYBOARD*/

  char key:      /*DATA ENTERED FROM THE KEYBOARD*/
  char valid:    /*FLAG TO TELL US IF A VALID KEYSTROKE HAS BEEN ENTERED*/
  char button:   /*HOLDS THE INTEGER VALUE OF THE BUTTON SELECTED*/
  char prevbut:  /*BUTTON THAT WAS PRESSED BEFORE WE SENT IT*/

  rows = 0XFE:                       /*SEND OUT A 1110B*/
  for(;;)
   {
    memput(PIA2CRA,0X3C):        /*RESET THE WATCHDOG TIMER*/
    memput(PIA2CRA,0X34):        /*BRING IT LOW AGAIN*/
    memput(PIA1DRA,rows):              /*SEND OUT DATA*/
    key = memget(PIA1DRB):             /*READ THE DATA BACK*/
    if (key != 0XFF)                   /*A KEY HAS BEEN HIT*/
     {
      valid = wait(key):            /*DEBOUNCE SWITCH AND GET BACK VALID ANSWER*/
      if (valid == TRUE)
       {
        prevbut = key:             /*SAVE THE BUTTON*/
        button = convert(key,rows):  /*CONVERT TO DIGIT*/
        if (button != 0XFF)
         {
          talk(button):            /*A VALID BUTTON HAS BEEN HIT. SEND TO ACIA*/
          enirq();                 /*ENABLE THE IRQ INTERRUPT*/
         }
        buthold(prevbut);         /*IS THE BUTTON STILL HELD DOWN?*/
       }
     }
    rows = ~((~rows) << 1):     /*SHIFT TO THE LEFT ONCE*/
    if (rows == 0XEF)
     rows = 0XFE;                     /*GO BACK TO BEGINNING SCAN*/
   }
 }
```

```
/*****************************************************************************
* FUNCTION NAME
* WAIT
*============================================================================
* DESCRIPTION:
*   WE WAIT A SPECIFIED AMOUT OF TIME AND THEN WE CHECK THE KEY AGAIN TO
*   SEE IF IT IS STILL PUSHED. IF IT IS A TRUE HIT, THEN WE WILL RETURN A
*   TRUE.
*
* FUNCTIONS CALLED
*   MEMSET    INOUT.C
* PARAMETERS PASSED:
*   KEY       THE VALUE FOR THE BUTTON THAT HAS BEEN HIT
* PARAMETERS RETURNED:
*   VALID     TRUE OR FALSE, IS THE BUTTON VALID
*****************************************************************************/

wait(key)
 char key;
  {
   char tkey;          /*KEYSTROKE READ FROM KEYBOARD*/
   unsigned delay;  /*COUNTER*/

   for (delay = 0;delay < 0X1000;delay++)
    ;
   tkey = memget(PIA1DRB);                   /*READ IN KEY VALUE*/
   if (tkey != key)
    return(FALSE);
   return(TRUE);
  }

/*****************************************************************************
*  FUNCTION NAME
*  CONVERT
*============================================================================
*  DESCRIPTION:
*     CONVERTS A VALID KEY PRESSED INTO A DIGIT TO BE SENT TO THE CONTROL
*     MICROPROCESSOR.
*  FUNCTIONS CALLED
*     NONE
*  PARAMETERS PASSED:
*     ROWS  VALUE THAT WAS SCANNED
*     KEY   DATA THAT WAS READ
*  PARAMETERS RETURNED:
*     BUTTON INTEGER VALUE OF KEY
*****************************************************************************/

convert(key,rows)
 char key, rows;
  {
   char button; /*INTEGER VALUE OF KEY PRESSED*/
   char valid;  /*VALID KEY FLAG*/

   valid = TRUE;
   switch (key)
    {
     case (0XFE):
      button = 0X01;
      break;
     case (0XFD):
      button = 0X02;
      break;
```

```
    case (0XFB):
     button = 0X03:
     break:
    case (0XF7):
     button = 0X04;
     break:
    case (0XEF):
     button = 0X05:
     break.
    case (0XDF):
     button = 0X06:
     break:
    case (0XBF):
     button = 0X07:
     break:
    case (0X7F):
     button = 0X08:
     break:
    default:
     valid = FALSE:
   }

  if (valid == FALSE)
   return(0XFF):               /*A INVALID KEY HAS BEEN PRESSED*/
  if (rows == 0XFD)
   button += 8:               /*THIS IS THE SECOND ROW SO ADD 8*/
  else
   if (rows == 0XFB)
    button += 16:              /*THIS IS THE THIRD ROW SO ADD 16*/
   else
    if (rows == 0XF7)
     button += 24:             /*THIS IS THE THIRD ROW SO ADD 24*/
  return(button):
 }


/*****************************************************************************
*    FUNCTION NAME
*    BUTHOLD
*============================================================================
*    DESCRIPTION
*    THIS FUNCTION WILL CHECK TO SEE IF THE PREVIOUS BUTTON PRESSED IS STILL
*    HELD DOWN.  IF IT IS, WE WILL WAIT TO MAKE SURE BUTTON IS RELEASED BEFORE
*    SCANNING AGAIN.
*    REV     DATE       ENGINEER        DESCRIPTION OF CHANGE
*****************************************************************************/

buthold(prevbut)
 char prevbut:
 {
  char key:    /*BUTTON THAT IS PRESSED*/

  key = prevbut:
  while (key == prevbut)
   {
    memput(PIA2CRA.0X3C):       /*RESET THE WATCHDOG TIMER*/
    memput(PIA2CRA.0X34):       /*BRING IT LOW AGAIN*/
    key = memget(PIA1DRB):
   }
  return:
 }
```

```
/*************************************************************************************
*  FUNCTION NAME                  MODULE NAME                  PROGRAM NAME
*  BEEP                           BEEPER.C                     COMET KEYBOARD
*====================================================================================
*  DESCRIPTION
*   THIS IS THE BEEPER ROUTINE.  WE WILL GET THE LENGTH OF THE BEEP FROM
*   COMET CONTROL AND WE WILL BEEP FOR THAT LENGTH OF TIME AND THEN EXIT
*  FUNCTIONS CALLED
*   STATUS     TALKMIDR.C
*  REVISIONS
*   REV        DATE        ENGINEER           DESCRIPTION OF CHANGE
*************************************************************************************/

#include "io.h"

extern char indicator;

beep()
 {
  char length;          /*LONG OR SHORT BEEP*/
  char i;               /*COUNTER*/
  char loop;            /*NUMBER OF TIMES TO LOOP FOR BEEP*/
  char value;           /*STORAGE VALUE*/
  unsigned x;           /*COUNTER*/
  unsigned time;        /*AMOUNT OF TIME TO BEEP*/

  status(1,0X75);
  memout(ACIACSR,0X55);        /*DISABLE CLEAR TO SEND*/
  length = memget(ACIACDR);    /*GET THE LENGTH TO TURN ON BEEPER*/
  if (length == 'L')
   {
    time = 0X0100;             /*LONG BEEP*/
    loop = 3;
   }
  else
   {
    time = 0X0200;             /*SHORT BEEP*/
    loop = 1;
   }
  for (i = 0;i < loop;i++)
   {
    value = indicator | 0X20;
    for (x = 0;x < time;x++)
     {
      memout(PIA2DRA,value);         /*TURN BEEPER ON*/
     }
    value = indicator & 0XDF;
    memout(PIA2DRA,value);       /*TURN BEEPER OFF*/
    delay(0X200);
   }

  return;
 }
/*************************************************************************************
*  FUNCTION
*  DELAY
*====================================================================================
```

```
*  DESCRIPTION
*     HIS FUNCTION WILL CAUSE A DELAY WHICH IS EQUAL TO TIME * 30 USEC.
*    THERFORE, AN INPUT OF A000 HEX (40960 DECIMAL) IS APPROXIMATELY 1.2
*    SECONDS.
*  FUNCTIONS CALLED
*    NONE
*  PARAMETERS PASSED
*    TIME     THE LENGTH OF TIME THE DISPLAY WILL BE
*  REVISIONS
*  REV      DATE      ENGINEER      DESCRIPTION OF CHANGE
**************************************************************************************


delay(time)
 unsigned time;
 {
  unsigned count;
  for (count = 0; count < time; count++)
   {
    memout(PIA0CRA,0X3C);         /*RESET THE WATCHDOG TIMER*/
    memout(PIA0CRA,0X34);         /*BRING IT LOW AGAIN*/
   }
  return;
 }
```

```
*****************************************************************************
* FUNCTION NAME                    MODULE NAME            PROGRAM NAME
* SENDPRC.C                        PRICE.C                KEYBOARD CONTROL
*============================================================================
* DESCRIPTION
*   THIS FUNCTION WILL SEND THE PRICE TO THE DISPLAYS.
* FUNCTIONS CALLED
*   MEMPU   INOUT.C
*   MEMSET  INOUT.C
* VARIABLE PASSED
*  PRCOUT   THIS IS AN ARRAY THAT CONTAINS ALL THE BUTTON NUMBERS THAT ARE
*           TO BE DISPLAYED.
*  SAVECDE  THIS ARRAY CONTAINS THE PRICE INFORMATION
* REVISIONS
* REV       DATE        ENGINEER        DESCRIPTION OF CHANGE
*****************************************************************************

#include "io.h"


sendprc(prcout,savecde)
 char prcout[],savecde[];

   char count;        /*COUNTER*/
   char port;         /*PIA PORT TO BE WRITTEN TO*/
   char pricecd;      /*PRICE CODE THAT IS WRITTEN TO THE DISPLAYS*/

  for (count = 0;count < 4;count++)
   {
    if (count == 3)     /*FOURTH DIGIT BEING ENTERED*/
     {
      switch(savecde[count])
       {
        case 1:
         pricecd = 0X10;
         break;
        case 10:
         pricecd = 0X00;
         break;
        case 11:
         pricecd = 0X3F; /* PLEASE MAKE ANOTHER SELECTION 1 */
         break;
        case 20:
         pricecd = 0X2F; /* PLEASE MAKE ANOTHER SELECTION */
         break;
        default:
         pricecd = 0X2F;
         break;
       }
     }
    else
     {
      switch (savecde[count])
       {
        case 0:
         pricecd = 0X7E;  /*'0'*/
         break;
```

```
        case 1:
         priced = 0X18: /*'1'*/
         break:
        case 2:
         priced = 0X6D:  /*'2'*/
         break:
        case 3:
         priced = 0X3D:  /*'3'*/
         break:
        case 4:
         priced = 0X19:  /*'4'*/
         break:
        case 5:
         priced = 0X37   /*'5'*/
         break:
        case 6:
         priced = 0X77:  /*'6'*/
         break:
        case 7:
         priced = 0X1C:  /*'7'*/
         break:
        case 8:
         priced = 0X7F: /*'8'*/
         break:
        case 9:
         priced = 0X1F: /*'9'*/
         break:
        case 10:
         priced = 0X04:  /*   */
         break:
        default:
         priced = 0X00: /*   */
         break:
       }
     }

    if (count == 1)
     priced = priced | 0X80:  /*SET BIT 7 TO 1 FOR FOR THE DECIMAL POINT*/
    if (count == 3)
     priced = priced | 0X20:  /*ADD THE '$' SIGN*/
    memput(FIA2DRB.priced): /*PUT DATA TO BE DISPLAYED ON PORT*/
    memput(FIA2CRB.0X34): /*CB2 GOES LOW*/
    memput(FIA2CRB.0X3C): /*CB2 GOES HIGH. START CLOCKING IN DATA*/
   }
   /*FIND THE PORT WITH THE ASSOCIATED BUTTON NUMBER*/
   for (count = 0;prcbut[count] != 33:count++)
    {
/*     memput(FIA2CRA.0X3C):       RESET THE WATCHDOG TIMER*/
/*     memput(FIA2CRA.0X34):       BRING IT LOW AGAIN*/
     switch (prcbut[count])
      {
       case 0X08:
        port = 0X7F:
        break;
       case 0X07:
        port = 0XBF;
        break:
       case 0X06:
        port = 0XDF;
        break;
       case 0X05:
        port = 0XEF;
        break:
       case 0X04:
        port = 0XF7;
        break:
```

```
case 0X03:
 port = 0XFB:
 break:
case 0X02:
 port = 0XFD:
 break:
case 0X01:
 port = 0XFE:
 break:
case 0X10:
 port = 0X7F:
 break:
case 0X0F:
 port = 0XBF:
 break:
case 0X0E:
 port = 0XDF:
 break:
case 0X0D:
 port = 0XEF:
 break:
case 0X0C:
 port = 0XF7:
 break:
case 0X0B:
 port = 0XFB:
 break:
case 0X0A:
 port = 0XFD:
 break:
case 0X09:
 port = 0XFE:
 break:
case 0X18:
 port = 0X7F:
 break:
case 0X17:
 port = 0XBF:
 break:
case 0X16:
 port = 0XDF:
 break:
case 0X15:
 port = 0XEF:
 break:
case 0X14:
 port = 0XF7:
 break:
case 0X13:
 port = 0XFB:
 break:
case 0X12:
 port = 0XFD:
 break:
case 0X11:
 port = 0XFE:
 break:
case 0X20:
 port = 0X7F:
 break:
case 0X1F:
 port = 0XBF:
 break:
case 0X1E:
 port = 0XDF:
 break:
```

```
      case 0X1D:
       port = 0XEF:
       break:
      case 0X1C:
       port = 0XF7:
       break:
      case 0X1B:
       port = 0XFB:
       break:
      case 0X1A:
       port = 0XFD:
       break:
      case 0X19:
       port = 0XFE:
       break:
     }
       memout(PIA2DRB.port):
   if (prcbut[count] >= 1 && prcbut[count] <= 8)
    memout(PIA1DRA.0XEF): /*PORT1 IS SELECTED*/
   else
   if (prcbut[count] >= 9 && prcbut[count] <= 16)
    memout(PIA1DRA.0XDF): /*PORT2 IS SELECTED*/
   else
    if (prcbut[count] >= 17 && prcbut[count] <= 24)
     memout(PIA1DRA.0XBF): /*PORT3 IS SELECTED*/
   else
    memout(PIA1DRA.0X7F): /*PORT4 IS SELECTED*/
   memout(PIA1DRA.0XFF):  /*BRING STROBE LINE HIGH*/
       memout(PIA2DRB.0XFF):  /*SET UP PORT TO BRING LOAD LINE LOW OF DISPLAY*
   memout(PIA1DRA.0X0F):  /*STROBE LINES ARE LOW. LATCH IN DATA*/
   memout(PIA1DRA.0XFF): /*BRING STROBE LINES HIGH*/
  }
 return:
}

/*****************************************************************************
* FUNCTION NAME
* GETPRICE
*============================================================================
* DESCRIPTION
*  THIS FUNCTION WILL GET THE PRICE DATA FROM THE CONTROL MICROPROCESSOR AND
*  THE BUTTON ASSOCIATED WITH THE PRICE
* FUNCTIONS CALLED
*  STATUS     TALKMICR.C
*  MEMPUT     INOUT.C
*  MEMGET     INOUT.C
*  SENDPRC    PRICE.C
* REVISIONS
*  REV    DATE      ENGINEER      DESCRIPTION OF CHANGE
*****************************************************************************/

getprc()
 {
  char count:            /*COUNTER*/
  char temp:             /*TEMPORARY STORAGE*/
  char prcbut[35]:       /*HOLDS THE PRICE BUTTON INFORMATION*/
  char savecde[6]:       /*HOLDS THE PRICE INFORMATION*/

  for (count = 0:count < 4:count++)   /*LOOP 4 TIMES SINCE 4 DIGIT PRICE DISPLAY
*/
   {
    status(1.0X75):
    memout(ACIA2SR.0X55): /*DISABLE CLEAR TO SEND*/
    savecde[count] = memget(ACIA2DR): /*GET THE PRICE INFORMATION*/
    if (savecde[count] > 11 && savecde[count] != 20)
     savecde[count] = 10: /*WRITE A ' ' TO THE DISPLAY IF BAD DATA*/
   }
 temp = 0:
 for (count = 0:temp != 33:count++)  /*33 IS THE TERMINATOR*/
  {
   status(1.0X75):
   memout(ACIA2SR.0X55):  /*DISABLE CLEAR TO SEND*/
   prcbut[count] = memget(ACIA2DR):   /*GET THE BUTTON INFORMATION*/
   temp = prcbut[count]:
  }
 sendprc(prcbut.savecde):
 return:
}
```

```
**************************************************************************
* FUNCTION NAME              MODULE NAME          PROGRAM NAME
* SENDPRC()                  PRICE.C              KEYBOARD CONTROL
*=========================================================================
* DESCRIPTION
*   THIS FUNCTION WILL SEND THE PRICE TO THE DISPLAYS.
* FUNCTIONS CALLED
*   DINPUT   INOUT.C
*   MEMGET   INOUT.C
* VARIABLE PASSED
*  PRCBUT    THIS IS AN ARRAY THAT CONTAINS ALL THE BUTTON NUMBERS THAT ARE
*            TO BE DISPLAYED.
*  SAVECDE   THIS ARRAY CONTAINS THE PRICE INFORMATION
* REVISIONS
* REV      DATE       ENGINEER       DESCRIPTION OF CHANGE
**************************************************************************

#include "io.h"


sendprc(prcbut,savecde)
 char prcbut[],savecde[];
  {
   char count;        /*COUNTER*/
   char port;         /*PIA PORT TO BE WRITTEN TO*/
   char pricecd;      /*PRICE CODE THAT IS WRITTEN TO THE DISPLAYS*/


  for (count = 0;count < 4;count++)
   {
    switch (savecde[count])
     {
      case 0:
       pricecd = 0X7E;  /*'0'*/
       break;
      case 1:
       pricecd = 0X30; /*'1'*/
       break;
      case 2:
       pricecd = 0X6D;  /*'2'*/
       break;
      case 3:
       pricecd = 0X79;  /*'3'*/
       break;
      case 4:
       pricecd = 0X33;  /*'4'*/
       break;
      case 5:
       pricecd = 0XB3;  /*'5'*/
       break;
      case 6:
       pricecd = 0X1F;  /*'6'*/
       break;
      case 7:
       pricecd = 0X70;  /*'7'*/
       break;
```

```
  case 8:
   pricecd = 0X7F; /*'8'*/
   break;
  case 9:
   pricecd = 0X[illegible]; /*[illegible]*/
   break;
  case 10:
   pricecd = 0X00; /*' '*/
   break;
  case 11:
   pricecd = 0X[illegible]F; /* PLEASE MAKE ANOTHER SELECTION 1 */
   break;
  case 12:
   pricecd = 0X3F; /* PLEASE MAKE ANOTHER SELECTION */
   break;
  default:
   pricecd = 0X00; /*' '*/
   break;
  }

 if (count == 1)
  pricecd = pricecd | 0X80; /*SET BIT 7 TO 1 FOR FOR THE DECIMAL POINT*/
 if (count == 3)
  pricecd = pricecd | 0X20; /*ADD THE '$' SIGN*/
 memout(PIA2CRB,pricecd); /*PUT DATA TO BE DISPLAYED ON PORT*/
 memout(PIA2CRB,0X34); /*CB2 GOES LOW*/
 memout(PIA2CRB,0X3C); /*CB2 GOES HIGH, START CLOCKING IN DATA*/
}
/*FIND THE PORT WITH THE ASSOCIATED BUTTON NUMBER*/
for (count = 0;prcout[count] != 33;count++)
 {
/*     memout(PIA2CRA,0X3C);      RESET THE WATCHDOG TIMER*/
/*     memout(PIA2CRA,0X34);      BRING IT LOW AGAIN*/
  switch (prcout[count])
   {
    case 0X08:
     port = 0X7F;
     break;
    case 0X07:
     port = 0XBF;
     break;
    case 0X06:
     port = 0XDF;
     break;
    case 0X05:
     port = 0XEF;
     break;
    case 0X04:
     port = 0XF7;
     break;
    case 0X03:
     port = 0XFB;
     break;
    case 0X02:
     port = 0XFD;
     break;
    case 0X01:
     port = 0XFE;
     break;
    case 0X10:
     port = 0X7F;
     break;
    case 0X0F:
     port = 0XBF;
     break;
    case 0X0E:
```

```
  port = 0XDF;
  break;
 case 0X0D:
  port = 0XEF;
  break;
 case 0X0C:
  port = 0XF7;
  break;
 case 0X0B:
  port = 0XFB;
  break;
 case 0X0A:
  port = 0XFD;
  break;
 case 0X09:
  port = 0XFE;
  break;
 case 0X18:
  port = 0X7F;
  break;
 case 0X17:
  port = 0XBF;
  break;
 case 0X16:
  port = 0XDF;
  break;
 case 0X15:
  port = 0XEF;
  break;
 case 0X14:
  port = 0XF7;
  break;
 case 0X13:
  port = 0XFB;
  break;
 case 0X12:
  port = 0XFD;
  break;
 case 0X11:
  port = 0XFE;
  break;
 case 0X20:
  port = 0X7F;
  break;
 case 0X1F:
  port = 0XBF;
  break;
 case 0X1E:
  port = 0XDF;
  break;
 case 0X1D:
  port = 0XEF;
  break;
 case 0X1C:
  port = 0XF7;
  break;
 case 0X1B:
  port = 0XFB;
  break;
 case 0X1A:
  port = 0XFD;
  break;
 case 0X19:
  port = 0XFE;
  break;
}
```

```
      memout(PIA2DRB,port);
   if (prcbut[count] >= 1 && prcbut[count] <= 8)
    memout(PIA1DRA,0XEF); /*PORT1 IS SELECTED*/
   else
   if (prcbut[count] >= 9 && prcbut[count] <= 16)
     memout(PIA1DRA,0XDF); /*PORT2 IS SELECTED*/
   else
    if (prcbut[count] >= 17 && prcbut[count] <= 24)
     memout(PIA1DRA,0XBF); /*PORT3 IS SELECTED*/
   else
    memout(PIA1DRA,0X7F); /*PORT4 IS SELECTED*/
   memout(PIA1DRA,0XFF); /*BRING STROBE LINE HIGH*/
      memout(PIA2DRB,0XFF); /*SET UP PORT TO BRING LOAD LINE LOW OF DISPLAY*/
   memout(PIA1DRA,0X0F); /*STROBE LINES ARE LOW, LATCH IN DATA*/
   memout(PIA1DRA,0XFF); /*BRING STROBE LINES HIGH*/
  }
 return;

/***********************************************************************************
* FUNCTION NAME
* GETPRICE
*==================================================================================
* DESCRIPTION
*  THIS FUNCTION WILL GET THE PRICE DATA FROM THE CONTROL MICROPROCESSOR AND
*  THE BUTTON ASSOCIATED WITH THE PRICE
* FUNCTIONS CALLED
*  STATUS     TALKMICR.C
*  MEMPUT     INOUT.C
*  MEMGET     INOUT.C
*  SENDPRC    PRICE.C
* REVISIONS
*  REV    DATE       ENGINEER       DESCRIPTION OF CHANGE
***********************************************************************************/

getprc()
 {
  char count;          /*COUNTER*/
  char temp;           /*TEMPORARY STORAGE*/
  char prcbut[35];     /*HOLDS THE PRICE BUTTON INFORMATION*/
  char savecde[6];     /*HOLDS THE PRICE INFORMATION*/

  for (count = 0;count < 4;count++)  /*LOOP 4 TIMES SINCE 4 DIGIT PRICE DISPLAY
*/
   {
    status(1,0X75);
    memout(ACIA2SR,0X55); /*DISABLE CLEAR TO SEND*/
    savecde[count] = memget(ACIA2DR); /*GET THE PRICE INFORMATION*/
    if (savecde[count] > 11 && savecde[count] != 21)
     savecde[count] = 10; /*WRITE A ' ' TO THE DISPLAY IF BAD DATA*/
   }
  temp = 0;
  for (count = 0;temp != 33;count++) /*33 IS THE TERMINATOR*/
   {
    status(1,0X75);
    memout(ACIA2SR,0X55); /*DISABLE CLEAR TO SEND*/
    prcbut[count] = memget(ACIA2DR);  /*GET THE BUTTON INFORMATION*/
    temp = prcbut[count];
   }
  sendprc(prcbut,savecde);
  return;
 }
```

```
/*****************************************************************************
* FUNCTION NAME                  MODULE NAME                 PROGRAM NAME
* LEDS                           LEDS.C                      COMET KEYBOARD
*
*============================================================================
*
* DESCRIPTION:
* THERE ARE 32 OUT OF STOCK LEDS. LEDSAVE1, LEDSAVE2, LEDSAVE3, AND LEDSAVE4
* HOLD THE OUT OF STOCK INFORMATION. THE LATCHES USED ARE 74ACT273 S. WE
* SEND DATA OUT AND THEN WE LATCH THE DATA WITH PA4, PA5, PA6, OR PA7 ON U1
* PIA1.
* FUNCTIONS CALLED
*               MEMPUT
* FUNCTIONS THAT CALL LEDS()
*               INIT    FILE INIT.C
* REVISIONS
* REV    DATE     ENGINEER       DESCRIPTION OF CHANGE
*****************************************************************************/
#include "?.h"
static char ledsave1, ledsave2, ledsave3, ledsave4, allon;
char leds()
 {
  if (allon == TRUE)
   turnon(0XEF);                          /*SEND THE ADDRESS TO TURN ON ONE AT A TIME*/
  memout(PIA2DRB,ledsave1);                /*LEDSAVE IS THE OUT OF STOCK LEDS*/
  memout(PIA1DRA,0XEF);
  memout(PIA1DRA,0XFF);
  if (allon == TRUE)
   turnon(0XDF);                          /*SEND THE ADDRESS TO TURN ON ONE AT A TIME*/
  memout(PIA2DRB,ledsave2);
  memout(PIA1DRA,0XDF);
  memout(PIA1DRA,0XFF);
  if (allon == TRUE)
   turnon(0XBF);                          /*SEND THE ADDRESS TO TURN ON ONE AT A TIME*/
  memout(PIA2DRB,ledsave3);
  memout(PIA1DRA,0XBF);
  memout(PIA1DRA,0XFF);
  if (allon == TRUE)
   turnon(0X7F);                          /*SEND THE ADDRESS TO TURN ON ONE AT A TIME*/
  memout(PIA2DRB,ledsave4);
  memout(PIA1DRA,0X7F);
  memout(PIA1DRA,0XFF);                 /*BRING CONTROL LINES HIGH*/
  return;
 }


/*****************************************************************************
* FUNCTION NAME
* TURNON.C
*============================================================================
* DESCRIPTION
*  THIS FUNCTION WILL TURN ON EACH LED ON AT A TIME.  THIS WILL LIMIT THE
*  INRUSH CURRENT ON THE 12 VOLT SUPPLY
* PARAMETERS PASSED
*  ADDRESS     ADDRESS THAT WE ARE TO WRITE TO
* REVISIONS
* REV    DATE      ENGINEER      DESCRIPTION OF CHANGE
```

```
turnon(address)
 char address;

  char data;   /*DATA TO BE WRITTEN TO THE DF8311*/
  char count;   /*COUNTER FOR LOOP*/
  char tmpdata; /*TEMPORARY HOLDER FOR DATA*/

  data = 0XF7;
  for (count = 0;count < 8;count++) /*LOOP 8 TIMES*/
   {
    data = data << 1;      /*SHIFT DATA LEFT BY ONE POSITION*/
    tmpdata = ~data;    /*COMPLEMENT DATA*/
    memout(PIA1DRB,tmpdata);
    memout(PIA1DRA,address);   /*TOGGLE WRITE LINES LOW*/
    memout(PIA1DRA,0XFF);     /*TOGGLE WRITE LINES HIGH*/
    delay(0X0050);           /*DELAY*/
   }
  return;
 }

/******************************************************************************
*THIS FUNCTION WILL LOOK AT THE VALUE PASSED AND DETERMINE WHICH LED
*SHOULD BE TURNED OFF.
*FUNCTIONS CALLED
*            LEDS     FILE LEDS.C
*FUNCTIONS THAT CALL LEDOUT
*            LEDOUT     FILE IRQ.C
******************************************************************************/

ledoff(value)
 char value;

   switch (value)
    {
        case 0X00:
         ledsave1 = 0X00;
     ledsave2 = 0X00;
     ledsave3 = 0X00;
     ledsave4 = 0X00;
     break;
    case 0X08:
     ledsave1 = ledsave1 & 0X7F;
     break;
    case 0X07:
     ledsave1 = ledsave1 & 0XBF;
     break;
    case 0X06:
     ledsave1 = ledsave1 & 0XDF;
     break;
    case 0X05:
     ledsave1 = ledsave1 & 0XEF;
     break;
    case 0X04:
     ledsave1 = ledsave1 & 0XF7;
     break;
    case 0X03:
     ledsave1 = ledsave1 & 0XFB;
     break;
    case 0X02:
     ledsave1 = ledsave1 & 0XFD;
     break;
    case 0X01:
     ledsave1 = ledsave1 & 0XFE;
     break;
    case 0X10:
```

```
    ledsave2 = ledsave2 & 0X7F;
    break;
  case 0X0F:
    ledsave2 = ledsave2 & 0XBF;
    break;
  case 0X0E:
    ledsave2 = ledsave2 & 0XDF;
    break;
  case 0X0D:
    ledsave2 = ledsave2 & 0XEF;
    break;
  case 0X0C:
    ledsave2 = ledsave2 & 0XF7;
    break;
  case 0X0B:
    ledsave2 = ledsave2 & 0XFB;
    break;
  case 0X0A:
    ledsave2 = ledsave2 & 0XFD;
    break;
  case 0X09:
    ledsave2 = ledsave2 & 0XFE;
    break;
  case 0X18:
    ledsave3 = ledsave3 & 0X7F;
    break;
  case 0X17:
    ledsave3 = ledsave3 & 0XBF;
    break;
  case 0X16:
    ledsave3 = ledsave3 & 0XDF;
    break;
  case 0X15:
    ledsave3 = ledsave3 & 0XEF;
    break;
  case 0X14:
    ledsave3 = ledsave3 & 0XF7;
    break;
  case 0X13:
    ledsave3 = ledsave3 & 0XFB;
    break;
  case 0X12:
    ledsave3 = ledsave3 & 0XFD;
    break;
  case 0X11:
    ledsave3 = ledsave3 & 0XFE;
    break;
  case 0X20:
    ledsave4 = ledsave4 & 0X7F;
    break;
  case 0X1F:
    ledsave4 = ledsave4 & 0XBF;
    break;
  case 0X1E:
    ledsave4 = ledsave4 & 0XDF;
    break;
  case 0X1D:
    ledsave4 = ledsave4 & 0XEF;
    break;
  case 0X1C:
    ledsave4 = ledsave4 & 0XF7;
    break;
  case 0X1B:
    ledsave4 = ledsave4 & 0XFB;
    break;
  case 0X1A:
```

```
      ledsave4 = ledsave4 & OXFD;
      break;
     case OX19:
      ledsave4 = ledsave4 & OXFE;
      break;
    }
  leds();
  return;
 }

/*****************************************************************************
*THIS FUNCTION WILL LOOK AT THE TENS PLACE OF THE BUTTON NUMBER AND MULTIPLY
*BY 10.  WE WILL THEN ADD THE ONE DIGIT TO GET A VALUE THAT WILL TURN OFF
*THE LED.
*FUNCTIONS CALLED
*  LEDON    LEDS.C
*  LEDOFF   LEDS.C
*****************************************************************************

ledout(outstock,on)
 char outstock[], on;
  {
   char value, loc = 0;

   while (outstock[loc] != ZZ)
    {
     allon = FALSE;                /*INITIALIZE FLAG*/
     value = (outstock[loc++]);
     if (on == TRUE)
      ledon(value);
     else
      ledoff(value);
    }
   return;
  }

 *****************************************************************************
*THIS FUNCTION WILL LOOK AT THE VALUE PASSED AND DETERMINE WHICH LED
*SHOULD BE TURNED ON.
*FUNCTIONS CALLED
*           LEDS     FILE LEDS.C
*FUNCTIONS THAT CALL LEDOUT
*           LEDOUT      FILE IRQ.C
*****************************************************************************/

ledon(value)
 char value;
  {
  switch (value)
   {
    case OXFF:                /*ALL LEDS ARE TO BE SHUT ON*/
     allon = TRUE;            /*SET FLAG*/
     ledsave1 = OXFF;
     ledsave2 = OXFF;
     ledsave3 = OXFF;
     ledsave4 = OXFF;
     break;
    case OX08:
     ledsave1 = ledsave1 | OX80;
     break;
    case OX07:
     ledsave1 = ledsave1 | OX40;
     break;
    case OX06:
     ledsave1 = ledsave1 | OX20;
     break;
```

```
case 0X05:
 ledsave1 = ledsave1 | 0X10;
 break;
case 0X04:
 ledsave1 = ledsave1 | 0X08;
 break;
case 0X03:
 ledsave1 = ledsave1 | 0X04;
 break;
case 0X02:
 ledsave1 = ledsave1 | 0X02;
 break;
case 0X01:
 ledsave1 = ledsave1 | 0X01;
 break;
case 0X10:
 ledsave2 = ledsave2 | 0X80;
 break;
case 0X0F:
 ledsave2 = ledsave2 | 0X40;
 break;
case 0X0E:
 ledsave2 = ledsave2 | 0X20;
 break;
case 0X0D:
 ledsave2 = ledsave2 | 0X10;
 break;
case 0X0C:
 ledsave2 = ledsave2 | 0X08;
 break;
case 0X0B:
 ledsave2 = ledsave2 | 0X04;
 break;
case 0X0A:
 ledsave2 = ledsave2 | 0X02;
 break;
case 0X09:
 ledsave2 = ledsave2 | 0X01;
 break;
case 0X18:
 ledsave3 = ledsave3 | 0X80;
 break;
case 0X17:
 ledsave3 = ledsave3 | 0X40;
 break;
case 0X16:
 ledsave3 = ledsave3 | 0X20;
 break;
case 0X15:
 ledsave3 = ledsave3 | 0X10;
 break;
case 0X14:
 ledsave3 = ledsave3 | 0X08;
 break;
case 0X13:
 ledsave3 = ledsave3 | 0X04;
 break;
case 0X12:
 ledsave3 = ledsave3 | 0X02;
 break;
case 0X11:
 ledsave3 = ledsave3 | 0X01;
 break;
case 0X20:
 ledsave4 = ledsave4 | 0X80;
 break;
```

```
    case 0X1F:
     ledsave4 = ledsave4 | 0X40;
     break;
    case 0X1E:
     ledsave4 = ledsave4 | 0X20;
     break;
    case 0X1D:
     ledsave4 = ledsave4 | 0X10;
     break;
    case 0X1C:
     ledsave4 = ledsave4 | 0X08;
     break;
    case 0X1B:
     ledsave4 = ledsave4 | 0X04;
     break;
    case 0X1A:
     ledsave4 = ledsave4 | 0X02;
     break;
    case 0X19:
     ledsave4 = ledsave4 | 0X01;
     break;
   }
  leds();
  return;
}
```

```
/*****************************************************************************
*  FUNCTION NAME            MODULE NAME            PROGRAM NAME
*  TALK                     TALKMICR.C             COMET KEYBOARD
*
*============================================================================
*  DESCRIPTION:
*     THIS MODULE WILL TALK TO THE CONTROL MICROPROCESSOR.  DATA TO BE
*     PASSED WILL BE THE BUTTON THAT WAS PRESSED.
*  FUNCTIONS CALLED
*     STATUS   TALKMICR.C
*     MEMPUT   INOUT.C
*     MESSAGE  TALKMICR.C
*  PARAMETERS PASSED:
*     BUTTON
*  REVISIONS
*  REV      DATE     ENGINEER        DESCRIPTION OF CHANGE
*****************************************************************************

#include "ic.h"

/*GLOBAL*/
char indicator;    /*THIS IS THE STATUS OF THE INDICATOR LIGHT*/

talk(button)
 char button;
 {

  status(2.0X7F);
  memout(ACIA2DR.button);   /*SEND THE BUTTON*/
  message();
  return:
 }

/*****************************************************************************
*  FUNCTION NAME
*  STATUS
*============================================================================
*  DESCRIPTION:
*     THIS FUNCTION WILL CHECK THE STATUS OF THE ACIA TO DETERMINE WHETHER
*     THE TRANSMIT DATA REGISTER IS EMPTY OR THE RECIEVE DATA REGISTER IS
*     FULL. DEPENDING ON THE PARAMETER PASSED.
*  FUNCTIONS CALLED
*     MEMPUT   INOUT.C
*     MEMGET   INOUT.C
*  PARAMETERS PASSED
*     A, B    "A" TELLS US WHETHER WE ARE LOOKING FOR A STREAM OF DATA OR IF
*             WE ARE WAITING TO SEND DATA.
*  PARAMETERS RETURNED:
*     STAT   THIS WILL TELL US WHETHER A SUCCESSFUL TRANSFER WAS COMPLETED.
*****************************************************************************/

status(a.b)
 char a, b:
  {
   char stat: /*CONTAINS STATUS OF ACIA*/

   stat = 0:
   memout(ACIA2SR.0X15):        /*CLEAR TO SEND*/
```

```
  while (stat != a)
   {
    memput(PIA2DRA,0X3C);        /*RESET THE WATCHDOG TIMER*/
    memput(PIA2DRA,0X34);        /*BRING IT LOW AGAIN*/
    stat = memget(ACIA2SR) & a;       /*GET THE STATUS*/
    if (a == 2 && stat == 3)
     {
      stat = memget(ACIA2DR);             /*WE GOT DATA WHILE NOT EXPECTING IT*/
      memput(ACIA1DR,'E');
      for (;;);              /*LOOP FOREVER UNTIL A RESET OCCURS*/
     }
    if (stat > 0X0F)                    /*WE HAVE AN ERROR*/
     {
      memget(ACIA2DR);
      memput(ACIA1DR,stat);
      for (;;);            /*LOOP UNTIL A RESET OCCURS*/
     }
   }
  return(stat);
 }

/*****************************************************************************
*  FUNCTION NAME
*  MESSAGE
*=============================================================================
*  DESCRIPTION
*     THIS FUNCTION WILL GET A MESSAGE FROM THE CONTROL MICROPROCESSOR
*     AND PROCESS THAT MESSAGE.
*  FUNCTIONS CALLED
*     BEEP      BEEPER.C
*     STATUS    TALKMICR.C
*     MEMPUT    INOUT.C
*     MEMGET    INOUT.C
*     READSKU   READSKU.C
*     SENDSKU   READSKU.C
*     LEDOUT    LEDS.C
*     SENDPRC   PRICE.C
*  REVISIONS
*  REV    DATE      ENGINEER        DESCRIPTION OF CHANGE
*****************************************************************************/

message()
 {
  char code;          /*CONTAINS FUNCTION THAT WILL BE PERFORMED*/


  code = 0;
  while (code != 'A')       /*WAIT FOR MAKE ANOTHER SECTION COMMAND*/
   {
    status(1,0X75);
    memput(ACIA2SR,0X55); /*DISABLE CLEAR TO SEND*/
    code = memget(ACIA2DR); /*GET THE CODE*/
    switch (code)
     {
      case 'W':              /*PLEASE WAIT COMMAND*/
       memput(PIA2DRA,0X12);   /*PA1 HIGH*/
       indicator = 0X12;
       break;
      case 'T':              /*THANK YOU COMMAND*/
       memput(PIA2DRA,0X14);   /*PA2 HIGH*/
       indicator = 0X14;
       break;
      case 'A':              /*MAKE ANOTHER SELECTION COMMAND*/
       memput(PIA2DRA,0X11);   /*PA0 HIGH*/
       indicator = 0X11;
```

```
        break;
      case 'B':                      /*TURN BEEPER ON*/
        beep();
        break;
      case 'R':                      /*READ SKU MESSAGE*/
        readsku();
        sendsku();
        break;
      case 'O':                      /*OUT OF STOCK COMMAND*/
        getout();
        break;
      case 'P':                      /*DISPLAY PRICE COMMAND*/
        getprc();
        break;
      }
    }
  status(C,0X7F);
  memout(ACIA2DR,0X0D);            /*SEND RECIEVE SIGNAL*/
/*  memout(ACIA2SR,0X95);*/
return;
}


/*************************************************************************
*  MODULE NAME                   PROGRAM NAME
*    INOUT.C                    COMET KEYBOARD
*=========================================================================
* DESCRIPTION:
*      THIS MODULE WILL READ (MEMGET) AND WRITE (MEMPUT) DATA TO THE PIA S
*      AND THE ACIA S.
* REVISION
* REV   DATE    ENGINEER              DESCRIPTION OF CHANGE
**************************************************************************/


char memget(address)
 char *address;
 {
  return(*address);
 }

char memout(address,value)
 char value, *address;
 {
  *address = value;
  return;
 }
```

```
.*PAO WILL BE USED FOR BEEPER FOR TEMPORARY PURPOSES UNTIL ANOTHER BOARD IS
  LAYED OUT. WE WILL THEN USE PA5 AS OUR BEEPER 3/12/88*/
/****************************************************************************
*   FUNCTION NAME           MODULE NAME                 PROGRAM NAME
*   INITIAL                 INITIAL.C                  COMET KEYBOARD
*===========================================================================
*  DESCRIPTION:
*     THIS ROUTINE WILL SET UP THE ACIA'S AND THE PIA'S.  PORT A. BITS
*     0 - 3. WILL BE USED FOR SCANNING THE KEYBOARD (BUTTONS). PORT A.
*     BITS 4 - 7. WILL BE USED TO STORE THE LATCHES FOR THE OUT OF STOCK
*     LEDS.  PORT B. BITS 0 - 7. ARE ALL USED FOR INTPUTS FROM THE
*     KEYBOARD.  CA2 WILL BE USED AS AN OUTPUT TO SELECT THE CONTACT
*     STRIPS READ (SKU READ OF BUTTON NUMBER).
*
*  FUNCTIONS CALLED
*     MEMPUT  INOUT.C
*     LEDOUT  LEDS.C
*  CALLING CONVENTION
*     THIS ROUTINE WILL BE CALLED BY START.ASM AFTER A POWER UP SEQUENCE.
*
*  AUTHOR: BOB HADICK
*  DATE:    OCTOBER 19, 1987
*
*  REVISION RECORD
*  REV       DATE      ENGINEER           DESCRIPTION OF CHANGE
****************************************************************************/

#include "io.h"

extern char indicator;

initial()
 {
  char loc = 0;      /*COUNTER FOR OUT OF STOCK*/
  char outstock[3]; /*HOLDS OUT OF STOCK POWER UP DATA*/

/*  memput(ACIA1CR,0X03);
  memput(ACIA1CR,0X55);*/
  memput(ACIA2CR,0X03);     /*RESET ACIA*/
  memput(ACIA2CR,0X55);     /*RTS HIGH, 8 DATA BITS, NO PARITY, AND ONE STOP BIT.
INTERRUPT DISABLED*/
  memput(PIA1CRA,0X38);     /*DATA DIRECTION REGISTER SELECTED*/
  memput(PIA1DRA,0XFF);     /*PORT A ARE ALL OUTPUTS*/
  memput(PIA1CRA,0X3C);     /*OUTPUT REGISTER SELECTED, CA2 IS HIGH*/
  memput(PIA1CRB,0X38);     /*DATA DIRECTION REGISTER SELECTED*/
  memput(PIA1DRB,0X00);     /*PORT B ARE ALL INPUTS*/
  memput(PIA1CRB,0X3C);     /*OUTPUT REGISTER SELECTED. CB2 IS HIGH*/
  memput(PIA2CRB,0X38);     /*DATA DIRECTION REGISTER SELECTED*/
  memput(PIA2DRB,0XFF);     /*PORT B ALL OUTPUTS*/
  memput(PIA2CRB,0X3C);     /*OUTPUT REGISTER SELECTED, CB2 IS HIGH*/
  memput(PIA2CRA,0X30);     /*DATA DIRECTION REGISTER SELECTED*/
  memput(PIA2DRA,0X3F);     /*PA0 - PA5 ARE OUTPUTS*/
  memput(PIA2CRA,0X34);     /*OUTPUT REGISTER SELECTED, CA2 IS LOW*/

  memput(PIA2DRB,0X00);     /*DISABLE ALL LOAD LINES*/
  memput(PIA1DRA,0X0F);     /*STOBE LINES ARE LOW*/
  memput(PIA1DRA,0XFF);     /*DON'T SCAN KEYBOARD, STROBE LINES HIGH*/
  memput(PIA2DRA,0X12);     /*(BEEPER TURNED OFF (TEST))MAKE ANOTHER SELECTION TUR


 NED ON*/
   indicator = 0X12;
   outstock[loc++] = 0XFF;
   outstock[loc] = 33;
   ledout(outstock,TRUE);
/*  memget(ACIA2SR);
   memget(ACIA2DR);*/
/*  memput(ACIA2CR,0X95);    RTS LOW, INTERRUPT ENABLED*/
   return;
  }
```

```
/***************************************************************************
* FUNCTION NAME                    MODULE NAME            PROGRAM NAME
* GETOUT                            OUT.C                 KEYBOARD CONTROL
*==========================================================================
* DESCRIPTION
*  THIS FUNCTION WILL GET THE OUT OF STOCK DATA
* FUNCTIONS CALLED
*  STATUS       CALCMICR.C
*  MEMPUT       INOUT.C
*  MEMGET       INOUT.C
*  LEDOUT       LEDS.C
* REVISIONS
*  REV     DATE    ENGINEER      DESCRIPTION OF CHANGE
***************************************************************************/

#include "io.h"

getout()
 {
  char on;              /*FLAG FOR LEDS ON OR LEDS OFF*/
  char count = 0;       /*COUNTER*/
  char outstock[33];    /*HOLDS THE STOCK INFORMATION*/
  char temp;            /*TEMPORARY STORAGE*/

  status(1,0x75);       /*WAIT FOR NEXT BYTE*/
  memput(ACIA2SR,0X55);
  on = memget(ACIA2DR);   /*GET THE TURN OFF LED MESSAGE*/
  temp = 0;
  for (count = 0;temp != 33;count++)
   {
    status(1,0x75);
    memput(ACIA2SR,0X55);
    outstock[count] = memget(ACIA2DR);
    temp = outstock[count];
   }
  ledout(outstock,on);
  return;
 }
```

```
/****************************************************************************
*  FUNCTION NAME            MODULE NAME             PROGRAM NAME
*  READSKU                  READSKU.C             , COMET KEYBOARD
*============================================================================
*  DESCRIPTION:
*     THIS FUNCTION WILL READ THE CONTACT STRIPS FOR EACH BUTTON.  THIS WILL
*     GIVE US THE LOCATION OF THE SKU.  WE WILL THEN SEND THIS INFORMATION
*     TO THE CONTROL MICROPROCESSOR.
*  FUNCTIONS CALLED
*     MEMPUT   INOUT.C
*     MEMGET   INOUT.C
*  REVISIONS
*  REV     DATE     ENGINEER        DESCRIPTION OF CHANGE
****************************************************************************/

#include "io.h"
char sku[33];

extern char indicator;

readsku()
 {
 char x;              /*COUNTER*/
 char address; /*ADDRESS THAT IS TO BE READ*/
 char number;  /*COUNTER LOCATION FOR SKU*/
 char value;          /*VALUE OF PORTB*/
 char data1;          /*DATA TO BE WRITTEN TO A PORT*/
 unsigned port;       /*PORT ADDRESS*/

  port = PIA1CRB;
  data1 = 0X3C;
  number = 1;
  address = 0;

  while (address < 31)             /*LOOP UNTIL READ 31 BUTTONS*/
   {
    memput(PIA2CRA,0X3C);        /*RESET THE WATCHDOG TIMER*/
    memput(PIA2CRA,0X34);        /*BRING IT LOW AGAIN*/
    for (x = 0;x <= 15;x++)
     {
      memput(PIA2DRB,address);      /*PUT OUT ADDRESS*/
      if (port == PIA2DRA)
       {
        value = indicator & 0XE7;
        memput(PIA2DRA,value);    /*0X06);     ENABLE THE LATCH*/
        memput(PIA2DRA,(value | 0X08));  /*0X0E);  LATCH DATA IN*/
       }
      else
       {
        memput(PIA1CRB,0X34);  /*CB2 GOES LOW, ENABLE LATCH*/
        memput(PIA2DRA,(indicator | 0X18)); /*0X1E); PA3 GOES LOW, LATCH ENABLE*
/
       }
      memput(PIA2CRB,0X38);    /*DATA DIRECTION REGISTER SELECTED*/
      memput(PIA2DRB,0X00);    /*PORT B ALL INPUTS*/
      memput(PIA2CRB,0X3C);    /*OUTPUT REGISTER SELECTED, CB2 IS HIGH*/
      memput(PIA1CRA,0X34);         /*ENABLE THE DATA BUSS*/
      sku[number] = memget(PIA2DRB); /*GET THE DATA*/
```

```
      number++;
    memout(port,data1);                  /*DISABLE THE LATCH*/
    memout(PIALDRA,(indicator & 0XFF)); /*DISABLE LATCH*/
      memout(PIALDRA,data);              DISABLE LATCH*/
    memout(PIACRA,0X3C);
    memout(PIACRB,0X3B);        /*DATA DIRECTION REGISTER SELECTED*/
    memout(PIADRB,0XFF);       /*PORT B ALL OUTPUTS*/
    memout(PIACRB,0X3C);       /*OUTPUT REGISTER SELECTED, CB2 IS HIGH*/
    address += 1;                 /*ADD 1 TO THE ADDRESS*/
   }
  port = PIADRA;                      /*PORT ADDRESS IS NOW BUTTONS 17 - 32*/
     data1 = indicator >> 0X18;          /*DATE.*/

  memout(PIACRA,0X3C);                /*DISABLE THE DATA BUS*/
 return;


/*****************************************************************************
*  FUNCTION NAME
*  SENDSKU
*============================================================================
*  DESCRIPTION
*      THIS FUNCTION WILL BE CALLED WHEN THE DOORS ARE CLOSED.  WE WILL SEND
*      THE SKU NUMBER AND THE BUTTON NUMER.
*  FUNCTIONS CALLED
*      STATUS   TALKMICR.C
*      MEMPUT   INOUT.C
*  REVISIONS
*  REV    DATE    ENGINEER      DESCRIPTION OF CHANGE
*****************************************************************************/

sendsku()
 {
  char number;       /*COUNTER*/
  unsigned count;  /*COUNTER*/

  for (number = 1;number < 33;number++)
   {
    for (count = 0;count < 0X0200;count++);
    status(1,0X7F);
    memout(ADIA2DR,sku[number]);
   }
  return;
 }
```

```
*THIS IS THE START UP ROUTINE FOR COMET

      TTL        THE COMET STARTUP ROUTINE'
      NAM       relstrc
      GLOBAL    .START
      GLOBAL    enirq
      EXTERN    initial
      EXTERN    scan
      EXTERN    message
      EXTERN    .LINK


*RESERVE MEMORY FOR STACK
         DSCT

         RMB 512
stack    EQU *

         PSCT

.START   LDS    #stack      PROGRAM WILL JUMP HERE ON A RESET
         CLRA
         JSR    initial     INTIALIZE THE PIA'S
                ANDCC #$EF        ENABLE IRQ INTERRUPT (BIT 4 OF CC REGISTER)
         JSR    .ENIRQ      ENABLE IRQ INTERRUPT OF ACIA
         CLRA
         JSR    scan        SCAN THE KEYBOARD
         JMP    .START

.IRQ     LDB    ##055        DISABLE RTS LINE AND INTERRUPT
         STB    $F940
         CLRA
         JSR    message
         ANDCC ##EF          ENABLE THE IRQ INTERRUPT AGAIN
         JSR    .ENIRQ       ENABLE IRQ INTERRUPT OF ACIA
         CLRA
         RTI

enirq    SUBA   #0           EXPECT NO PARAMETERS (C ENTRY)
         BEQ    .ENIRQ
         JSR    .LINK
.ENIRQ   LDB    $F940        ACIA2 STATUS REGISTER (ASSEMBLER ENTRY)
         LDB    $F941        ACIA2 DATA REGISTER
         LDB    ##095
         STB    $F940        ENABLE THE INTERRUPT
         CLRD                RETURN (int) 0 WITH 'Z' BIT SET
         RTS                 SINCE NO PARAMETERS WE CAN USE RTS TO RETURN


         ASCT

*INTERRUPT VECTORS

*IRQ INTERRUPT
         ORG $FFF8
         FDB .IRQ

*POWER ON RESET INTERRUPT
```

```
[illegible]
FCB .START

[illegible] START

/*THIS FILE DEFINES THE I/O PORTS*/

/*    THE FIRST ACIA IS DEVICE U8.*/
#define    ACIA1CR     0XFF40
#define    ACIA1SR     0XFF40
#define    ACIA1DR     0XFF41

/*    THE SECOND ACIA IS DEVICE U7.*/
#define    ACIA2CR     0XFF40    /*USE FF80 IF USING FANTOM 9 MONITOR*/
#define    ACIA2SR     0XFF40
#define    ACIA2DR     0XFF41

/*    THIS IS DEVICE U7 ON THE 6809 CONTROL MODULE.*/
#define    PIA2DRA     0XFD00
#define    PIA2DRB     0XFD01
#define    PIA2CRA     0XFD02
#define    PIA2CRB     0XFD03

/*THIS IS DEVICE U6 ON THE 6809 CONTROL MODULE*/

#define    PIA1DRA     0XFA80
#define    PIA1DRB     0XFA81
#define    PIA1CRA     0XFA82
#define    PIA1CRB     0XFA83

#define TRUE 1
#define FALSE 0
#define STX 2
#define ETX 3
```

What is claimed is:

1. An apparatus for storing and dispensing frozen comestibles, comprising:

- a cabinet having a frozen comestible delivery station;
- cooling means coupled to said cabinet for cooling said cabinet;
- a plurality of food product storage locations within said cabinet;
- a plurality of food product selection switches positioned on an exterior portion of said cabinet;
- a food product code sensor associated with each of said food product selection switches on said cabinet for reading a product code from a removable product identifier removably associated with each of said product storage locations;
- product characteristic storage means coupled to said cabinet for storing information related to the characteristics and locations of food products within said cabinet;
- mapping means coupled to said plurality of food product selection switches and to said food product code sensors for mapping a switch signal from one of said food product selection switches to a selected food product;
- interrogating means coupled to said product characteristic storage means, to said food product selection switches, and to said mapping means for interrogating said product characteristic storage means and identifying the storage location of a selected food product within said cabinet; and
- handling means coupled to said interrogating means and to said cabinet for transferring said selected food product from its storage location within said cabinet to the frozen comestible delivery station of said cabinet.

2. An apparatus for dispensing packaged refrigerated foods, as defined in claim 1, wherein said handling means comprises a pair of picker assemblies.

3. An apparatus for storing and dispensing frozen comestibles, as defined in claim 2, wherein each of said picker assemblies has a rotatable transporter.

4. An apparatus for storing and dispensing frozen comestibles, as defined in claim 1, wherein said food product code sensor comprises a digital code sensor.

5. An apparatus for storing and dispensing frozen comestibles, as defined in claim 1, wherein said product characteristic storage means comprises a plug-in random access memory.

6. An apparatus for storing and dispensing frozen comestibles, as defined in claim 5, wherein said plug-in random access memory is attached to a magazine.

7. An apparatus for storing and dispensing frozen comestibles, as defined in claim 1, wherein said cooling means comprises a refrigeration system.

8. An apparatus for storing and dispensing frozen comestibles, as defined in claim 1, wherein said mapping means comprises a microcomputer.

9. An apparatus for storing and dispensing frozen comestibles, as defined in claim 1, wherein said interrogating means comprises a microcomputer.

* * * * *